US012319346B2

(12) United States Patent
Lyons et al.

(10) Patent No.: US 12,319,346 B2
(45) Date of Patent: Jun. 3, 2025

(54) OFF-ROAD VEHICLE

(71) Applicant: Polaris Industries Inc., Medina, MN (US)

(72) Inventors: Jeremy S. Lyons, Centuria, WI (US); Daniel S. Weber, North Branch, MN (US); Keith A. Hollman, Osceola, WI (US); Aaron D. Deckard, Zionsville, IN (US); Travis J. Saari, Eau Claire, WI (US); Bryce A. Holm, Luck, WI (US); Nick S. Levin, Wyoming, MN (US); Christopher A Barnett, Lino Lakes, MN (US); Stephen G. Crain, Wyoming, MN (US); Amery D. Kuhl, North Branch, MN (US); Bruce A. St. Yves, Big Lake, MN (US); Boris Rubanovich, Oak Grove, MN (US); Jacob A. Frank, Dresser, WI (US)

( * ) Notice: Subject to any disclaimer, the term of this patent is extended or adjusted under 35 U.S.C. 154(b) by 0 days.

(21) Appl. No.: 17/708,327

(22) Filed: Mar. 30, 2022

(65) Prior Publication Data

US 2022/0315115 A1 Oct. 6, 2022

Related U.S. Application Data

(60) Provisional application No. 63/168,525, filed on Mar. 31, 2021.

(51) Int. Cl.

| | |
|---|---|
| ***B60K 13/04*** | (2006.01) |
| ***B60K 13/02*** | (2006.01) |
| ***B62D 21/18*** | (2006.01) |

(52) U.S. Cl.
CPC ............ *B62D 21/183* (2013.01); *B60K 13/02* (2013.01); *B60K 13/04* (2013.01)

(58) Field of Classification Search
CPC ....... B62D 21/183; B60K 13/02; B60K 13/04
See application file for complete search history.

(56) References Cited

U.S. PATENT DOCUMENTS

| | | | | |
|---|---|---|---|---|
| 3,747,704 | A * | 7/1973 | Ware | F01N 1/023 181/253 |
| 6,009,705 | A * | 1/2000 | Arnott | G10K 11/172 60/322 |
| 6,099,039 | A | 8/2000 | Hine | |
| 6,814,041 | B1 | 11/2004 | Cheng | |
| 7,198,017 | B2 | 4/2007 | Vogt | |

(Continued)

FOREIGN PATENT DOCUMENTS

CN 103256153 A * 8/2013

OTHER PUBLICATIONS

CN103256153A Machine English translation (Year: 2013).*

*Primary Examiner* — Jason D Shanske
*Assistant Examiner* — Matthew James O'Neill
(74) *Attorney, Agent, or Firm* — Faegre Drinker Biddle & Reath, LLP

(57) ABSTRACT

A vehicle shown herein is a side by side utility vehicle having frame configured to effectively transfer various loads throughout the frame as whole. The vehicle may further or alternatively include a routing tray configured to retain various fluid lines of the vehicle, a transmission including a passive duct acoustical attenuation device, a door seal configured to allow the frame to contact the seal at an angle, a modular door actuating mechanism, and/or a modular skid plate.

30 Claims, 146 Drawing Sheets

(56) References Cited

U.S. PATENT DOCUMENTS

| | | | | |
|---|---|---|---|---|
| 7,249,798 | B2 | 7/2007 | Saito | |
| 7,488,022 | B2 | 2/2009 | Belwafa et al. | |
| 7,992,676 | B1 | 8/2011 | Desjardins | |
| 9,266,569 | B1 | 2/2016 | Tew et al. | |
| 9,701,346 | B2 | 7/2017 | Deckard et al. | |
| 9,725,023 | B2 | 8/2017 | Miller | |
| 10,369,861 | B2 * | 8/2019 | Deckard | B60G 21/055 |
| 10,569,642 | B2 * | 2/2020 | Borud | B60K 1/00 |
| 10,800,250 | B2 * | 10/2020 | Nugteren | B60K 11/02 |
| 10,800,470 | B2 | 10/2020 | Barkey et al. | |
| 10,994,645 | B2 | 5/2021 | Deckard et al. | |
| 11,345,406 | B2 | 5/2022 | Johnson et al. | |
| 11,391,253 | B1 * | 7/2022 | Gilge | B60K 13/06 |
| 11,391,361 | B2 | 7/2022 | Leclair | |
| 11,400,985 | B2 | 8/2022 | Stojkovic | |
| 11,420,683 | B2 | 8/2022 | Newcomb et al. | |
| 11,448,311 | B2 | 9/2022 | Davis et al. | |
| 11,628,722 | B2 | 4/2023 | Rasa et al. | |
| 11,814,104 | B2 | 11/2023 | Rasa | |
| 12,012,027 | B2 | 6/2024 | Bjerketvedt et al. | |
| 12,017,702 | B2 | 6/2024 | Erspamer et al. | |
| 2011/0108358 | A1 | 5/2011 | Edgington | |
| 2011/0139110 | A1 | 6/2011 | Miller | |
| 2012/0031688 | A1 * | 2/2012 | Safranski | B60G 3/20 280/124.135 |
| 2015/0061275 | A1 * | 3/2015 | Deckard | B60G 3/20 280/124.135 |
| 2017/0233007 | A1 | 8/2017 | Park et al. | |
| 2019/0211915 | A1 * | 7/2019 | Davis | B60R 21/13 |
| 2020/0346542 | A1 | 11/2020 | Rasa | |
| 2024/0278846 | A1 | 8/2024 | Nysse | |

* cited by examiner

OFF-ROAD VEHICLE

The present application claims priority to U.S. Provisional Patent Application Ser. No. 63/168,525, filed Mar. 31, 2021, and entitled "OFF-ROAD VEHICLE," the complete disclosure of which is expressly incorporated by reference herein.

FIELD OF THE DISCLOSURE

The present invention relates to off-road vehicles including all-terrain vehicles ("ATVs") and utility vehicles ("UTVs").

BACKGROUND OF THE DISCLOSURE

Generally, ATVs and UTVs are used to carry one or more passengers and a small amount of cargo over a variety of terrains. Due to the terrain often traveled when using such off-road vehicles, the frame of the vehicle is susceptible to damage. Additionally, depending on the parameters of the vehicle, various frame components may be needed. Thus, a need exists for a frame configured to effectively transfer loads to reduce the possibility of the damage while also efficiently manufacturing various frame components for use with different configurations of the vehicle.

In addition, current ATVs and UTVs have various fluid lines running across them that may interfere with other portions of the vehicle. Thus, a need exists for a routing tray to retain these lines.

Furthermore, the powertrain for off-road vehicles may produce a significant amount of noise during operation. Thus, a need exists for reducing the amount of noise created by the powertrain to improve the rider's overall experience when using the vehicle. In a similar way, various components of the vehicle may be used to further seal the operator area from noise, moisture, debris, etc. For example, when the vehicle includes doors, a need exists for effective sealing and locking of such doors (or other components).

SUMMARY OF THE DISCLOSURE

In one embodiment of the disclosure, a vehicle comprises a frame including a lower frame portion, front and rear ground engaging members supporting the frame, a powertrain drivingly coupled to at least one of the front and rear ground engaging members, and a seating area supported by the frame, wherein the lower frame portion includes a front frame portion, a pair of longitudinally-extending frame members coupled to the front frame portion, and a brace coupled to the pair of longitudinally-extending frame members and the front frame portion and configured to transfer a load received by the front frame portion rearwardly to at least the pair of longitudinally-extending frame members.

In another embodiment of the disclosure, a vehicle comprises a frame including a lower frame portion, wherein the lower frame portion includes at least a first frame portion and a second frame portion, and the first frame portion includes at least a first frame member and a second frame member coupled to the first frame member, front and rear ground engaging members supporting the frame, and the first frame portion being positioned generally adjacent the front ground engaging members and the second frame portion being positioned longitudinally rearwardly of the first frame portion, a front suspension assembly operably coupled to the front ground engaging members, and the first and second frame members being positioned adjacent the front suspension assembly, a powertrain drivingly coupled to at least one of the front and rear ground engaging members, a seating area supported by the frame, and a bumper coupled to the lower frame portion, wherein the bumper is coupled to the second frame member, and the bumper and the first and second frame members are configured to transfer a load received by the bumper to at least the first frame portion and towards the second frame portion.

In yet another embodiment, a vehicle comprises a frame including a lower frame portion, wherein the lower frame portion includes a first frame member, a second frame member coupled to the first frame member, a pair of frame members coupled to the first frame member, and a bracket coupled between the second frame member and one of the pair of frame members, front and rear ground engaging members supporting the frame, a suspension assembly coupled between the front and rear ground engaging members and the frame, and the bracket is configured to support at least a portion of the suspension assembly, and a powertrain drivingly coupled to at least one of the front and rear ground engaging members.

In another embodiment, a frame of a vehicle comprises a cab frame, a lower frame portion having a first frame member, a first pair of vertically-extending frame members and a second pair of vertically-extending frame members, wherein the first pair of vertically-extending frame members and the second pair of vertically-extending frame members are coupled to ends of the first frame member, and a bracket assembly coupling the cab frame and the lower frame portion.

In another embodiment, a bracket assembly for coupling an upper frame assembly of a vehicle to a lower frame assembly of the vehicle comprises a first bracket having a lower coupling interface, and a second bracket having an upper coupling interface configured to couple with the lower coupling surface of the first bracket in a generally vertical orientation.

In yet another embodiment, a vehicle comprises a frame including a lower frame portion, the lower frame portion including a front frame portion, a rear frame portion, and a pair of first longitudinally-extending frame members coupled to the front frame portion and the rear frame portion, and the rear frame portion includes a pair of second longitudinally-extending frame members positioned inward of the pair of first longitudinally-extending frame members, front and rear ground engaging members supporting the frame, and a powertrain drivingly coupled to at least one of the front and rear ground engaging members, wherein the lower frame portion further includes a bracket coupled to one of the pair of first longitudinally-extending frame members and one of the pair of second longitudinally-extending frame members, the bracket being angled inwardly from the one of the pair of first longitudinally-extending frame members to the one of the pair of second longitudinally-extending frame members.

In another embodiment, a routing tray comprises a base configured to couple to a frame of a vehicle, and a plurality of channels extending across at least a portion of the base, each of the plurality of channels configured to receive a conduit, wherein the plurality of channels are integrally formed with the base.

In yet another embodiment, a vehicle comprises a frame, front and rear ground engaging members supporting the frame, and a powertrain drivingly coupled to at least one of the front and rear wheels, the powertrain comprising an engine and a transmission, and the transmission includes an air intake assembly and an exhaust assembly, wherein at least one of the air intake assembly and the exhaust assembly of the transmission includes a passive duct acoustical attenuation device.

In another embodiment, a vehicle comprises a frame having a plurality of frame members, front and rear ground engaging members supporting the frame, a powertrain drivingly coupled to at least one of the front and rear wheels, a seating area supported by the frame, and at least one door supported by the frame adjacent the seating area, wherein the at least one door includes a seal around a perimeter of an interior surface of the at least one door configured to engage at least one of the plurality of frame members, the seal including a flat portion and a round portion, the flat portion and the round portion configured to allow the at least one of the plurality of frame members to contact the seal at an angle.

In another embodiment, a vehicle comprises a frame having a plurality of frame members, front and rear ground engaging members supporting the frame, a powertrain drivingly coupled to at least one of the front and rear wheels, a seating area supported by the frame, and at least one door supported by the frame adjacent the seating area, wherein the at least one door includes an exterior actuating mechanism having a lock cylinder, the lock cylinder being removably coupled to the actuating mechanism.

In yet another embodiment, a vehicle comprises a frame having a plurality of frame members, front and rear ground engaging members supporting the frame, a powertrain drivingly coupled to at least one of the front and rear wheels, a seating area supported by the frame, and at least one door supported by the frame, wherein the at least one door includes an actuating mechanism having an interior actuating mechanism, an exterior actuating mechanism, and a latching mechanism, the interior actuating mechanism configured to actuate the latching mechanism independent of the exterior actuating mechanism.

In another embodiment, a vehicle comprises a frame, front and rear ground engaging members supporting the frame, a powertrain drivingly coupled to at least one of the front and rear wheels, a seating area supported by the frame, and a skid plate coupled to the frame, wherein the skid plate includes at least two of a first portion, a second portion, and a third portion, the first portion including a first end configured to couple with either of the second portion and the third portion, the second portion having a first end configured to couple with either of the first portion and the second portion, and the third portion having a first end configured to couple with the first portion and a second end configured to couple with the second portion.

BRIEF DESCRIPTION OF THE DRAWINGS

FIG. 118 shows an exploded view of the support bracket of FIG. 116;

FIG. 119 shows an exploded view of the support bracket of FIG. 116;

FIG. 120 shows a perspective view of a shock supporting a cargo box of the present disclosure;

FIG. 121 shows an exploded view of a shock mount of the shock of FIG. 120;

FIG. 122 shows an outer side perspective view of a door frame of the present disclosure;

FIG. 123 shows an inner side perspective view of the door frame of FIG. 122;

FIG. 124 shows an exploded view of the door frame of FIG. 122;

FIG. 125 shows a perspective view of a hinge assembly of the present disclosure;

FIG. 126 shows an exploded view of the hinge assembly of FIG. 125;

FIG. 127 shows an exploded view of a door limiter assembly of the present disclosure;

FIG. 128 shows a perspective view of the door limiter assembly of FIG. 127 on the door of the present disclosure;

FIG. 129 shows a perspective view of a door limiter of the present disclosure;

Figure 81:
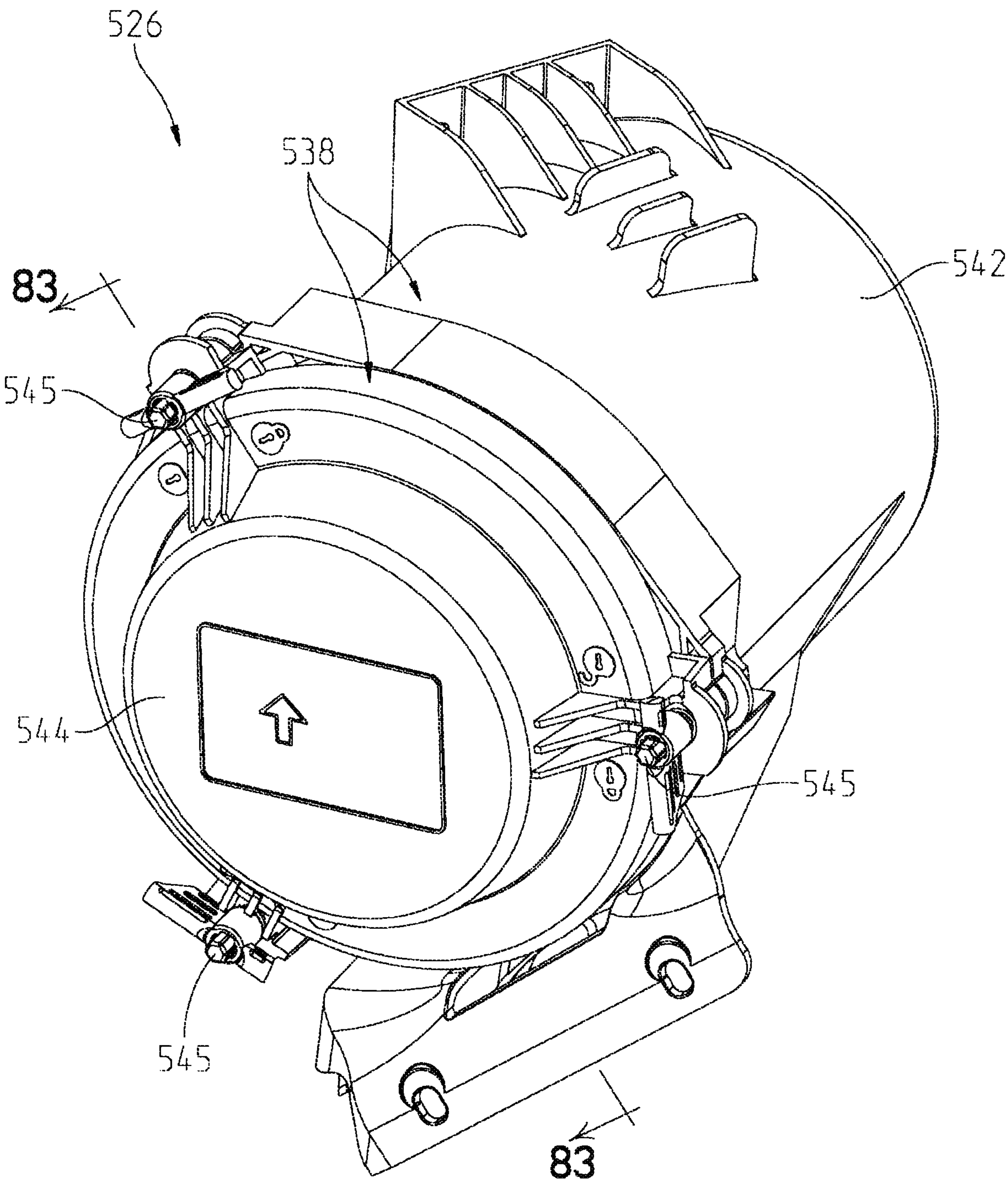
FIG. 81 shows an air filter assembly of the intake assembly of FIG. 77.
Figure 129:
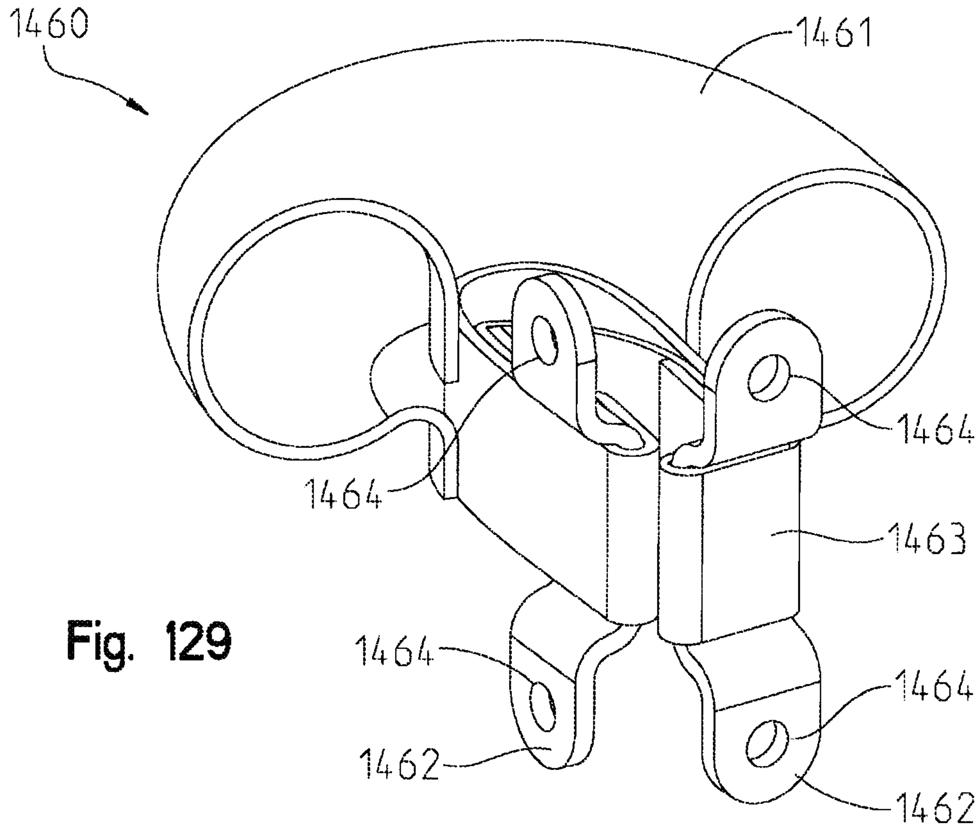
Figure 130:
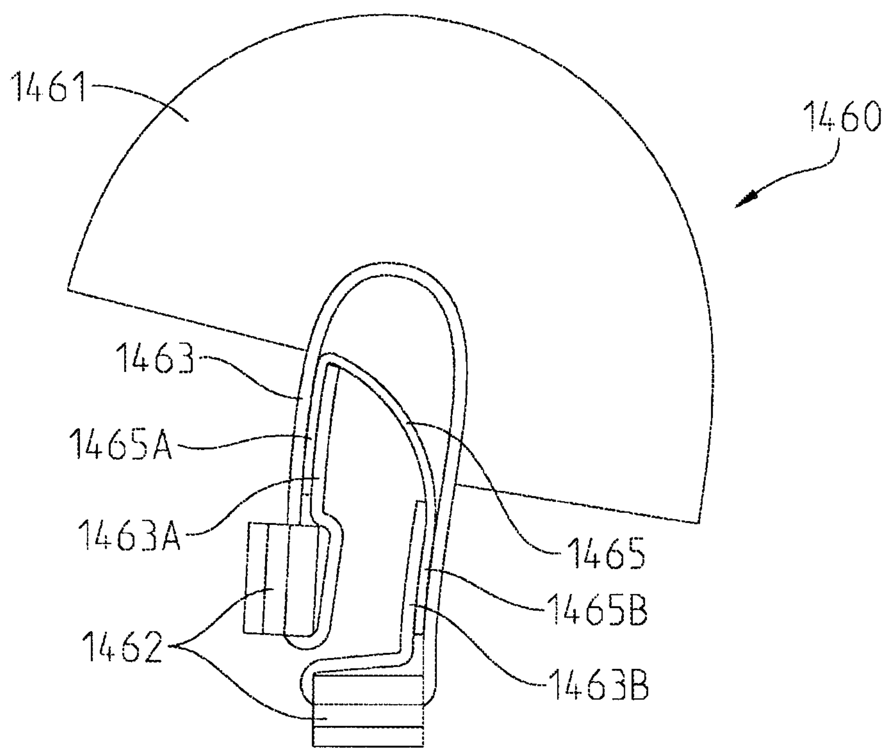
Figure 131:
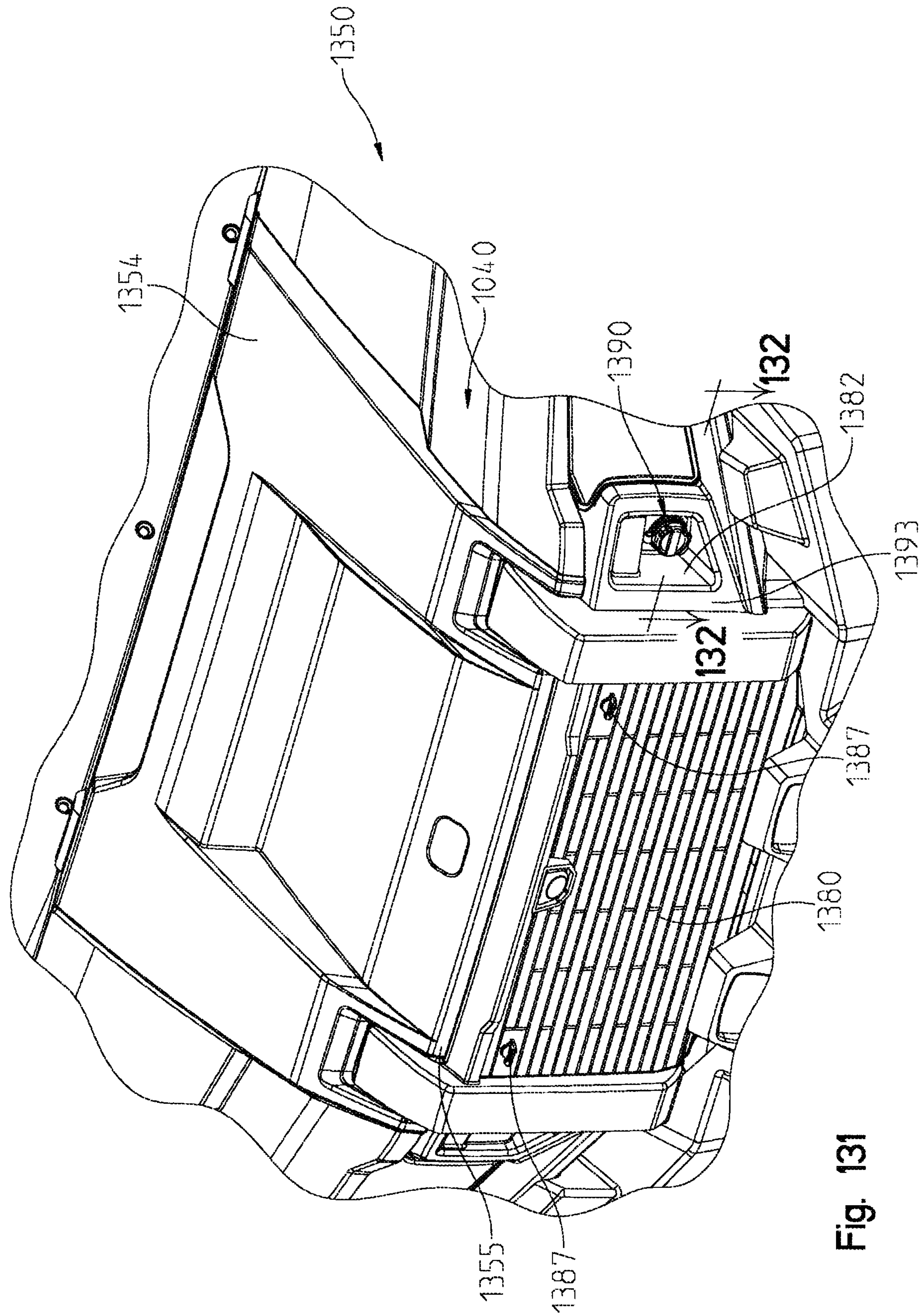
Figure 132:
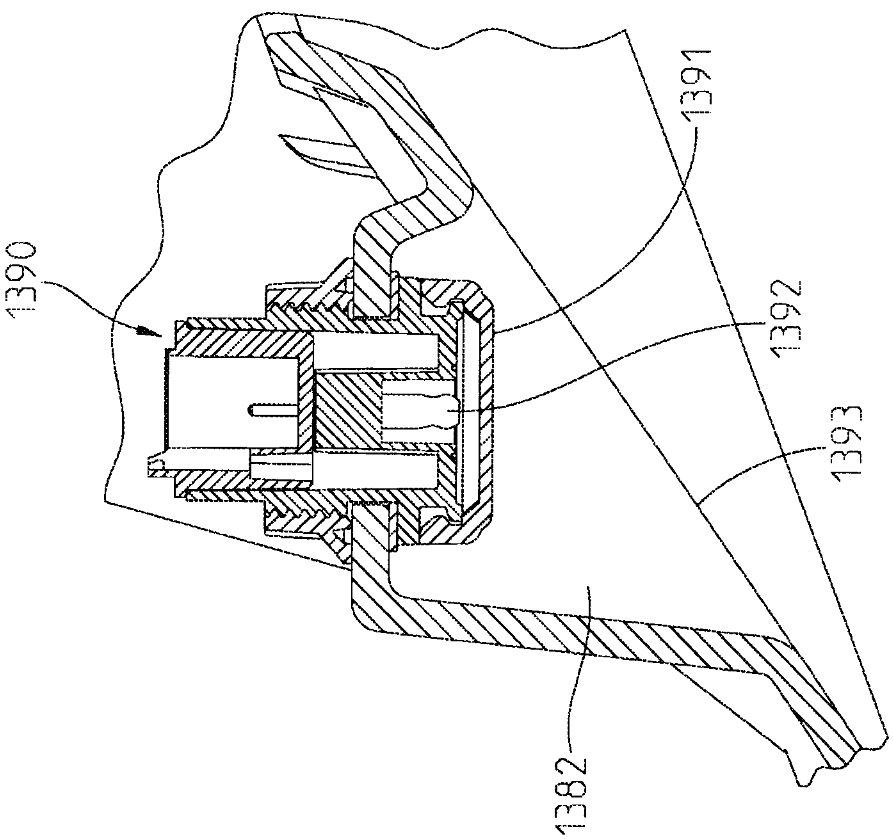
Figure 133:
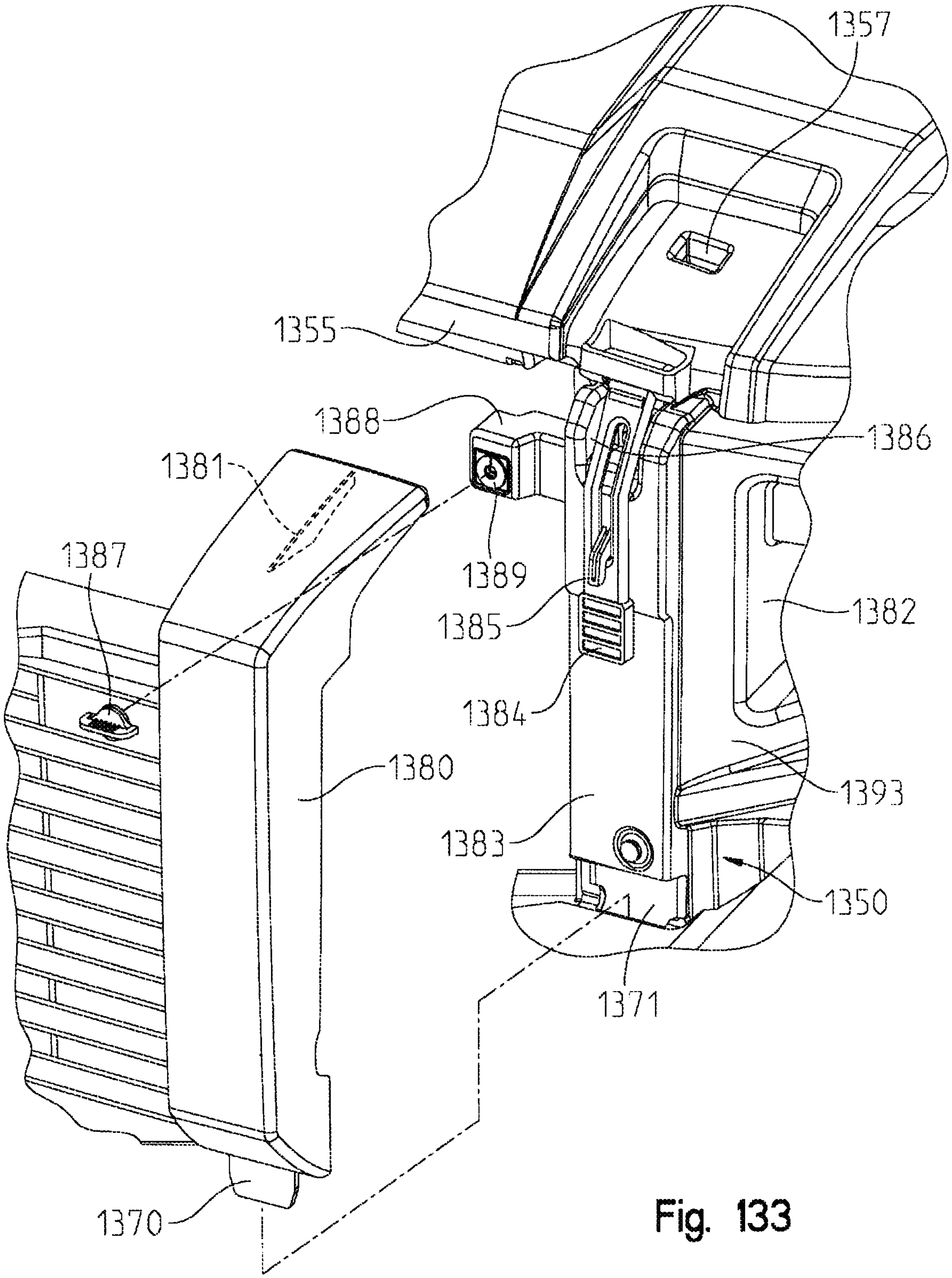
Figure 134:
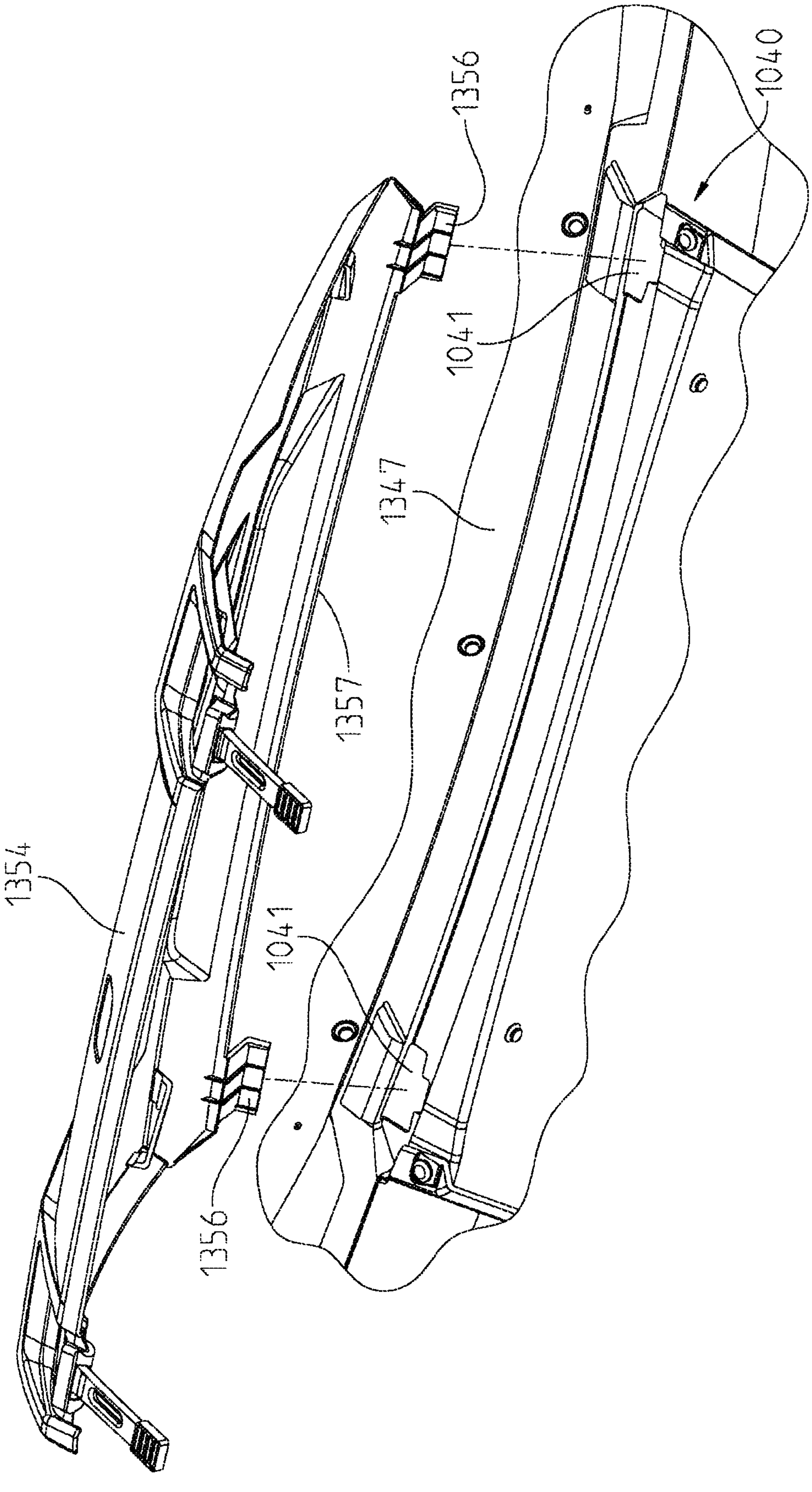
Figure 135:
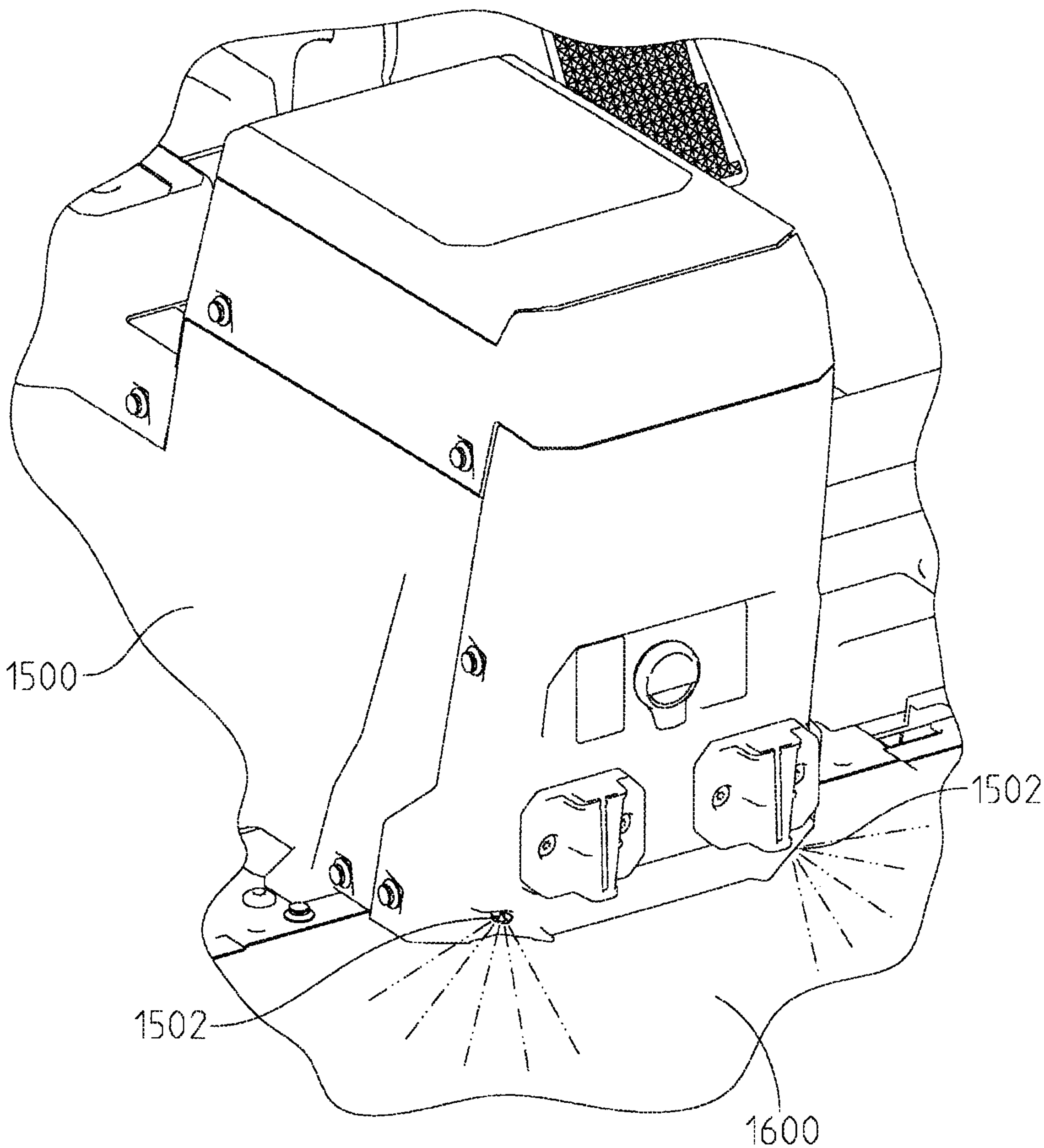
Figure 136:
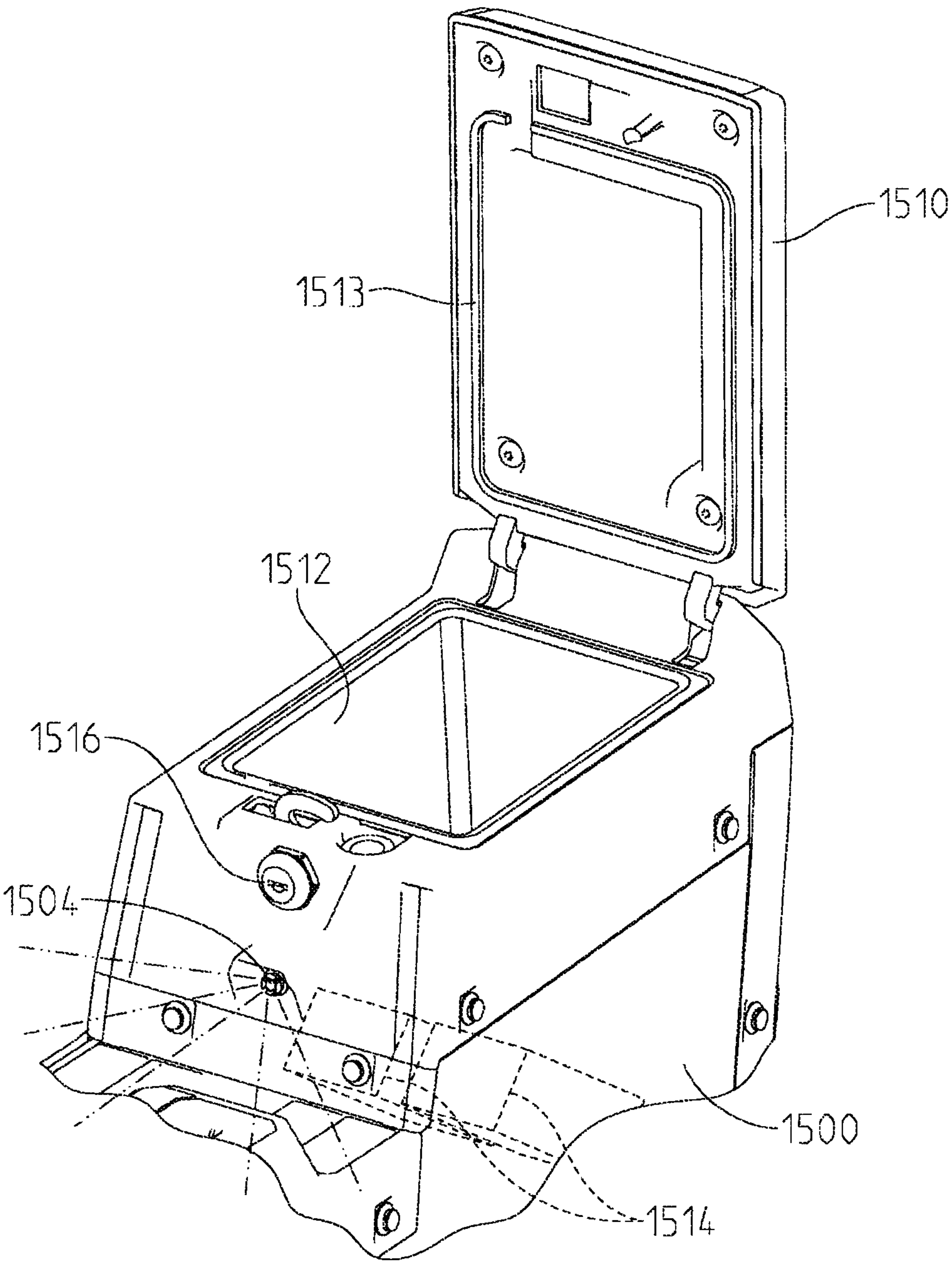
Figure 137:
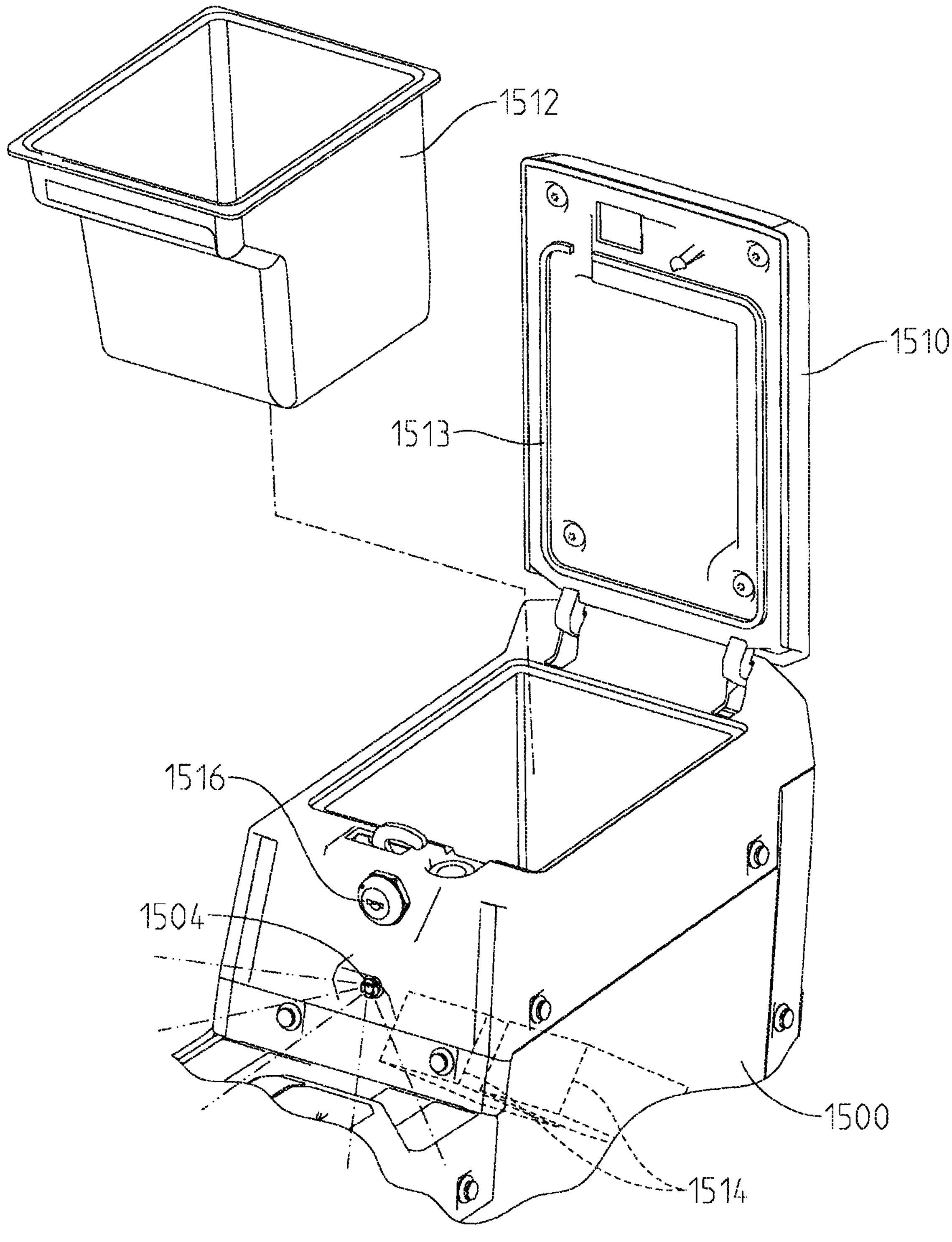
Figure 138:
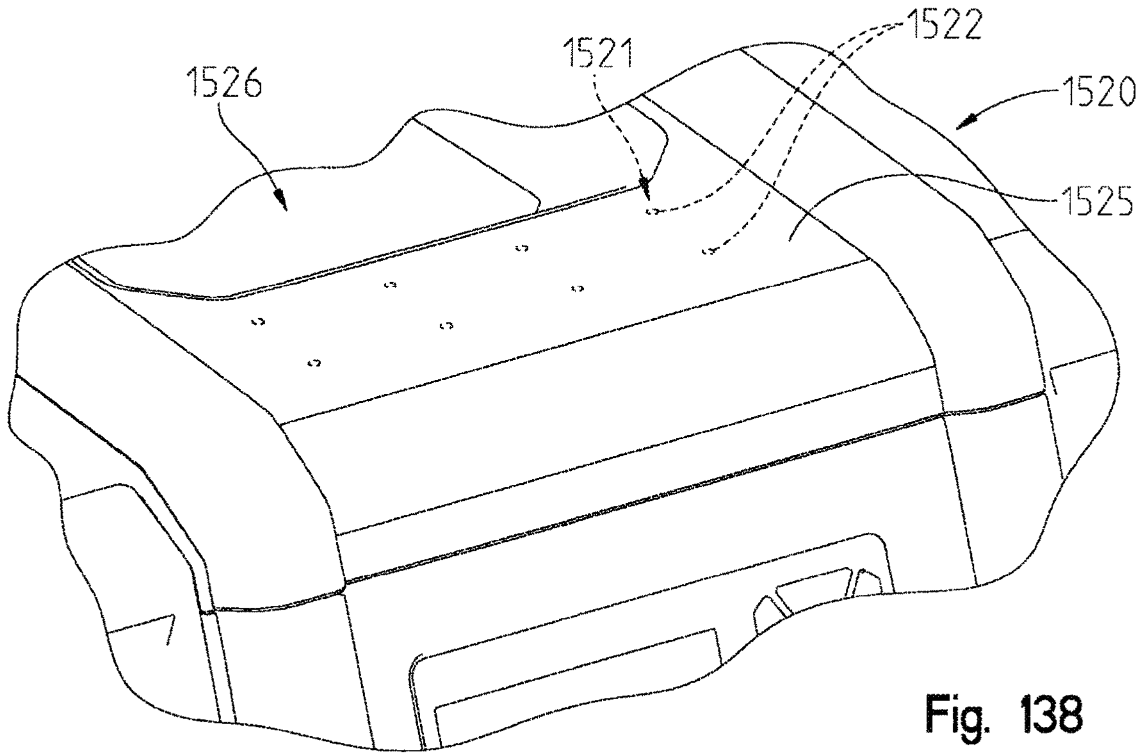
Figure 139:
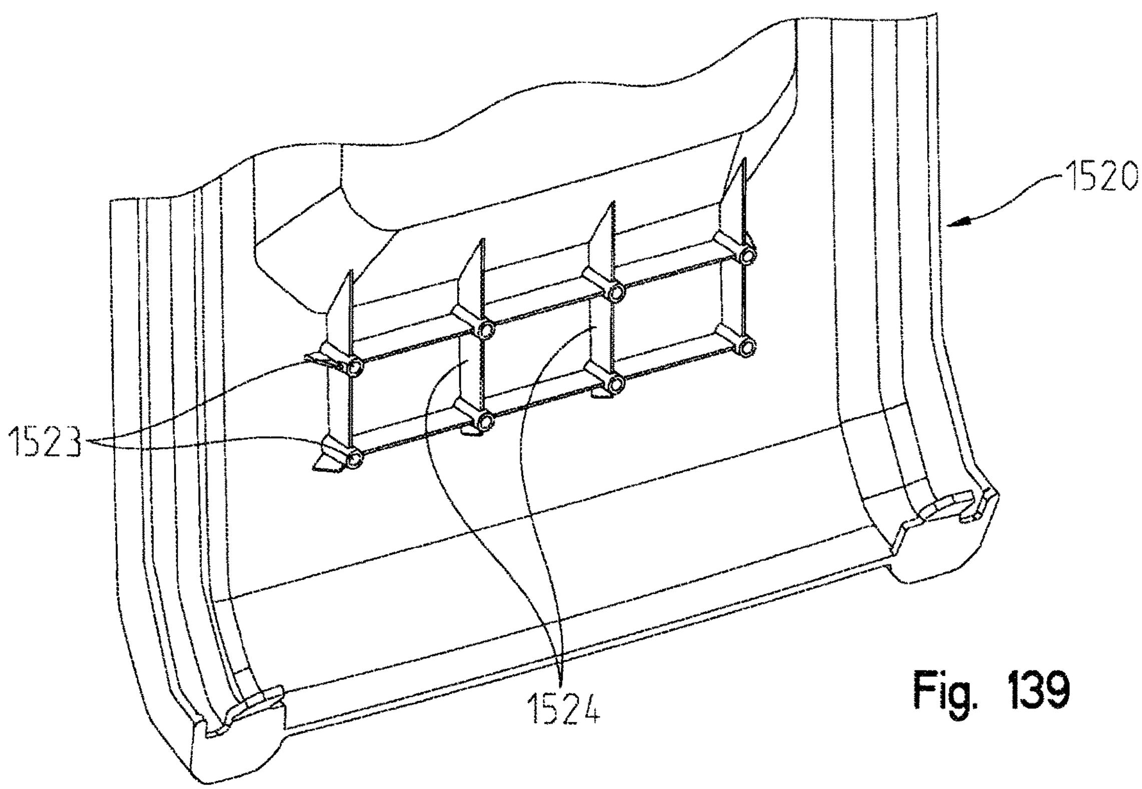
Figure 140:
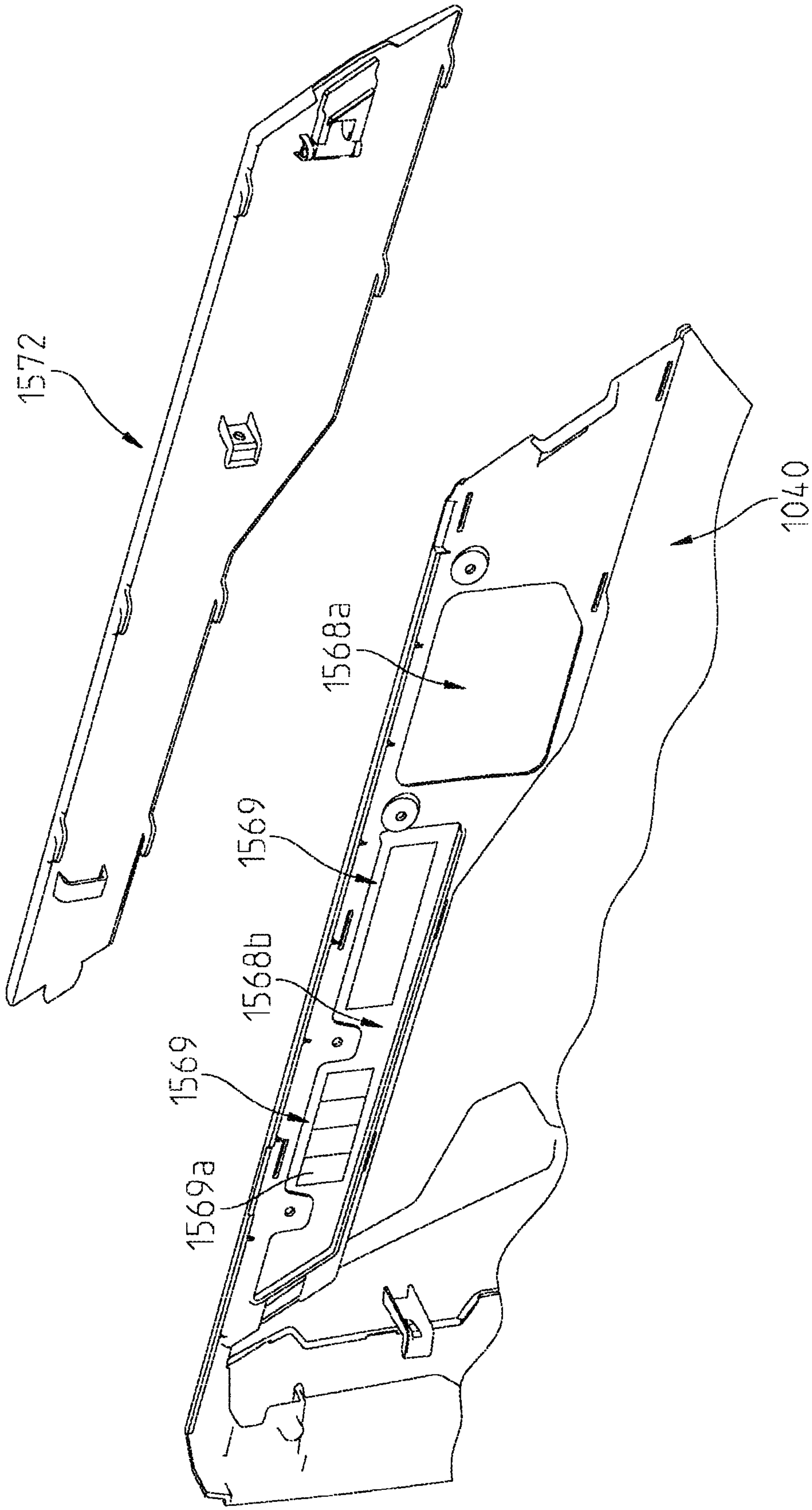
Figure 141:
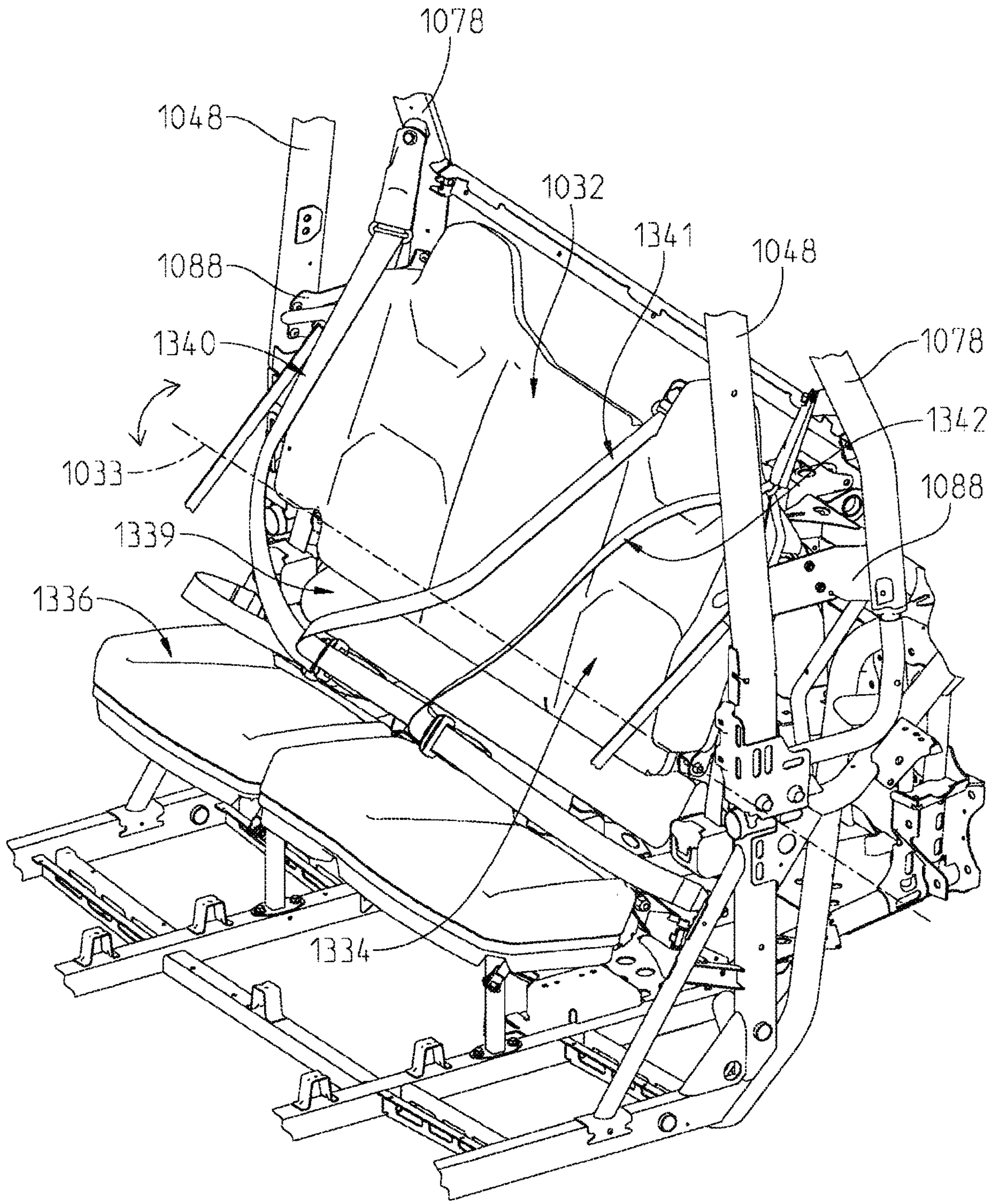
Figure 142:
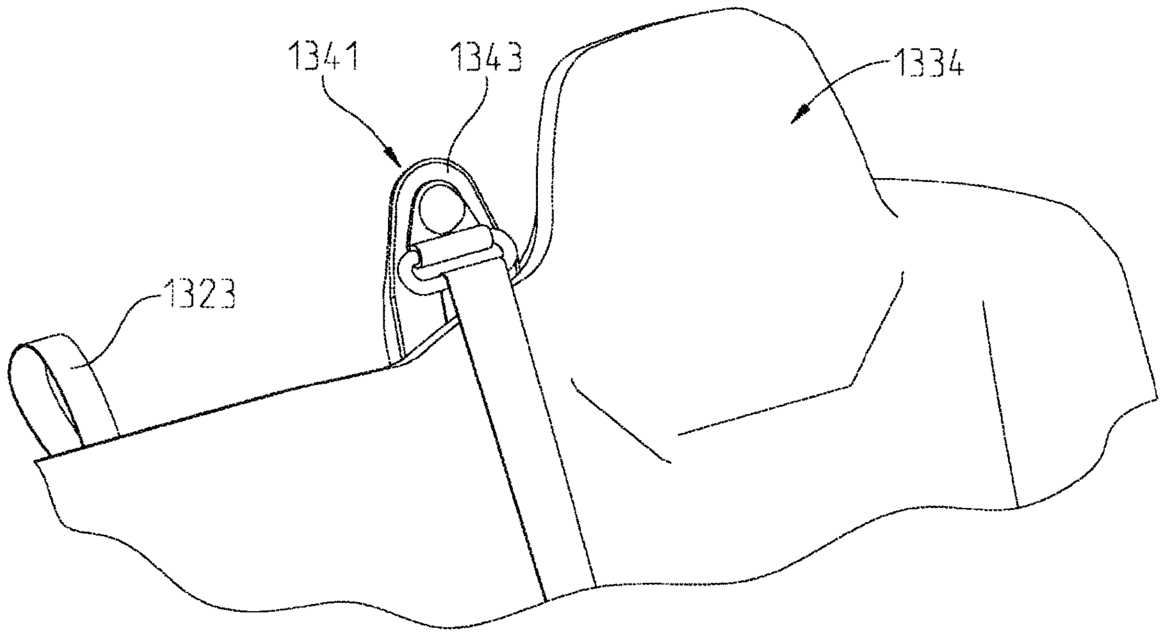
Figure 143:
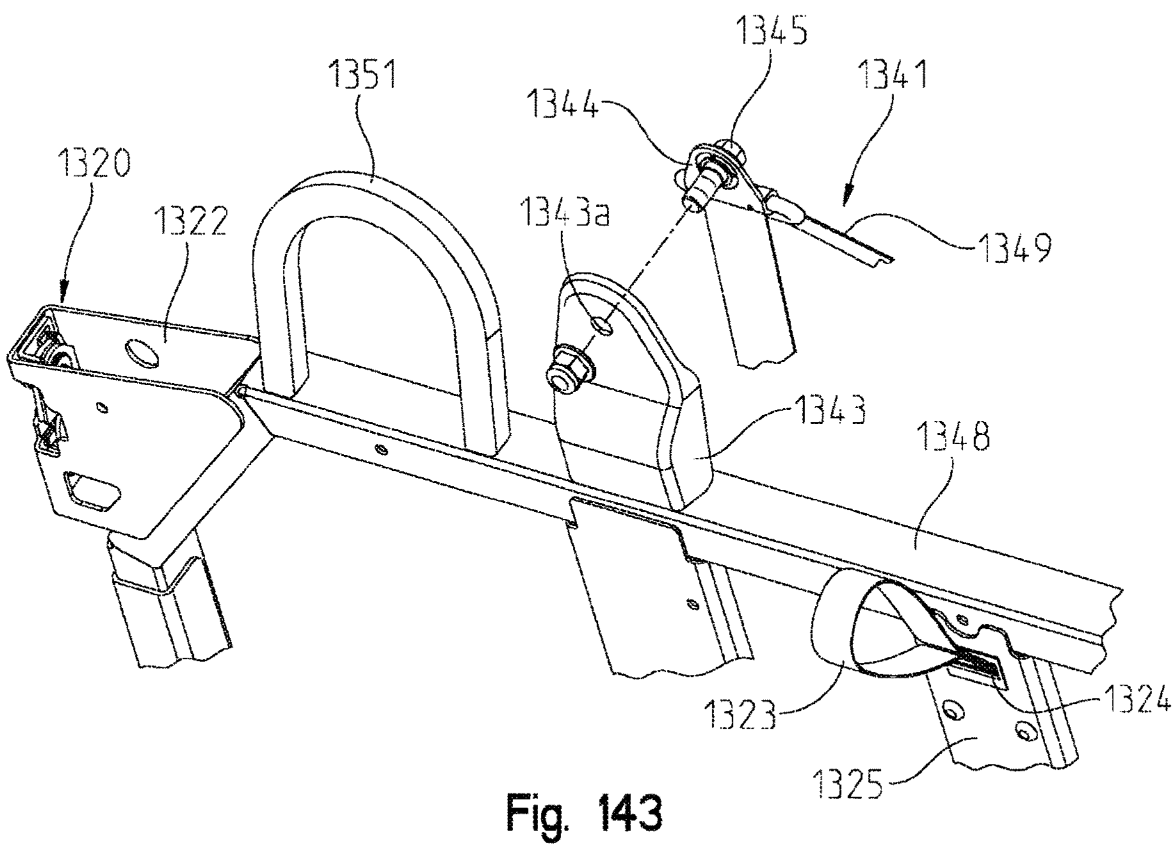
Figure 144:
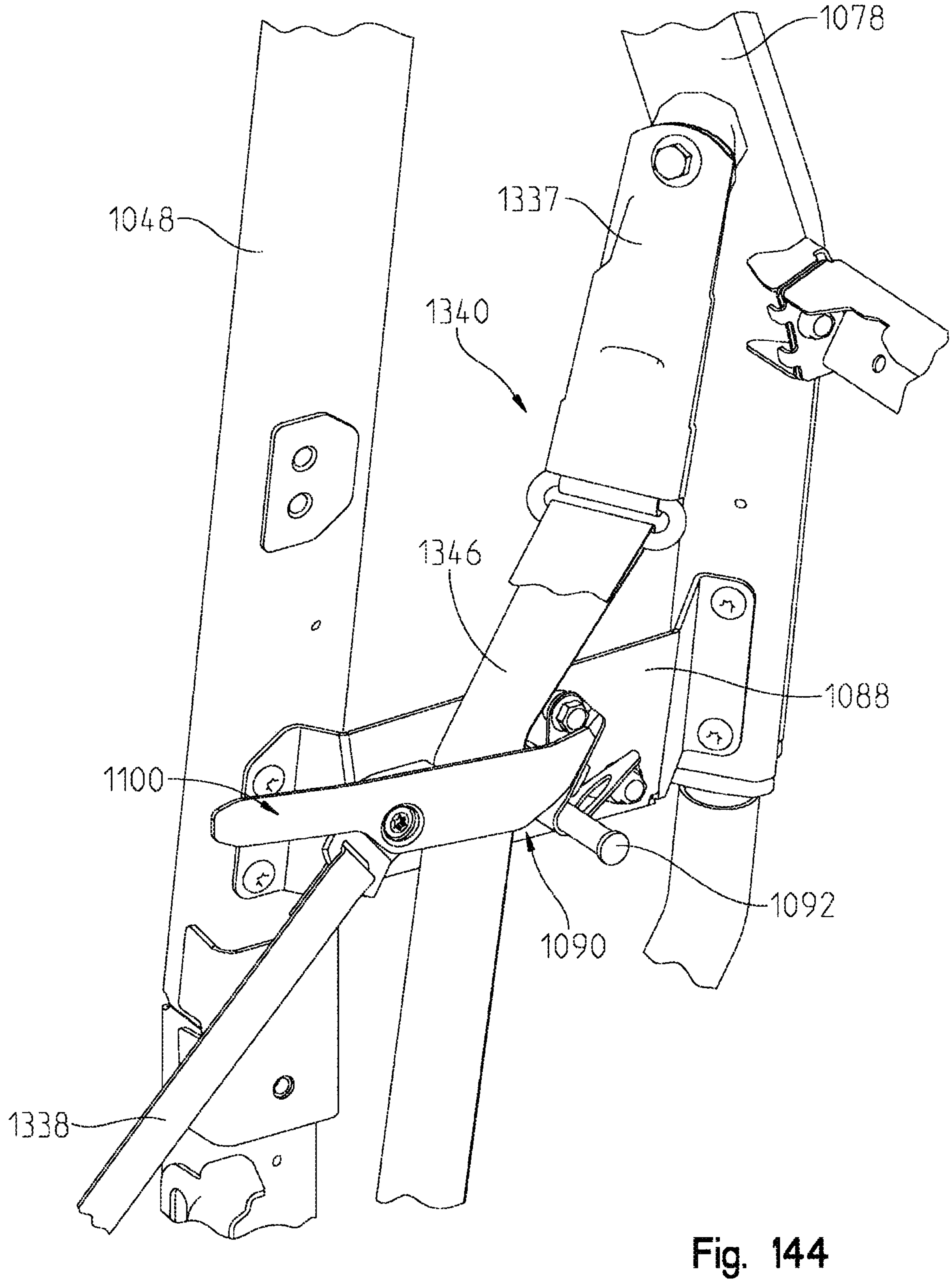
Figure 145:
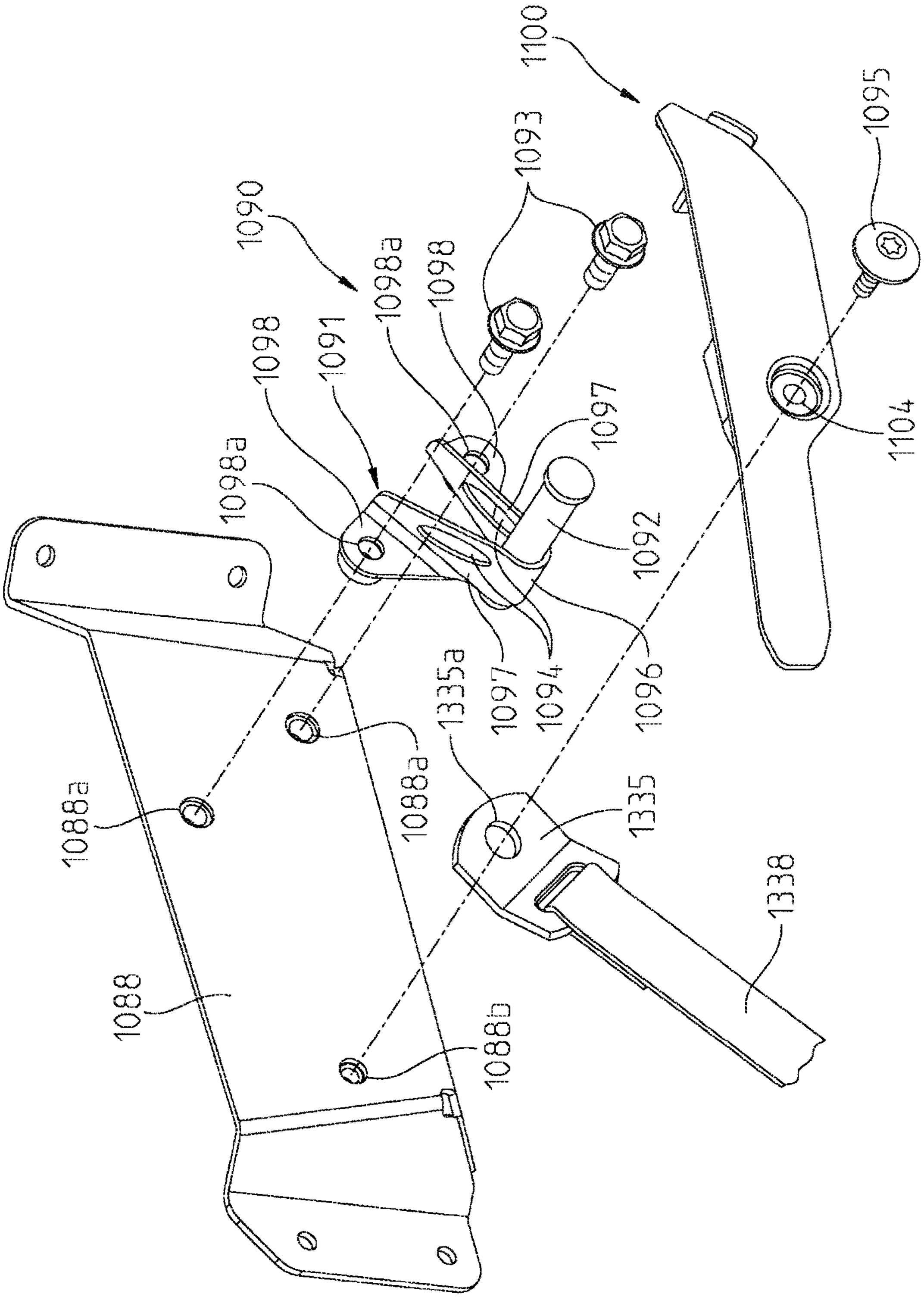
Figure 146:
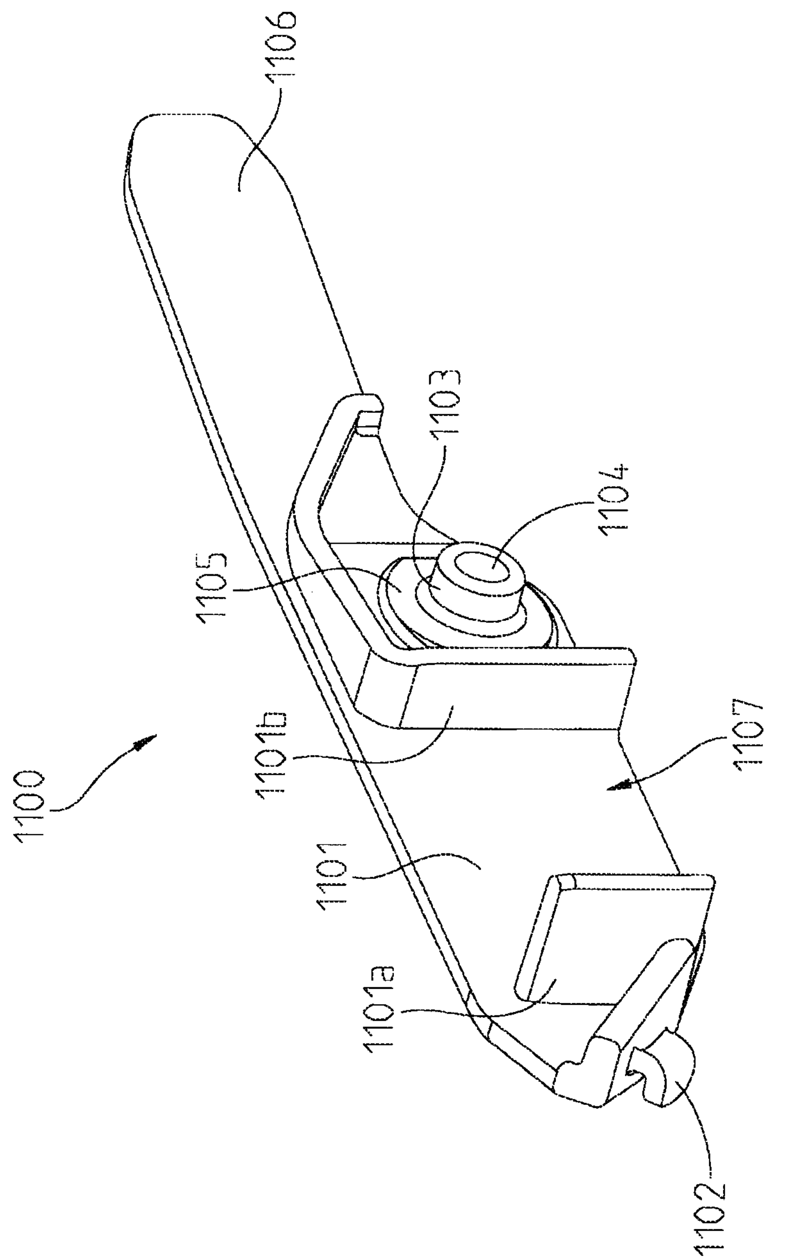
Figure 147:
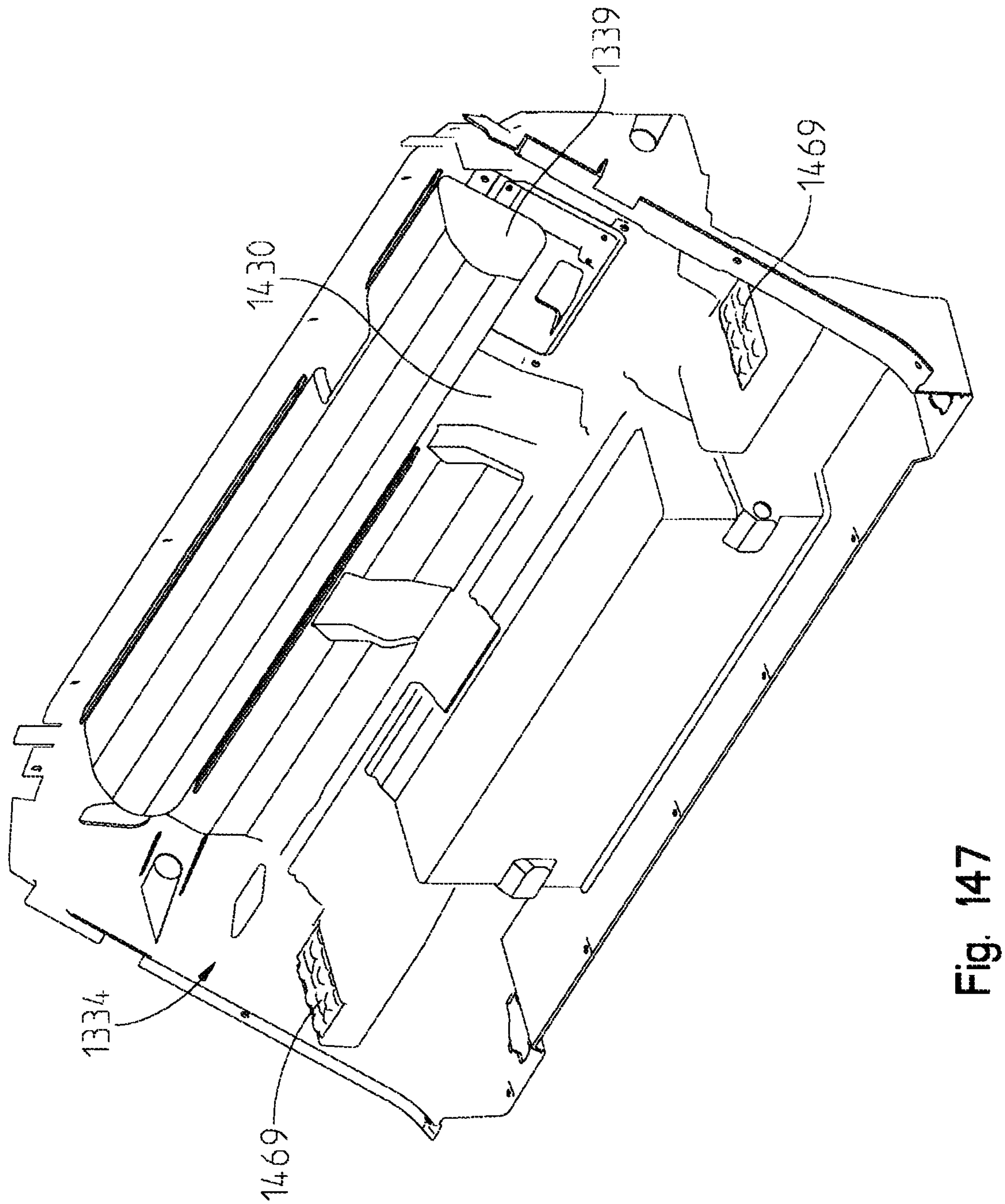
Figure 148:
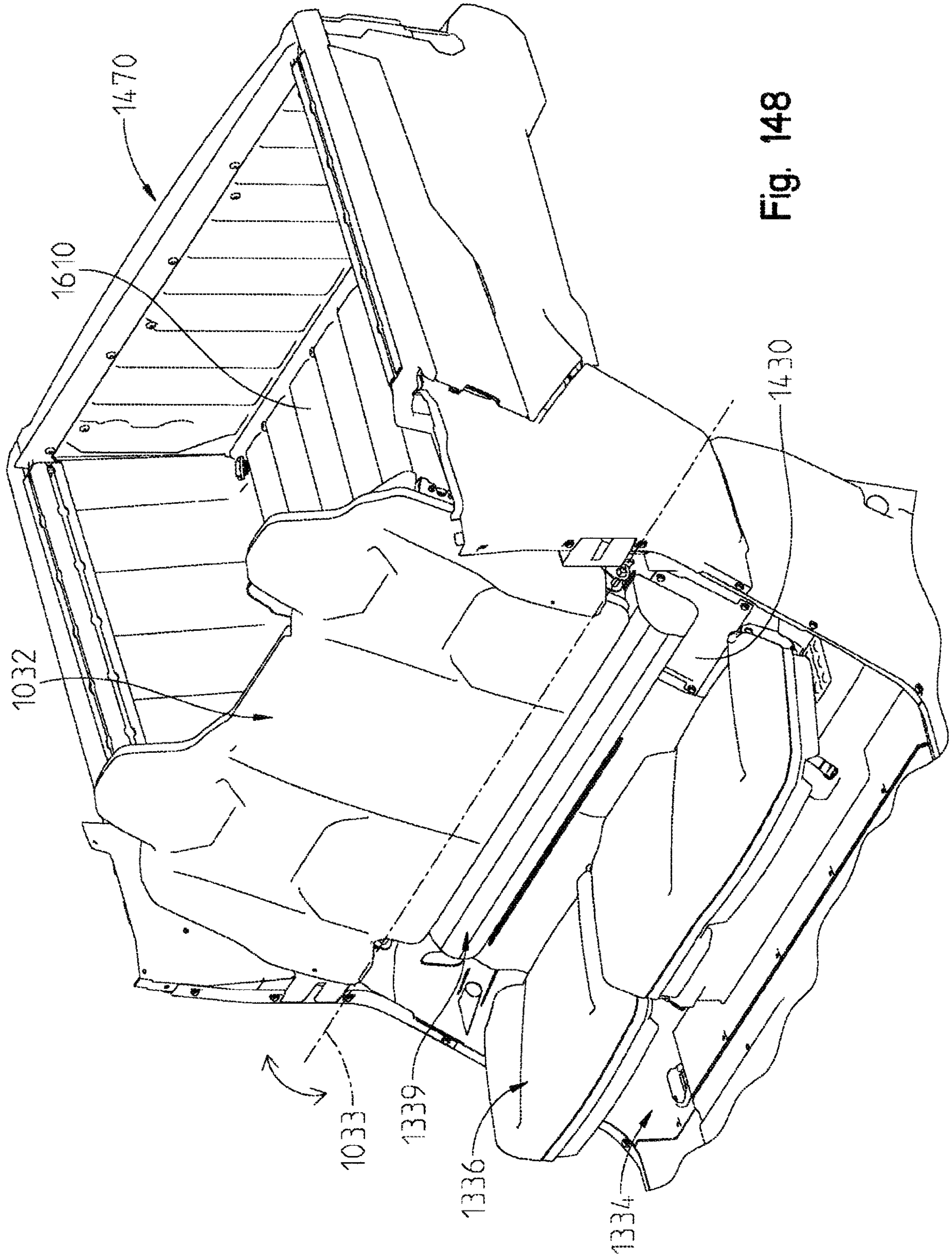
Figure 149:
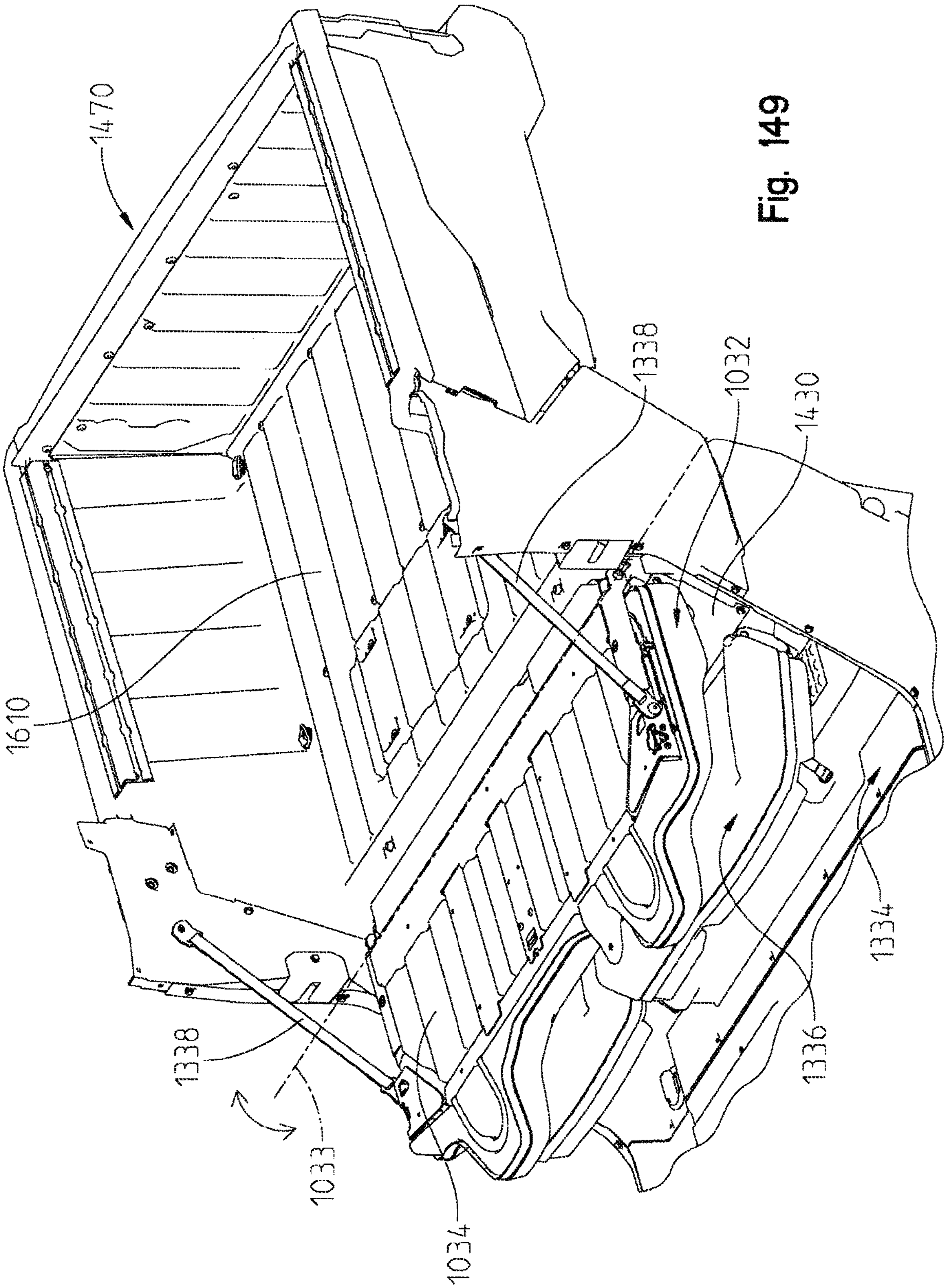
Figure 150:
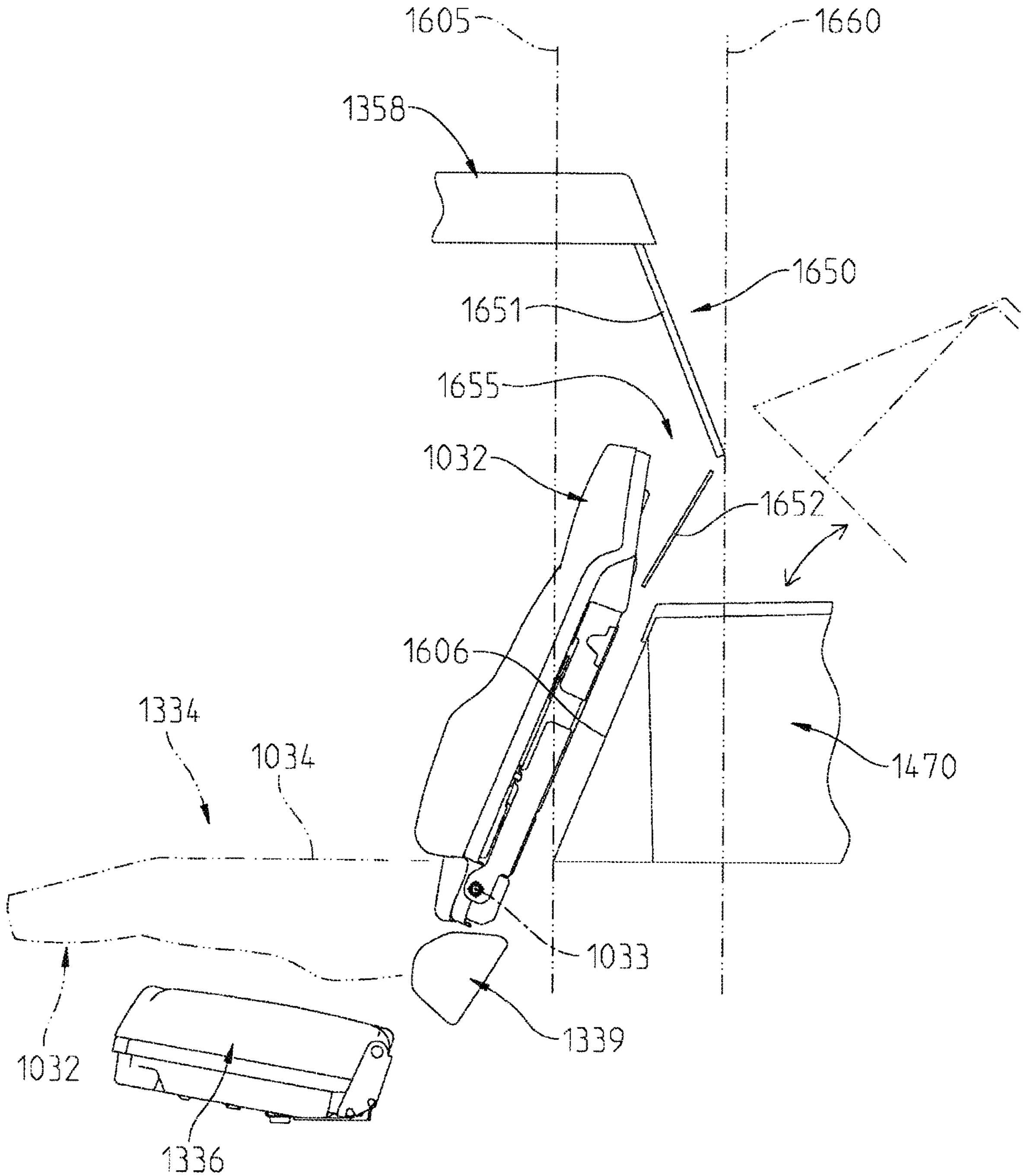
Figure 151:
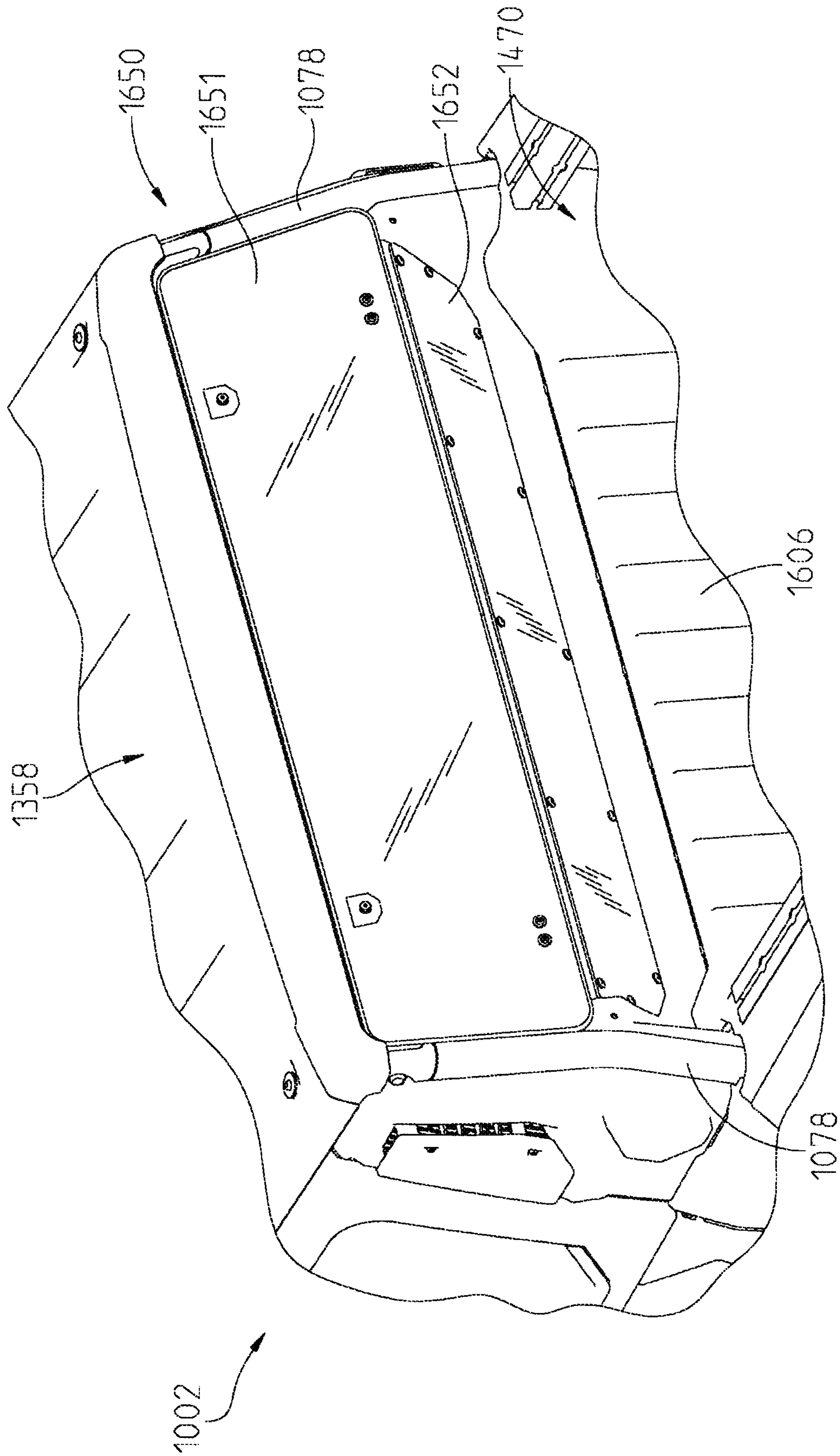
Figure 153:
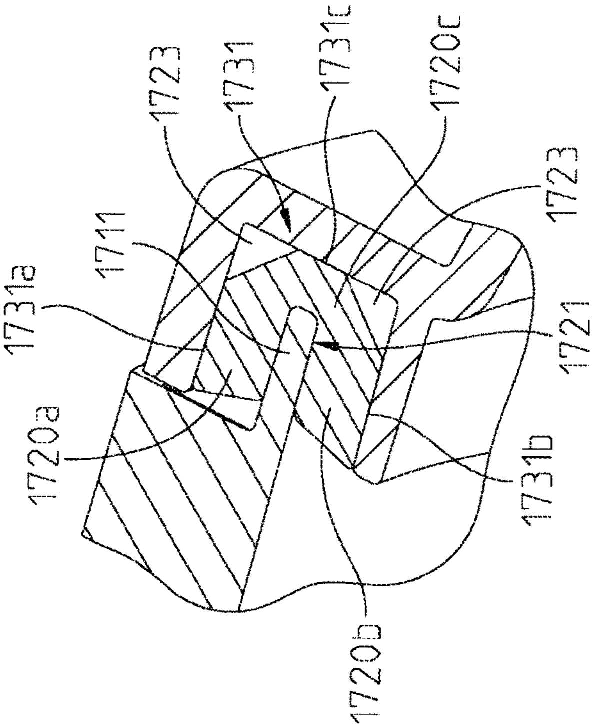
Figure 152:
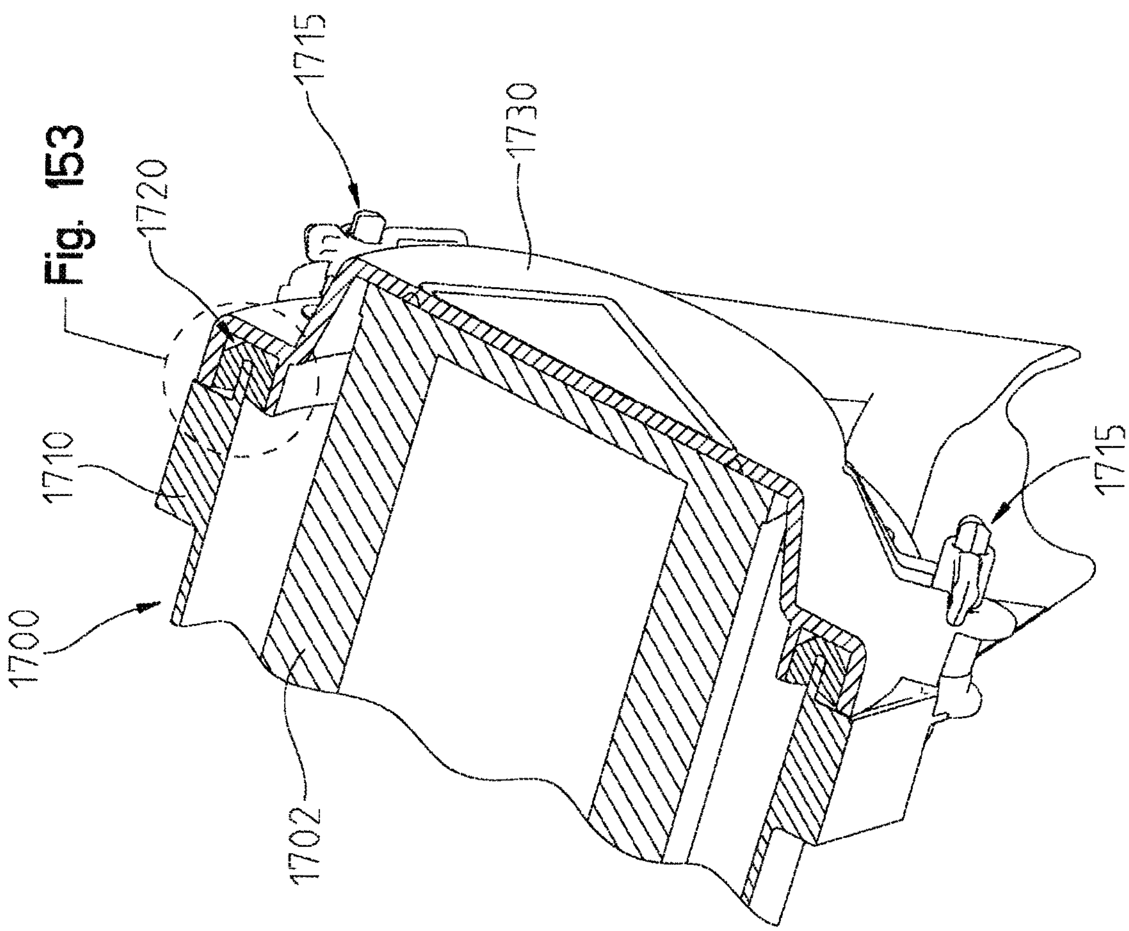
Figure 154:
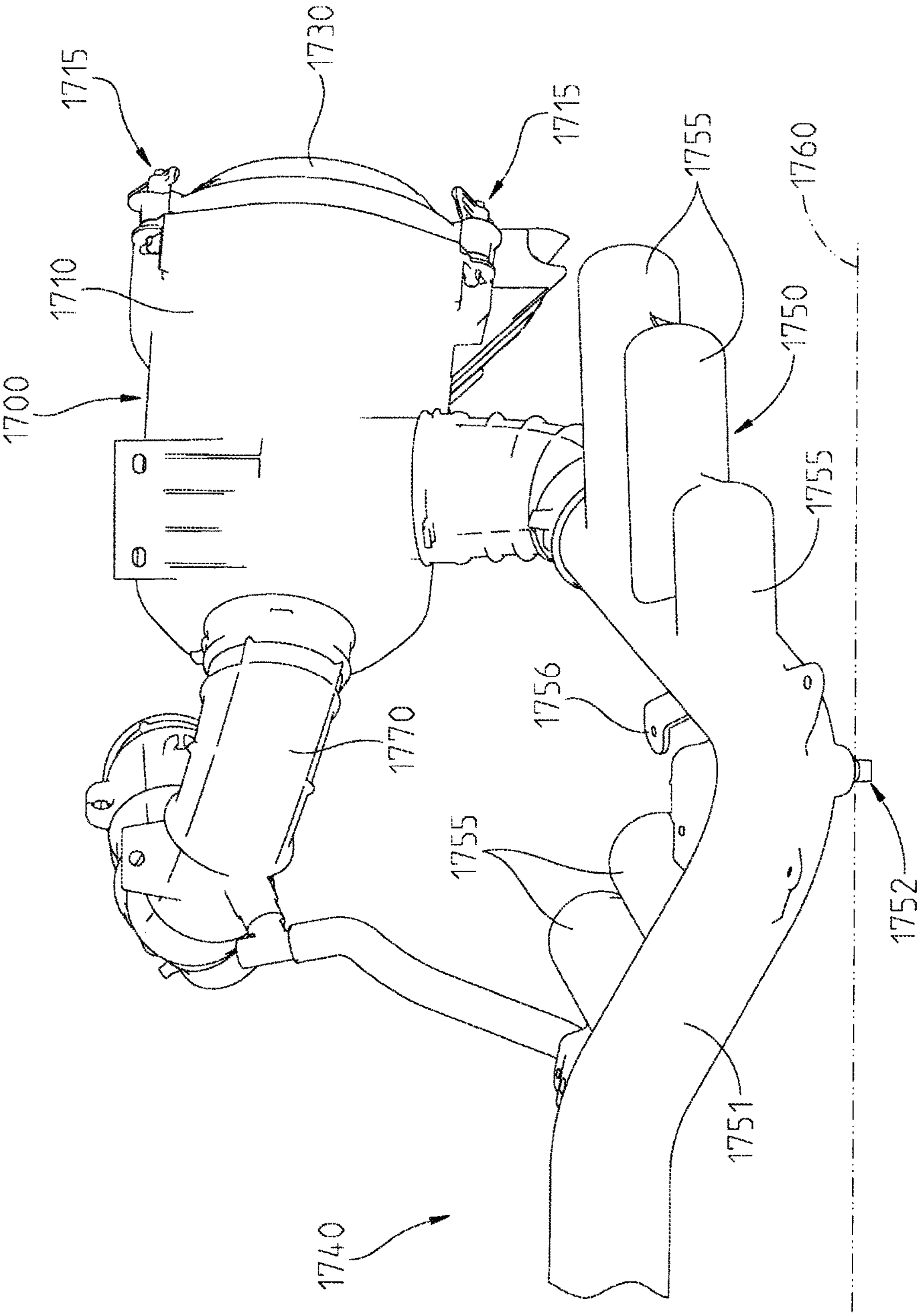

FIG. 130 shows a top view of the door limiter of FIG. 129;

FIG. 131 shows a perspective view of a front body assembly of a vehicle of the present disclosure;

FIG. 132 shows a cross-section view of a power port of the present disclosure taken along line 132-132 of FIG. 131;

FIG. 133 shows an exploded view of the grille retention assembly of the present disclosure;

FIG. 134 shows an exploded view of the hood assembly of the present disclosure;

FIG. 135 shows a rear perspective view of the center console of a vehicle of the present disclosure;

FIG. 136 shows a front perspective view of the center console of FIG. 135;

FIG. 137 shows an exploded view of the center console of FIG. 135;

FIG. 138 shows a perspective view of a dashboard of a vehicle of the present disclosure;

FIG. 139 shows a bottom perspective view of the dashboard of FIG. 138;

FIG. 140 shows an exploded view of a storage area within a cargo area of the present disclosure;

FIG. 141 shows a perspective view of a rear seating area of a vehicle of the present disclosure;

FIG. 142 shows a headrest area of the rear seating area of FIG. 141;

FIG. 143 shows a perspective view of a frame of the rear seating area of FIG. 141;

FIG. 144 shows a belt retention system of a seating area of the present disclosure;

FIG. 145 shows an exploded view of the belt retention system of FIG. 144;

FIG. 146 shows a perspective view of a retaining member of the belt retention system of FIG. 144;

FIG. 147 shows a perspective view of the rear seating area of the present disclosure;

FIG. 148 shows a portion of the rear seating and cargo area of a vehicle of the present disclosure with the rear seats in an upward position;

FIG. 149 shows a portion of the rear seating and cargo area of a vehicle of the present disclosure with the rear seats in a downward position;

FIG. 150 shows a side view of a rear seating area of the present disclosure;

FIG. 151 shows a rear left perspective view of a rear window assembly of the present disclosure;

FIG. 152 shows a cross section taken along line 83-83 of FIG. 81;

FIG. 153 shows an enhanced view of a section of the air filter seal of FIG. 152; and FIG. 154 shows an engine air intake assembly of the present disclosure.

DETAILED DESCRIPTION OF THE DRAWINGS

Figure 9:
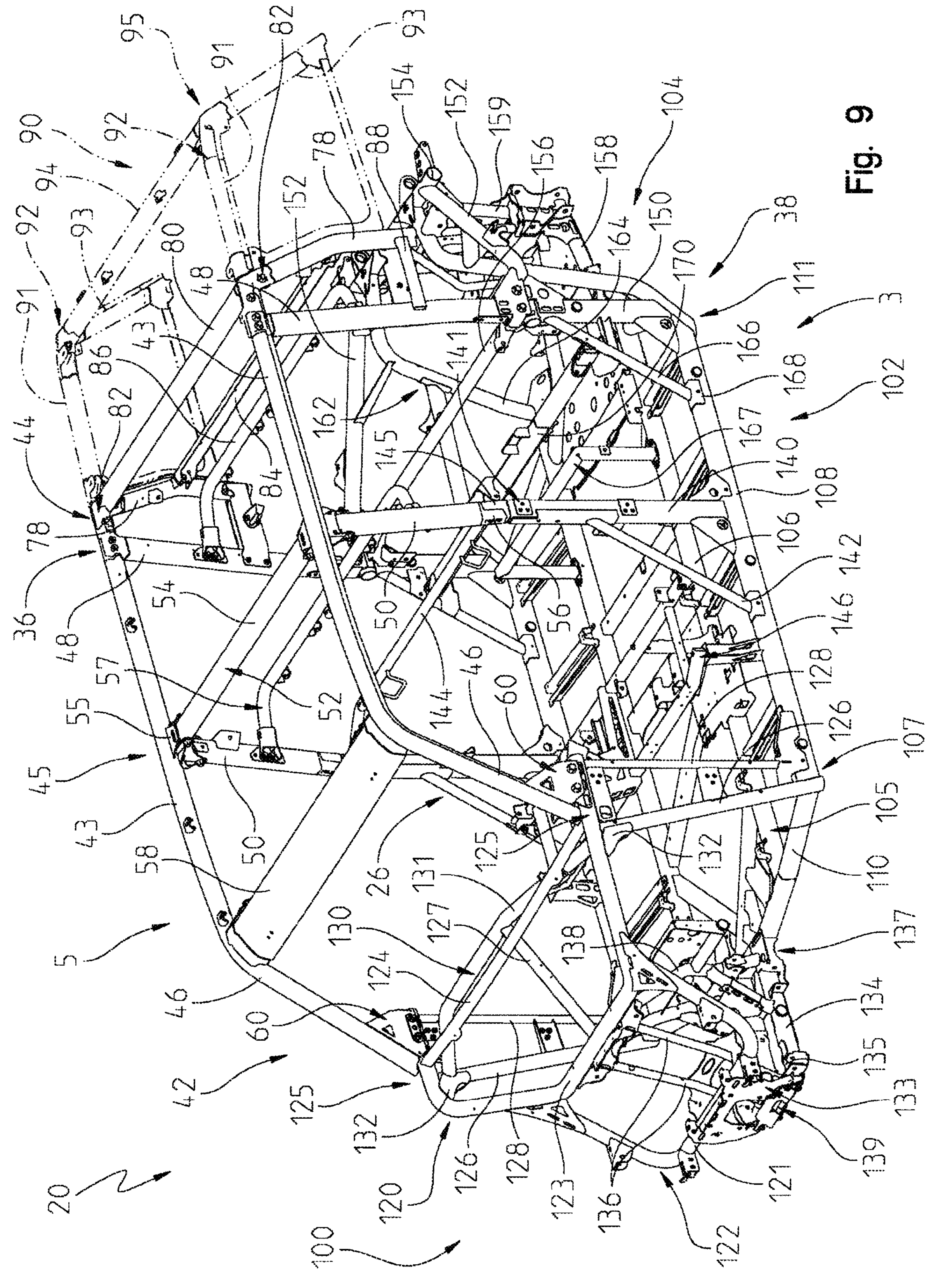
FIG. 9 shows a front left perspective view of a frame of the vehicle of FIG. 1.
Figure 10:
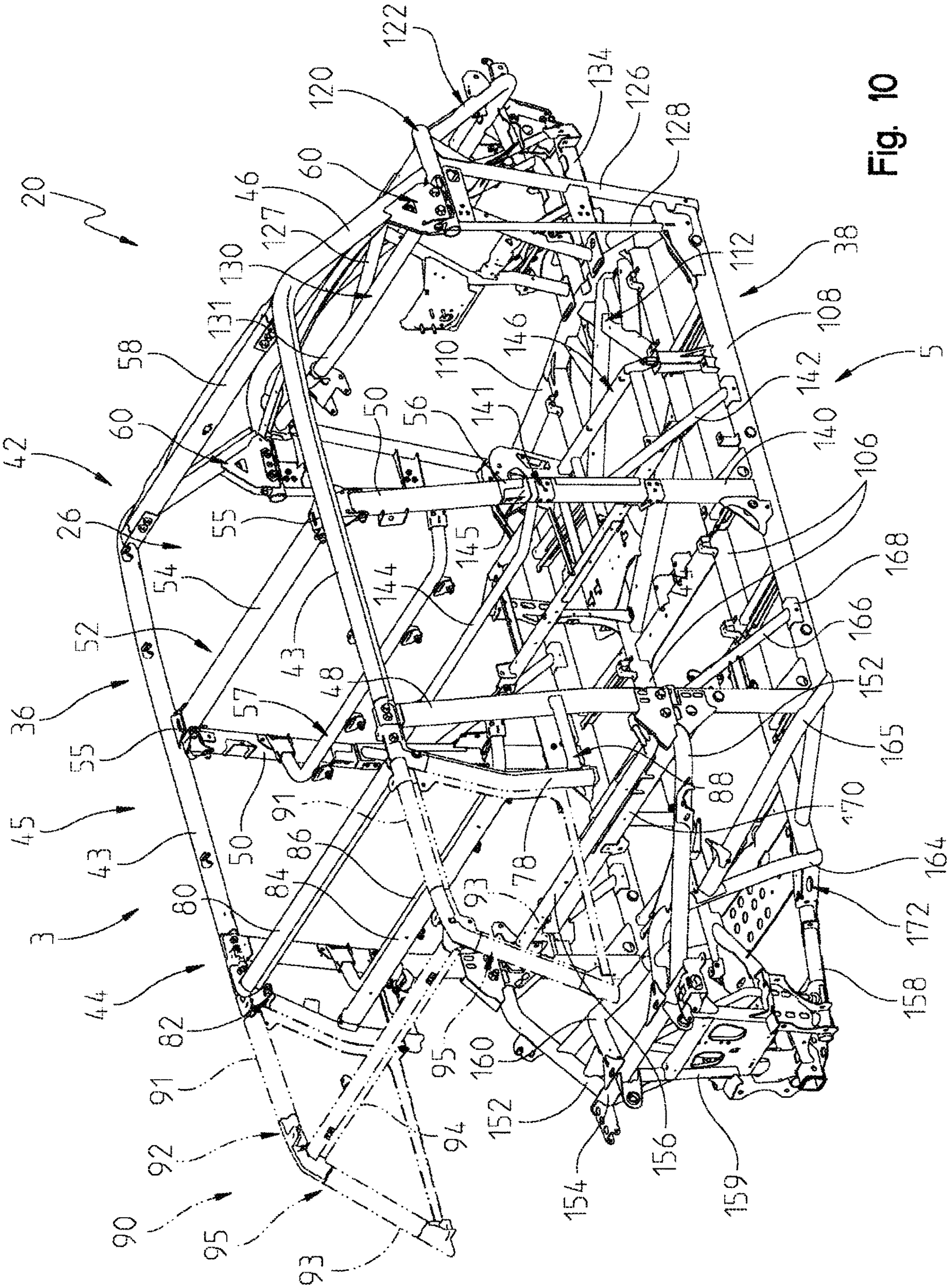
FIG. 10 shows a right rear perspective view of the frame of FIG. 9
Figure 11:
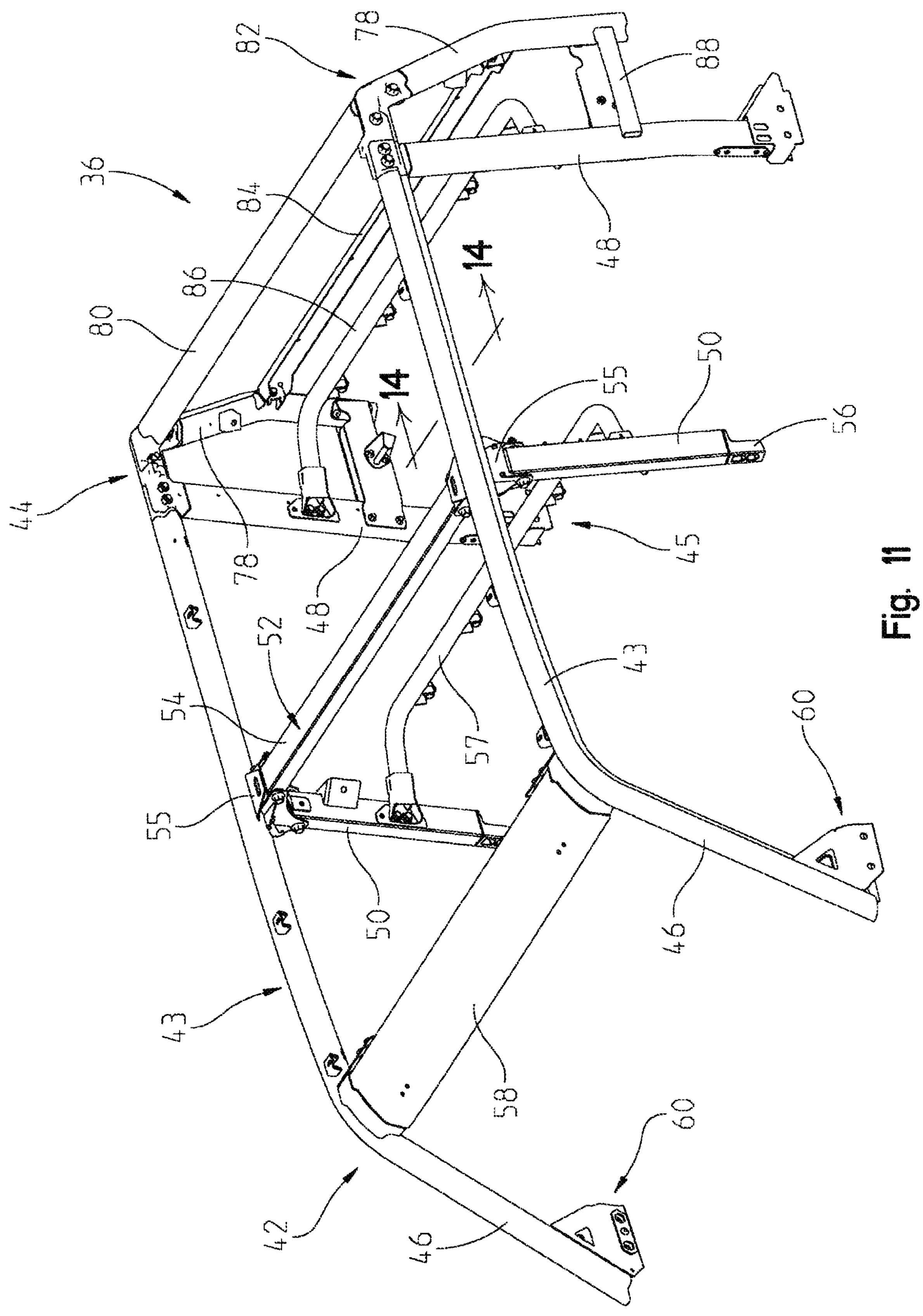
FIG. 11 shows a front left perspective view of a cab frame of the frame of FIG. 9.
Figure 12:
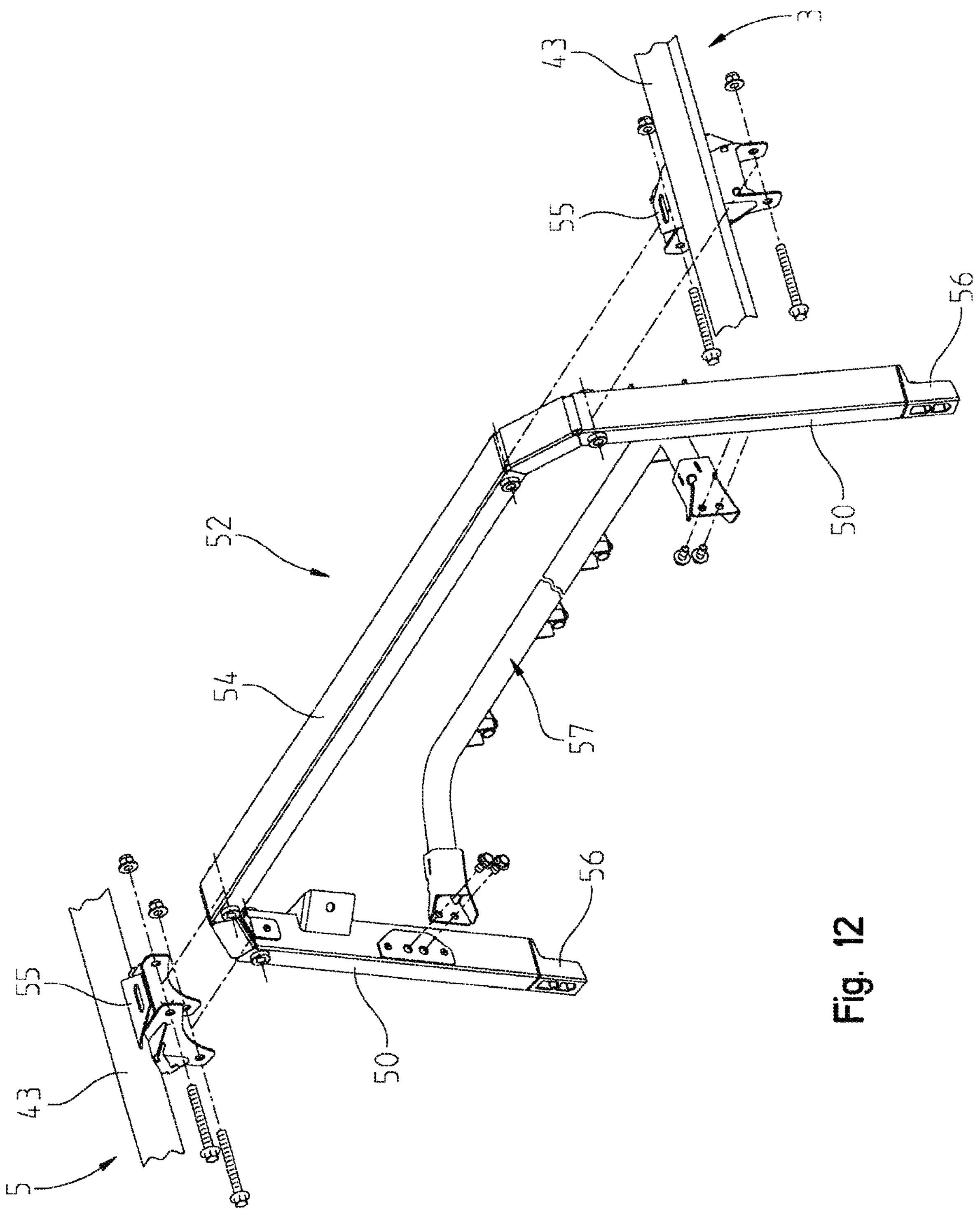
FIG. 12 shows an exploded view of a middle frame portion of the cab frame of FIG. 11.
Figure 37:
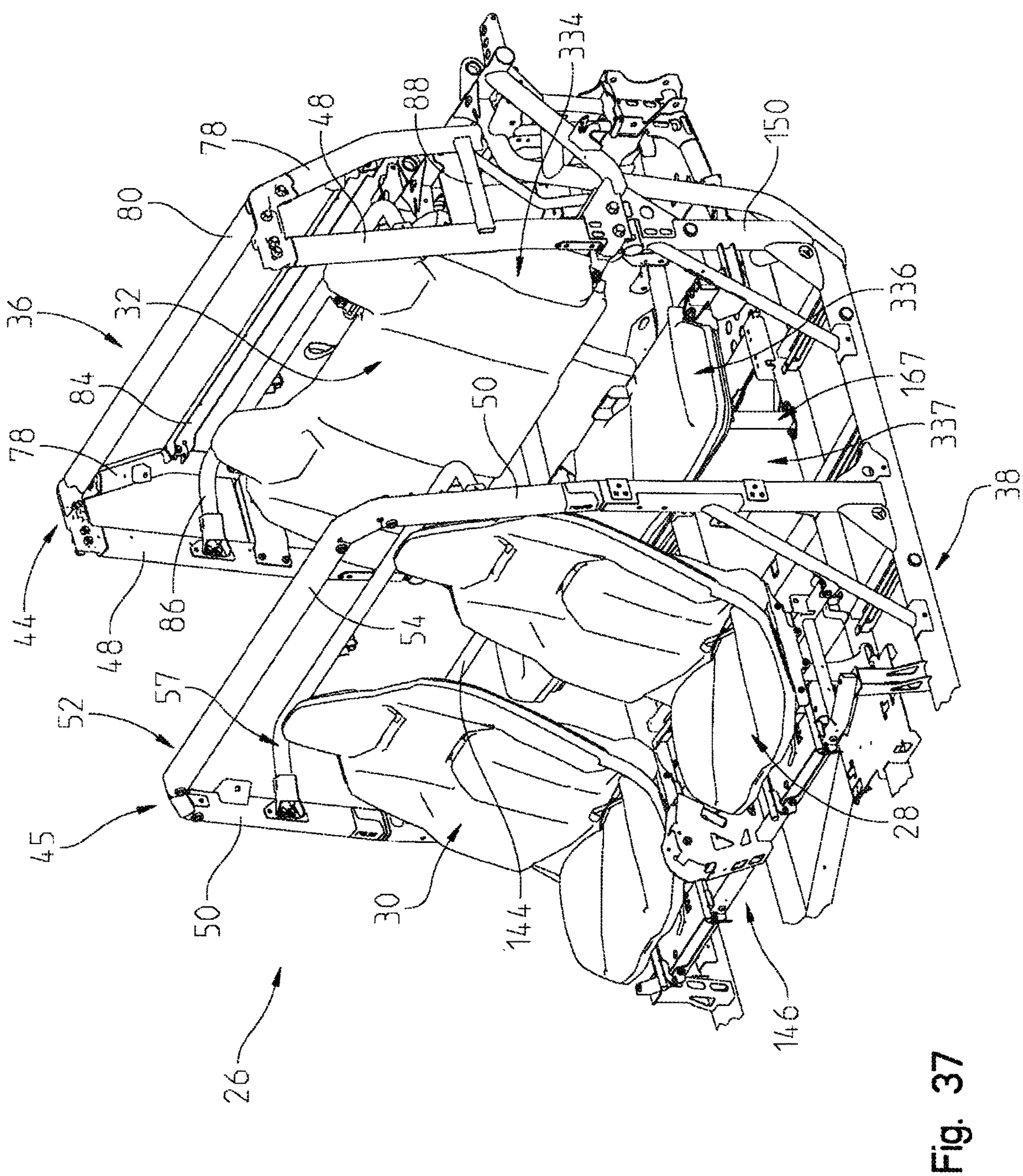
FIG. 37 shows a left front perspective view of a seating area of the vehicle of FIG. 1.
Figure 38B:
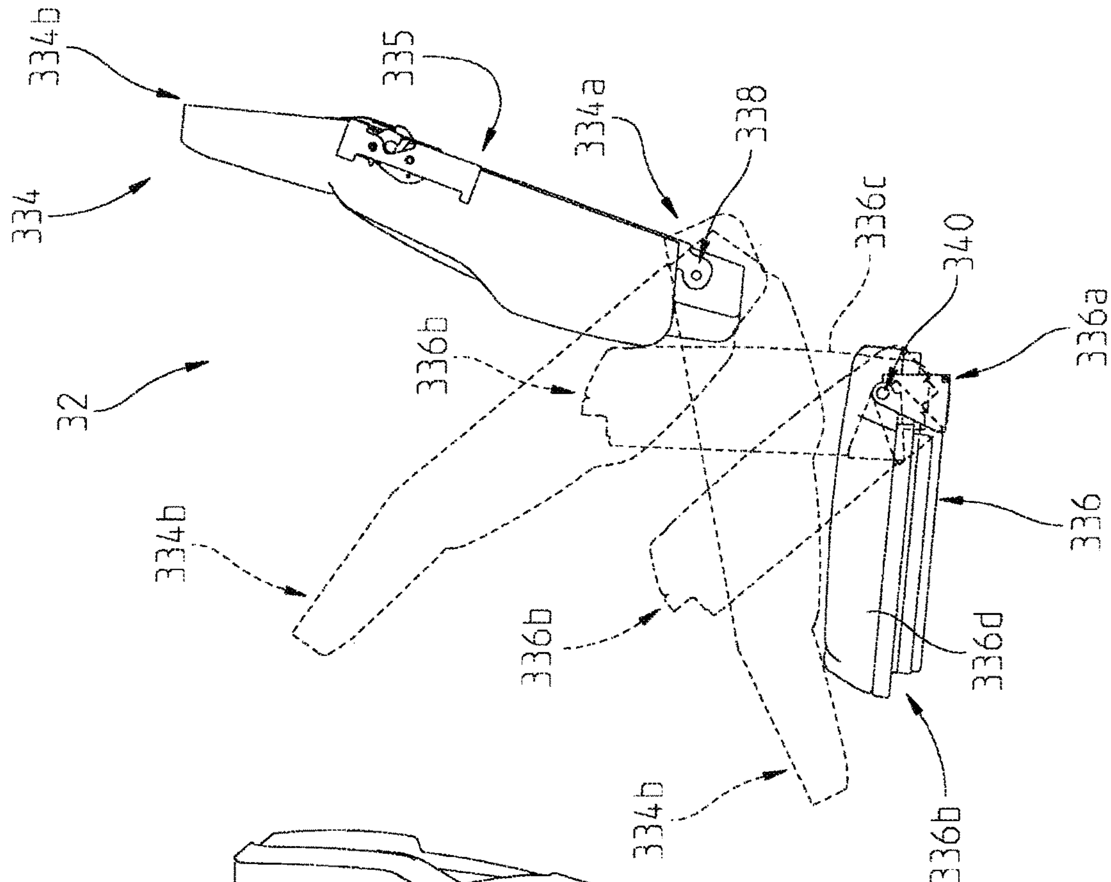
FIG. 38B shows a left side elevational view of a rear passenger seat of the seating area of FIG. 37.
Figure 38A:
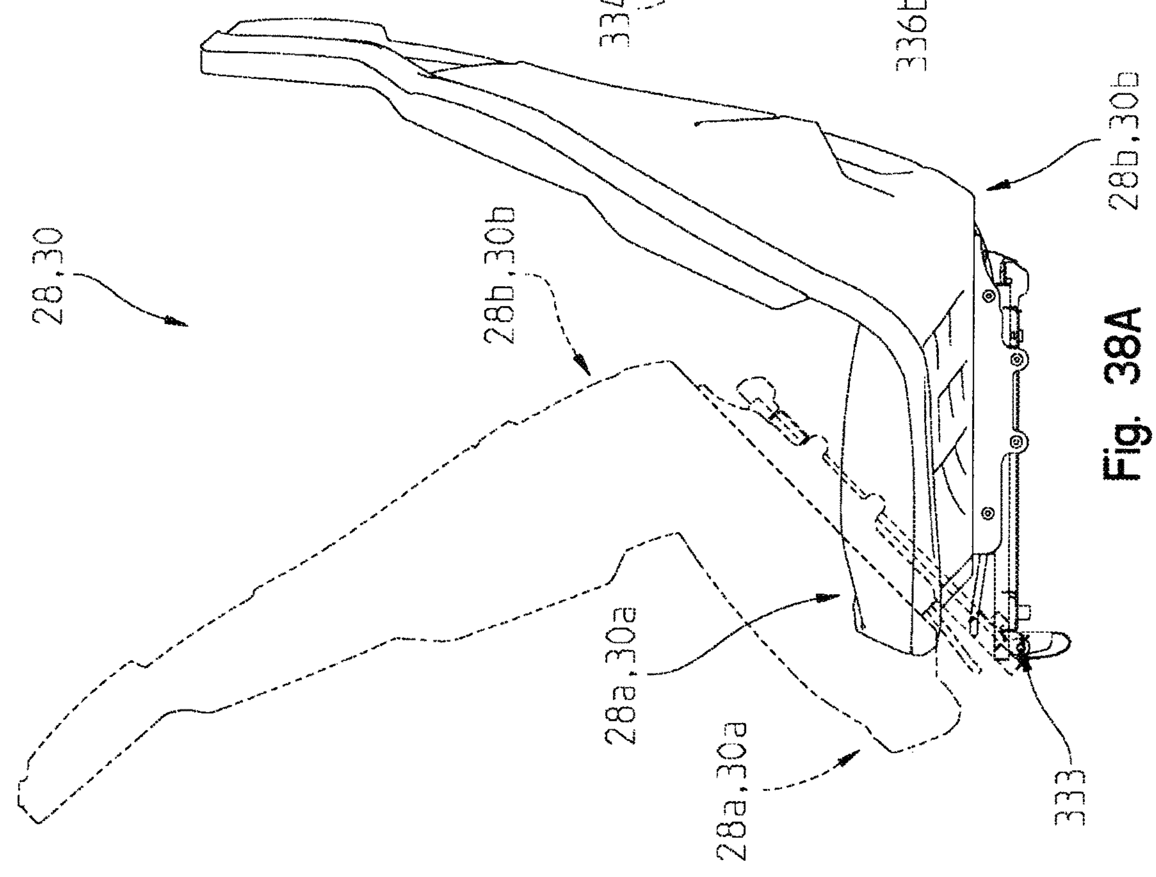
FIG. 38A shows left side elevational view of a front driver or passenger seat of the seating area of FIG. 37.
Figure 39:
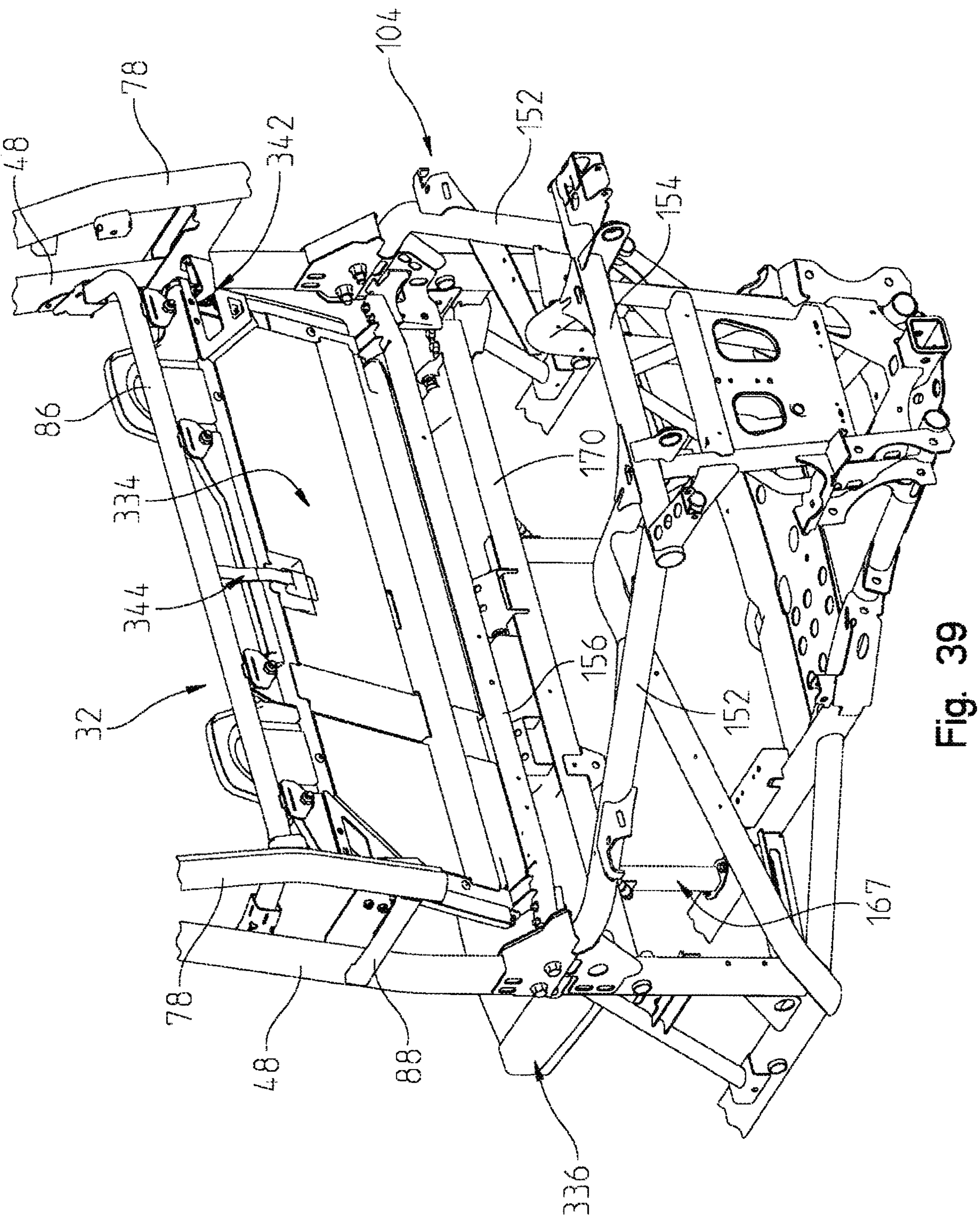
FIG. 39 shows a left rear perspective view of the rear passenger seat of FIG. 38B coupled to a rear portion of the frame of FIG. 9.
Figure 40:
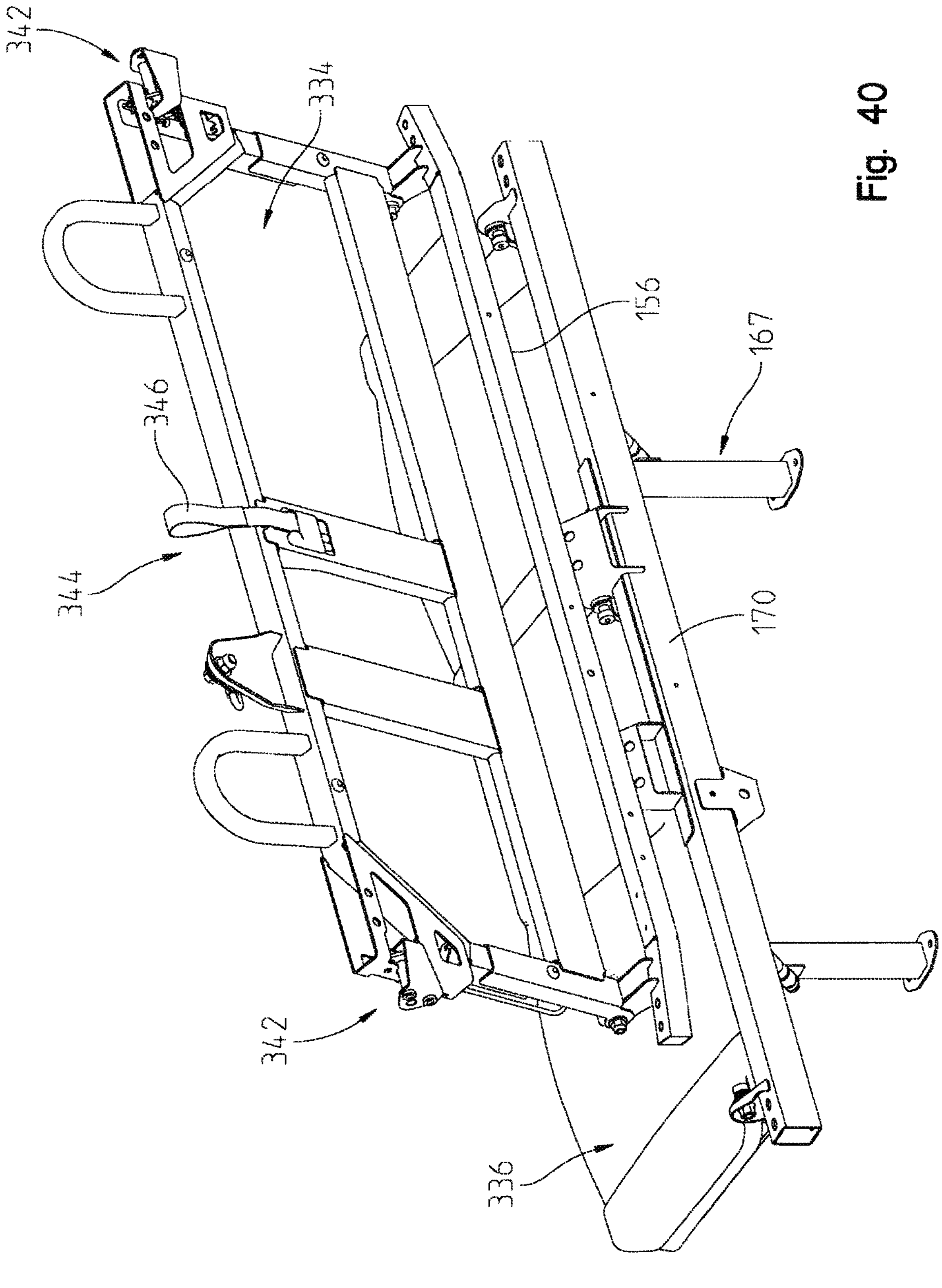
FIG. 40 shows a left rear perspective view a frame portion of a seat back and a seat bottom of the rear passenger seat of FIG. 39 coupled to the lower frame portion of the frame of FIG. 9.
Figure 41:
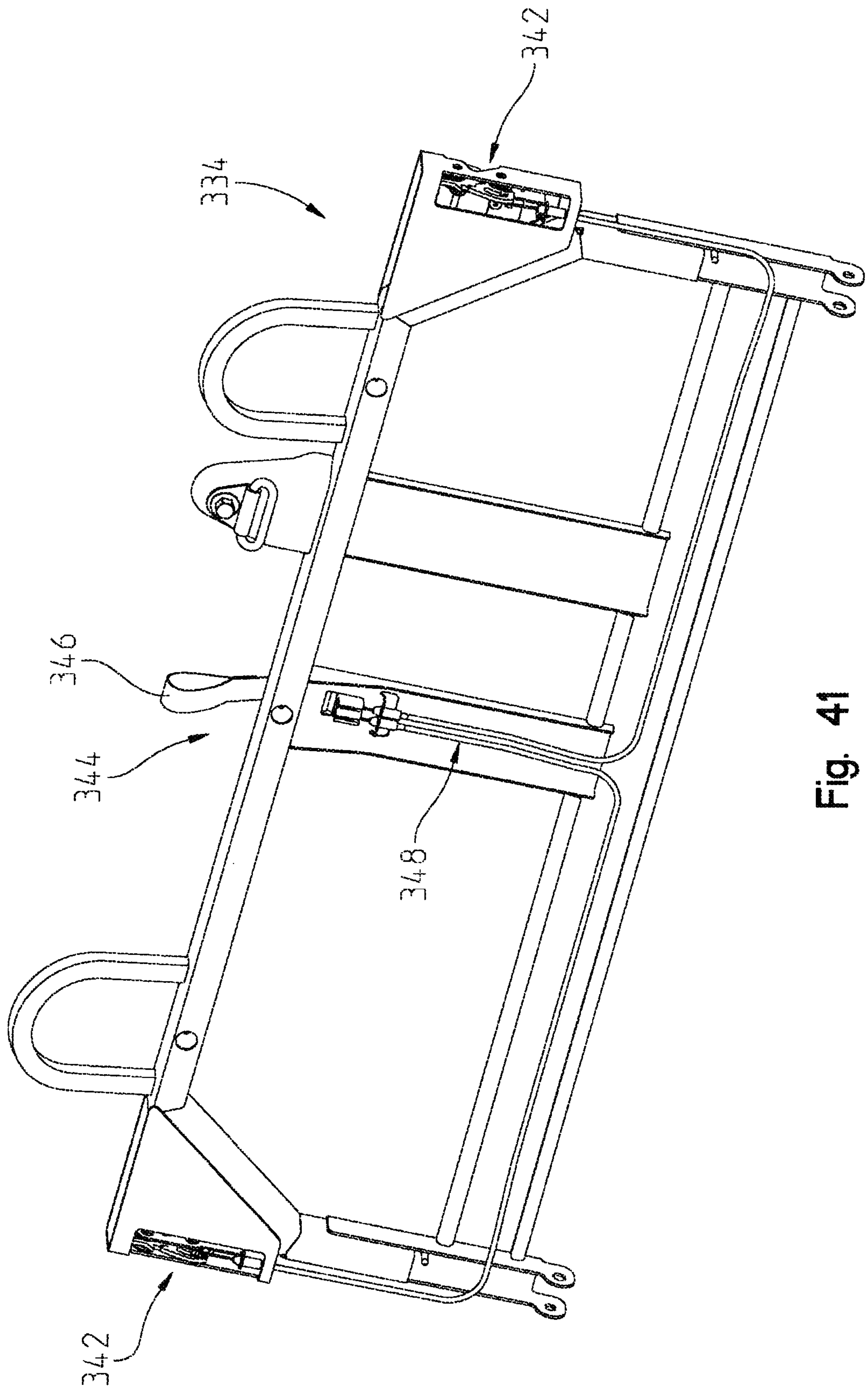
FIG. 41 shows a front left perspective view of the frame portion of the seat back of FIG. 40.

With reference first to FIGS. 1-8, the vehicle of the present disclosure will be described. As shown, the vehicle is generally depicted as reference number 2 which includes front ground engaging members 4 and rear ground engaging members 6. Front ground engaging members 4 are comprised of wheels 8 and tires 10, and rear ground engaging members 6 are comprised of wheels 12 and tires 14. Ground engaging members 4 and 6 support a vehicle frame, which is shown generally at 20 (FIGS. 9 and 10), through front and rear suspension assemblies 22 and 24, respectively. Vehicle frame 20 supports a seating area 26 (FIGS. 9, 10 and 37) comprised of at least a driver's seat 28 and a front passenger seat 30 (FIG. 37), and a body assembly 40 including a plurality of body panels defining at least exterior surfaces of vehicle 2 and a cargo area 41, described in further detail below. Body assembly 40 also may include body panels which define various internal surfaces, such as floor panels, at least portions of a dashboard assembly, interior trim, etc. In various embodiments, seating area 26 further includes a rear passenger seat 32 (FIG. 37) positioned rearward of driver's seat 28 and passenger seat 30. Vehicle 2 further includes a steering assembly (not shown) for steering front ground engaging members 4 whereby the steering assembly includes a steering wheel (not shown) which is both tiltable and longitudinally movable. In various embodiments, the steering wheel may be heated and/or include various actuating mechanisms (i.e., buttons, handles, levers, etc.) for controlling various aspects of vehicle 2 (i.e., radio, speed control, etc.).

Referring to FIGS. 9-22, frame 20 of vehicle 2 is comprised of a cab frame 36 that generally extends over the seating area 26, and a lower frame portion 38 positioned below and supporting cab frame 36.

With reference to FIGS. 9-13, cab frame 36 of frame 20 will be described in further detail. Cab frame 36 generally includes a front frame portion 42 and a rear frame portion 44, where front and rear frame portions 42 and 44 are coupled together via a pair of longitudinally-extending frame members 43. In general, cab frame 36 is coupled to lower frame portion 38 via a first set of downwardly extending frame members 46 of front frame portion 42 and a second set of downwardly extending frame members 48 of rear frame portion 44. In various embodiments, cab frame 36 may further include a middle frame portion 45 coupled between front frame portion 42 and rear frame portion 44, where middle frame portion 45 is coupled to lower frame portion 38 via a third set of downwardly extending frame member 50. When seating area 26 includes only driver's seat 28 and passenger seat 30, cab frame 36 may include only front frame portion 42 and rear frame portion 44, and cab frame 36 may be coupled to lower frame portion 38 via first set of downwardly extending frame member 46 and second set of downwardly extending frame member 48, respectively, without any castings. When seating area 26 includes driver's seat 28, passenger seat 30, and rear passenger seat 32, cab frame 36 includes front frame portion 42, middle frame portion 45, and rear frame portion 44, and cab frame 36 is coupled to lower frame portion 38 via first set of downwardly extending frame members 46, third set of downwardly extending frame member 50, and second set of downwardly extending frame member 48, respectively, where frame members 50 may include castings 56 for coupling frame members 50 to lower frame portion 38.

Figure 13:
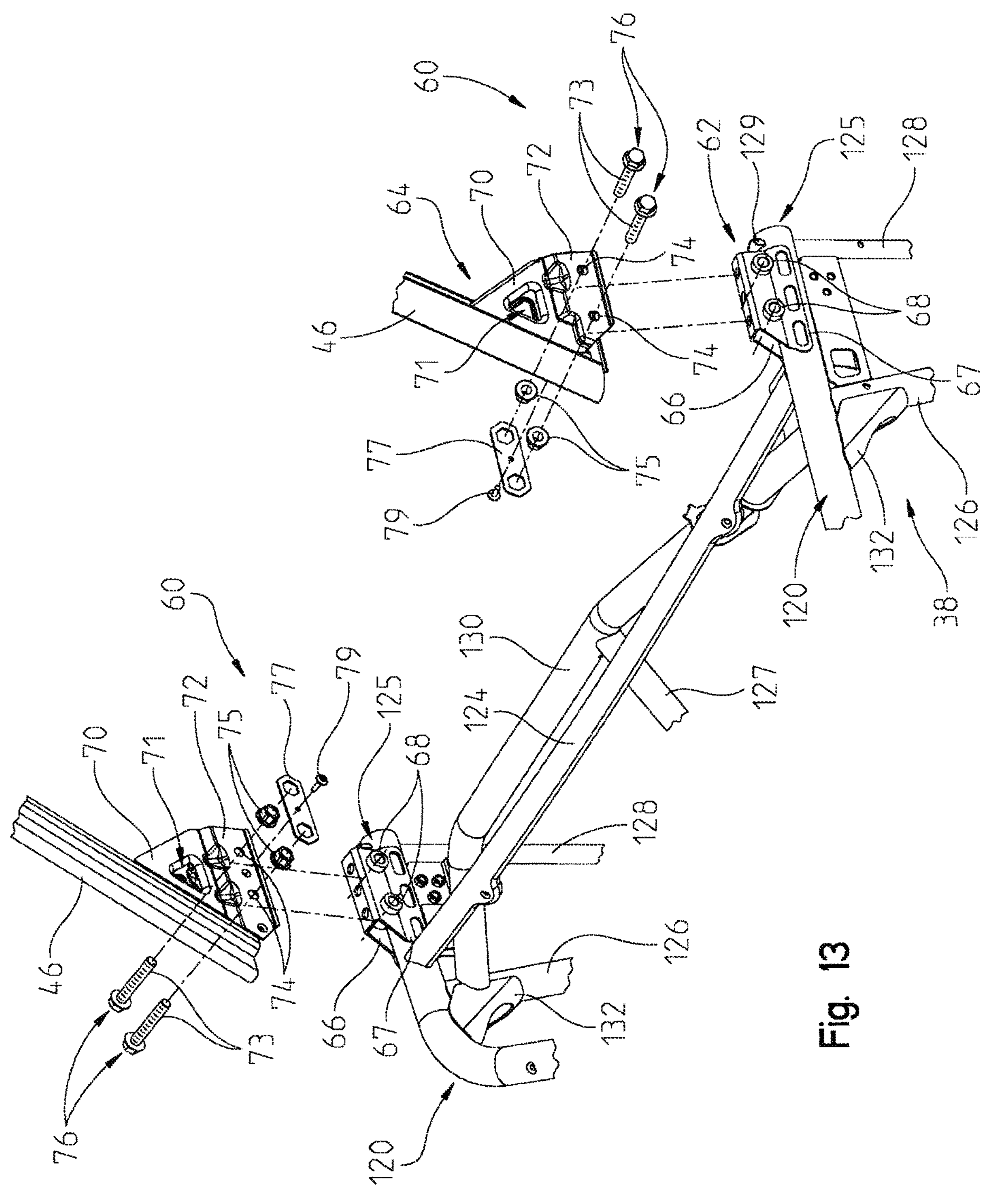
FIG. 13 shows an exploded view of a bracket assembly coupling a front frame portion of the cab frame of FIG. 11 to a lower frame portion of the frame of FIG. 9.

Front frame portion 42 of cab frame 36 generally includes downwardly-extending frame members 46 and a horizontal frame member 58 coupled between downwardly-extending frame member 46. In various embodiments, downwardly-extending frame members 46 of front frame portion 42 may be integrally formed as a single component with longitudinally-extending frame members 43. Downwardly-extending frame members 46 are each generally coupled to lower frame portion 38 via a bracket assembly 60. Referring to FIG. 13, bracket assembly 60 generally includes a first portion 62 and a second portion 64, where first portion 62 is coupled to lower frame portion 38 and second portion 64 is coupled to downwardly-extending frame member 46. In one embodiment, first portion 62 generally includes a bracket 66, illustratively an upside-down U-shaped bracket, and a pair of bushings 68 extending through bracket 66. In other embodiments, bushings 68 may sit on or in a portion of lower frame portion 38, illustratively a frame member 120, with a portion 67 of bracket 66 extending below bushings 68 to support bushings 68 and create an effective load path because the load from downwardly-extending frame member 46 is transmitted to bushings 68 and, with portion 67 of bracket 66 extending between both bushings 68 and lower frame 38, the load is transferred to lower frame 38. Spacing between bushings 68 and/or couplers 76, described below, is optimized to react to the loads. It may be understood that, depending on the application, it may be desirable to have more or less spacing between bushings 68 and/or couplers 76 (e.g., the harder it is to react to the loads). Second portion 64 of bracket assembly 60 generally includes a pair of triangular-shaped brackets 70 coupled to a side of frame member 46 and each having an opening 71 and a plate 72 extending downward therefrom, where plates 72 include openings 74 for coupling second portion 64 to first portion 62 at bushings 68 of first portion 62 via couplers 76. In various embodiments, plates 72 are integrally formed with triangular-shaped bracket 70. Furthermore, coupler 76 may include at least one bolt 73, at least one nut 75 for coupling to bolt 73, and a plate 77 configured to hold nut 75 and couple to bracket 70 via coupler 79 such that nut 75 does not have to be fully accessible for coupling with bolt 73. In various embodiments, nuts 75 may be welded to plate 77 to hold nut 75.

Rear frame portion 44 of cab frame 36 generally includes second set of downwardly-extending frame members 48 coupled to longitudinally-extending frame members 43, and a pair of downwardly-extending frame member 78 positioned rearward of downwardly-extending frame member 48. Rear frame portion 44 further includes a first horizontally-extending frame member 80 coupled between top ends 82 of downwardly-extending frame members 78, a second horizontally-extending frame member 84 extending between downwardly-extending frame member 78 at a position below first horizontally-extending frame member 80, and a third horizontally-extending frame member 86 extending between downwardly-extending frame member 48 at a position forward of second horizontally-extending frame member 84 and vertically lower than first horizontally-extending frame member 80. Rear frame portion 44 also includes a pair of longitudinally-extending frame members 88 each coupled between one of downwardly-extending frame member 48 and one of downwardly-extending frame member 78 at a position vertically lower than each of first, second, and third horizontally-extending frame members 80, 84, and 86.

In various embodiments, third set of downwardly extending frame members 50 may be integrally formed with a frame member 52 (FIG. 12) extending from a first side 3 of vehicle 2 to a second side 5 of vehicle 2 or, alternatively, may be separate components from frame member 52 and removably coupled thereto. In at least one embodiment, frame members 50, 52 define a single, unitary piece. Frame member 52 is generally defined by a horizontally-extending portion 54 extending between downwardly-extending portions 50, and is coupled to longitudinally-extending frame members 43 via brackets 55. When seating area 26 of vehicle 2 further includes rear passenger seat 32, frame member 52 of middle frame portion 45 includes two castings 56 for coupling frame member 52 to lower frame portion 38. In various embodiments, a cross-section of frame member 52 may be rectangular in shape. Middle frame portion 45, when provided, may further include a horizontally-extending member 57 coupled between downwardly-extending portions 50 at a position below horizontally-extending portion 54. Horizontally-extending member 57 is generally bowed rearward and is positioned behind an upper portion of each of driver's seat 28 and front passenger seat 30.

In various embodiments, cab frame 36 may further include a cargo area frame portion 90 (FIGS. 9 and 10) extending over cargo area 41. Cargo area frame portion 90 generally includes a pair of longitudinally-extending frame members 91 that couple to longitudinally-extending frame members 43 and downwardly-extending frame members 78 of rear frame portion 44. Additionally, cargo area frame portion 90 includes a pair of downwardly-extending frame members 93 coupled between rear ends 92 of longitudinally-extending frame members 91 and cargo area 41 and a horizontally-extending frame member 94 coupled between rear ends 92 of frame members 91 and upper ends 95 of frame members 93. In various embodiments, cargo area frame portion 90 may have a substantially-square shape where frame members 91 extend substantially straight rearward and frame members 93 extend substantially straight downward therefrom. In other embodiments, cargo area frame portion 90 may have a slanted shape where frame members 91 slant substantially downward from frame members 43 and frame members 93 are substantially shorter than those of the substantially-square shape. In yet other embodiments, cargo area frame portion 90 may have a mixed square/slated shape, where frame members 91 extend substantially straight backward and frame members 93 extended at a slant backward and downward therefrom, among other various shapes.

Figure 14:
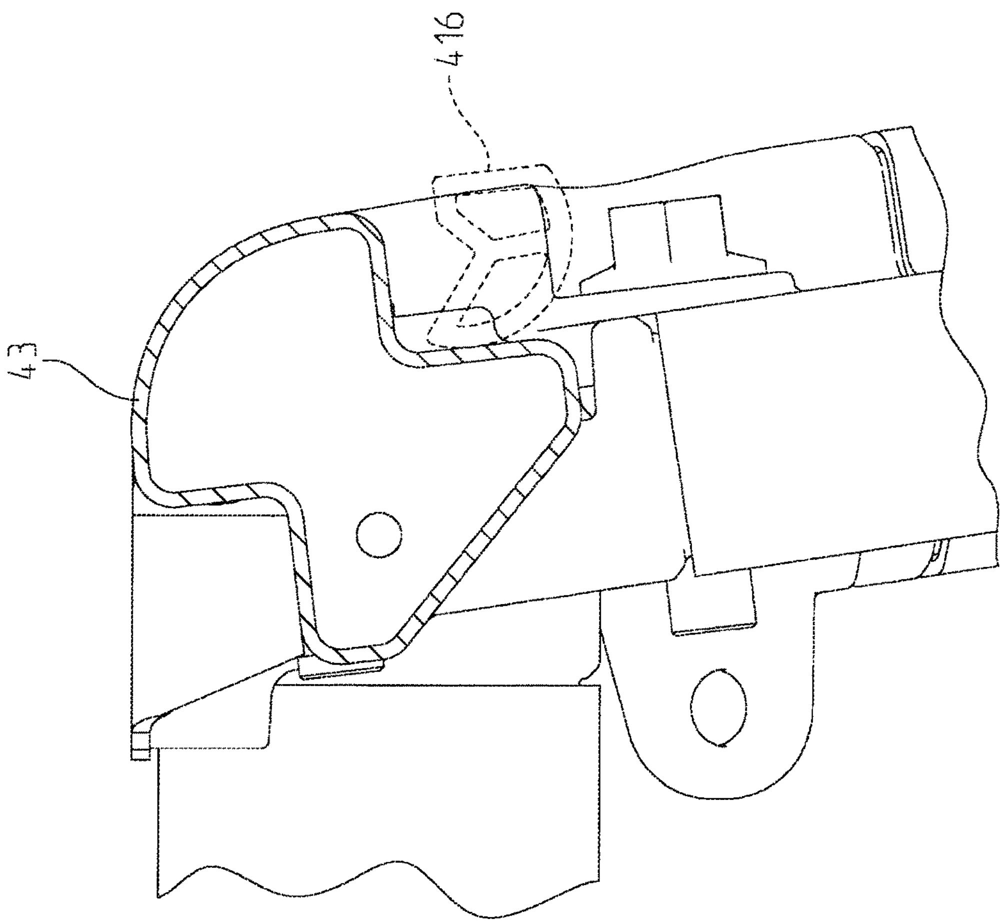
FIG. 14 shows a cross sectional view a frame member of the cab frame of FIG. 11 taken along line 14-14 of FIG. 11.

Referring to FIG. 14, in various embodiments, a cross-sectional profile of any or all of the frame members of front frame portion 42, rear frame portion 44, middle frame portion 45, and/or cargo area frame portion 90 may be hour-glass shaped, figure-8 shaped, or a mixture thereof to allow sufficient sealing with body assembly 40, discussed in further detail below.

With reference now to FIGS. 9, 10, and 15-22, lower frame portion 38 will be described in further detail. Lower frame portion 38 generally includes a front frame portion 100, a rear frame portion 104, a pair of inner, longitudinally-extending frame tubes 106 extending longitudinally between and coupled to each of front frame portion 100 and rear frame portion 104. Additionally, lower frame portion 38 includes a pair of outer, longitudinally-extending frame tubes 108 extending longitudinally between and coupled to each of front frame portion 100 and rear frame portion 104. Outer frame tubes 108 also may be coupled to inner frame tubes 106 through laterally-extending cross-members, where outer frame tubes 108 are positioned radially outwardly relative to inner frame tubes 106. In various embodiments, for example when seating area 26 of vehicle 2 includes driver's seat 28, passenger seat 30, and rear passenger seat(s) 32, lower frame portion 38 may further include a middle frame portion 102 positioned longitudinally between front frame portion 100 and rear frame portion 104, where outer frame tubes 108 are further coupled to middle frame portion 102.

Figure 15:
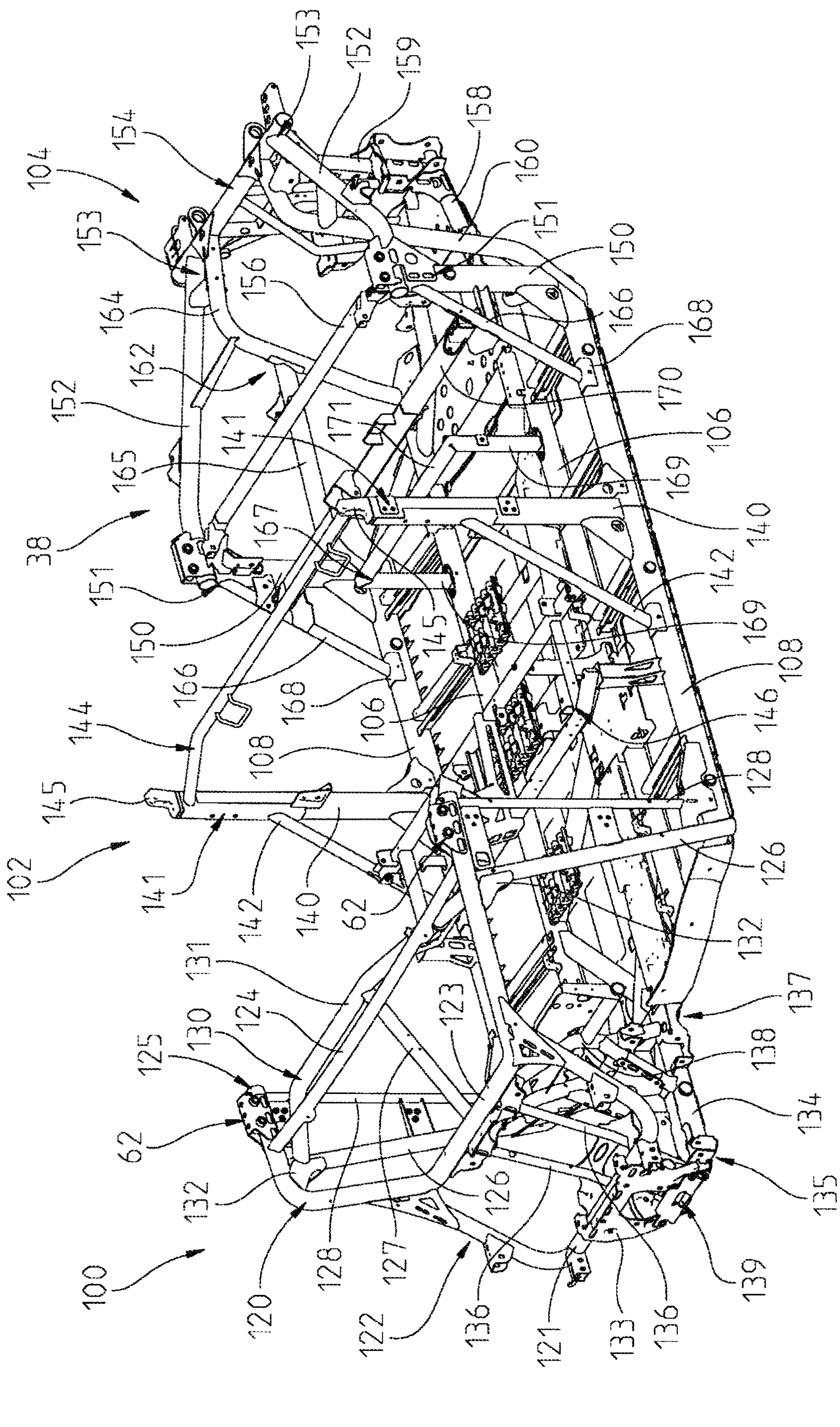
FIG. 15 shows a front left perspective view of a lower frame portion of the frame of FIG. 9.
Figure 16:
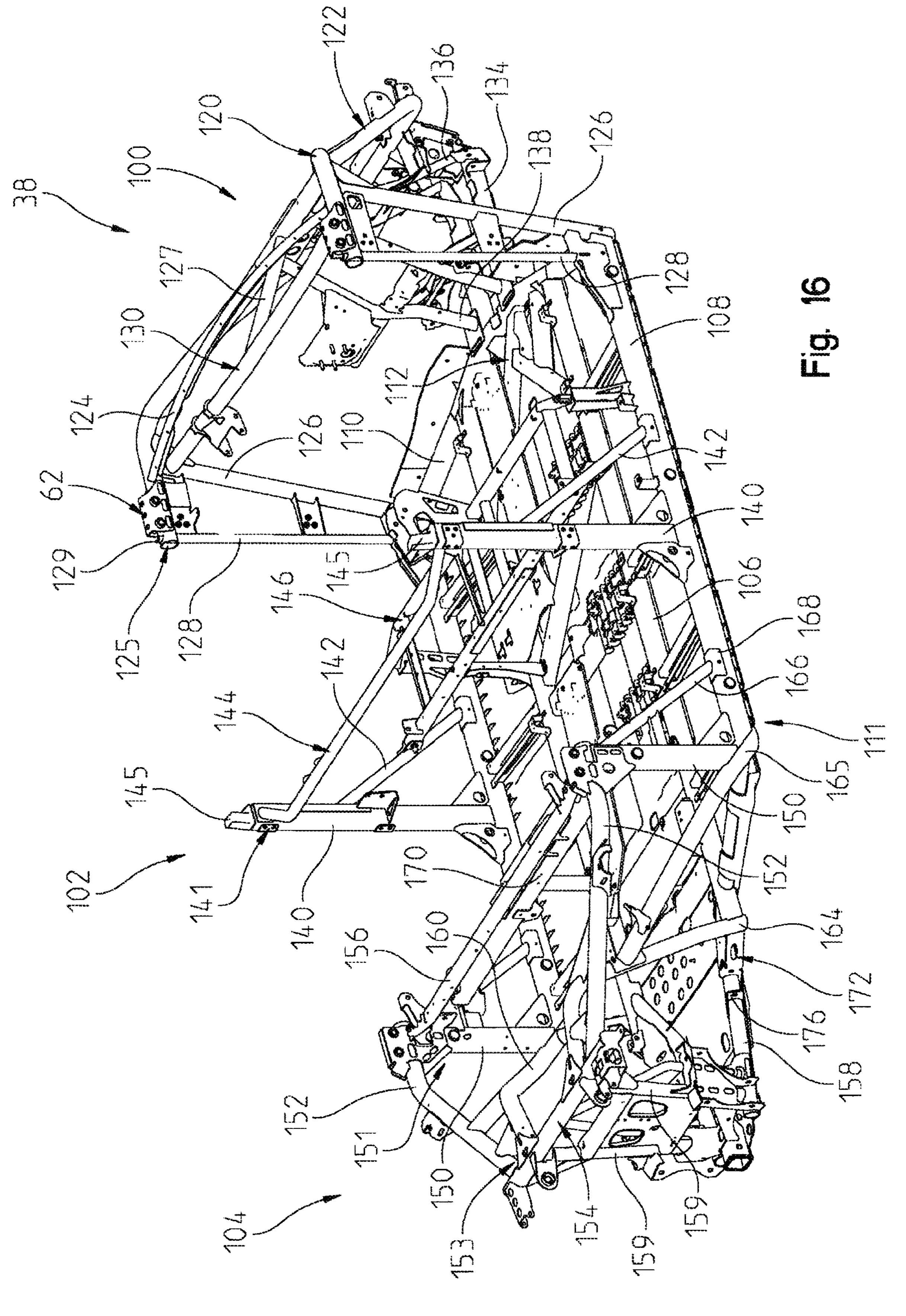
FIG. 16 shows a rear right perspective view of the lower frame portion of FIG. 15.
Figure 17:
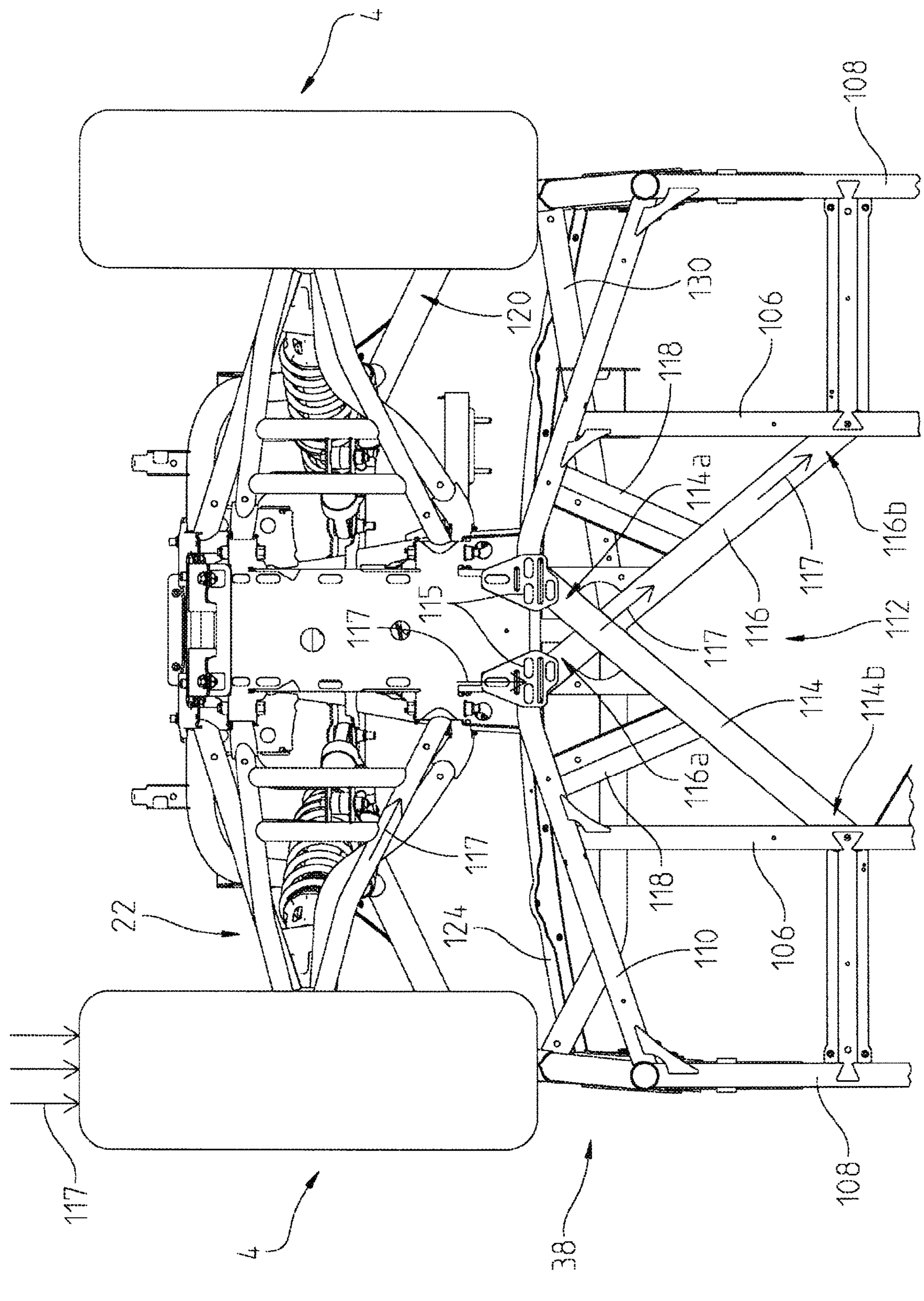
FIG. 17 shows a bottom plan view of a front portion of the lower frame portion of FIG. 15 with ground engaging members and a front suspension assembly operably coupled to the lower frame portion.

Referring still to FIGS. 9, 10, and 15-17, front ends 105 of inner frame tubes 106 and front ends 107 of outer frame tubes 108 may be coupled together at a position adjacent front frame portion 100 via an arched horizontally-extending frame member 110. Lower frame portion 38 may further include a brace 112, illustratively shown with an "X" configuration (FIG. 17). As shown in the illustrative embodiment, brace 112 generally includes a first cross member 114 and a second cross member 116, where first ends 114*a*, 116*a* of cross members 114 and 116 are coupled to arched frame member 110 via brackets 115 and second ends 114*b*, 116*b* of cross members 114 and 116 are coupled to one of inner frame tubes 106 (FIG. 17). Brace 112 allows a front impact load on vehicle 2 to efficiently transfer through front suspension 22 and to lower frame portion 38 along path 117 to reduce permanent deformation caused by the front impact load. In various embodiments, brace 112 may further include a pair of support frame members 118 each extending between arched frame member 110 and one of cross members 114 and 116, where support frame member 118 are coupled to arched frame member 110 at a position between where one of inner frame tube 106 couples to arched frame member 110 and where one of cross members 114 and 116 couples to arched frame member 110.

With reference now to FIGS. 9, 10, 15-17, and 20-22, front frame portion 100 of lower frame portion 38 will be described in further detail. Front frame portion 100 generally includes an upper U-shaped frame tube 120 and a front U-shaped frame tube 122 coupled at both ends to upper U-shaped frame tube 120 and including a middle portion 121 extending forward and downward from a front end or middle portion 123 of upper U-shaped frame tube 120. Front frame portion 100 also includes a first horizontally-extending frame member 124 coupled at both ends to rear ends 125 of U-shaped frame tube 120, and a first set of vertically-extending frame members 126 each coupled between upper U-shaped frame tube 120 and outer frame tube 108 on either side of vehicle 2. Front frame portion 100 further includes a second set of vertically-extending frame members 128 each coupled between upper U-shaped frame tube 120 and outer frame tube 108 rearward of first vertically-extending frame members 126 on either side of vehicle 2, and a second horizontally-extending frame member 130 coupled at both ends to a bracket 132 coupled between upper U-shaped frame tube 120 and first vertically-extending frame members 126. Front frame portion 100 also includes a longitudinally-extending frame member 127 coupled between middle portion 123 of upper U-shaped frame tube 120 and second horizontally-extending frame member 130. In various embodiments, rear ends 125 of upper U-shaped frame tube 120 may include cutouts such that a top portion 129 (FIG. 13) of vertically-extending frame members 128 extends through and above each of rear ends 125 of upper U-shaped frame tube 120, which supports upper U-shaped frame tube 120. This configuration may strengthen upper U-shaped frame tube 120 during an impact.

In various embodiments, second horizontally-extending frame member 130 is coupled to upper U-shaped frame tube 120 at both ends at a position forward of first horizontally-extending frame member 124, and extends rearwardly such that a middle portion 131 of second horizontally-extending frame member 130 is positioned rearwardly of first horizontally-extending frame member 124. Middle portion 121 of front U-shaped frame tube 122 generally extends down from upper U-shaped frame tube 120 to a front frame bracket 133 that is coupled to arched frame member 110 via longitudinally-extending frame members 134. In various embodiments, front frame bracket 133 may include a recovery bar 139 welded thereto that acts as a recovery point or coupling point for vehicle 2 for towing or otherwise moving vehicle 2. Front frame portion 100 may further include a pair of generally upstanding front frame members 136 extending from front end 123 of upper U-shaped frame tube 120 down to a front end 135 of frame members 134, and a pair of generally upstanding rear frame members 138 extending from front end 123 of upper U-shaped frame tube 120 down to a rear end 137 of frame members 134. In various embodiments, front frame members 136 extend generally forward of front end 123 of upper U-shaped frame tube 120 and rear frame members 138 extend generally rearward of front end 123 of upper U-shaped frame tube 120.

Front frame bracket 133 and frame members 134 are generally configured to support a front isolated drive of a drivetrain of vehicle 2 (not shown). For additional information and details regarding the front isolated drive and the mounting and support thereof, U.S. patent application Ser. No. 17/034,077 is expressly incorporated by reference herein.

With reference still to FIGS. 9, 10, 15 and 16, middle frame portion 102 of lower frame portion 38 will be described in further detail. Middle frame portion 102, when provided, generally includes a pair of outer vertically-extending frame tubes 140, a pair of forwardly-extending angled frame tubes 142 each coupling one of vertically-extending frame tubes 140 to one of outer frame tubes 108, and a horizontally-extending frame member 144 coupled to upper ends 141 of vertically-extending frame tubes 140, where horizontally-extending frame member 144 is bowed slightly rearward such that a majority of frame member 144 is rearward of vertically-extending frame tubes 140. When middle frame portion 102 is provided, castings 145 are provided to couple vertically-extending frame tubes 140 to castings 56 of cab frame 36. However, when middle frame portion 102 is not provided, lower frame portion 38 may be coupled to cab frame 36 without any castings.

In various embodiments, lower frame portion 38 may further include a seating area support frame assembly 146 coupled to outer frame tubes 108 and forwardly-extending frame tubes 142 of middle frame portion 102, where seating area support frame assembly 146 is positioned forward of vertically-extending frame tubes 140 and horizontally-extending frame member 144.

Referring now to FIGS. 15, 16, 18, and 19, rear frame portion 104 of lower frame portion 38 will be described in further detail. Rear frame portion 104 generally includes a pair of vertically-extending frame members 150 extending upward from rear ends 111 of outer frame tubes 108, and a pair of upper longitudinally-extending frame member 152 extending rearwardly and inwardly from upper ends 151 of vertically-extending frame members 150. Rear frame portion 104 further includes a first horizontally-extending frame member 154 coupling rearward ends 153 of longitudinally-extending frame members 152, and a second horizontally-extending frame member 156 coupled between upper ends 151 of vertically-extending frame members 150. Rear frame portion 104 also includes a pair of lower longitudinally-extending frame members 158 each coupled to an inner surface 103 of inner frame tubes 106 and extending rearward and inward to a rear of vehicle 2, and a pair of rear, vertically-extending frame members 159 coupling lower longitudinally-extending frame member 158 to upper horizontally-extending frame member 154.

Rear frame portion 104 further includes an upward and rearward-extending frame member 160 on one side of vehicle 2 coupling one of outer frame members 108 to first horizontally-extending frame member 154, where frame member 160 couples to frame member 154 inwardly of upper frame members 152. Rear frame portion 104 also includes a frame assembly 162 coupling the other of outer frame members 108 to first horizontally-extending frame member 154, where frame assembly 162 includes a first frame member 164 coupling one of inner frame tubes 106 to horizontally-extending frame member 154 and a second frame member 165 coupling the other outer frame member 108 to first frame member 164. Similar to frame member 160, first frame member 164 is coupled to horizontally-extending frame member 154 at a position inward of the other of upper frame member 152.

In various embodiments, rear frame portion 104 may further include a pair of forward and downward angled frame members 166 each coupled between one of vertically-extending frame members 150 and one of outer frame tubes 108, a third horizontally-extending frame member 170 coupled between angled frame member 166, and a rear passenger seat support frame assembly 167. Rear passenger seat support frame assembly 167 is generally positioned forward of horizontally-extending frame members 156 and 170 and generally includes two vertically-extending frame members 169 extending upward from inner frame tubes 106 and a horizontally-extending frame member 171 coupled vertically-extending frame member 169. In various embodiments, angled frame members 166 are coupled to outer frame tubes 108 via a bracket 168. Bracket 168 is configured to minimize or decrease the likelihood of buckling of outer frame tubes 108 and transfer loads or forces to other various portions of tubes 108 and/or frame 20.

Figure 18:
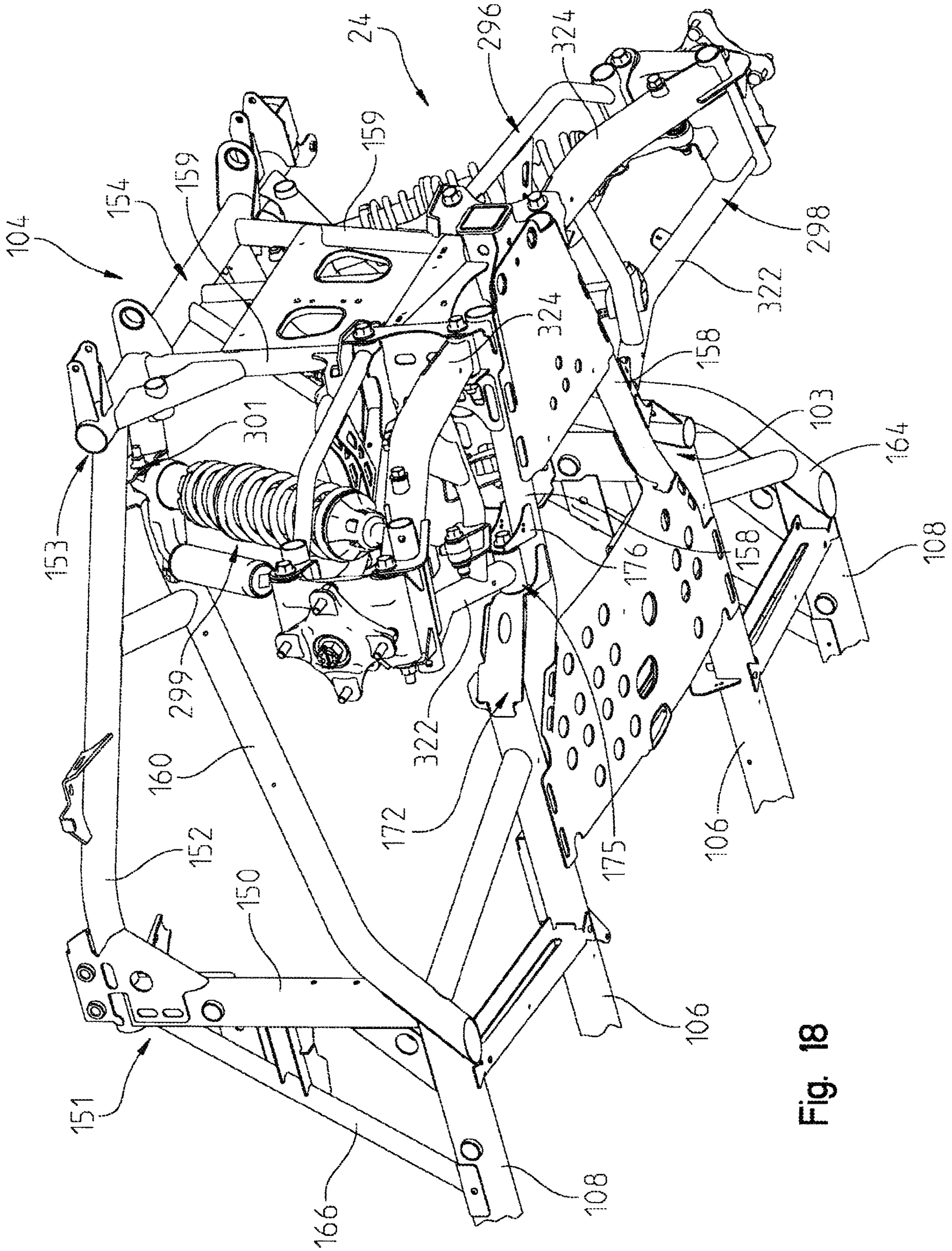
FIG. 18 shows a bottom left perspective view of a rear portion of the lower frame portion of FIG. 15 with a rear suspension assembly operably coupled to the lower frame portion.
Figure 19:
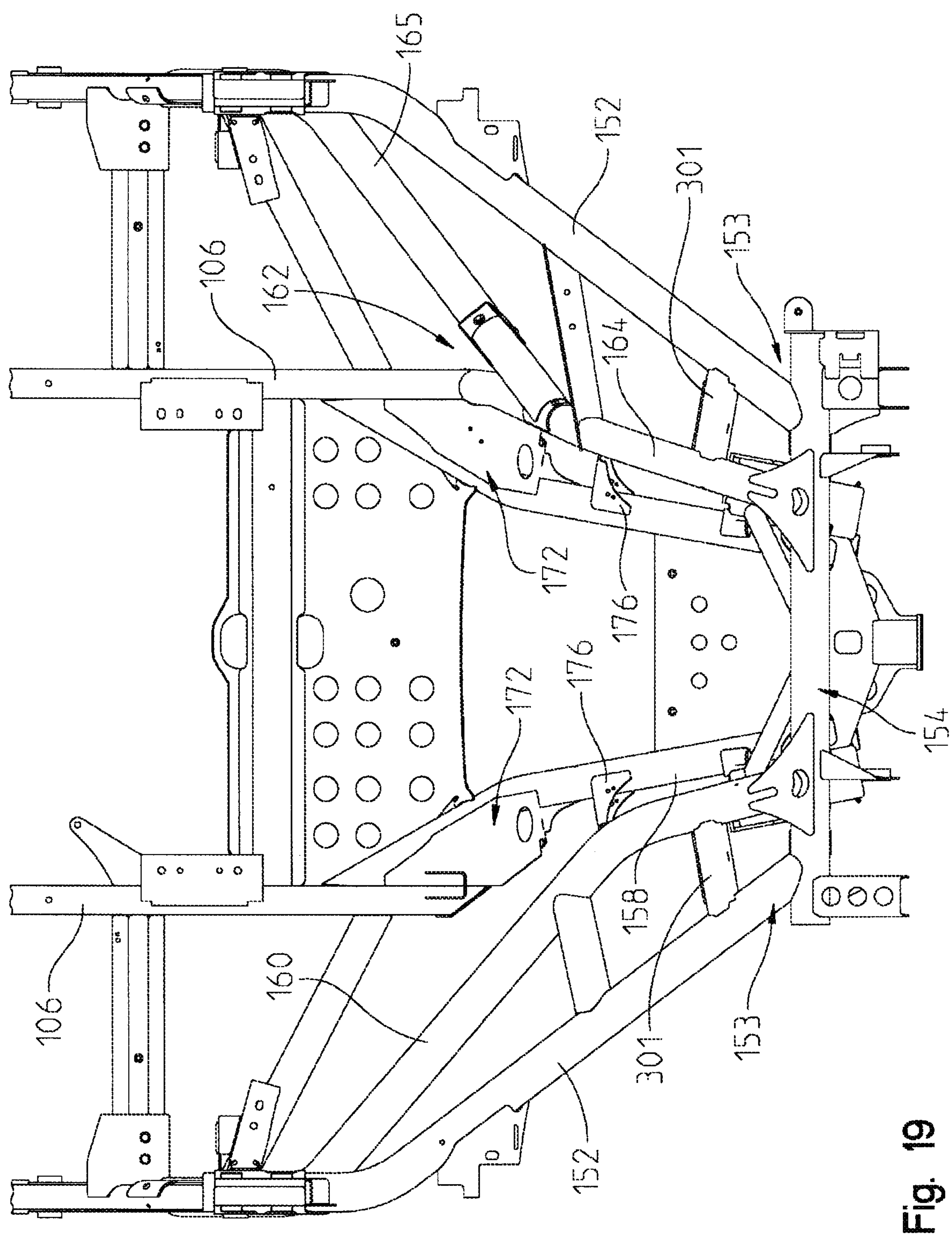
FIG. 19 shows a top plane view of the rear portion of the lower frame portion of FIG. 18 with the rear suspension assembly removed.

With reference to FIGS. 16, 18, and 19, in various embodiments, inner frame tubes 106 may be coupled to rear frame portion 104 via transition brackets 172. Transition brackets 172 angle inward from inner frame tubes 106 to couple to lower longitudinally-extending frame member 158 of rear frame portion 104, where frame members 158 are positioned inward of inner frame tubes 106. In various embodiments, lower longitudinally-extending frame member 158 may include a suspension coupling bracket 176 positioned rearward of transition bracket 172, where rear suspension assembly 24 may be coupled between a rear surface 175 of transition bracket 172 and suspension coupling bracket 176.

Figure 20:
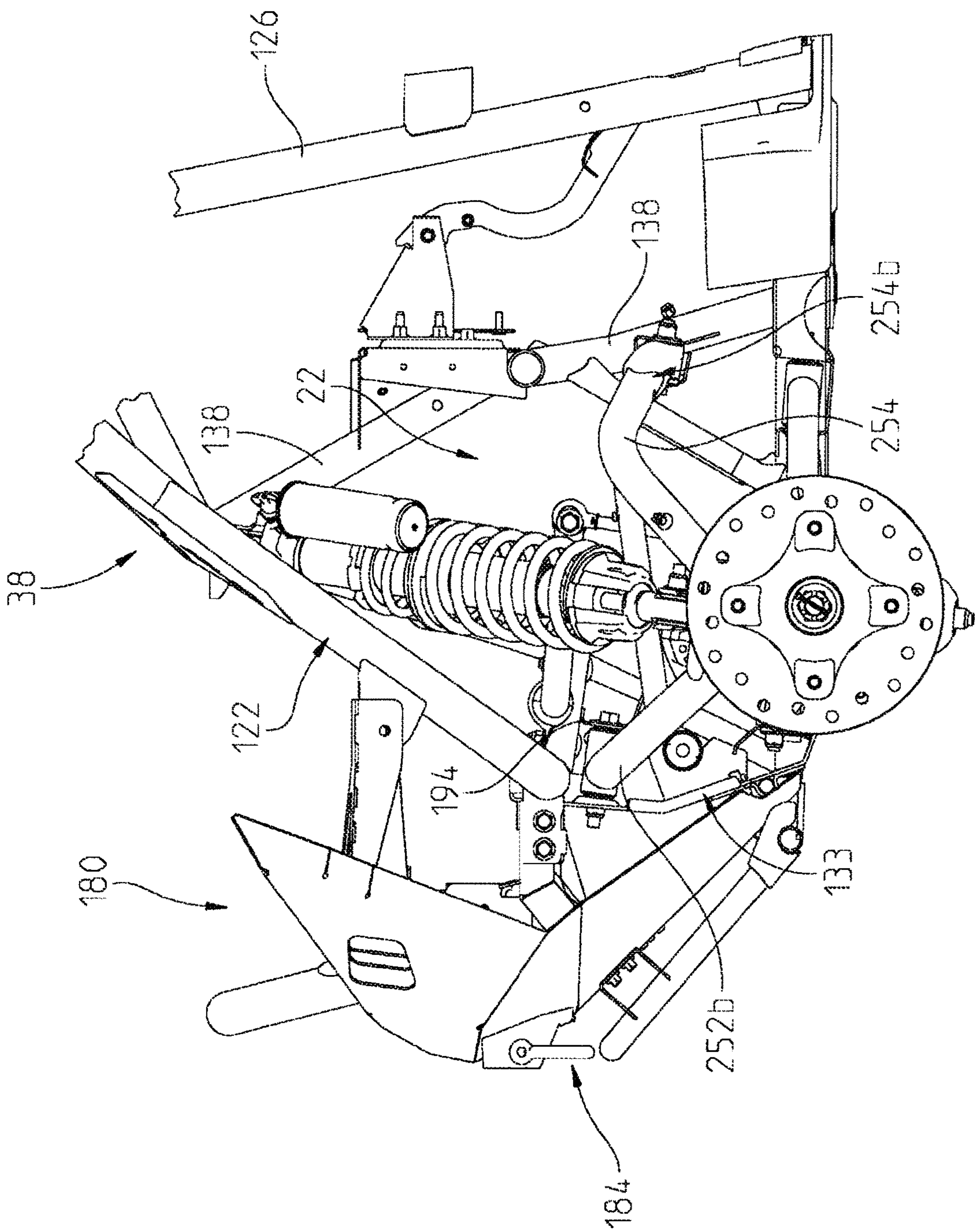
FIG. 20 shows a left elevational side view of the front portion of the lower frame portion of FIG. 17 with the ground engaging members removed and a bumper coupled to the front portion of the lower frame portion.
Figure 21:
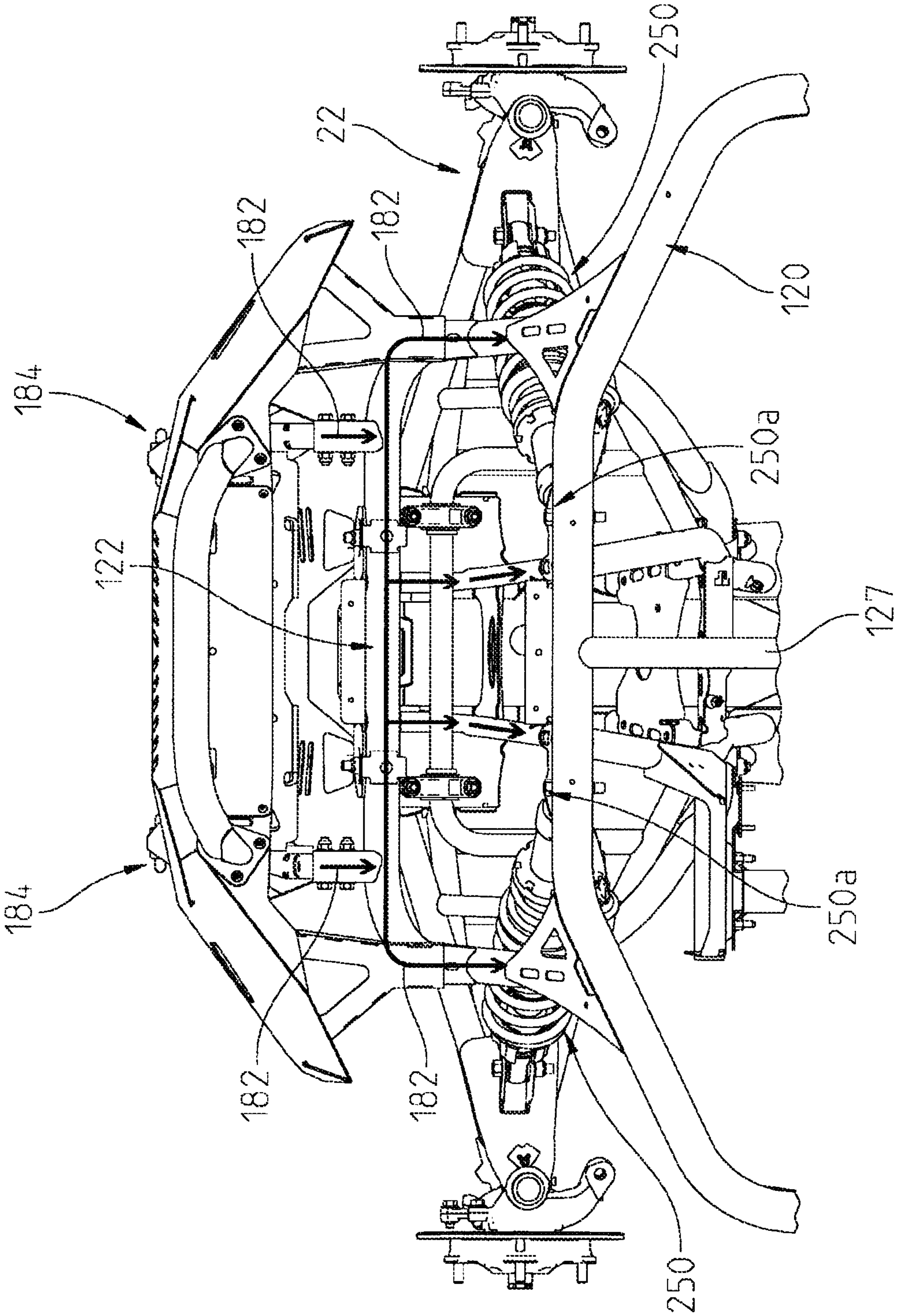
FIG. 21 shows a top plan view of the front portion of the lower frame portion and the bumper of FIG. 20.

Referring now to FIGS. 20 and 21, in various embodiments, vehicle 2 may further include a bumper 180 supported by frame 20. Bumper 180 is generally supported by lower frame portion 38, and may be coupled to front U-shaped frame tube 122 and front frame bracket 133. Bumper 180 is coupled to frame 20 such that a force received through bumper 180 may be transfer to and through lower frame 38 along path 182. In various embodiments, bumper 180 includes at least one towing ring 184. In the illustrative embodiment of FIGS. 20 and 21, bumper 180 includes two towing rings 184. Bumper 180 is coupled to front U-shaped frame tube 122 at a position directly rearward of towing ring(s) 184 to allow the force received therethrough to transfer throughout frame 20.

Figure 22:
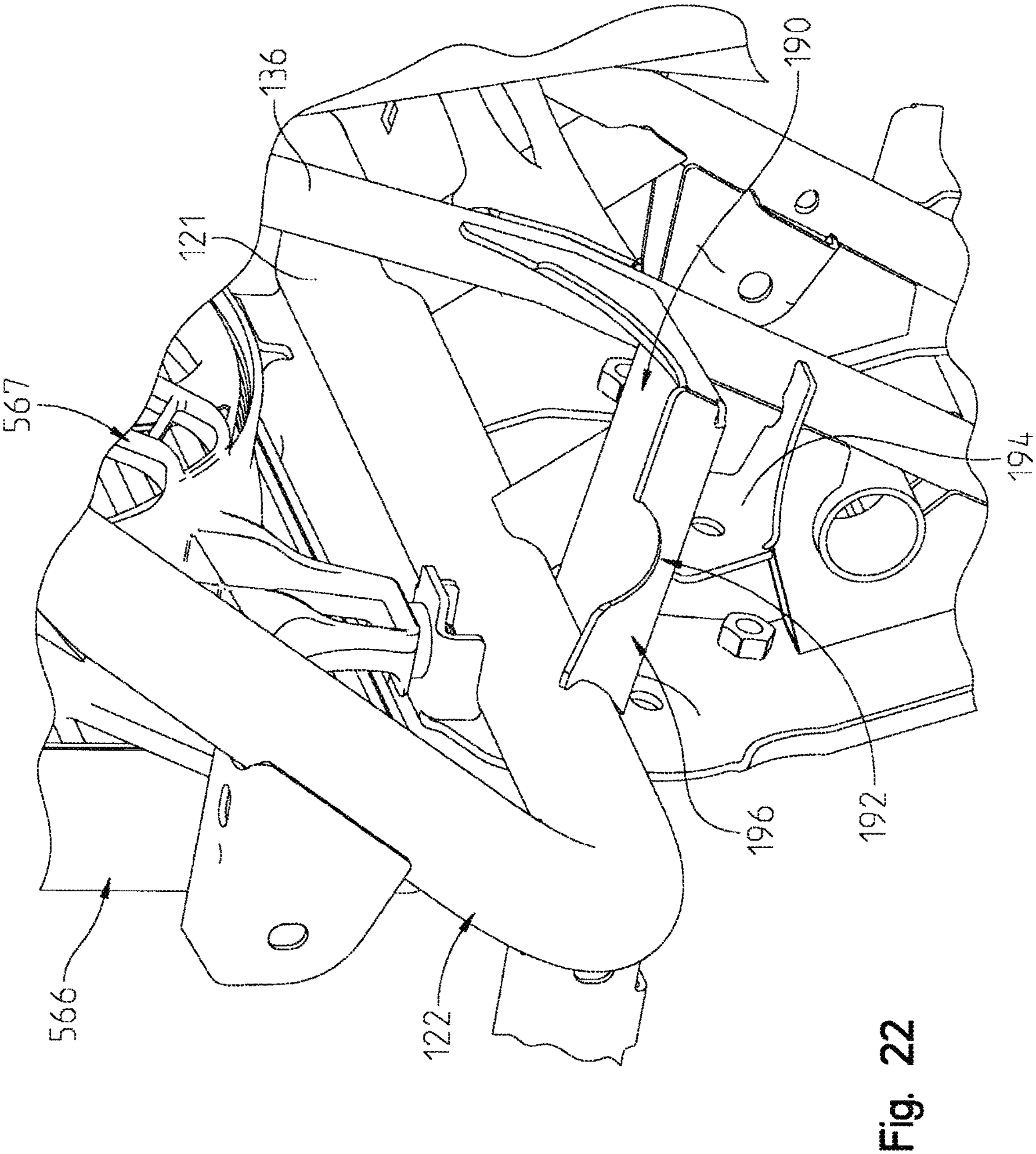
FIG. 22 shows a rear right perspective view of a front stabilizer bar mounting bracket of the front portion of the lower frame portion of FIG. 15.

Referring to FIG. 22, each side of front frame portion 100 may further include a front stabilizer bar mounting bracket 190 configured to support a portion of front suspension 22. Mounting bracket 190 extends between middle portion or front end 121 of front U-shaped frame tube 122 and vertical forward-extending frame member 136, and is positioned generally forward of vertical forward-extending frame member 136 and generally rearward of forward end 121 of front U-shaped frame tube 122. In various embodiments, mounting bracket 190 is also positioned rearward of a radiator 566 and/or a fan 567 (FIG. 22) of a cooling assembly 519 (FIG. 82) of vehicle 2, described in further detail below. Mounting bracket 190 generally includes an indention 192 for receiving a stabilizer bar 244 of front suspension 22 (FIG. 29), described in further detail below. In various embodiments, front frame portion 100 may further include a front control arm mount 194 extending between a bottom surface 196 of bracket 190 and vertical forward-extending frame member 136 such that front control arm mount 194 further supports mounting bracket 190.

Figure 23:
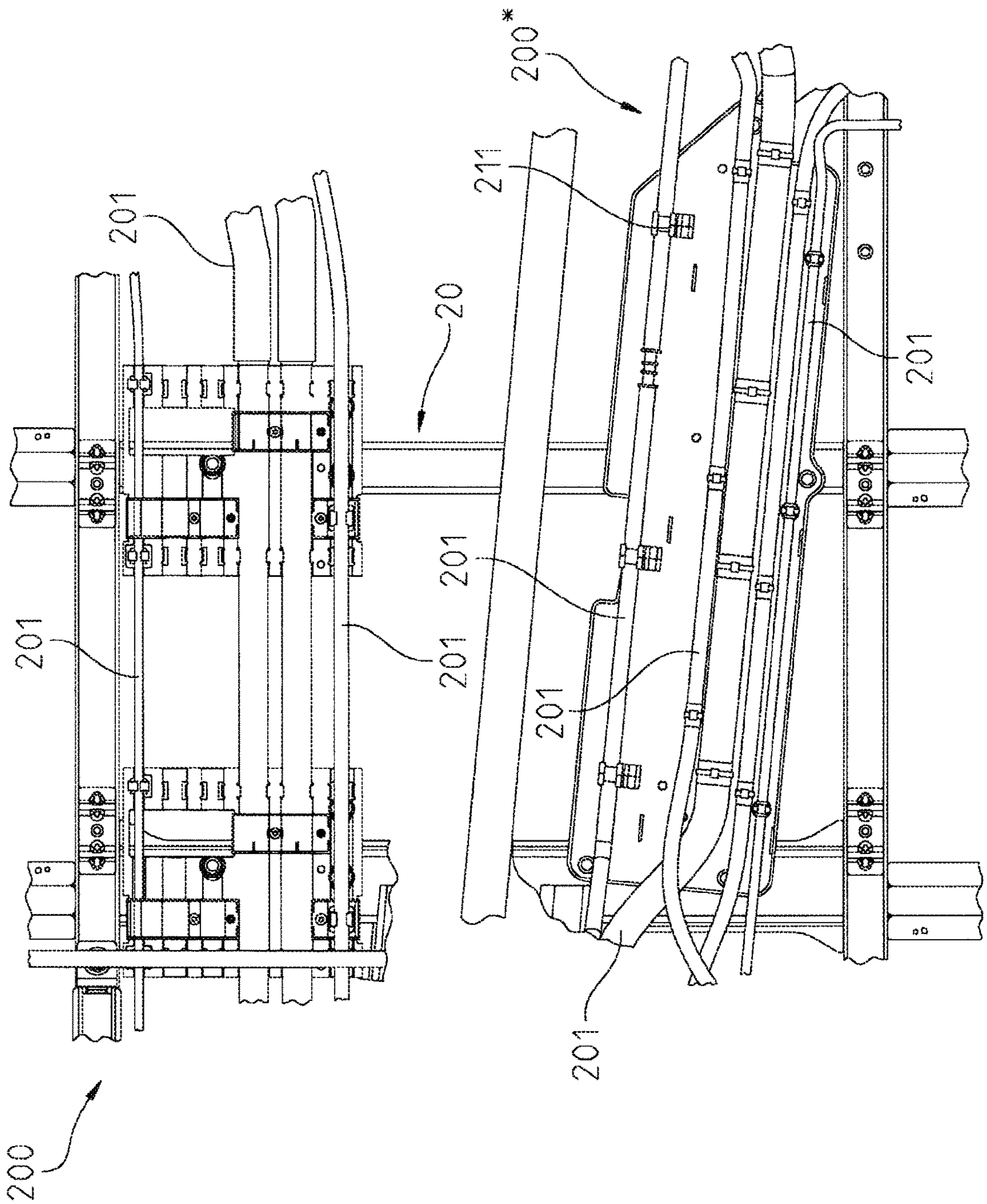
FIG. 23 shows a bottom plan view of a portion of the frame of FIG. 9 with first and second embodiments of routing trays of the present disclosure coupled thereto.
Figure 24:
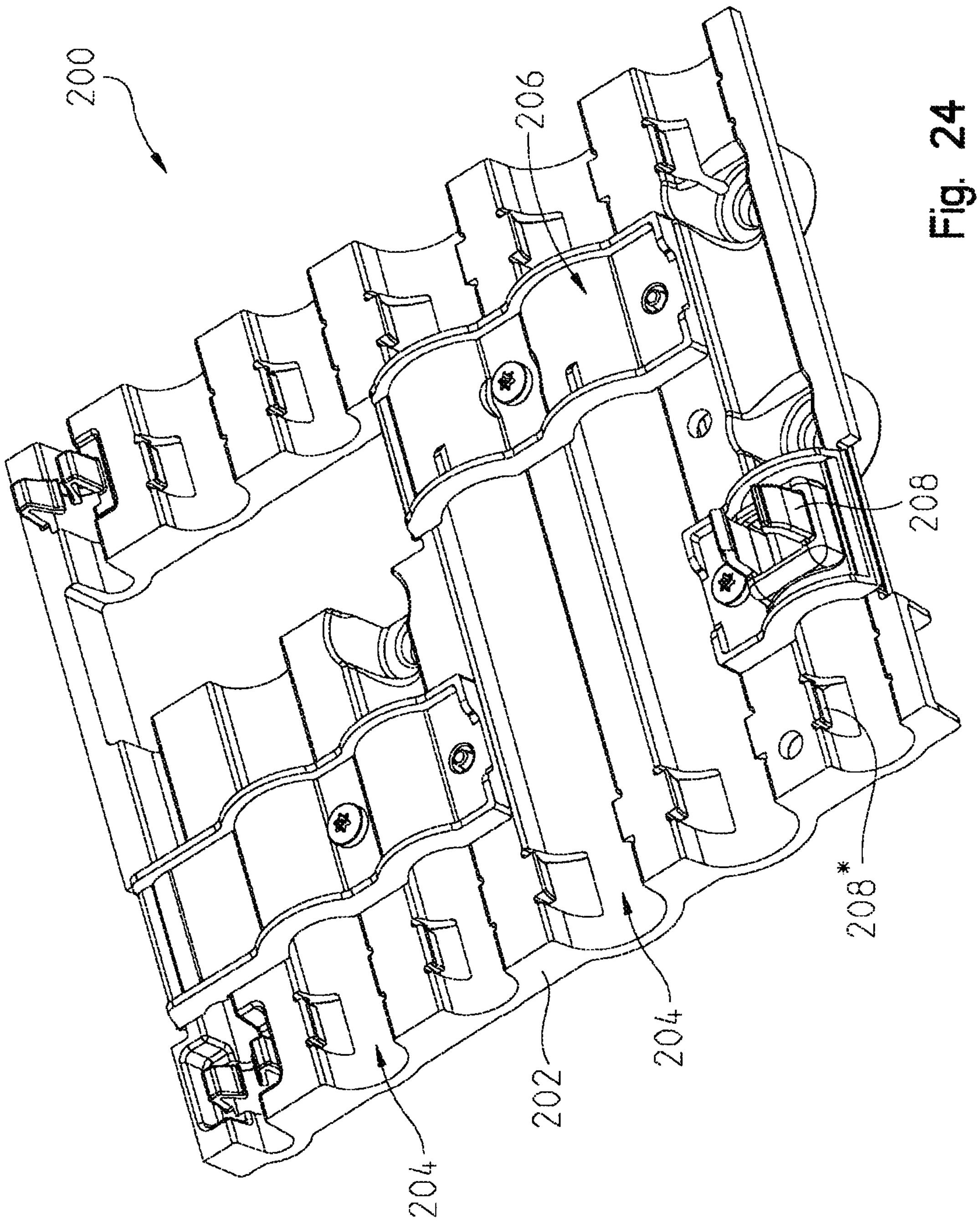
FIG. 24 shows a perspective view the first embodiment of routing trays of FIG. 23.
Figure 25:
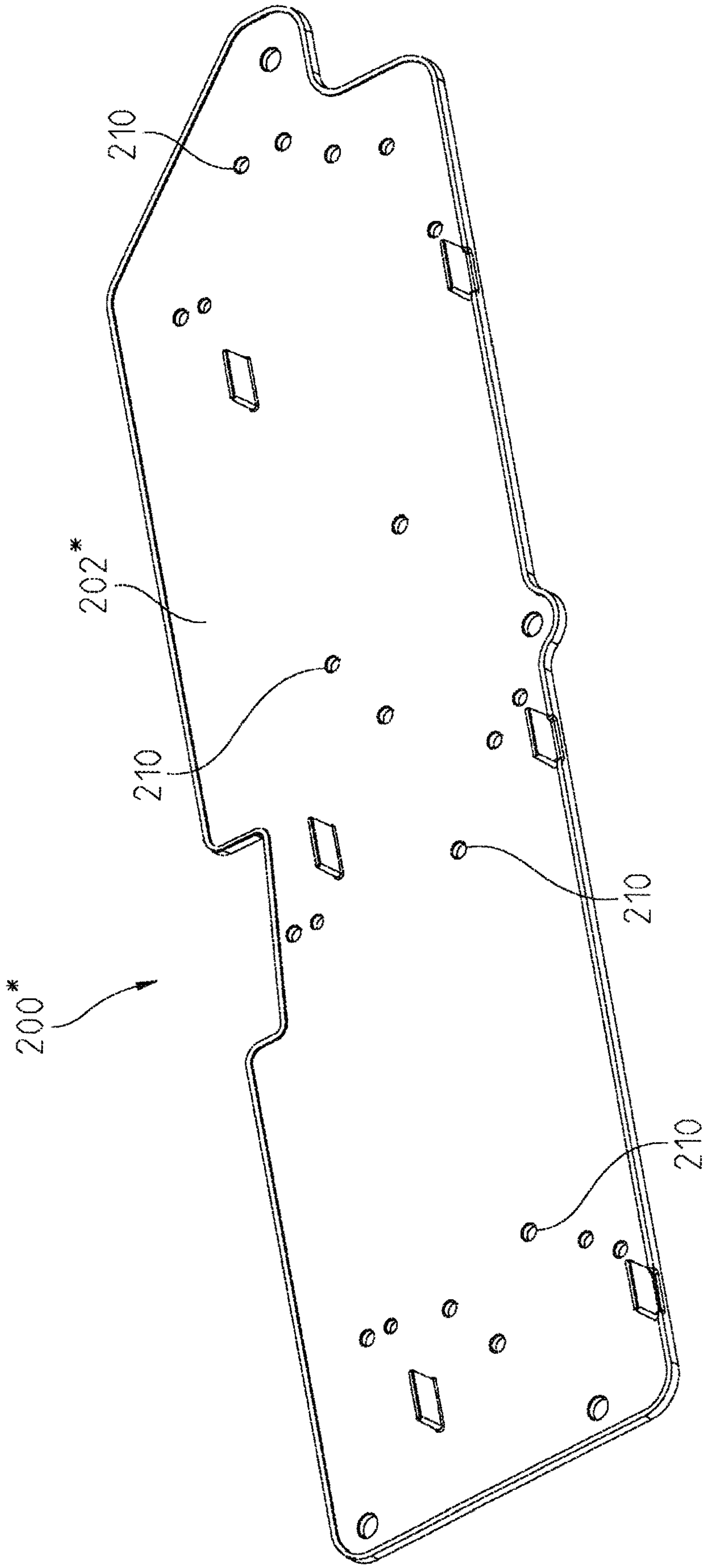
FIG. 25 shows a perspective view the second embodiment of routing trays of FIG. 23.
Figure 76:
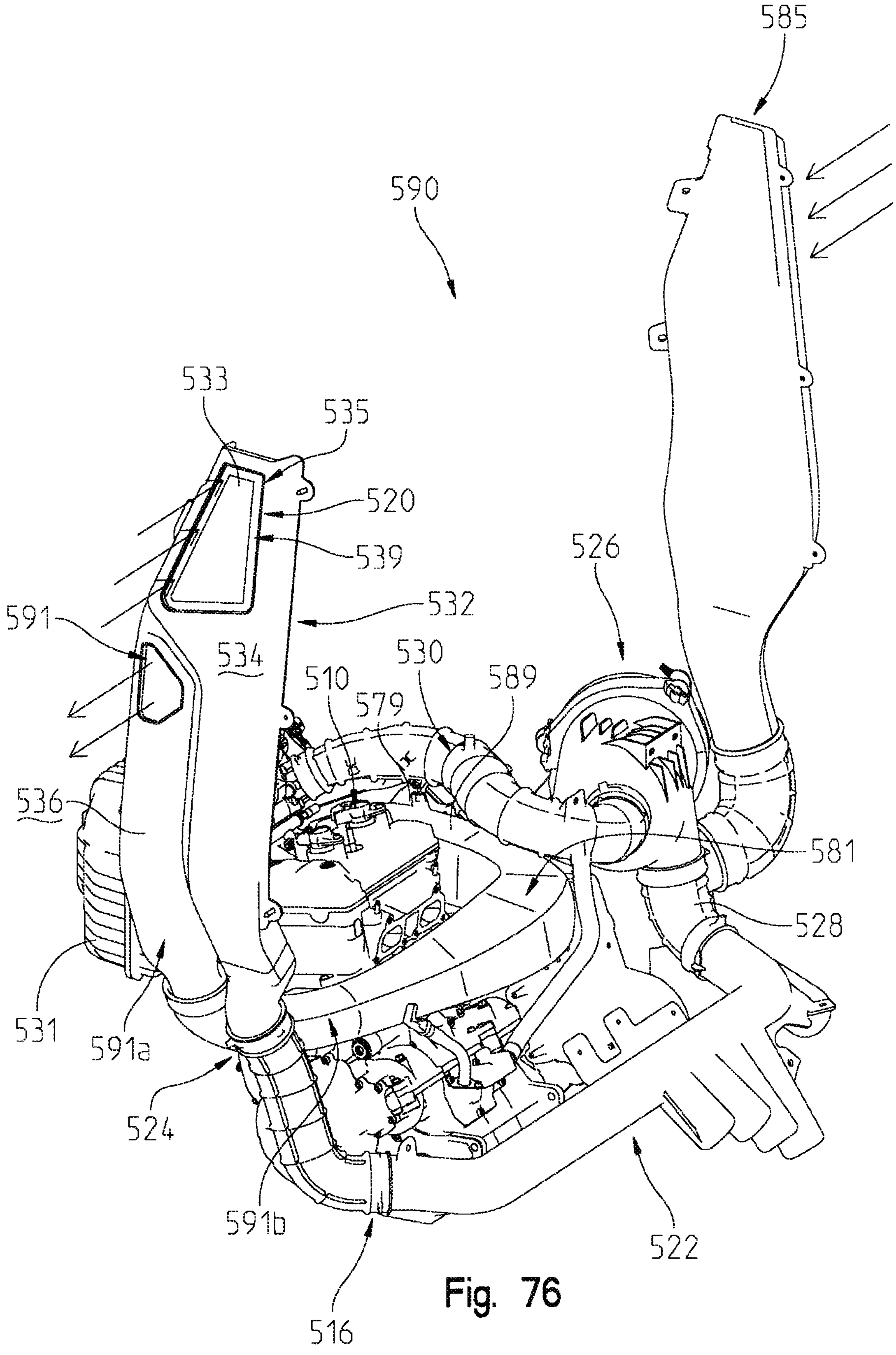
FIG. 76 shows a front right perspective view of a first embodiment of a powertrain of the vehicle of FIG. 1, where the powertrain includes an engine having an intake assembly and an exhaust assembly, and a transmission having a cooling intake assembly and a cooling exhaust assembly.
Figure 77:
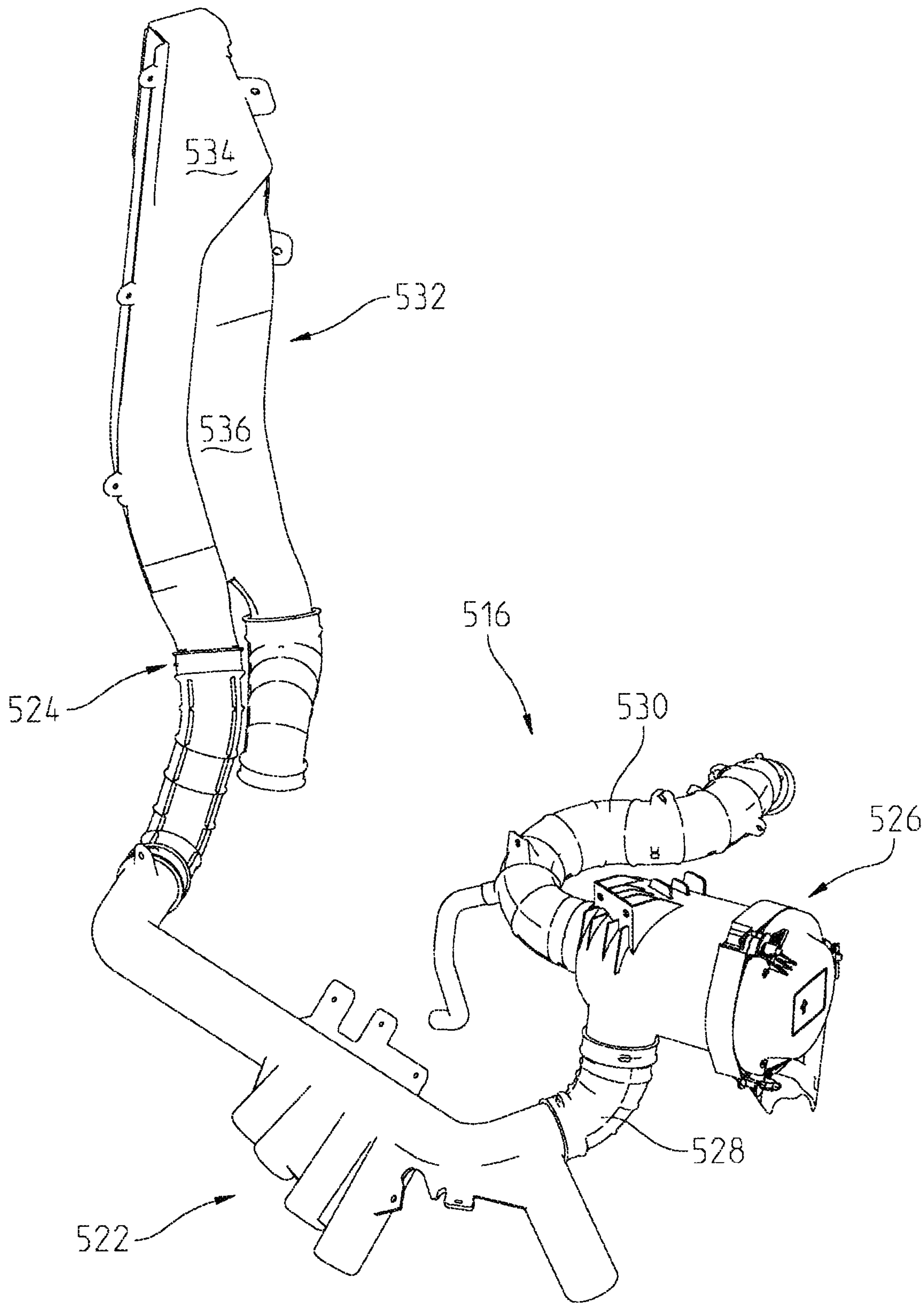
FIG. 77 shows a front left perspective view of the intake assembly of the engine and a portion of the cooling exhaust assembly of the transmission of FIG. 76.
Figure 78:
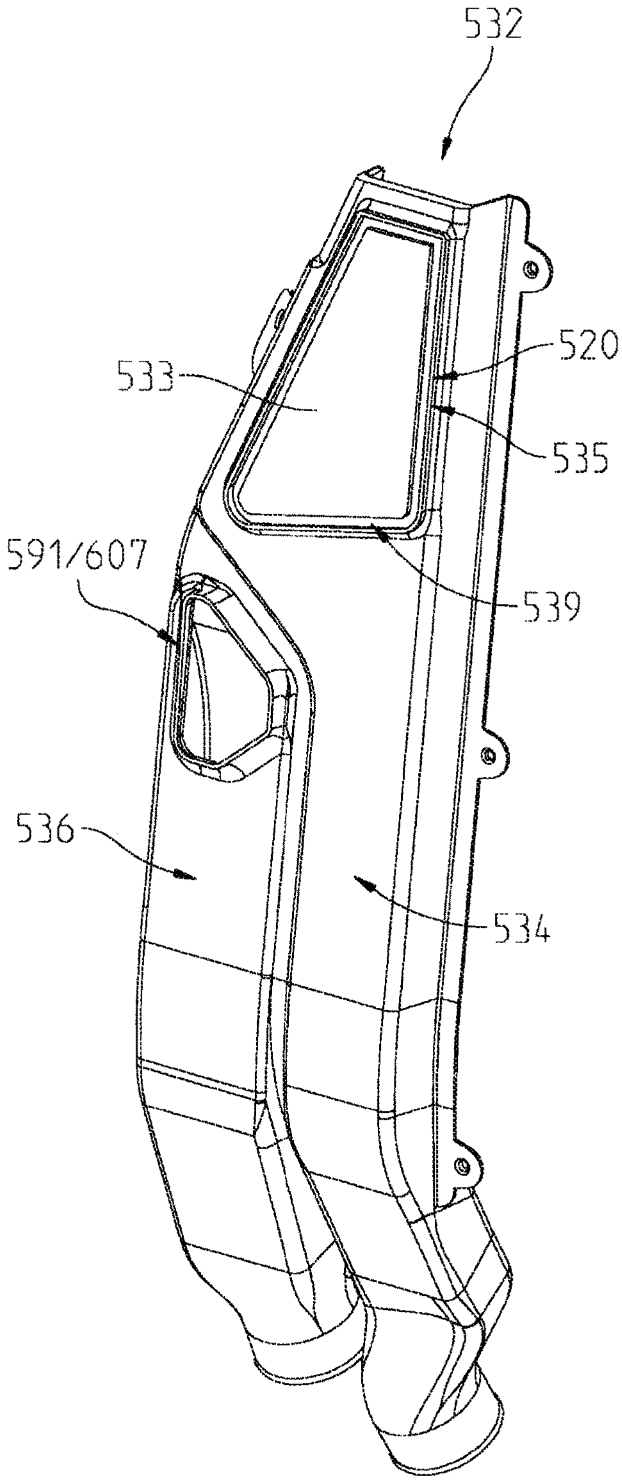
FIG. 78 shows a perspective view of a ducting component of the powertrain of FIG. 76.

With reference to FIGS. 23-25, one or more routing trays 200, 200* may be coupled to frame 20 to retain various fluid lines 201 routed across vehicle 2 and to keep lines 201 away from other components of vehicle 2, such as a drive shaft (not shown) of powertrain 509 (FIG. 76). These various fluid lines 201 may include brake fluid lines, coolant lines, fuel lines, or other fluid lines. Routing tray 200 generally includes a base 202 having a plurality of channels 204 molded therein for receiving fluid lines 201. In addition, routing tray 200 may include one or more living hinges 206 configured to retain lines 201 within channels 204 and to allow various lines 201 to be installed or removed without interfering with other lines engagement with routing tray 200. Routing tray 200 may further or alternatively include various molded clips 208, 208* for retaining the lines. Routing tray 200 generally includes a base 202* having a plurality of openings 210 for receiving traditional clips 211 (FIG. 23) and/or other various coupling mechanisms.

Figure 26:
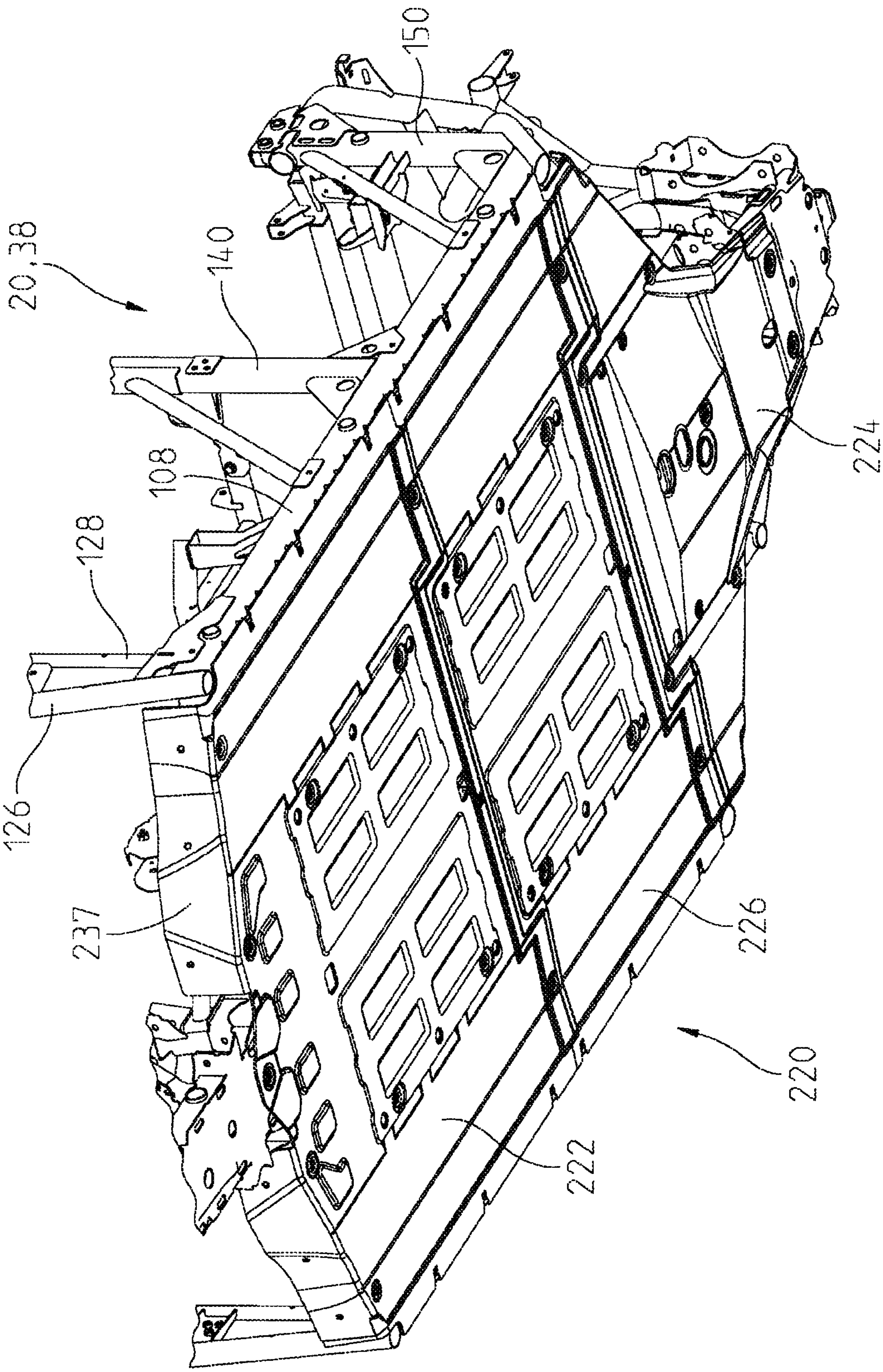
FIG. 26 shows a bottom front left perspective a skid plate of the present disclosure coupled to the lower frame portion of FIG. 15.
Figure 27:
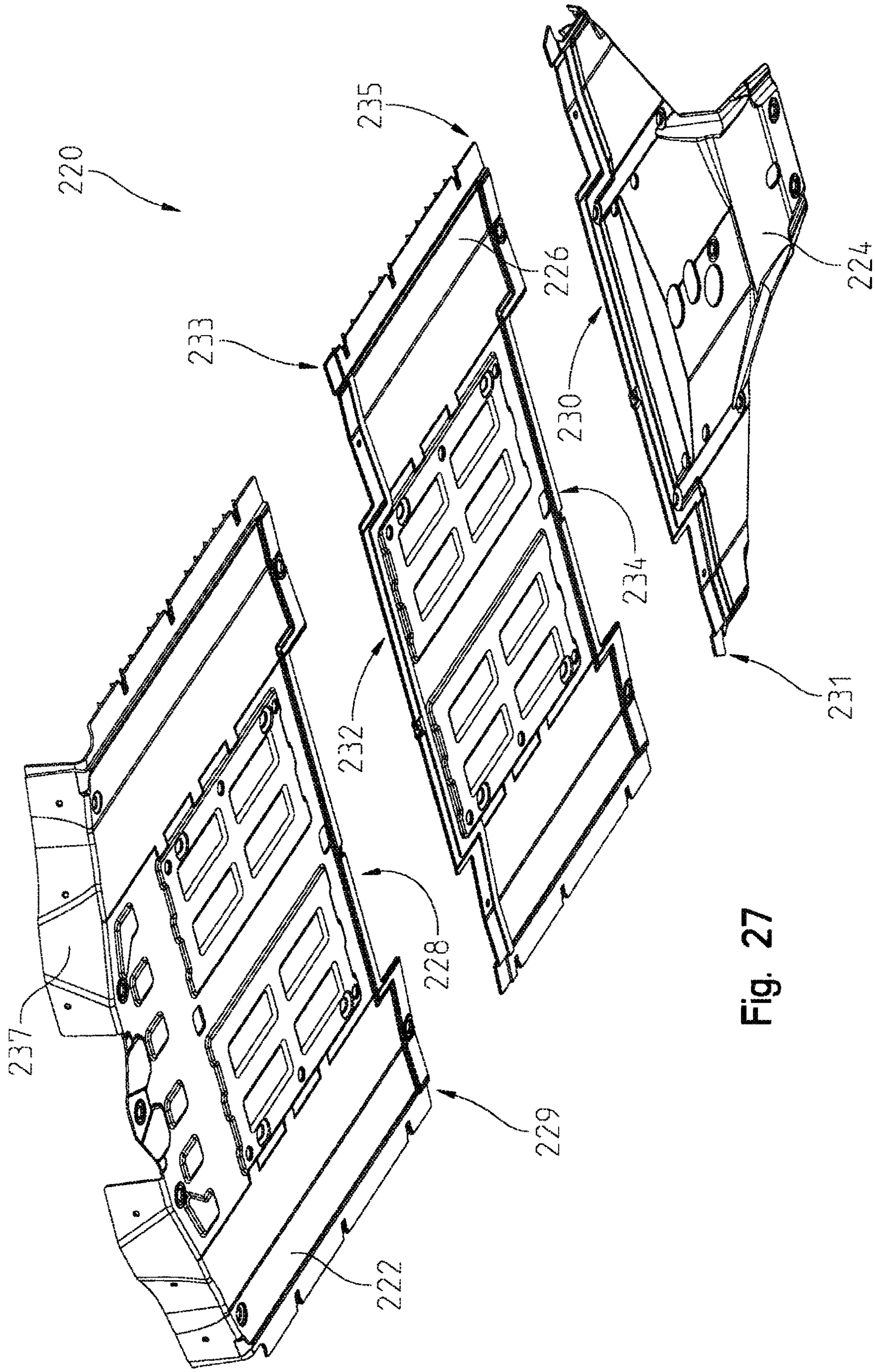
FIG. 27 shows an exploded view of the skid plate of FIG. 26.
Figure 28:
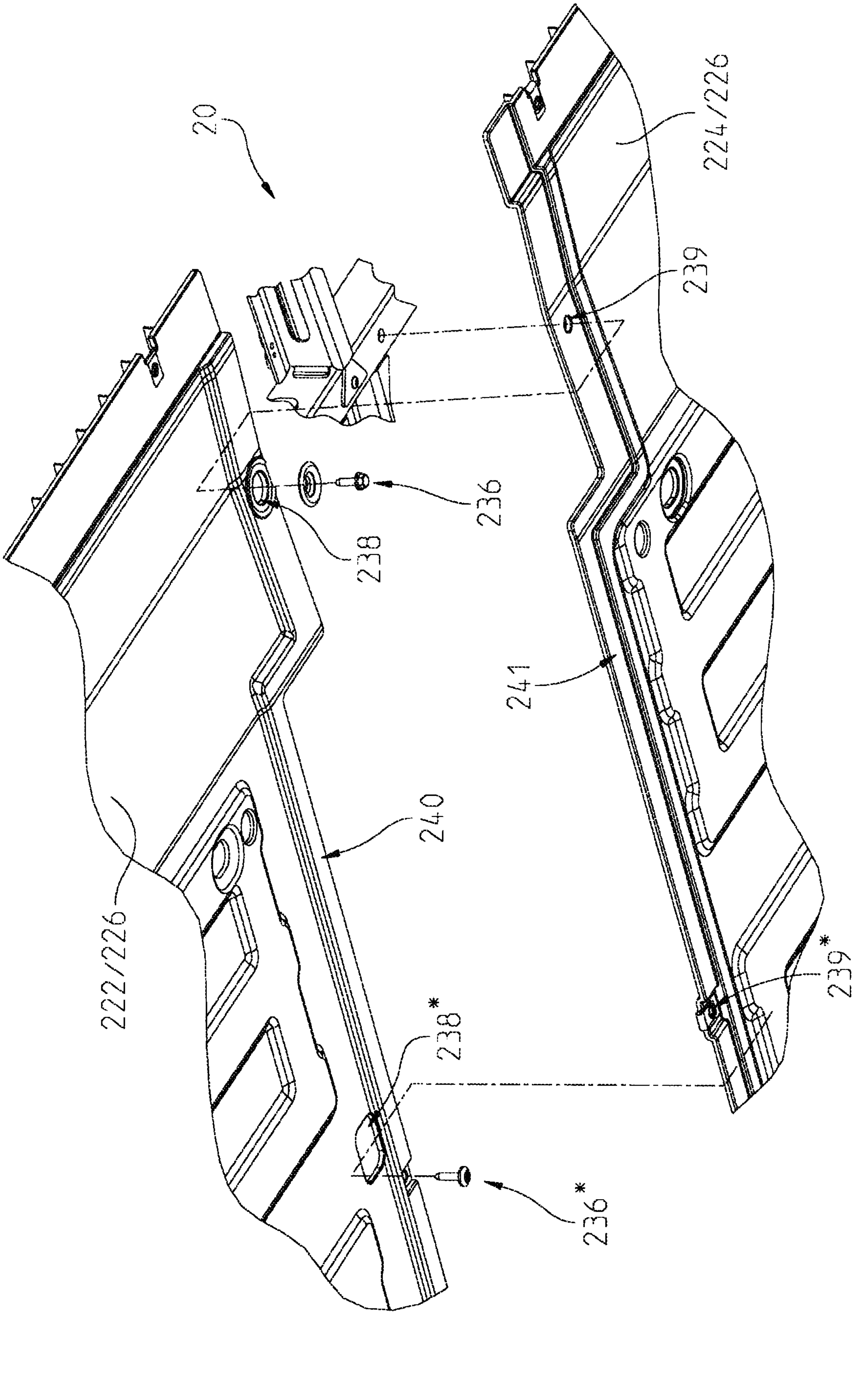
FIG. 28 shows an exploded view of a coupling between portions of the skid plate of FIG. 26 and the lower frame portion of FIG. 15.

Referring now to FIGS. 26-28, in various embodiments, vehicle 2 may further include a skid plate 220 positioned below frame 20. Skid plate 220 is generally coupled to lower frame portion 38 of frame 20. In various embodiments, such as when seating area 26 of vehicle 2 includes only driver's seat 28 and passenger seat 30, skid plate 220 may be comprised of a first portion 222 and a second portion 224, while in other various embodiments, such as when seating area 26 of vehicle 2 further includes rear passenger seat 32, skid plate 220 may be comprised of first portion 222, second portion 224, and a third portion 226 coupled between first portion 222 and second portion 224. First portion 222 of skid plate 220 is generally positioned vertically below and coupled to front frame portion 100, and second portion 224 is generally positioned vertically below and coupled to rear frame portion 104. Third portion 226, when provided, is generally positioned below middle frame portion 102 between first portion 222 and second portion 224. In various embodiments, second portion 224 of skid plate 220 may be removably coupled to first portion 222 and/or third portion 226 to provide access to various systems or components of vehicle 2 (e.g., a lubrication system (not shown)) for service or replacement thereof when second portion 224 is removed.

With reference to FIG. 27, first portion 222 of skid plate 220 generally includes an indentation 228 along a rear surface 229 thereof. Second portion 224 of skid plate 220 generally includes a forward extension 230 along a forward surface 231 thereof. Third portion 226 of skid plate 220 generally includes a forward extension 232 along a forward surface 233 thereof and an indentation 234 along a rear surface 235 thereof. When skid plate 220 includes only first portion 222 and second portion 224, indentation 228 of first portion 222 receives and couples with forward extension 230 of second portion 224. When skid plate 220 further includes third portion 226, indentation 228 of first portion 222 receives and couples with forward extension 232 of third portion 226 and indentation 234 of third portion 226 receives and couples with forward extension 230 of second portion 224. Illustratively, such a configuration allows portions 222, 224, 226 to be nested together at various portions and also to overlap each other at various portions adjacent indentations 228, 234 and extensions 230, 232. It may be appreciated that first portion 222 and second portion 224 are the same machined component for both 2-seater vehicles (i.e., when seating area 26 includes only driver's seat 28 and front passenger seat 30) and 4-seater vehicles (i.e., when seating area 26 includes driver's seat 28, front passenger seat 30, and rear passenger seat 32).

Referring now to FIG. 28, any of first portion 222, second portion 224 and/or third portion 226 are generally coupled together via couplers 236, 236*, where couplers 236, 236* extend through openings 238, 238* of overlapping section 240 of first portion 222 or third portion 226 and openings 239, 239* of overlapping section 241 of portions 224 and/or 226. In various embodiments, portion 222, 224, and/or 226 may also be coupled to frame 20 via couplers 236, which extend through portions 222, 224, and/or 226 and couple into frame 20. In various embodiments, some or all of couplers 236 may be screws and/or nuts and bolts, while in other various embodiments, some or all of couplers 236 may be tabs and openings (not shown) configured to receive and engage said tabs.

With reference still to FIGS. 26-28, various portions of a forward edge 237 of skid plate 220 wrap upwardly around lower frame portion 38 of vehicle 2, such that edge 237 extends upwardly above a lowermost portion of frame 20 and skid plate 230 may provide protection to lower frame portion 38 of frame 20 and other various components of vehicle 2. In this way, edge 237 of skid plate 220 is positioned laterally forward of arched frame member 110 of front frame portion 100.

Figure 29:
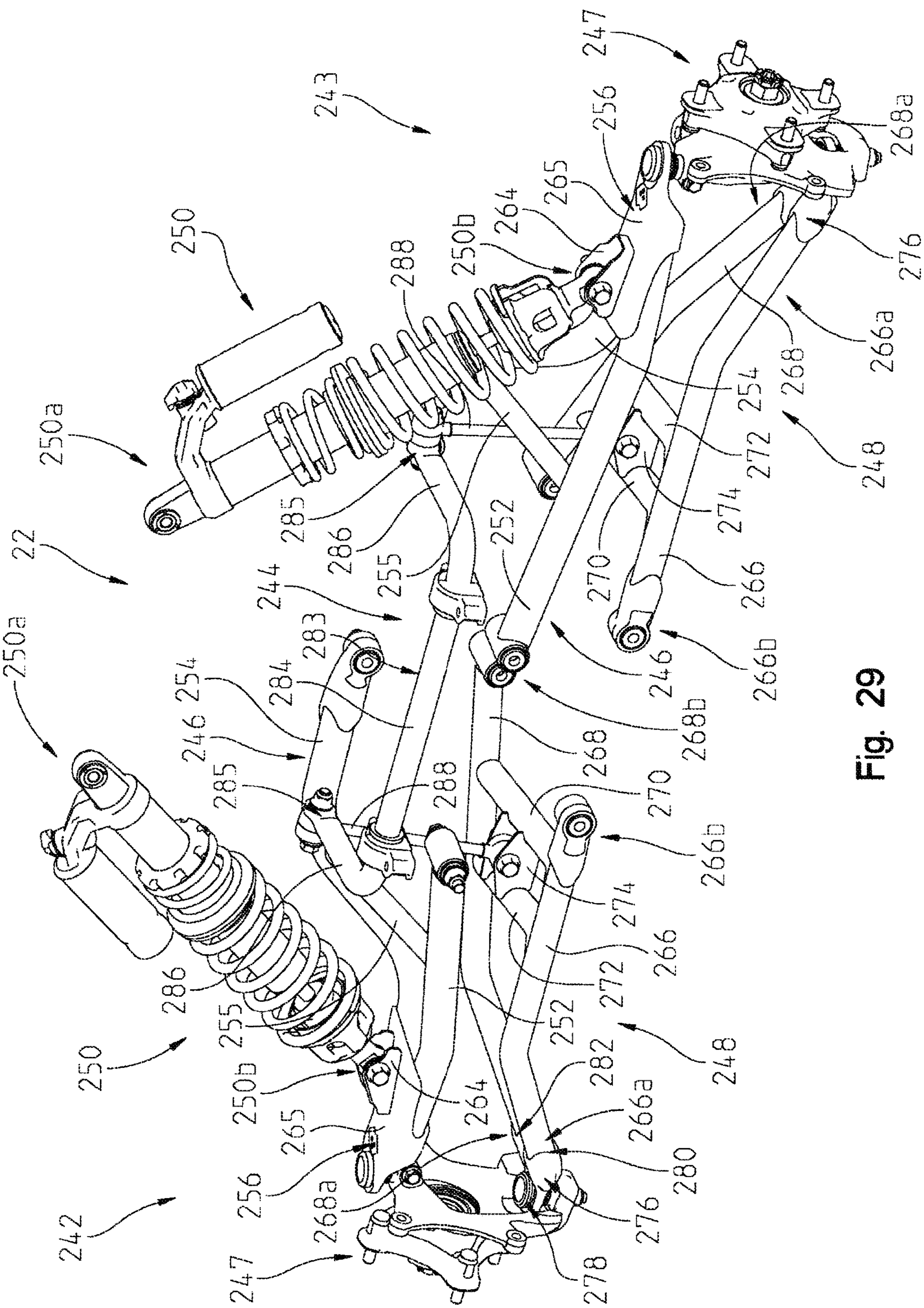
FIG. 29 shows a front left perspective view of a front suspension assembly of the present disclosure.
Figure 30:
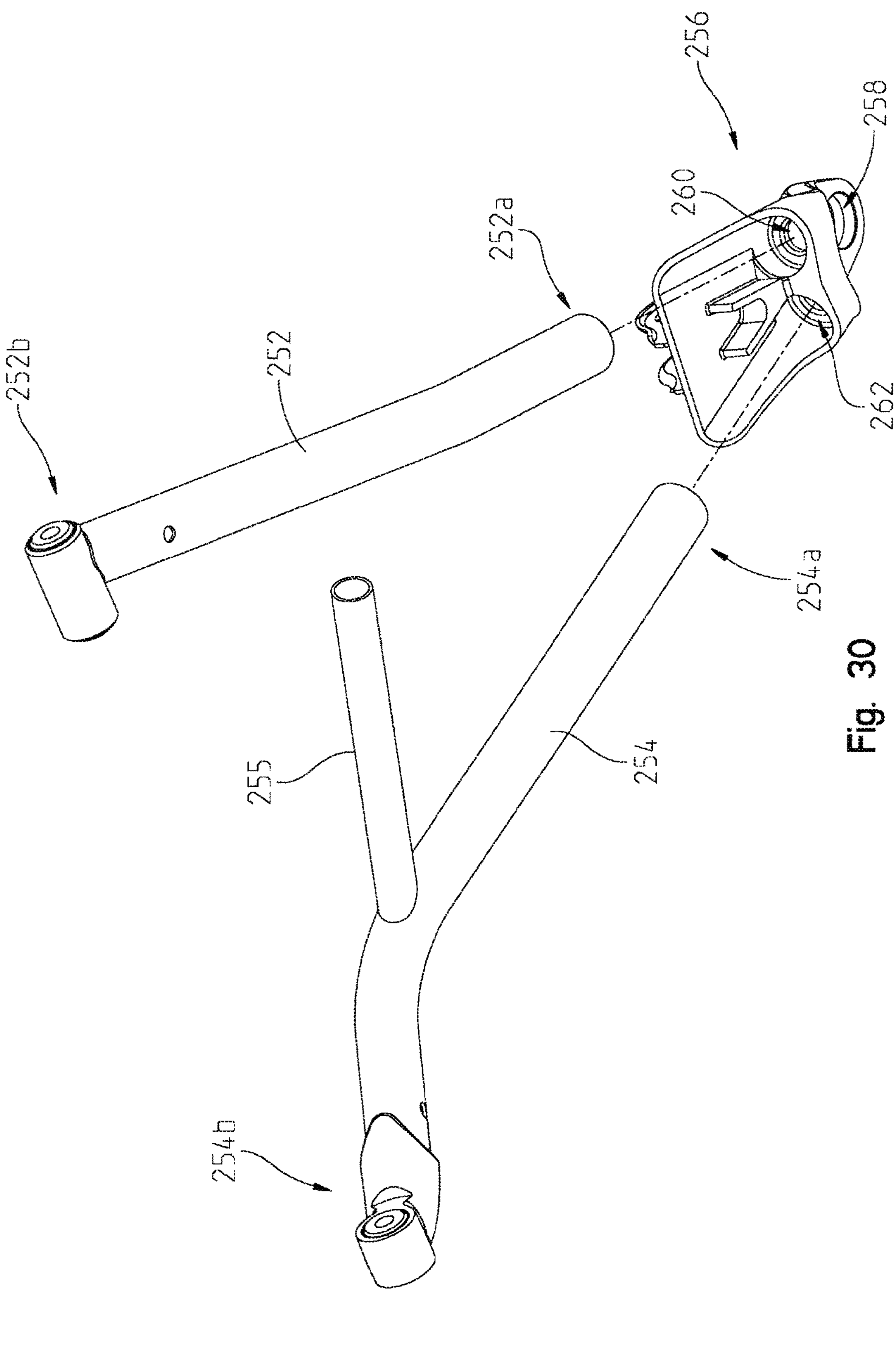
FIG. 30 shows an exploded bottom perspective view of an upper alignment arm ("A-arm") and a half casting of the front suspension assembly of FIG. 29.
Figure 31:
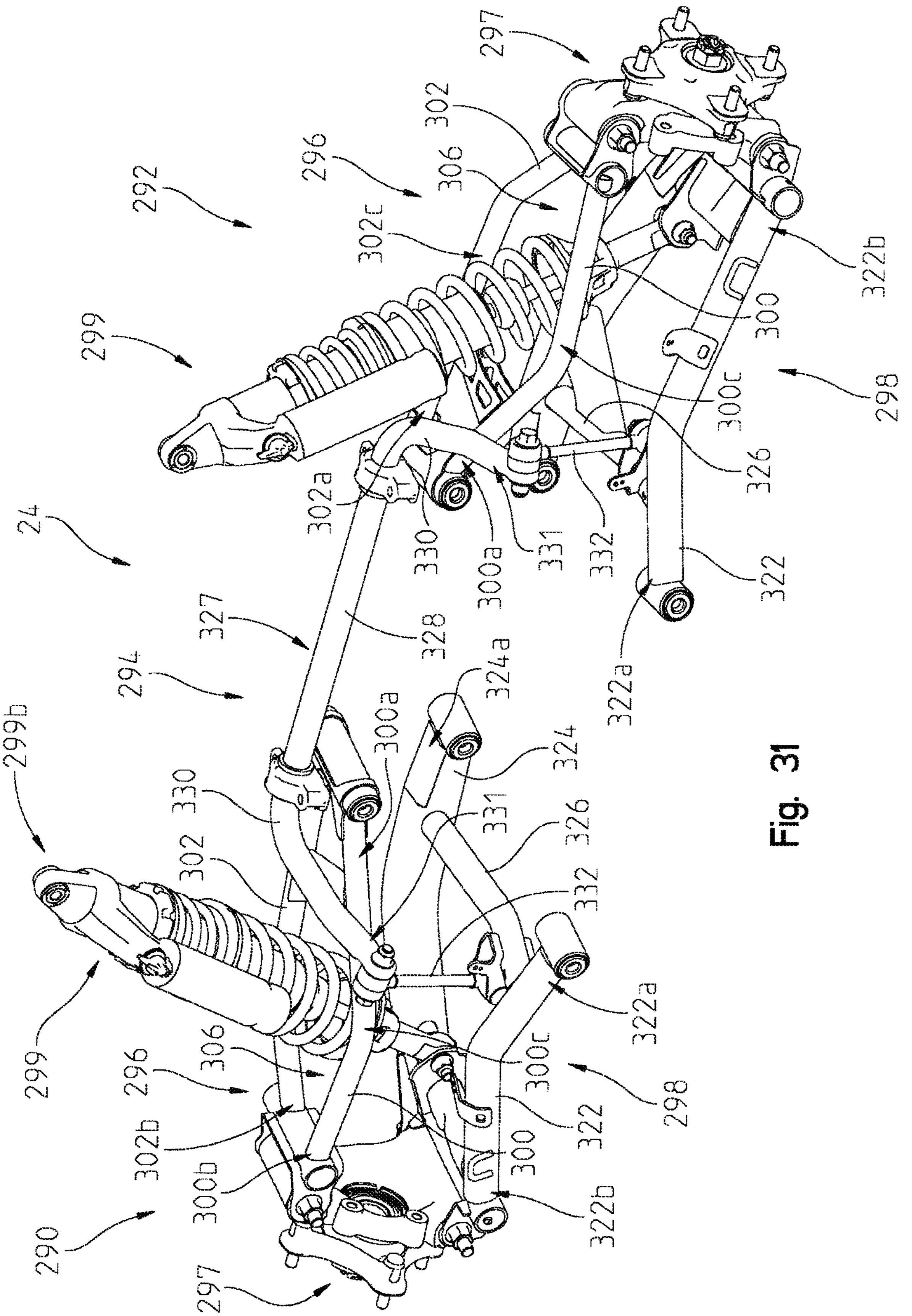
FIG. 31 shows a front left perspective view of a rear suspension assembly of the present disclosure.

Referring now to FIGS. 29 and 30, front suspension 22 of vehicle 2 will be described in further detail. Front suspension 22 generally includes a first side suspension assembly 242, a second side suspension assembly 243, and a stabilizer bar 244 coupled between first side suspension assembly 242 and second side suspension assembly 243. First and second side suspension assemblies 242 and 243 each include an upper alignment arm ("A-arm") 246 operably coupled to a wheel hub 247, a lower A-arm 248 operably coupled to wheel hub 247, and a shock absorber 250 operably coupled between upper A-arm 246 and upper U-shaped frame tube 120 of lower frame portion 38 (FIG. 21).

Upper A-arm 246 generally includes a forward arm 252, a rearward arm 254, a coupling member 255 coupled between forward arm 252 and rearward arm 254, and a casting 256 coupling outer ends 252*a* and 254*a* of forward and rearward arms 252 and 254, respectively, to wheel hub 247. Forward arm 252 of upper A-arm 246 is coupled to casting 256 at outer end 252*a* and between front frame bracket 133 and front control arm mount 194 at an inner end 252*b* (FIG. 20). Rearward arm 254 of upper A-arm 246 is coupled to casting 256 at outer end 254*a* and frame members 138 at an inner end 254*b* (FIG. 20). Casting 256 generally includes a first opening 258 configured to receive a portion of wheel hub 247 for coupling half casting 256 to wheel hub 247, a second opening 260 configured to receive forward arm 252 of upper A-arm 246, a third opening 262 configured to receive rearward arm 254 of upper A-arm 246, and a bracket 264 coupled to an upper surface 265 of casting 256 configured to couple to shock absorber 250. Casting 256 is generally coupled to wheel hub 247, forward arm 252, and/or rearward arm 254 via at least one weldment, and is generally configured such that a load received via shock absorber 250 may be transferred from wheel 8 to hub 247 to a knuckle and a ball joint (not shown) to casting 256 and then to shock absorber 250.

Lower A-arm 248 generally includes a forward arm 266, a rearward arm 268, a first coupling member 270 coupled between forward arm 266 and rearward arm 268, a second coupling member 272 coupled between forward arm 266 and rearward arm 268 and positioned outward of first coupling member 270, a bracket 274 coupled between first coupling member 270 and second coupling member 272, and a casting 276 coupling outer ends 266*a* and 268*a* of forward arm 266 and rearward arm 268, respectively, to wheel hub 247. Forward arm 266 is coupled to casting 276 at outer end 266*a* and forward end 135 of longitudinally-extending frame members 134 of lower frame portion 38 at an inner end 266*b* (FIG. 15). Rearward arm 268 of lower A-arm 248 is coupled to casting 276 at outer end 268*a* and rearward end 137 of longitudinally-extending frame members 134 at an inner end 268*b* (FIG. 15). Casting 276 generally includes a first opening 278 configured to receive a portion of wheel hub 247 for coupling casting 276 to wheel hub 247, a second opening 280 configured to receive outer end 266*a* of front arm 266, and a third opening 282 configured to receive outer end 268*a* of rearward arm 268.

Shock absorber 250 is generally coupled to upper U-shaped frame tube 120 at an inner or upper end 250*a* (FIG. 21) and bracket 264 of casting 256 at an outer or lower end 250*b*, such that any load received through shock absorber 250 may transfer through lower frame portion 38 and cab frame 36 to distribute the load about the entire frame 20. For instance, the coupling of shock absorber 250 allows shock load to be transferred through frame members 136 and 138 to frame members 134 and/or other portions of lower frame portion 38, and torsional load that is created by the shock load to be transferred through U-shaped frame member 120.

Stabilizer bar 244 generally includes a U-shaped body 283 having a horizontal portion 284, two longitudinally-extending arms 286 extending from either end of horizontal portion 284, and two vertically-extending members 288 coupled between ends 285 of arms 286 and bracket 274 of lower A-arm 248. Horizontal portion 284 of stabilizer bar 244 is coupled to lower frame portion 38 at indentations 192 of mounting bracket 190 (FIG. 20). Stabilizer bar 244 is generally positioned forward of rearward arm 254 of upper A-arm 246 and rearward of forward arm 252 of upper A-arm 246.

With reference now to FIGS. 31-36, rear suspension 24 of vehicle 2 will be described in further detail. Rear suspension 24 generally includes a first side suspension assembly 290, a second side suspension assembly 292, and a stabilizer bar 294 coupled between first side suspension assembly 290 and second side suspension assembly 292. First and second side suspension assemblies 290 and 292 each include an upper arm 296 coupled to a wheel hub 297, a lower A-arm 298 coupled to wheel hub 297, and a shock absorber 299 coupled to lower A-arm 298 and extending through an opening 306 of upper arm 296.

Figure 32:
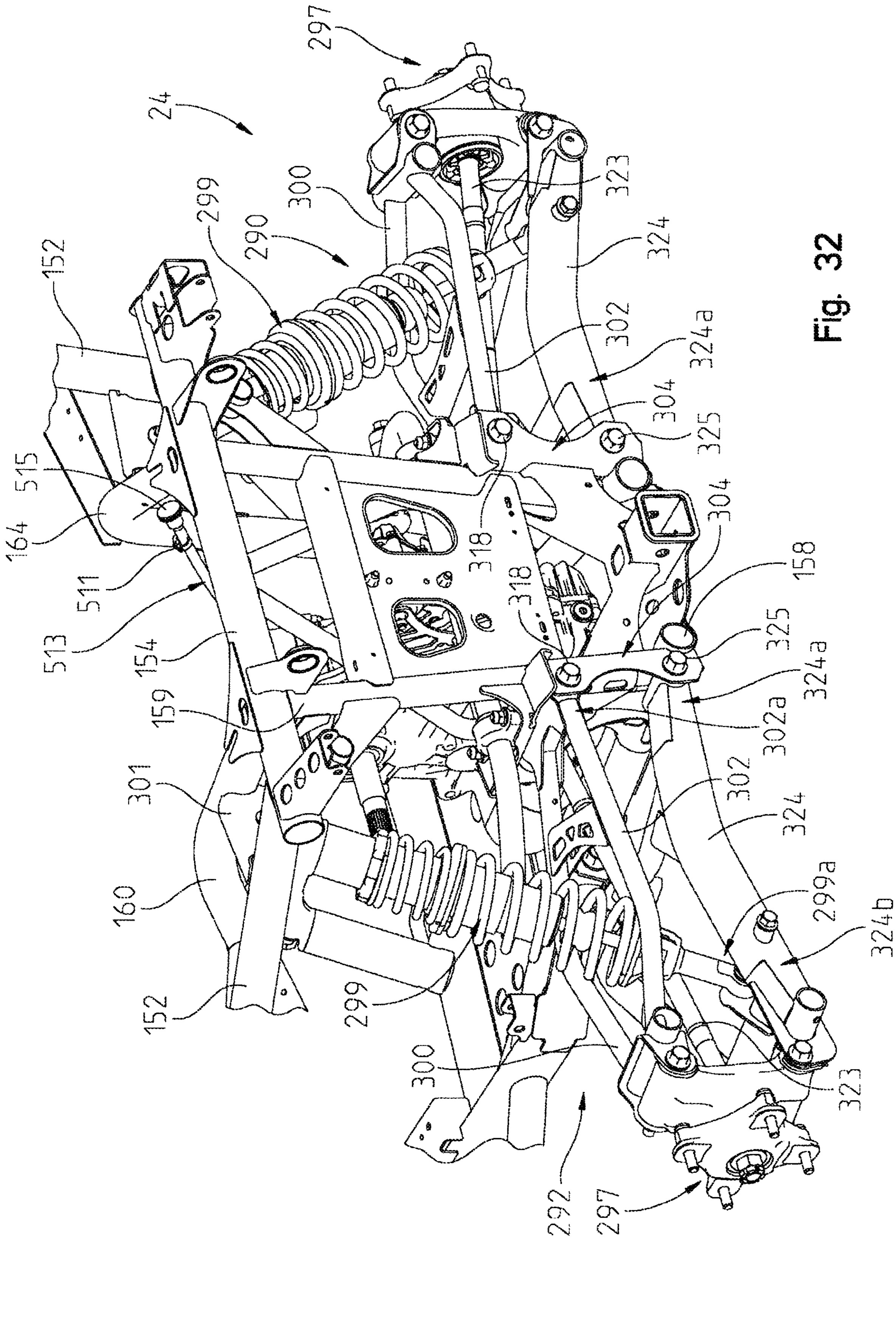
FIG. 32 shows a rear left perspective view of the rear suspension assembly of FIG. 31 coupled to the lower frame portion of FIG. 15.
Figure 33:
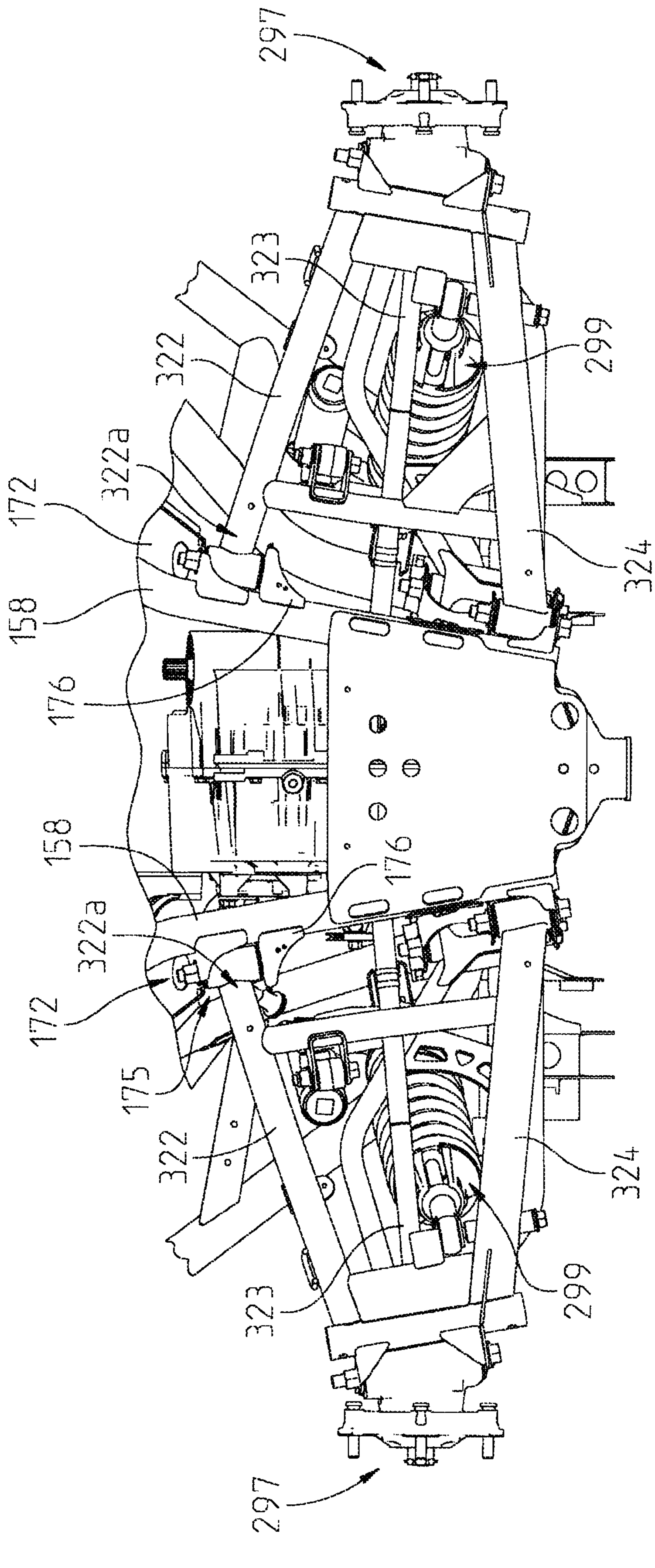
FIG. 33 shows a bottom plan view of the rear suspension assembly and the lower frame portion of FIG. 32.

Upper arm 296 generally includes a first arm portion 300 and a second arm portion 302, where first or outer ends 300*a* and 302*a* are coupled together and coupled to wheel hub 297 and second or inner ends 300*b* and 302*b* are coupled together and coupled to lower frame portion 38 via a rear control arm mount 304 (FIG. 32). Middle portions 300*c* and 302*c* of first and second arm portions 300 and 302 bow outward such that opening 306 extends between first ends 300*a* and 302*a* and second ends 300*b* and 302*b*. More particularly, middle portion 300*c* is angled or bowed forwardly while middle portion 302*c* is angled or bowed rearwardly relative to respective first ends 300*a* and 302*a*. The bow of first arm portion 300 is shaped such that first arm portion 300 passes between stabilizer bar 294 and shock absorber 299.

Rear control arm mount 304 of lower frame portion 38 is generally coupled to lower, longitudinally-extending frame member 158 and rear, vertically-extending frame member 159 of lower frame portion 38, and generally includes a back plate 310, a front side plate 312, a rear side plate 314, and an upper plate 316. In various embodiments, back plate 310, front side plate 312, rear side plates 314, and upper plate 316 may be formed as a single, integral component; while in other embodiments, back plate 310, front side plate 312, rear side plate 314, and/or upper plate 316 may be formed of two or more separate components. Front and rear side plates 312 and 314 are spaced apart such that second ends 300*b* and 302*b* of first and second arm portions 300 and 302 of upper arm 296 may be received between upper ends 312*a* and 314*a* of front and rear side plates 312 and 314 and coupled to rear control arm mount 304 via a coupler 318 extending through front and rear side plates 312 and 314 and arms portions 300 and 302. Lower ends 312*b* and 314*b* of front and rear side plates 312 and 314 are also spaced apart such that lower A-arm 298 may be coupled to rear control arm mount 304, as described in further detail below. In various embodiments, upper plate 316 may couple to and extend between upper ends 312*a* and 314*a* of front and rear side plates 312 and 314, and may include an indentation 320 along an upper surface 321 thereof for receiving stabilizer bar 294 of rear suspension 24.

Figure 34:
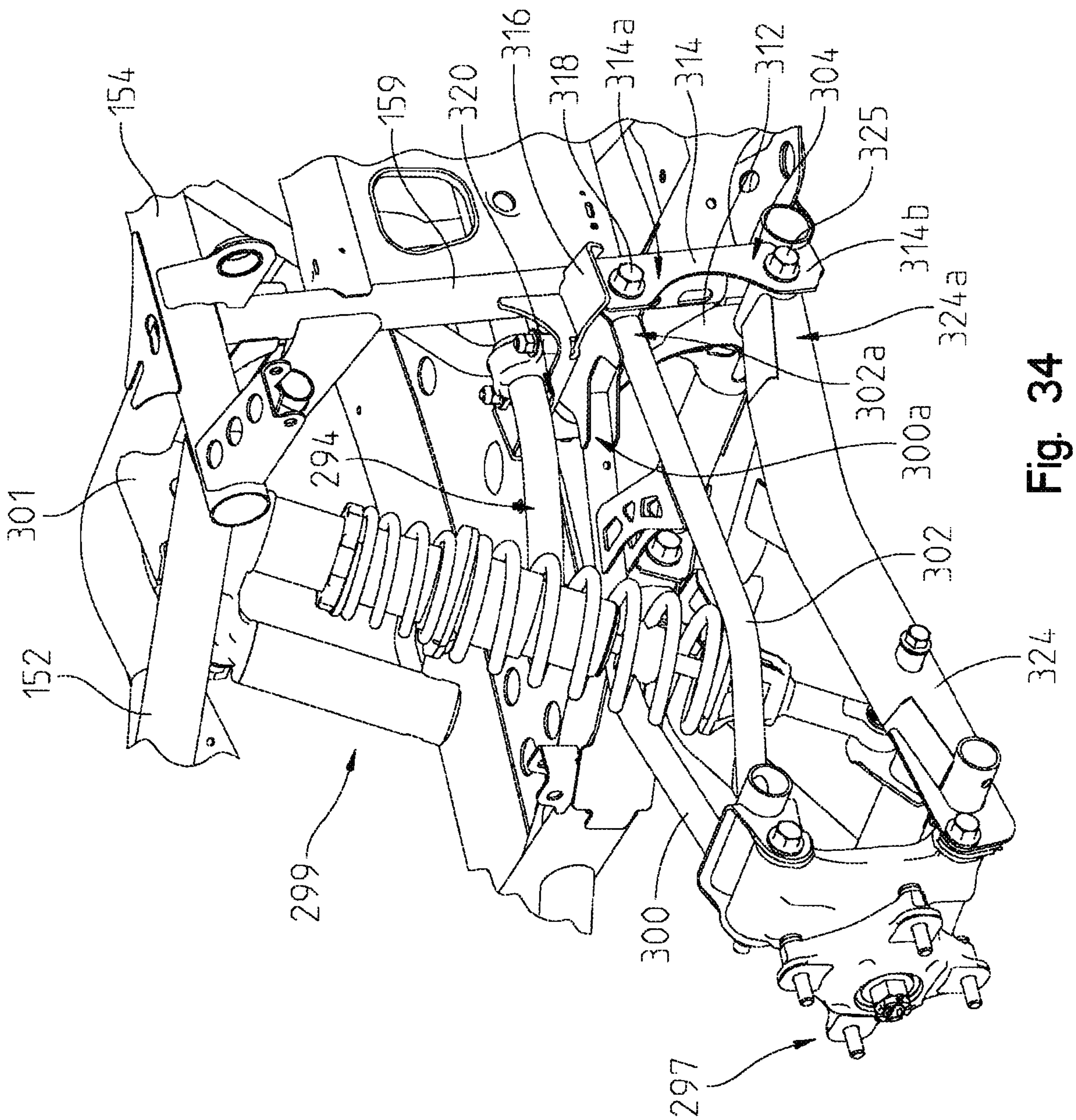
FIG. 34 shows an enlarged left rear perspective view of a first side assembly of the rear suspension assembly of FIG. 32.
Figure 35:
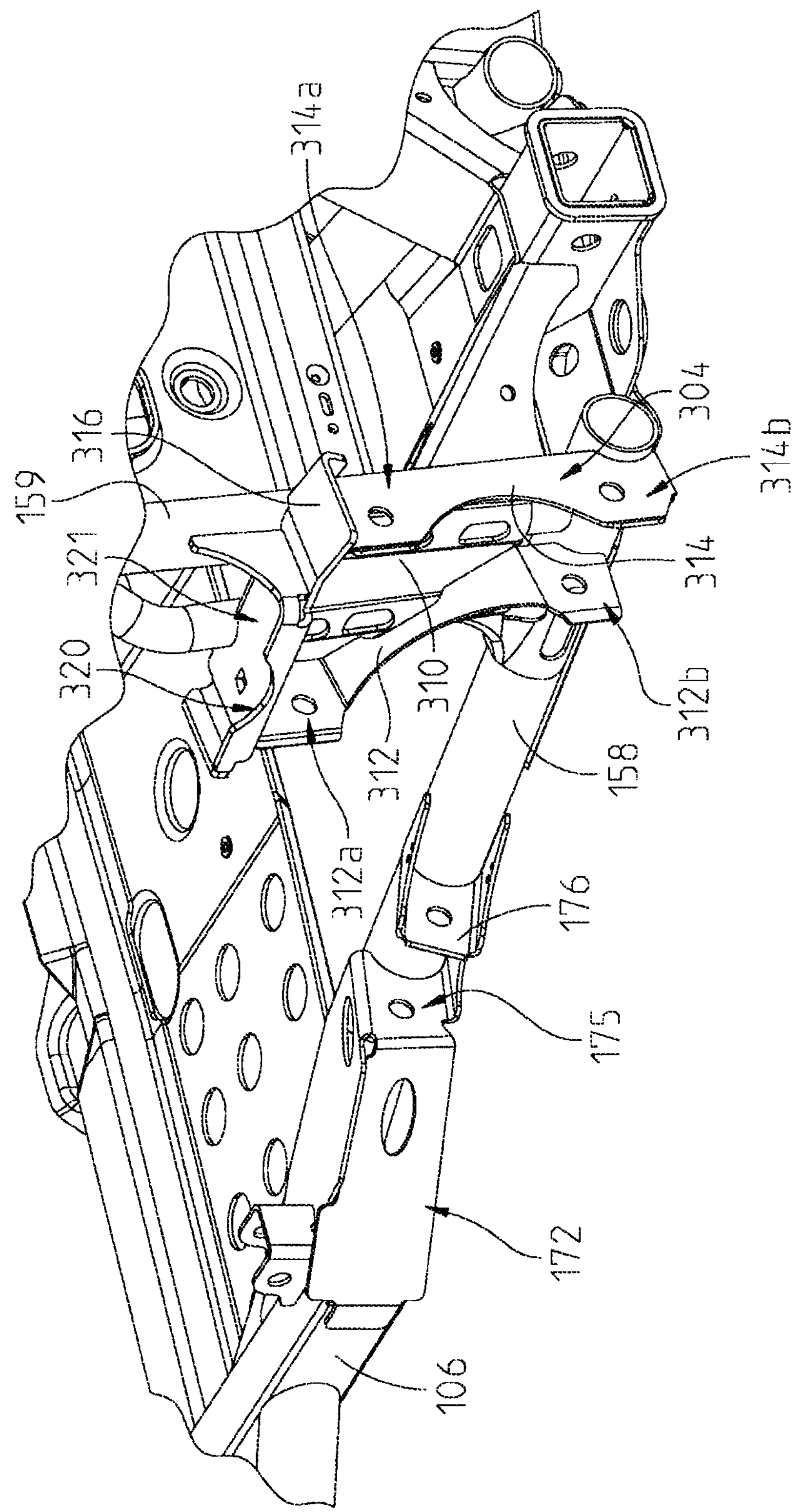
FIG. 35 shows a left rear perspective view of a rear control arm mount of the rear suspension assembly of FIG. 32.
Figure 36:
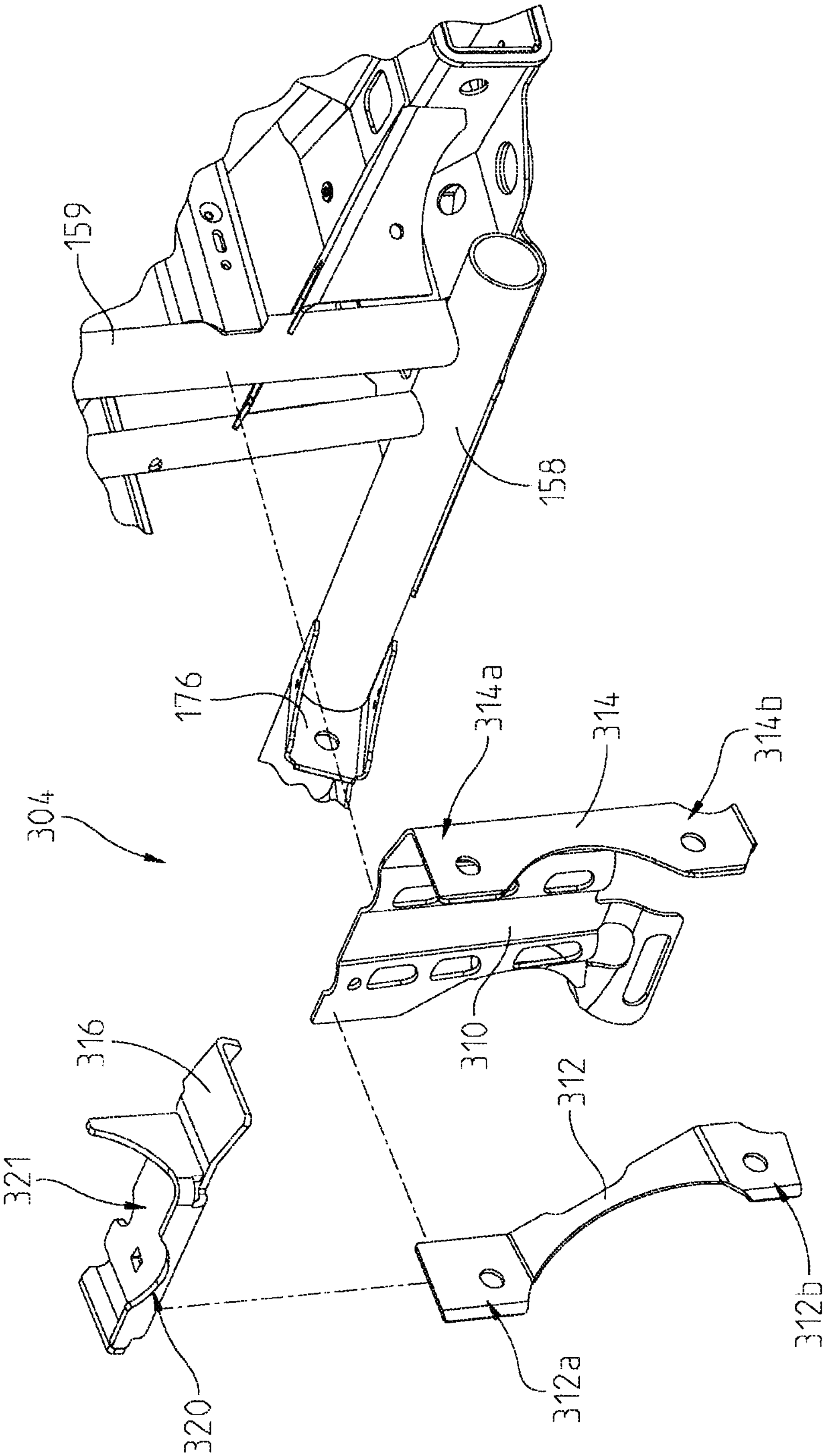
FIG. 36 shows an exploded view of the rear control arm mount of FIG. 35.

Lower A-arm 298 generally includes a front arm 322, a rear arm 324, and a coupling member 326 extending adjacent inner ends 322*a* and 324*a* of front and rear arms 322 and 324. Front arm 322 is generally coupled to wheel hub 297 at outer end 322*b* and to lower, longitudinally-extending frame member 158 via suspension coupling bracket 176 and rear surface 175 of transition bracket 172 at inner end 322*a*, where inner end 322*a* is positioned between suspension coupling bracket 176 and rear surface 175 of transition bracket 172 (FIG. 34). Rear arm 324 is generally coupled to wheel hub 297 at outer end 324*b* adjacent outer end 322*b* of front arm 322 and to lower ends 312*b* and 314*b* of front and rear side plates 312 and 314 of rear control arm mount 304 at inner end 324*a*, where inner end 324*a* is received between lower ends 312*b* and 314*b* and coupled to rear control arm mount 304 via a coupler 325 extending through front and rear side plates 312 and 314 and inner end 324*a* of rear arm 324. In various embodiments, rear arm 324 includes a rectangular cross-section which may increase the load-carrying capacity of rear arm 324.

Shock absorber 299 is generally coupled to rear arm 324 of lower A-arm 298 at a lower end 299*a* of shock absorber 299 and to brackets 301 extending between first frame member 164 of frame assembly 162 and upper longitudinally-extending frame member 152 on one side of vehicle 2 and upward and rearward-extending frame member 160 and upper longitudinally-extending frame member 152 on the other side of vehicle 2 at a upper end 299*b*. In various embodiments, rear frame portion 104 further includes frame members 303 coupled between frame members 152 and 160 on one side of vehicle 2 and to frame members 152 and 164 of the other side of vehicle 2 to assist in efficient transferring of the load to the rest of frame 20. Lower end 299*a* of shock absorber 299 is generally coupled to rear arm 324 at a position rearward of and vertically lower than a half shaft 323 (FIG. 32) of a drivetrain (not shown) of a powertrain 509 of vehicle 2, discussed in further detail below.

Stabilizer bar 294 of rear suspension 24 generally includes a U-shaped body 327 having a horizontal portion 328, two longitudinally-extending arms 330 extending from either end of horizontal portion 328, and two vertically-extending members 332 coupled between ends 331 of arms 330 and coupling member 326 of lower A-arm 298. Stabilizer bar 294 is generally coupled to lower frame portion 38 via indentations 320 along upper surfaces 321 of rear control arm mounts 304 (FIG. 32).

Referring now to FIGS. 37-41, seating area 26 and seats 28, 30, and 32, when provided, will be described in further detail. Seating area 26 is generally comprised of driver's seat 28 and passenger seat 30 coupled to seating area support frame assembly 146 of lower frame portion 38. In various embodiments, seating area 26 further includes rear passenger seat 32 positioned rearward of driver's seat 28 and passenger seat 30. An upper portion (i.e., seat back portion 334) of rear passenger seat 32 is coupled to cab frame 36, via horizontally-extending frame member 86 and longitudinally-extending frame members 88, and a lower portion (i.e., seat back portion 334 and/or seat bottom 336) of rear passenger seat 32 is coupled to lower frame portion 38, via horizontally-extending frame members 156 and 170 and rear passenger seat support frame assembly 167. Driver's seat 28 and/or passenger seat 30 may be configured to pivot forward about pivot axis 333 positioned adjacent a front end 28*a* and/or 30*a* of seat 28 and/or 30 such that when a release mechanism (not shown) is activated, a rear end 28*b* and/or 30*b* of seat 28 and/or 30 raises up and moves forwardly (FIG. 38A). It may be appreciated that seat back 29 may move with seat bottom 27 during the movement about pivot axis 333 or, alternatively, seat back 29 may move independently of the movement of seat bottom 27. In various embodiments, seats 28, 30 and/or 32 may be heated and/or cooled.

Rear passenger seat 32, when provided, generally includes a seat back 334 coupled to horizontally-extending frame member 86 and longitudinally-extending frame member 88 of cab frame 36 and horizontally-extending frame member 156 of lower frame portion 38. Seat back 334 also may be coupled to a seat bottom 336 which is supported on horizontally-extending frame member 170 and rear passenger seat support frame assembly 167 of lower frame portion 38. Seat back 334 is configured to rotate about pivot axis 338 at a lower end 334*a* of seat back 334 adjacent horizontally-extending frame member 156 such that an upper end 334*b* of seat back 334 can pivot forwardly and downwardly away from frame members 86 and 88. When seat back 334 is folded forward, a back surface 335 of seat back 334 may be flat and/or flush with cargo area 41 such that cargo area 41 and seating area 26 are open to one another providing additional storage and/or space, which may house larger items such as lumber, sheet rock, skis, and/or other items.

Seat bottom 336 is configured to rotate about a pivot point 340 at a rear end 336*a* of seat bottom 336 adjacent horizontally-extending frame member 170 such that a front end 336*b* of seat bottom 336 can pivot upwardly and rearwardly towards seat back 334. Seat bottom 336 generally includes a biasing member such as a spring or shock (not shown) connected between seat bottom 336 and lower frame portion 38 that is configured to assist in rotating seat bottom 336 upwardly as well as holding seat bottom 336 in either the seated position 336*d* or the storage position 336*s*. When seat bottom 336 is folded up, area 337 provided below seat bottom 336 is open providing additional storage and/or space, which may house camping gear, tools, luggage, coolers, etc. In various embodiments, a floor (not shown) of area 337 is substantially flat providing an even surface for storing the various items. Each of seat back 334 and/or seat bottom 336 of rear passenger seat 32 may be a single, unitary piece spanning seating area 26, while in other various embodiments seat back 334 and/or seat bottom 336 of rear passenger seat 32 may include two portions split 60%/40% or 50%/50% or three portions split into thirds. When seat 32 includes multiple portions, seat backs 334 and seat bottoms 336 of each portion may pivot or move independent of the other portions or all portions may move simultaneously.

Seat back 334 and/or seat bottom 336 may be coupled to cab frame 36 and/or lower frame portion 38 via at least one latch 342, illustratively two latches 342, coupled to a release mechanism 344. In various embodiments, each latch 342 may have a separate release mechanism 344, while in other various embodiments, and as shown in the illustrative embodiment in FIG. 41, multiple latches 342 may be coupled to a single release mechanism 344. Release mechanism 344 may be a mechanical release mechanism (i.e., a loop or strap 346 that may be pulled to actuate lines 348 running from loop or strap 346 to latch(es) 342), or an electrical release mechanism that may be actuated by an actuation mechanism near a user of vehicle 2 that actuates lines 348 to release latches 342.

With reference now to FIGS. 1-8, body assembly 40 of vehicle 2 will be described in further detail. Any of the components described herein may be included or omitted from vehicle 2. Body assembly 40 is supported by frame 20 and generally includes a front body assembly 350, a main body assembly 351, a rear body assembly 352, and/or a roof assembly 358. Front body assembly 350 includes front fender body panels 353, a hood panel 354, and/or a front windshield 347. Main body assembly 351 includes main body panels 355, doors 360, which may be full doors or half doors, and/or a rear window 349 extending between frame members 78. Rear body assembly 352 includes rear fender body panels 356, rear body panels 357, and/or cargo area 41. Roof assembly 358 is sealing coupled to front body assembly 350, main body assembly 351, rear body assembly 352, and/or frame 20 via a continuous perimeter seal (not shown), when all provided together. Roof assembly 358 generally includes a single panel 358*a* over driver's seat 28 and front passenger seat 30 when vehicle 2 includes only driver's seat 28 and front passenger seat 30, and panel 358*a* extending over driver's seat 28 and front passenger seat 30 as well as a second panel 358*b* extending over rear passenger seat 32 when vehicle 2 further includes rear passenger seat 32. When vehicle 2 includes both panels 358*a* and 358*b*, panels 358*a* and 358*b* may overlap to create a sealed joint therebetween.

Figure 1:
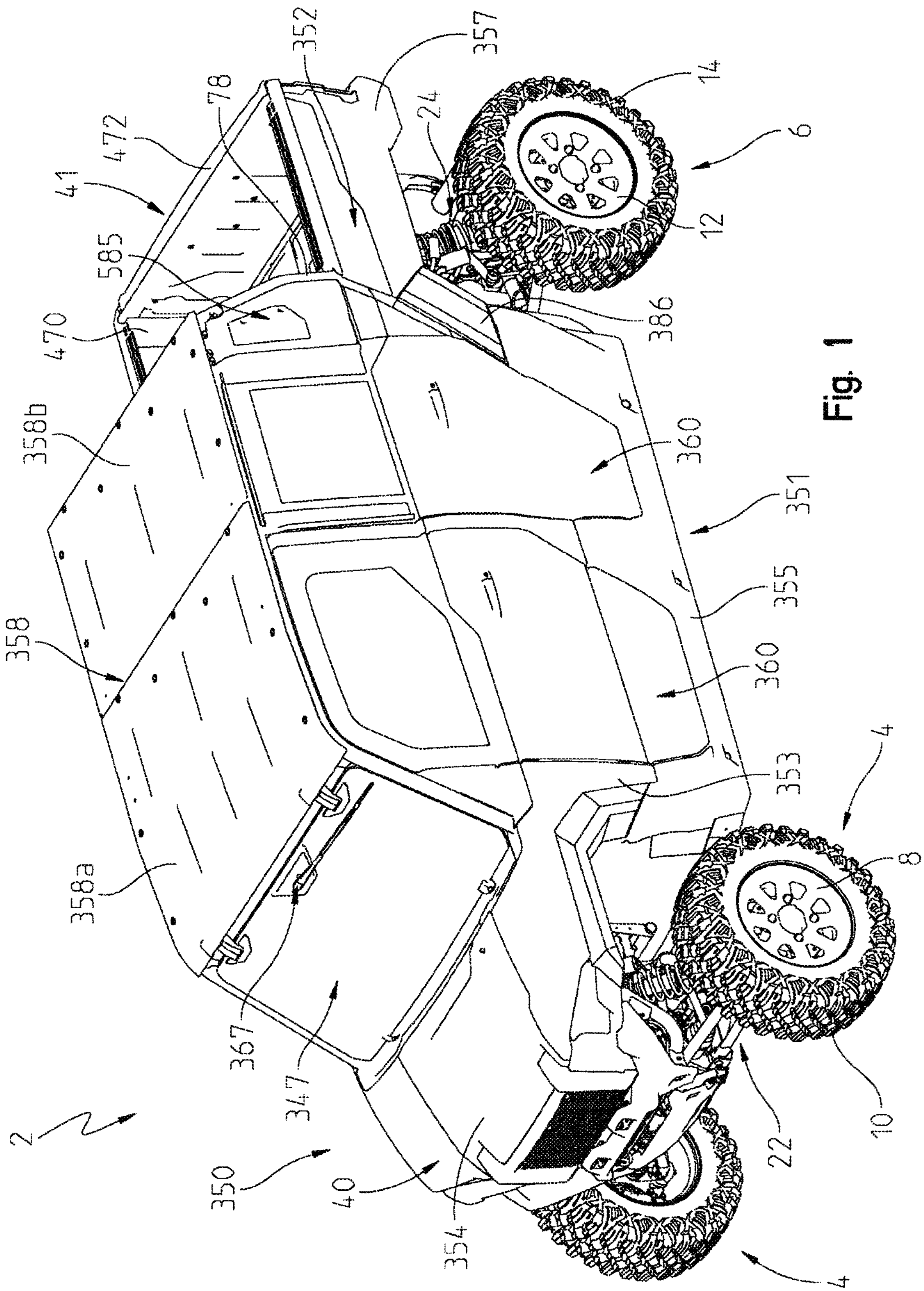
FIG. 1 shows a front left perspective view of a vehicle of the present disclosure having a first embodiment of a body assembly.
Figure 2:
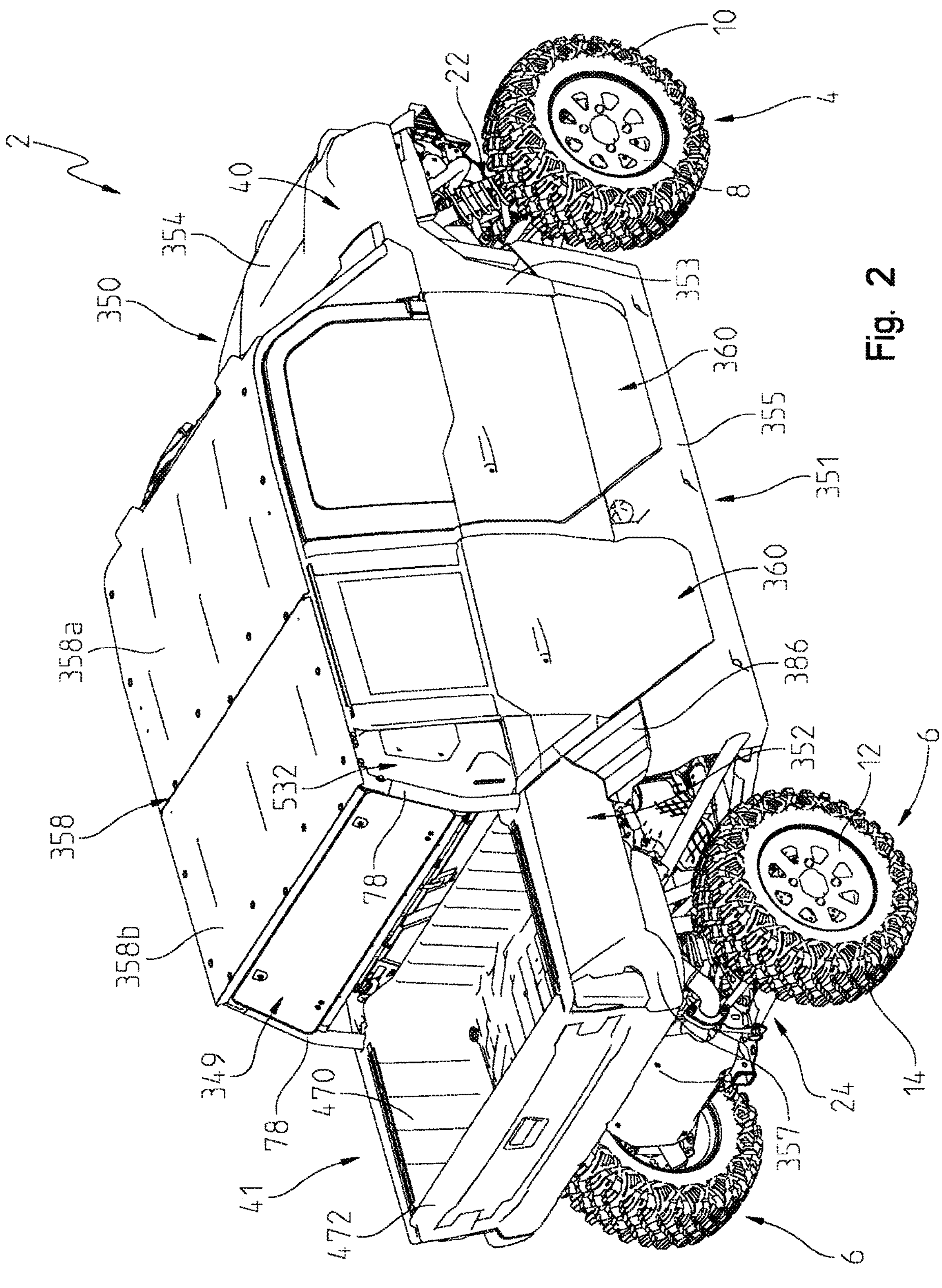
FIG. 2 shows a right rear perspective view of the vehicle of FIG. 1.
Figure 3:
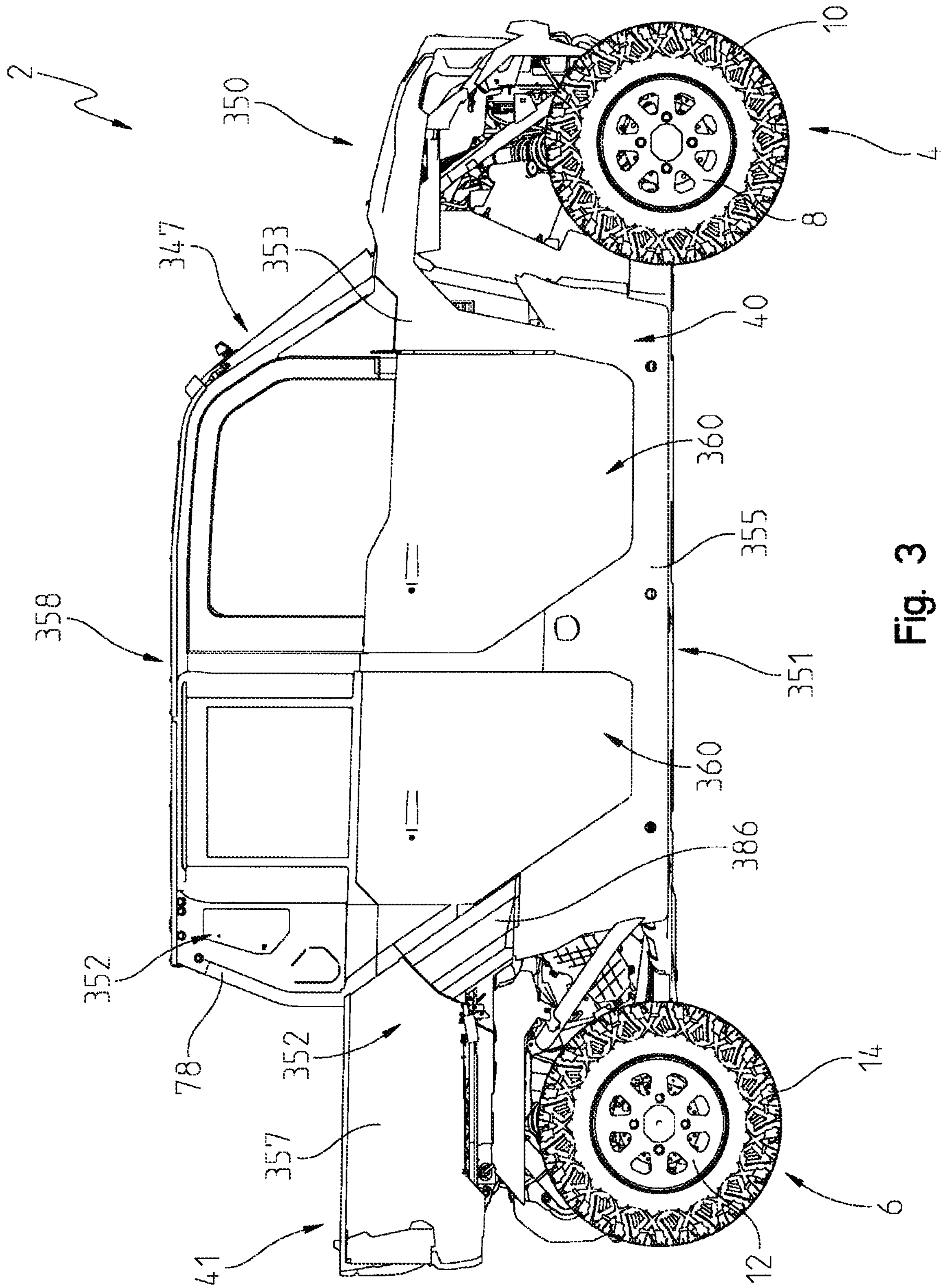
FIG. 3 shows a right elevational side view of the vehicle of FIG. 1.
Figure 4:
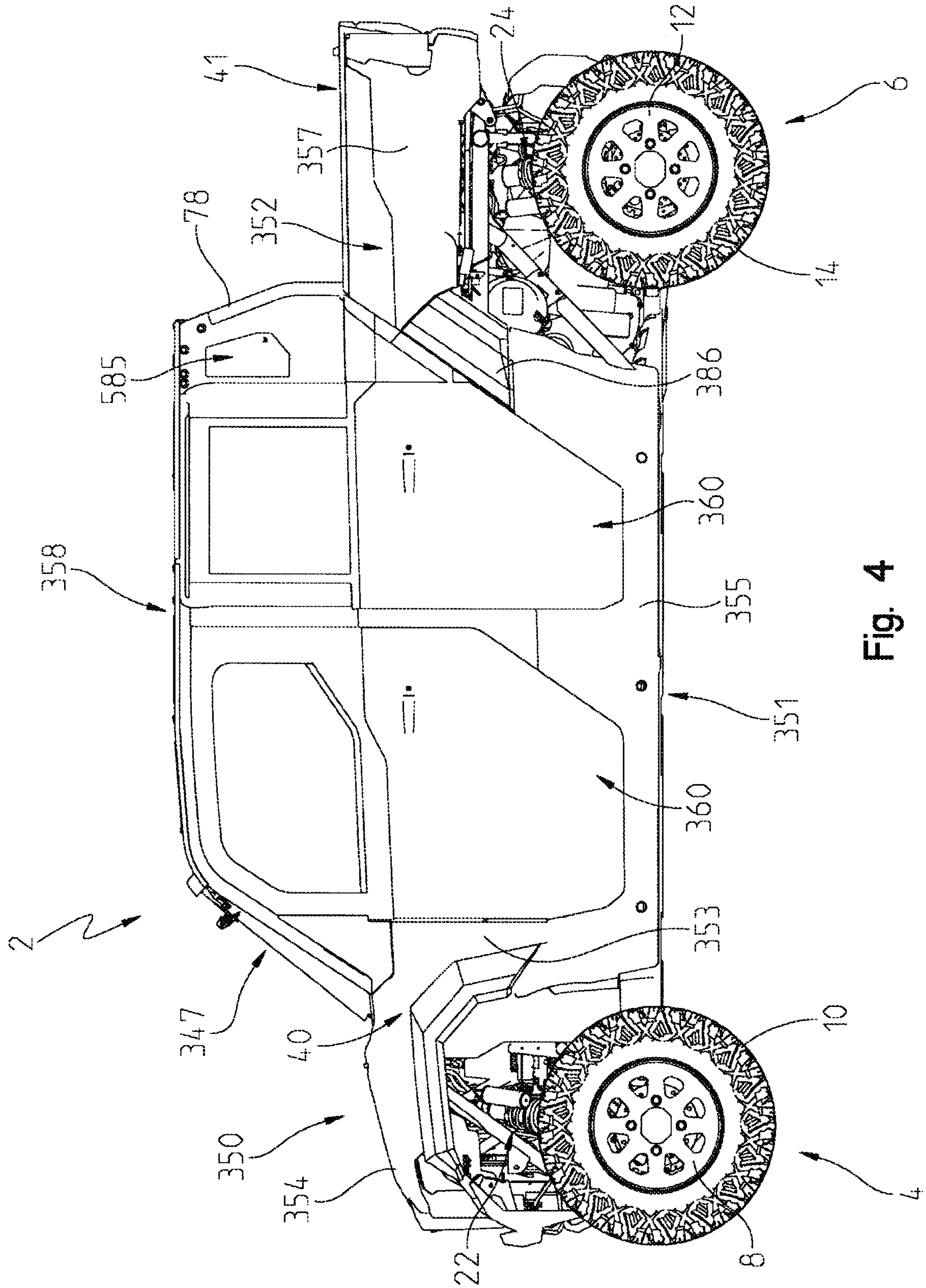
FIG. 4 shows a left elevational side view of the vehicle of FIG. 1.
Figure 5:
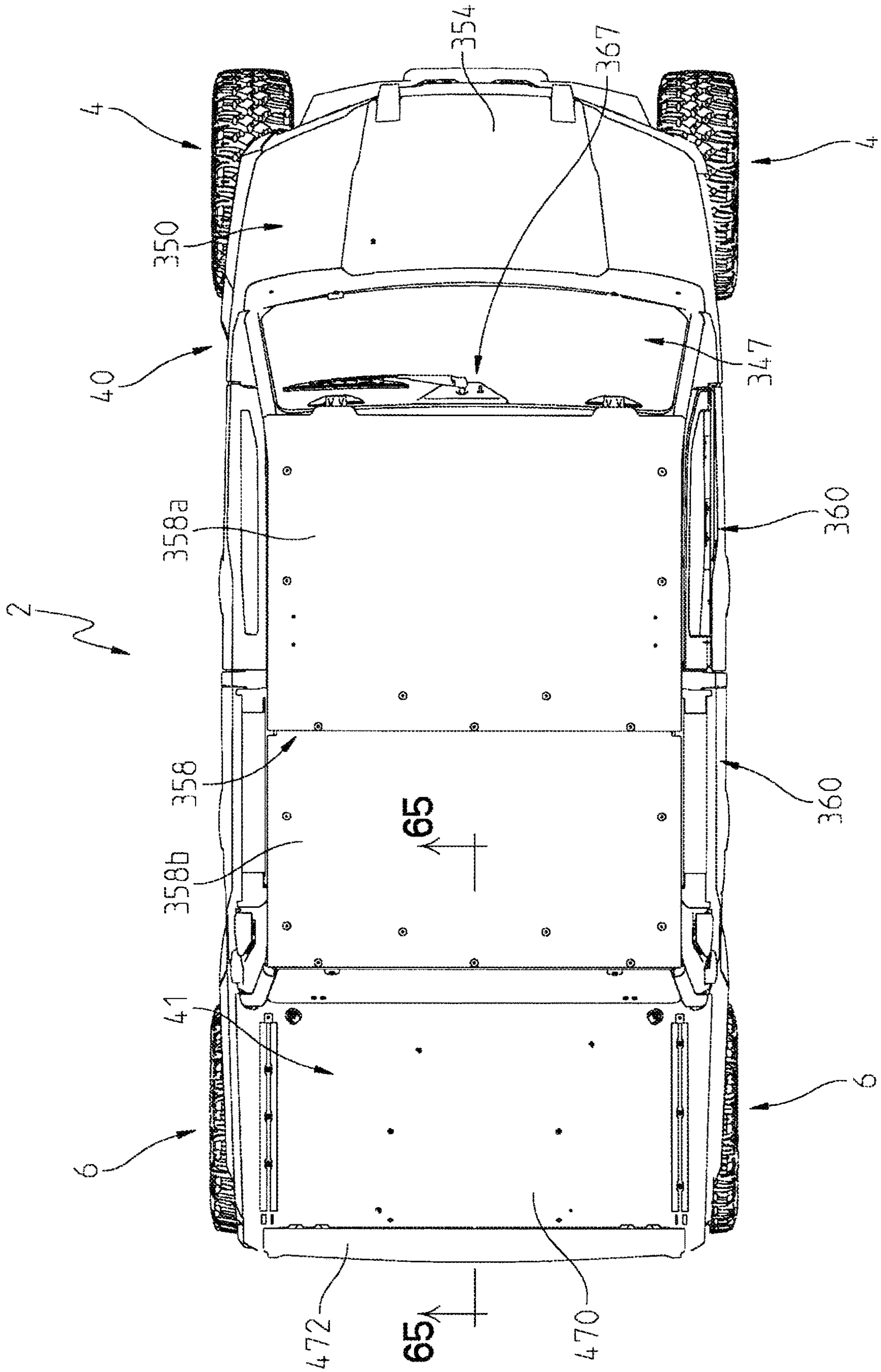
FIG. 5 shows a top plan view of the vehicle of FIG. 1.
Figure 7:
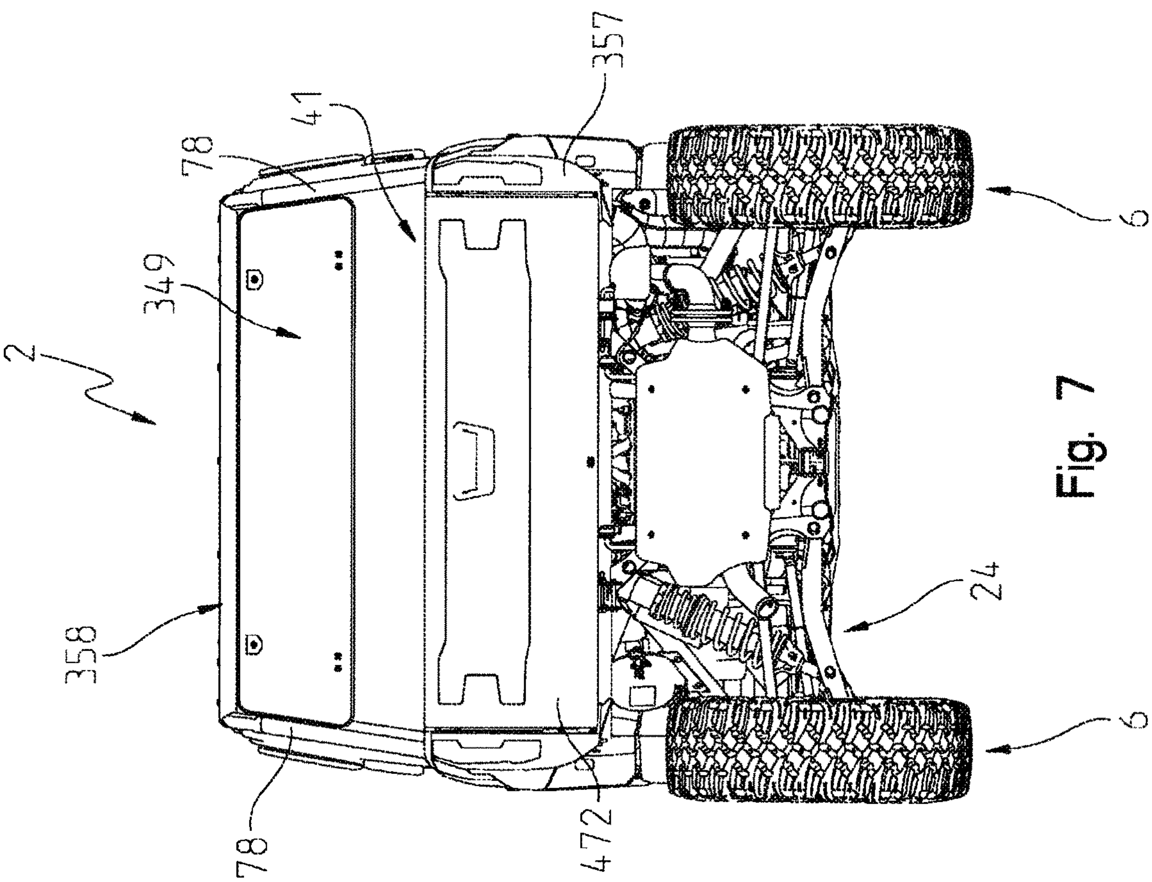
FIG. 7 shows a rear elevational view of the vehicle of FIG. 1.
Figure 6:
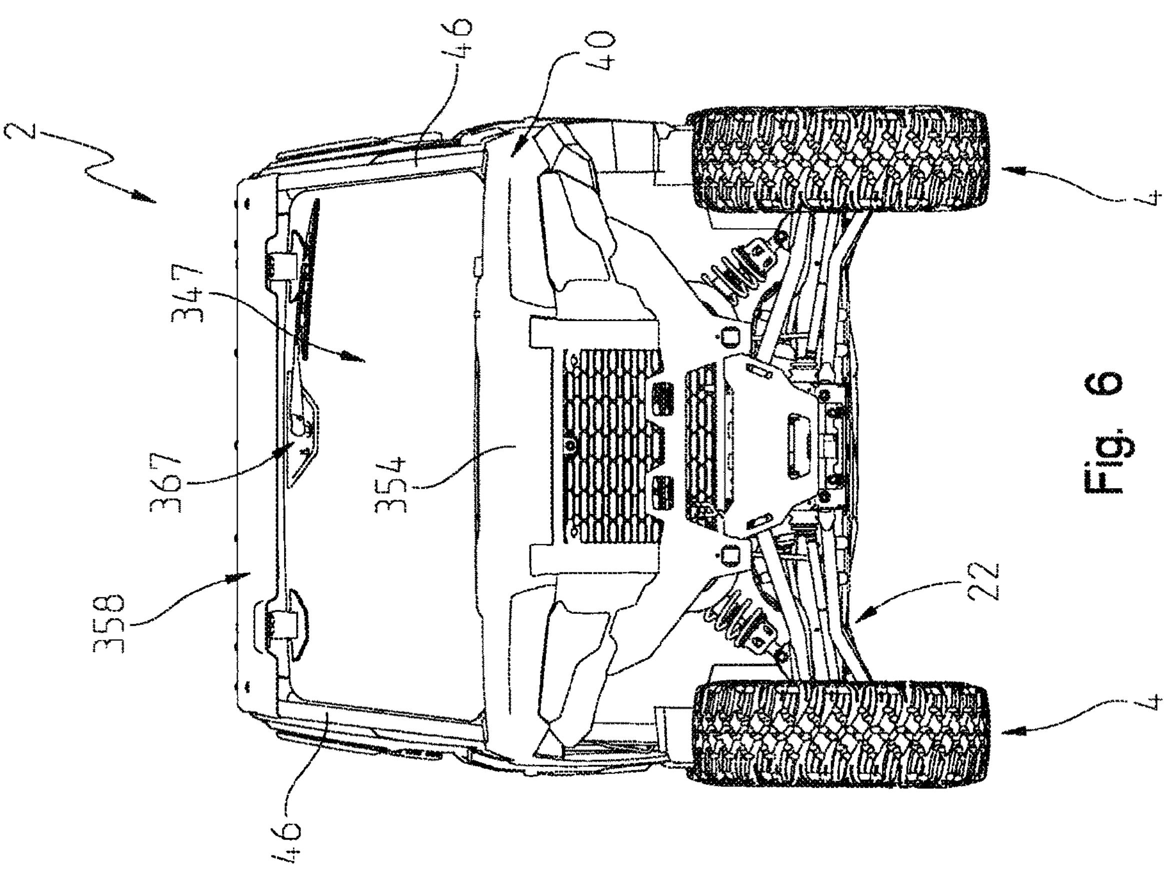
FIG. 6 shows a front elevational view of the vehicle of FIG. 1.
Figure 8:
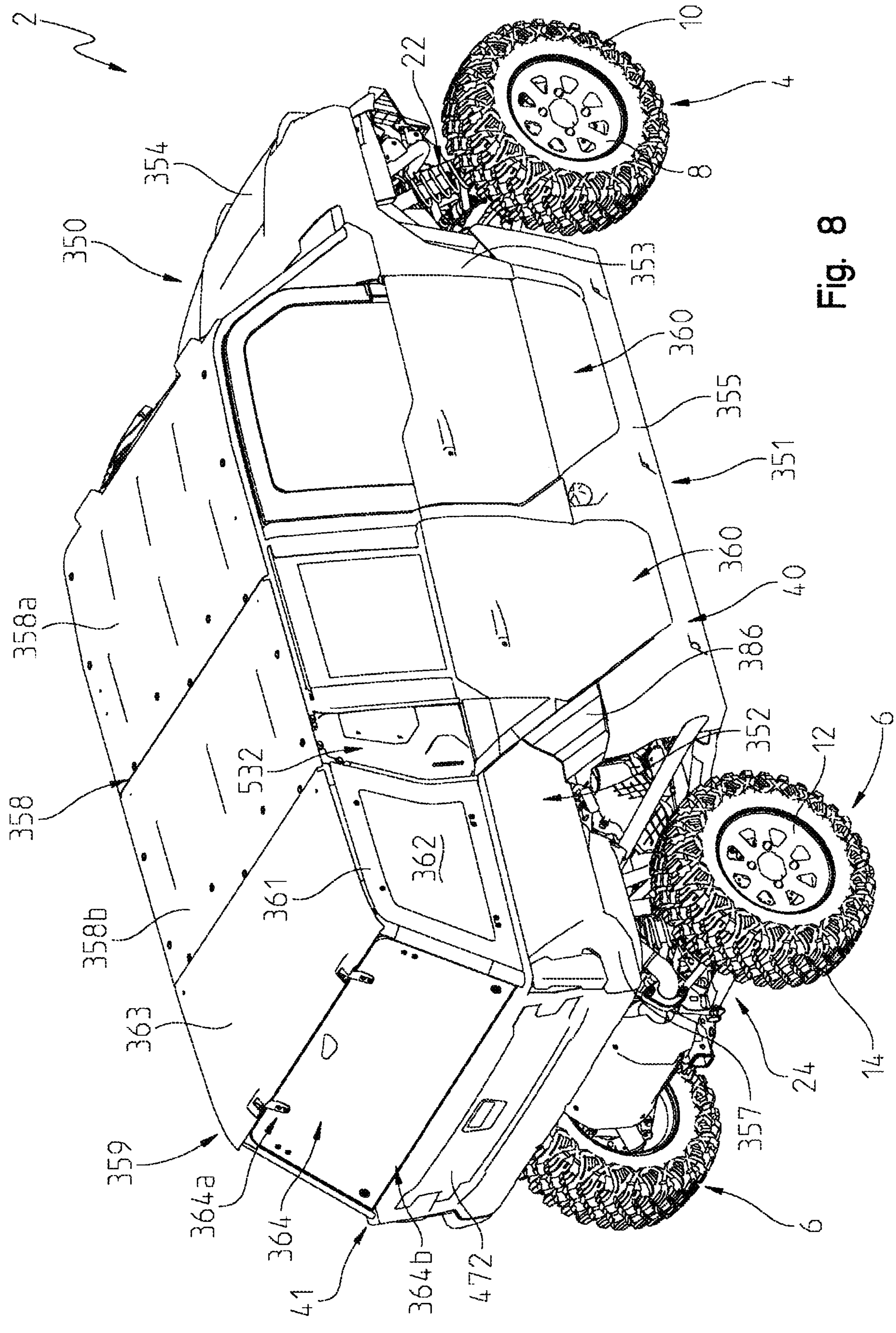
FIG. 8 shows a right rear perspective view of the vehicle of FIG. 1 having a second embodiment of a body assembly.

Referring to FIG. 8, when cab frame 36 further includes cargo area frame 90, body assembly 40 may further include cargo area body assembly 359 fully enclosing and sealing cargo area 41. Cargo area body assembly 359 generally includes first and second side panels 361 each configured to support a window 362, a roof panel 363 supported above side panels 361, and a rear window 364 in sealing engagement with roof panel 363, side panels 361, and cargo area 41, specifically a tailgate 472, as described in further detail below. When body assembly 40 includes cargo area body assembly 359, body assembly 40 does not include rear window 349. In various embodiments, rear window 364 may be a lift gate window configured to release from a lower end 364*b* and pivot upward about an upper end 364*a*.

Figure 42:
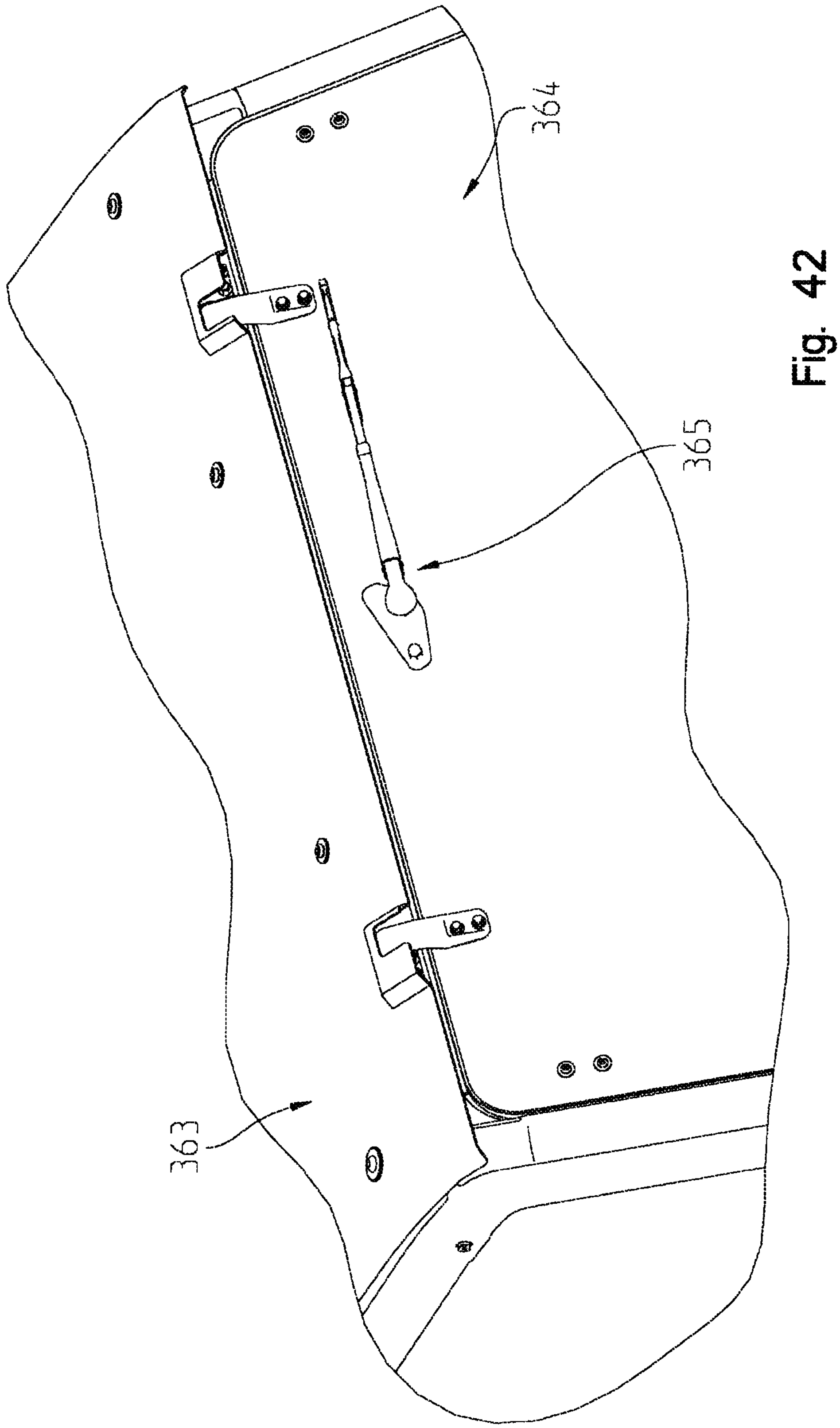
FIG. 42 shows an enlarged perspective view of a rear wiper assembly of the present disclosure.
Figure 43:
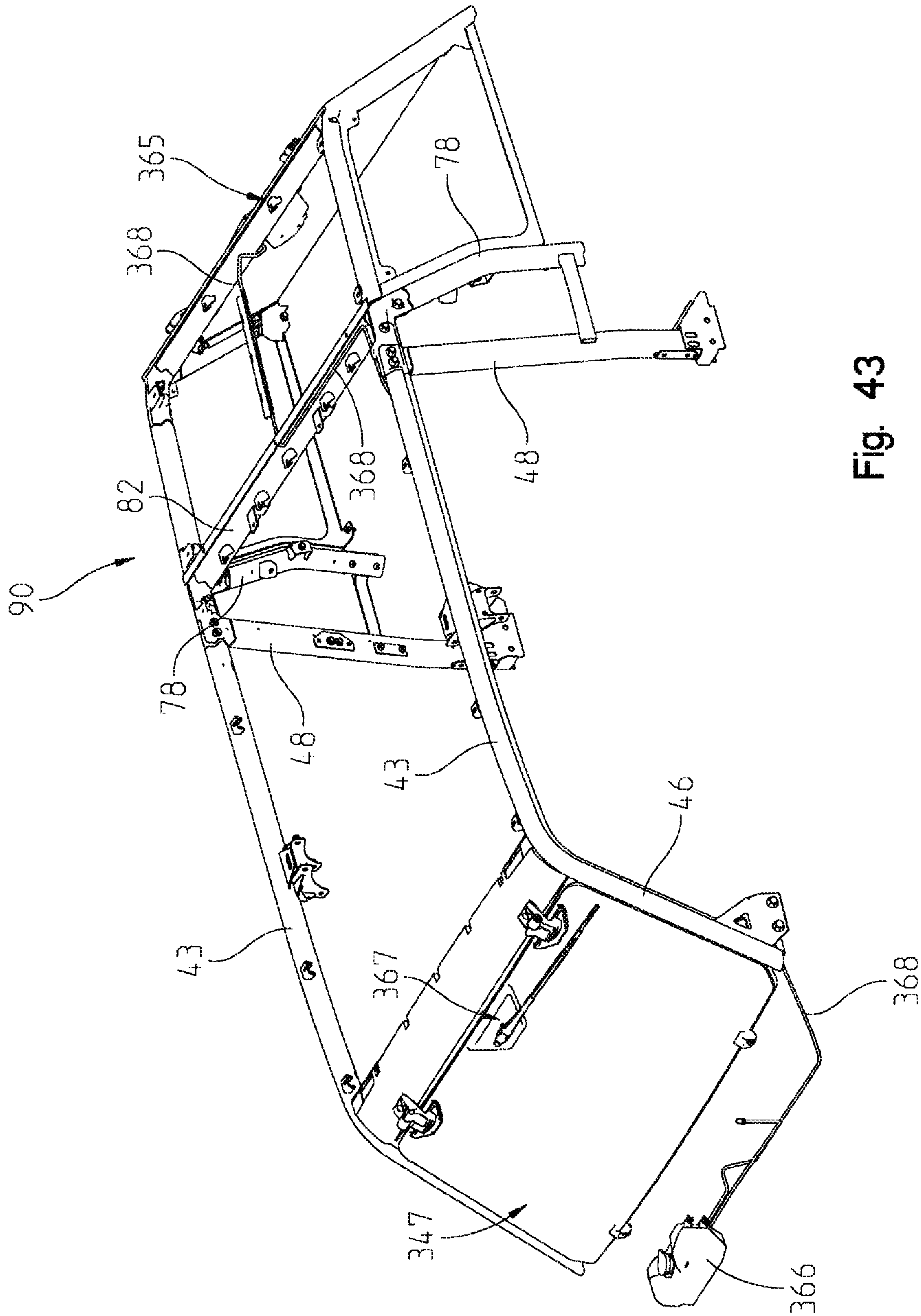
FIG. 43 shows a front left perspective view of a cab frame of the frame of FIG. 9 with a front wiper assembly and the rear wiper assembly of FIG. 42 coupled thereto.
Figure 44:
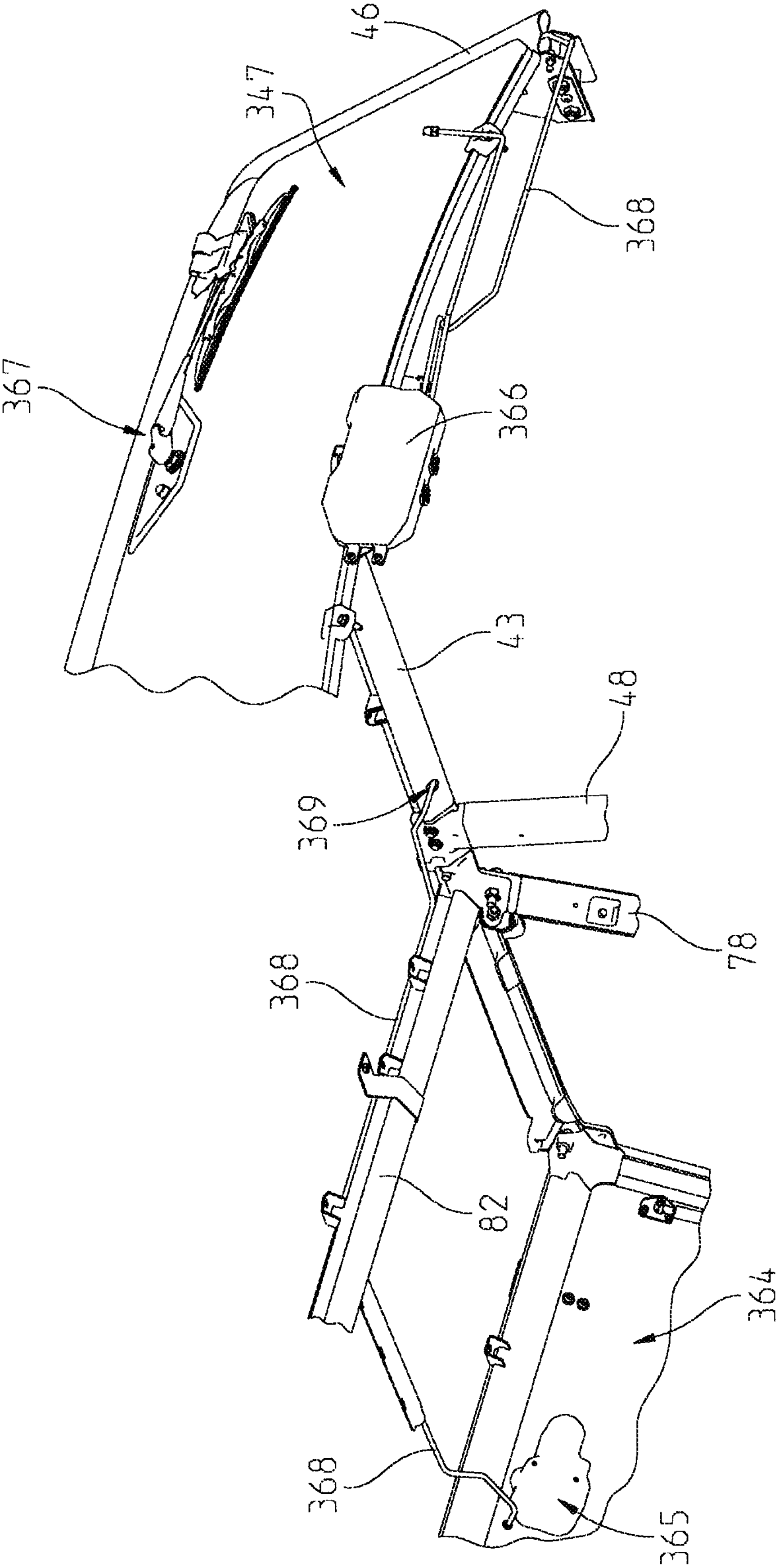
FIG. 44 shows an enlarged bottom right perspective view of the cab frame, the front wiper assembly, and the rear wiper assembly of FIG. 43.

With reference to FIGS. 42-44, in various embodiments, rear window 364 may include a rear wiper assembly 365. Rear wiper assembly 365 is fluidly coupled to a reservoir 366 of a front wiper assembly 367 for front windshield 347 via line 368 such that wiper fluid for rear wiper assembly 365 is provided from the same reservoir 366 as front wiper assembly 367. Reservoir 366 includes a pump (not shown) for providing wiper fluid from reservoir 366 back to rear wiper assembly 365. In various embodiments, line 368 coupling reservoir 366 of front wiper assembly 367 to rear wiper assembly 365 extends along cab frame 36. For example, and as shown in FIGS. 43 and 44, line 368 may extend from reservoir 366 into frame member 46 and towards rear wiper assembly 365 within frame member(s) 46/43. Line 368 then exits frame member 43 through an opening 369 (FIG. 44) adjacent horizontal frame member 82 and extends inwardly along frame member 82, before extending rearwardly along roof panel 363 from frame member 82 to rear wiper assembly 365. In various embodiments, line 368 may be routed through one or more routing trays 200 below frame 20 rather than across cab frame 36.

Referring to FIGS. 45-53, hood panel 354 of front body assembly 350 may be coupled to front fender body panels 352 or another portion of body assembly 40 (not shown in FIGS. 45-50) via a coupling mechanism 370, 370*, 370'. Coupling mechanism 370, 370*, 370' generally includes a latch 372, 372* and a coupling member 374, 374*, 374'. Latch 372, 372*, 372' includes a body 376 having a front end 377, 377' configured to couple with front fender body panel 352 or other body panels, and a rear end 378, 378' adjacent to, and in various embodiments, coupled to, hood panel 354. In various embodiments, a wall 380 extends downwardly between front end 377 and rear end 378.

Figure 45:
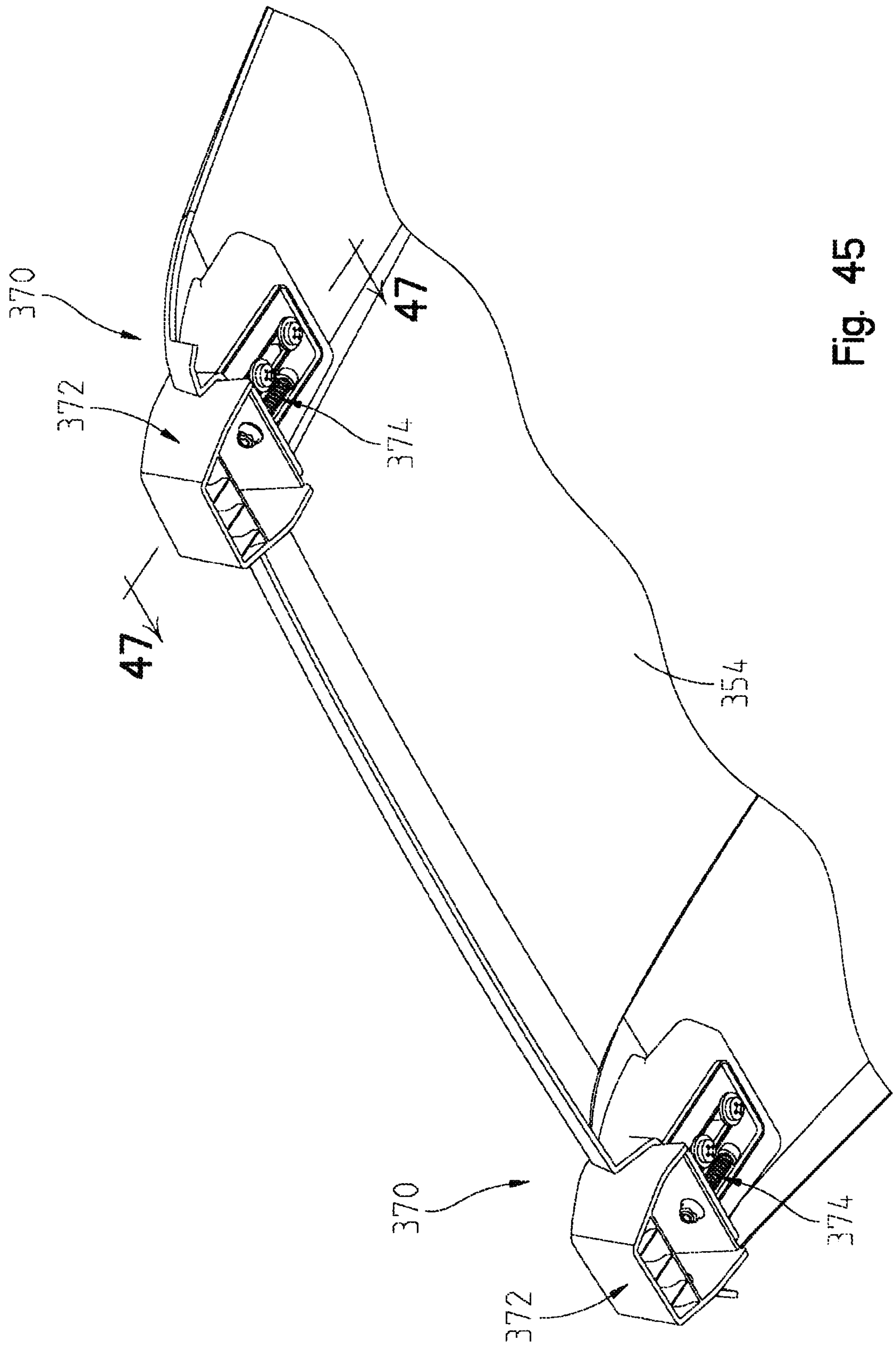
FIG. 45 shows a bottom left perspective view of a first embodiment of a hood latch assembly of the present disclosure.
Figure 46:
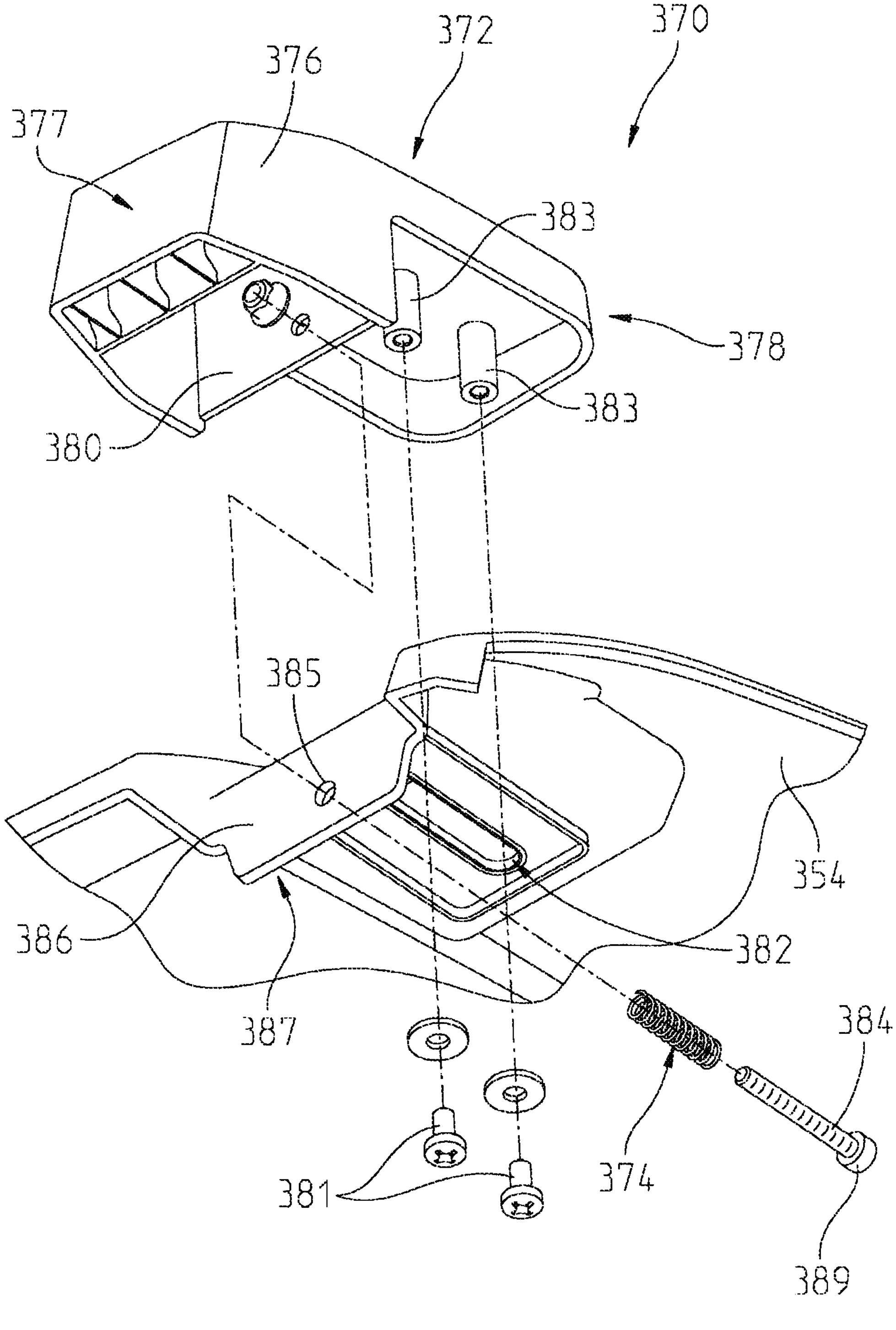
FIG. 46 shows an exploded view of the hood latch assembly of FIG. 45.
Figure 47:
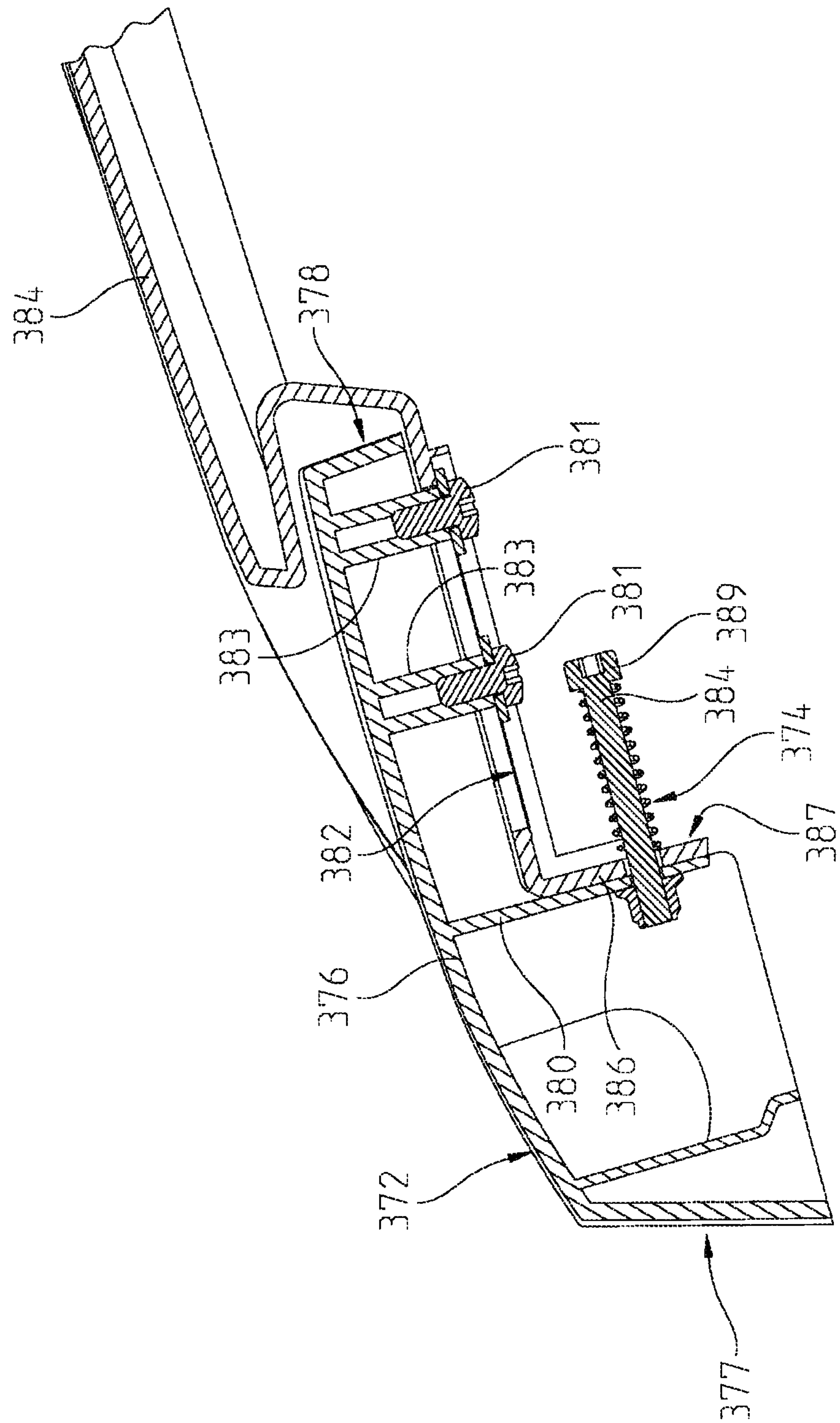
FIG. 47 shows a cross sectional view of the hood latch assembly of FIG. 45 taken along line 47-47 of FIG. 45.

In a first embodiment of coupling mechanism 370, shown in FIGS. 45-47, rear end 378 of latch 372 may be coupled to hood panel 354 via at least one coupler 381, illustratively two couplers 381, extending through an elongated slot 382 of hood panel 354 and being received within an extension 383 extending downwardly from rear end 378. Coupling member 374 of first embodiment 370 may be a biasing member received over a pin 384 that extends through wall 380 of latch 372 and an opening 385 in a downward-extending wall 386 in hood panel 354, where coupling member 374 extends between a rear surface 387 of wall 386 and a head 389 of pin 384 such that latch 372 is biased rearwardly to be engaged with front fender body panel 352. Latch 372 is engaged with front fender body panel 352 when coupling member 374 is expanded and couplers 381 and extension 383 are slid backward within elongated slot 382. When latch 372 is actuated, coupling member 374 is contracted and couplers 381 and extensions 383 slide forward within elongated slot 382 such that latch 372 is slid forward disengaging from front fender body panel 352.

Figure 48:
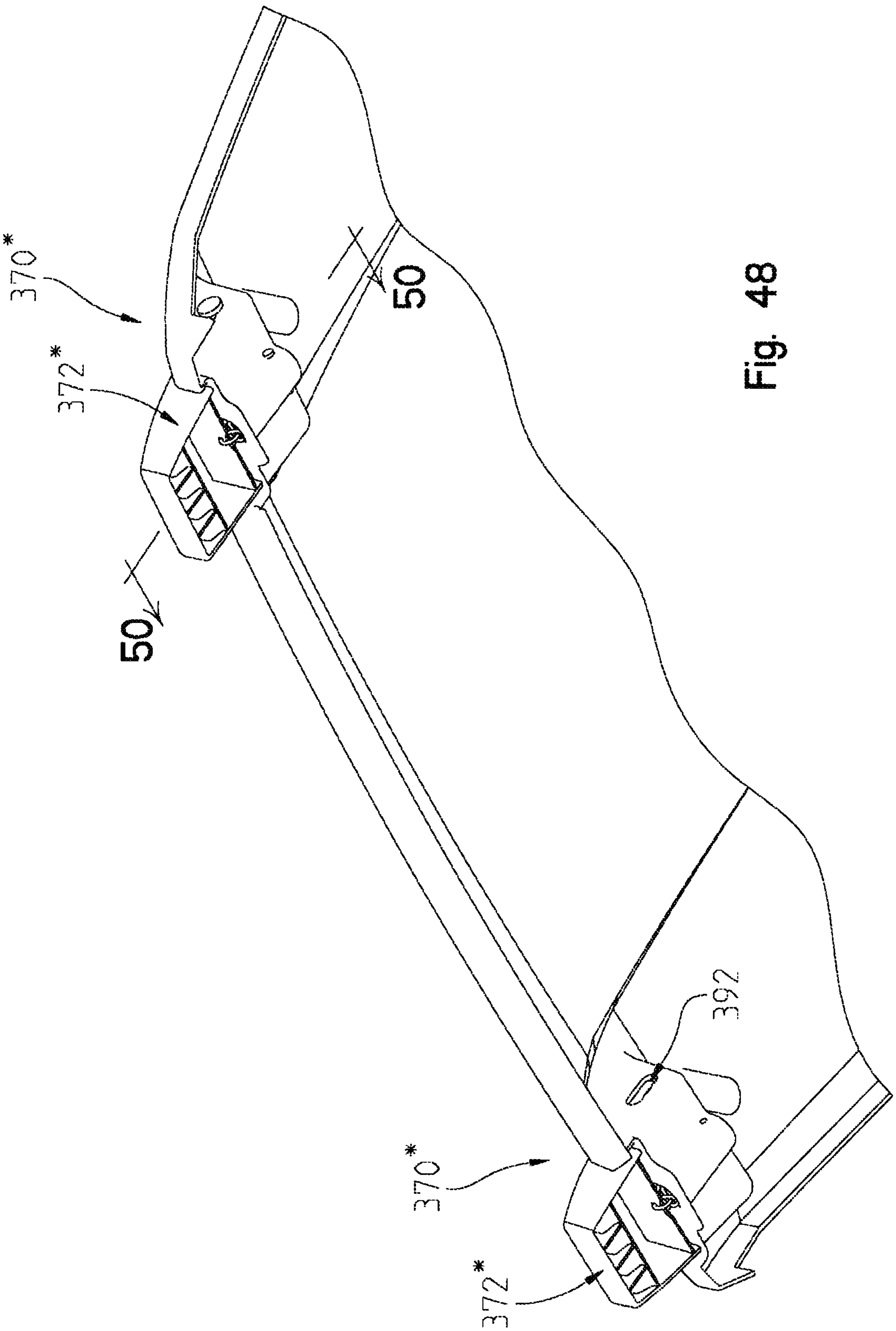
FIG. 48 shows a bottom left perspective view of a second embodiment of a hood latch assembly of the present disclosure.
Figure 49:
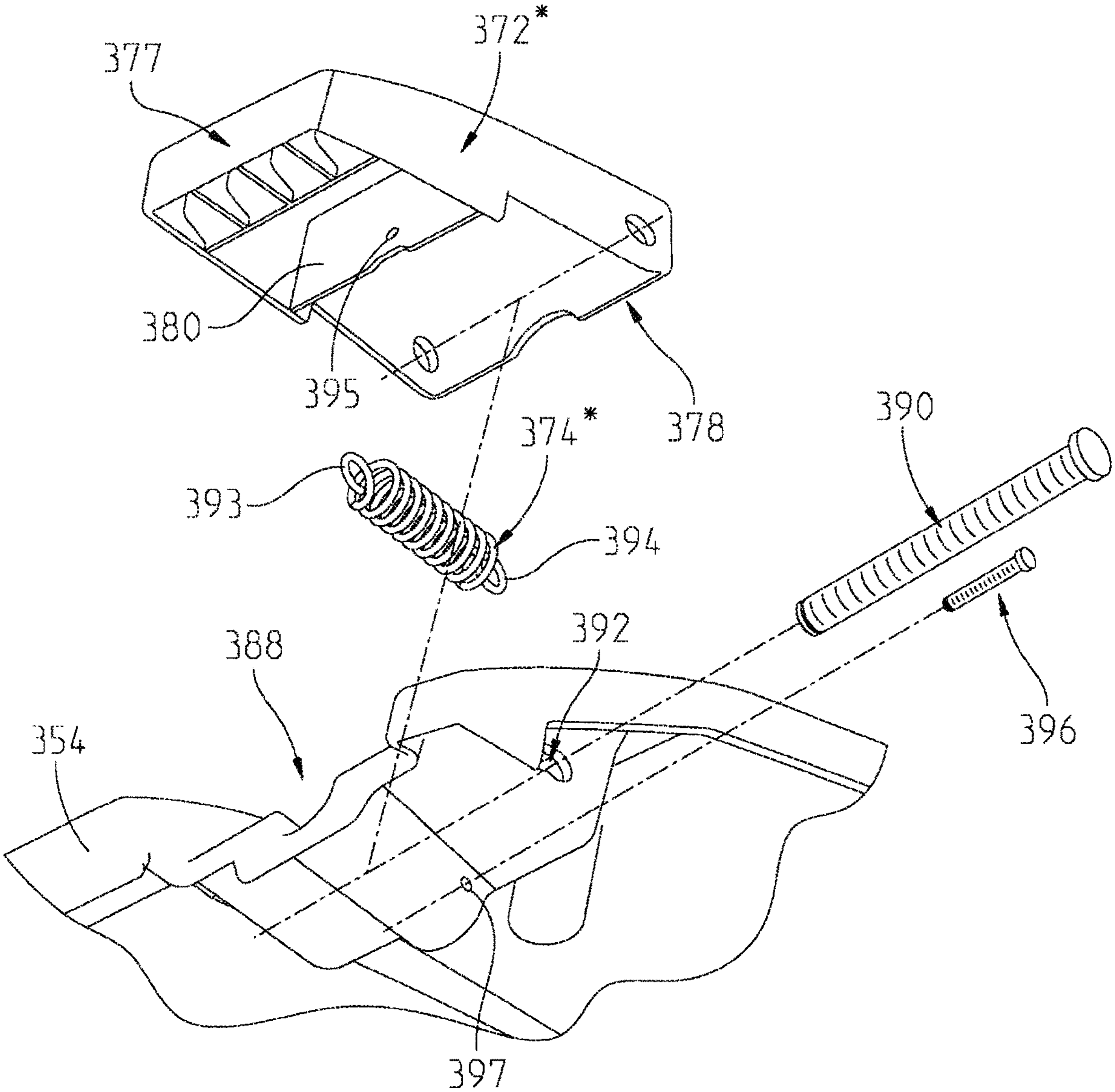
FIG. 49 shows an exploded view of the hood latch assembly of FIG. 48.
Figure 50:
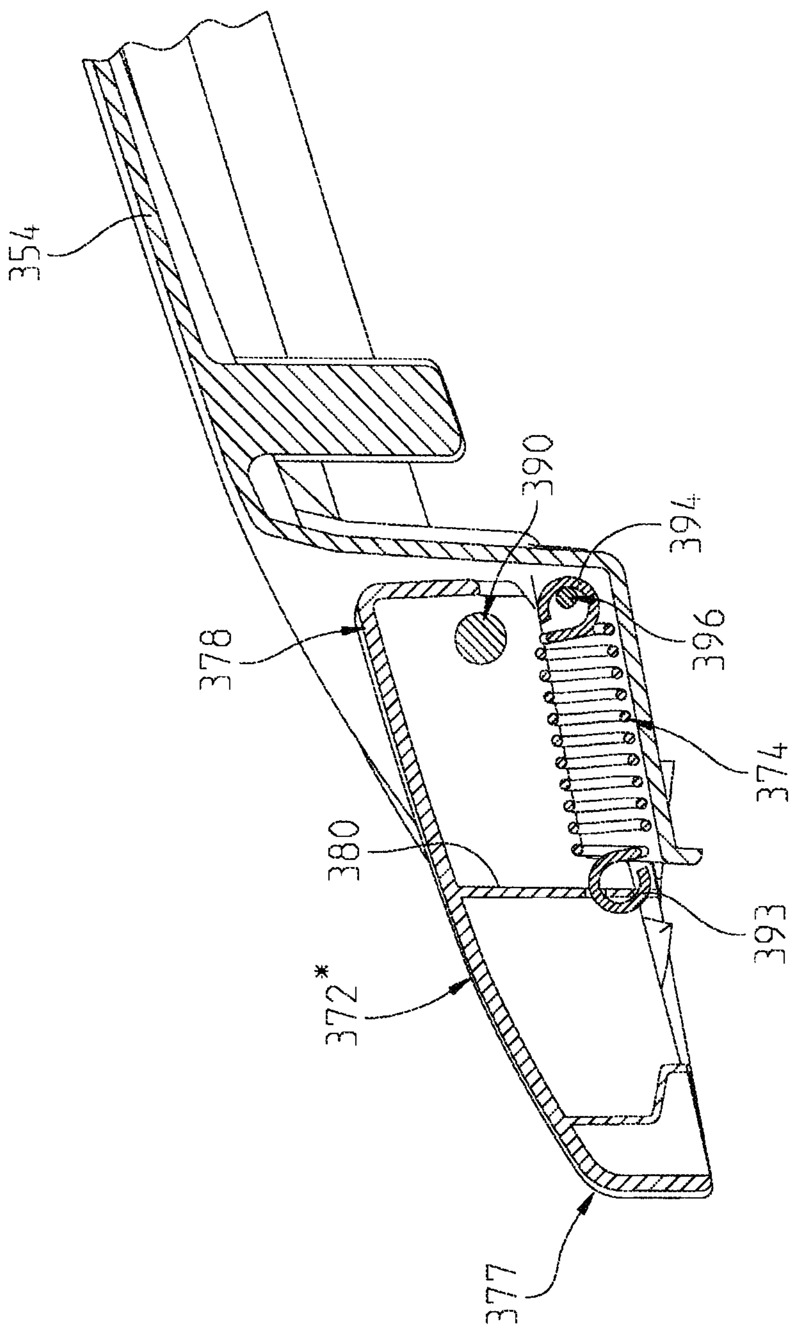
FIG. 50 shows a cross sectional view of the hood latch assembly of FIG. 48 taken along line 50-50 of FIG. 48.

In a second embodiment of coupling mechanism 370*, shown in FIGS. 48-50, rear end 378 of latch 372* may be received within an indentation 388 (FIG. 49) in hood panel 354 and coupled to hood panel 354 via a coupler 390 received within elongate slots 392 on either side of indentation 388. Coupling member 374* of second embodiment 370* may be a biasing member that includes hooks 393 and 394 on either end, where hook 393 is received within opening 395 in wall 380 of latch 372* and hook 394 is received around a pin 396 extending between sides of indentation 388 and received within openings 397 in the sides of indentation 388. Latch 372* is generally biased rearwardly to be engaged with front fender body panel 352 or other body panel. When latch 372* is engaged, latch 372* is pulled forward and up causing coupling member 374* to contract and coupler 390 to slide forward within elongated slot 392 such that latch 372* is slid forward disengaging from front fender body panel 352 and capable of rotating about coupler 390.

Figure 51:
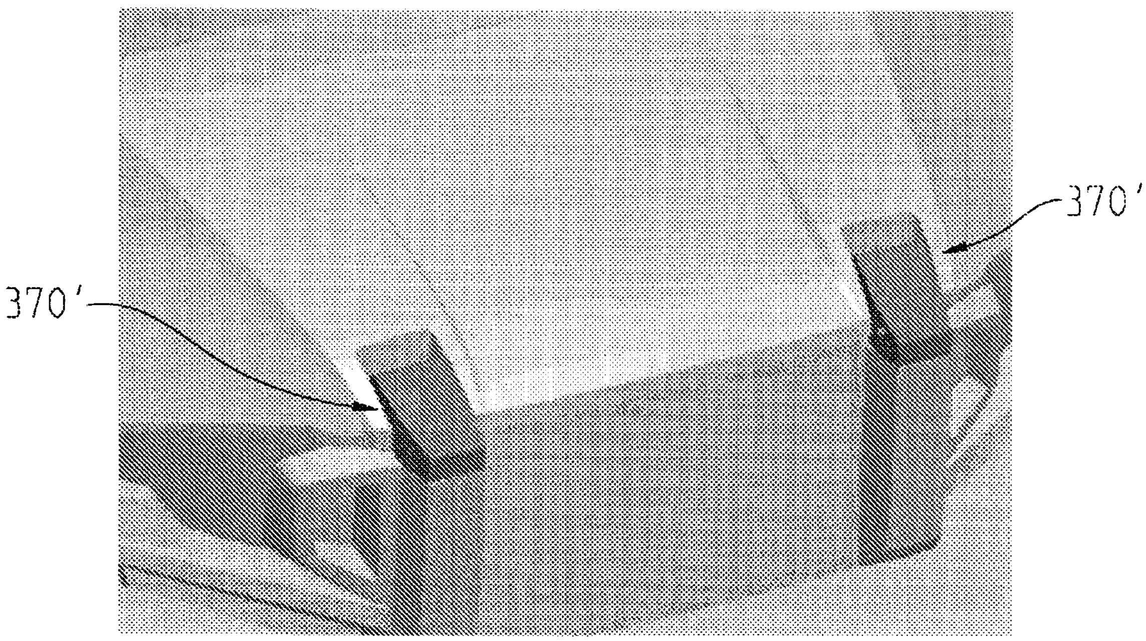
FIG. 51 shows a front right perspective view of a third embodiment of a hood latch assembly of the present disclosure coupling a front body panel to a hood panel.
Figure 52:
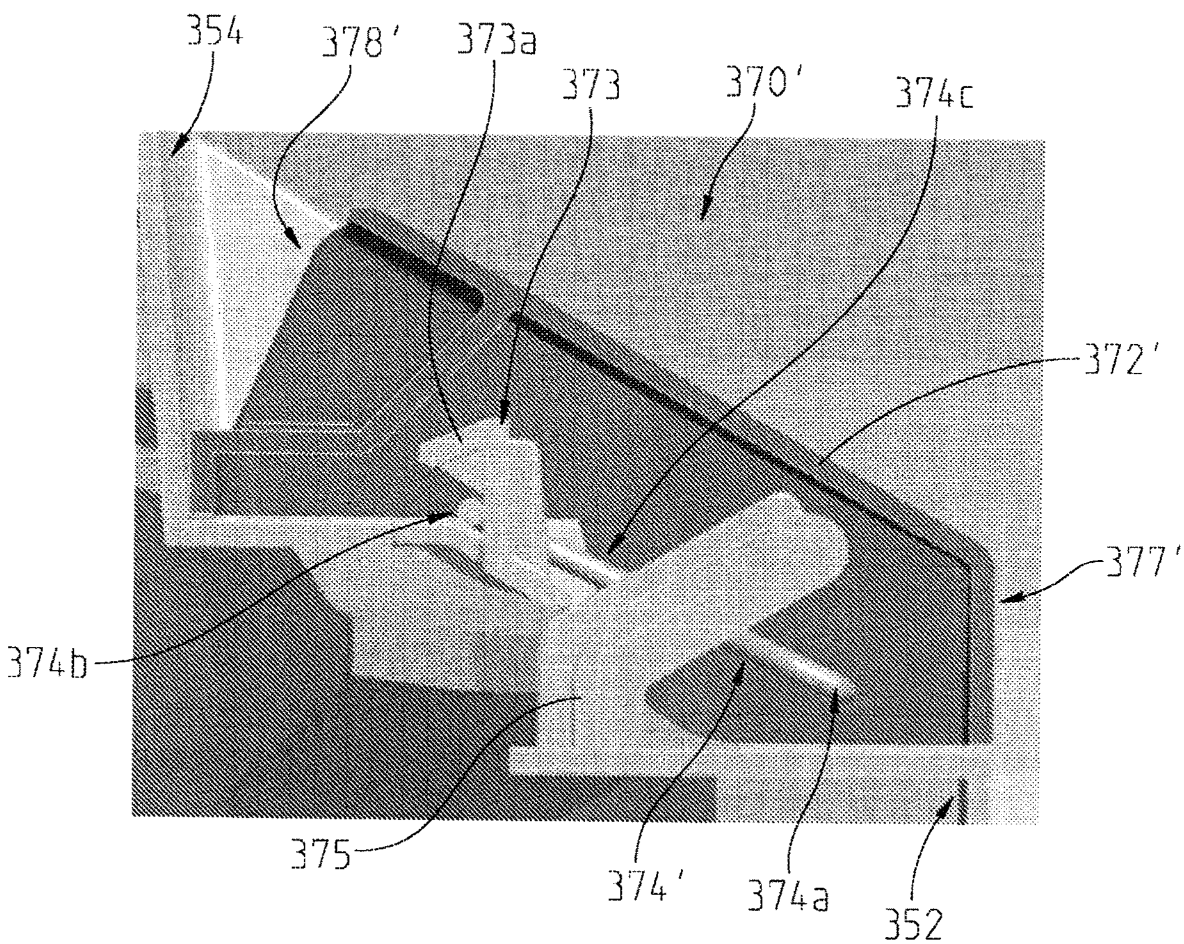
FIG. 52 shows a cross sectional view of the third embodiment of the hood latch assembly of FIG. 51 in a latched position.
Figure 53:
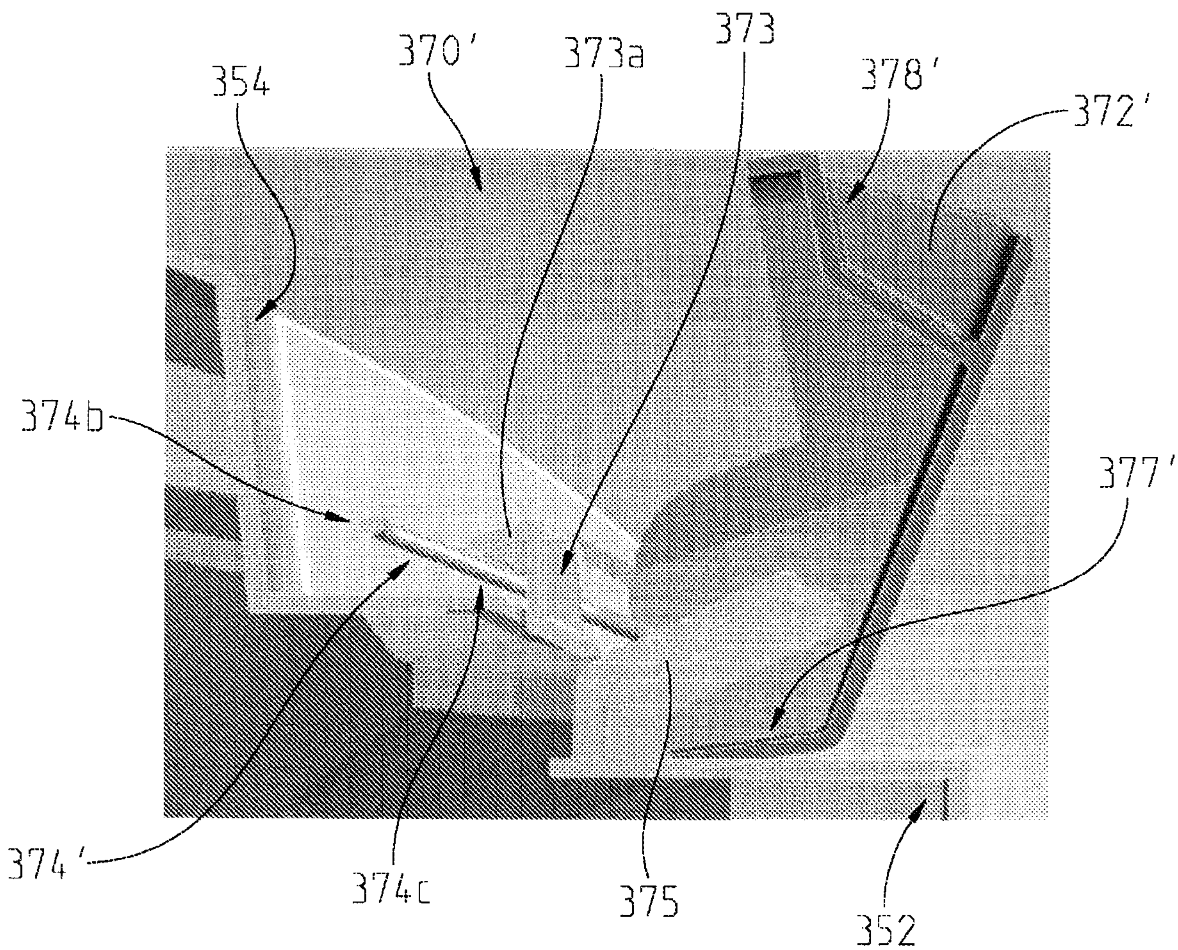
FIG. 53 shows a cross sectional view of the third embodiment of the hood latch assembly of FIG. 51 in an unlatched position.

In a third embodiment of coupling mechanism 370', shown in FIGS. 51-53, front end 377' of latch 372' is rotatably coupled to a first end 374*a* of coupling member 374'. A second end 374*b* of coupling member 374' is configured to be received within an extension member 373 of hood panel 354. In various embodiments, extension member 373 includes an indention (not shown) and at least one hook 373*a*, where a body 374*c* of coupling member 374' enters into the indention such that second end 374*b* of coupler 374' may be received by hook 373*a*. Body 374*c* of coupling member 374' extends through an opening (not shown) of extension 375 of front fender body panels 352 or another portion of body assembly 40 such that first end 374*a* of coupling member 374' is on a first side of extension 375 and second end 374*b* of coupling member 374' is on a second side of extension 375. In operation, rear end 378' of latch 372' is rotated upwardly and forwardly such that second end 374*b* of coupling member 374' may disengage with hook 373*a* of extension member 373 to unlatch hood panel 354 from front fender body panel 352 or other portion of body assembly 40, and rear end 378' of latch 372' is rotated backwardly and downwardly to be positioned adjacent hood panel 354 such that second end 374*b* of coupling member 374' can be received by hook 373*a* and front end 377' of latch 372' can be pushed down to shift coupling member 374' forward latching or securing hood panel 354 to front fender body panel 352 or another portion of body assembly 40.

With reference now to FIGS. 54-63B, doors 360 of body assembly 40 will be described in further detail. Each door

360 generally includes a lower body portion 400 having an actuating mechanism 430 for opening and/or latching closed door 360. In various embodiments, some or all of doors 360 may further include an upper body portion 401 coupled to lower body portion 400, where upper body portion 401 generally includes an opening 402 configured to house a window 403. Upper body portion 401 may be removably coupled to lower body portion 400 via at least one coupler, such as a bolt, screw or other various couplers, or integrally formed with lower body portion 400. When door 360 includes window 403, lower body portion 400 further includes a pocket (not shown) positioned below window 403 configured to house window 403 when window 403 is rolled down or open.

In various embodiments, windows 403 within doors 360 may be manually operated via a mechanical mechanism, such as a crank, in doors 360 (not shown), while in other embodiments, the windows within doors 360 may be electrically operated via an electrical system connected to actuating mechanisms (i.e., buttons or toggles) 404 positioned within a center console 410 (FIG. 49) or in a dash or other central area reachable by a driver or passenger of vehicle 2. Placing all actuating mechanisms 404 for windows 403 in center console 410 or the dash or other central area reachable by a driver of passenger of vehicle 2 simplifies the wiring system (not shown) needed to connect windows 403 to actuating mechanism 404. Alternatively, windows 403 may be operated by electrical controls at door 360. In various embodiments, doors 360 may also include an integrated grab handle 412 on an interior 414 of door 360.

Figure 54:
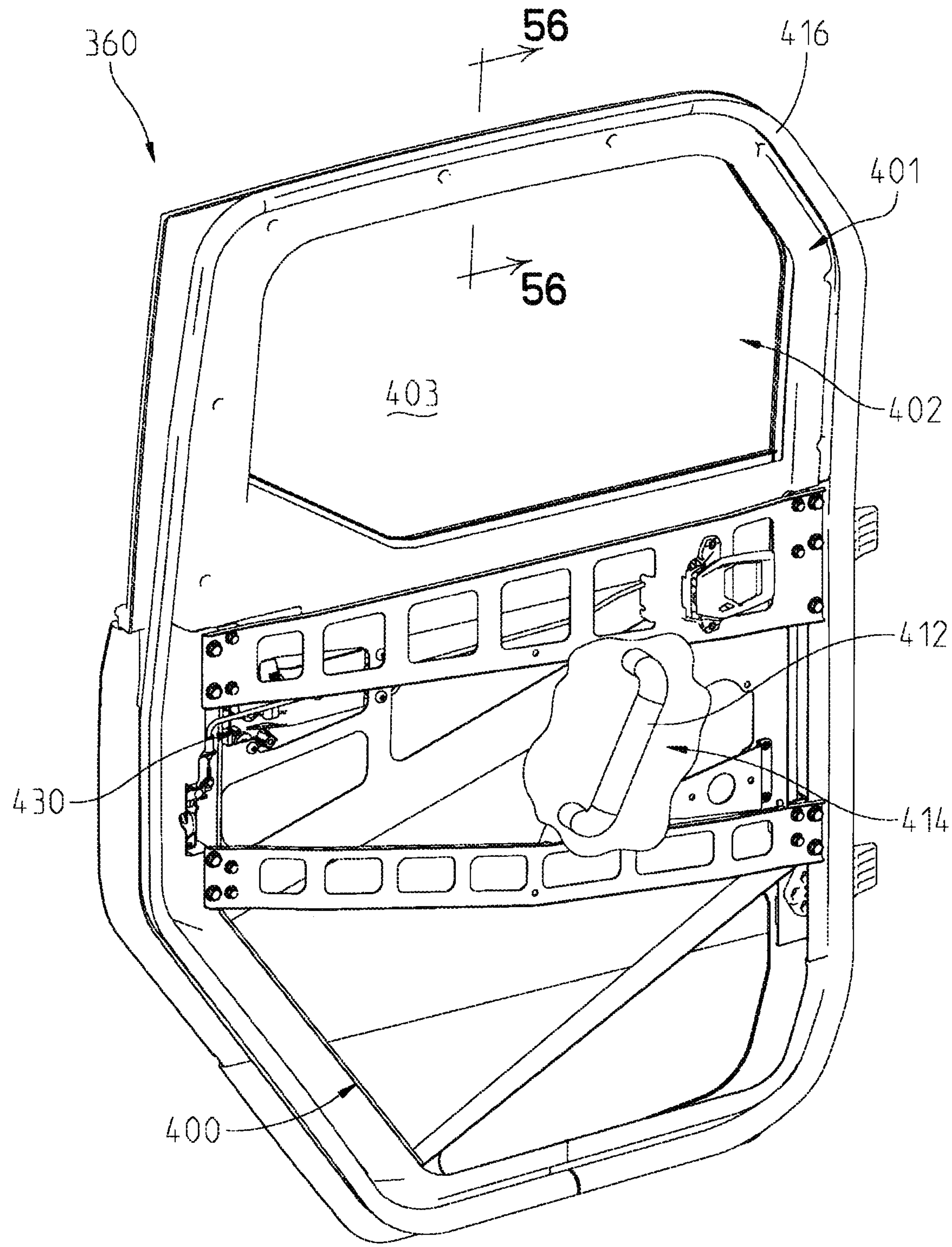
FIG. 54 shows an interior perspective view of a door of the vehicle of FIG. 1 with an interior panel of the door removed.
Figure 55:
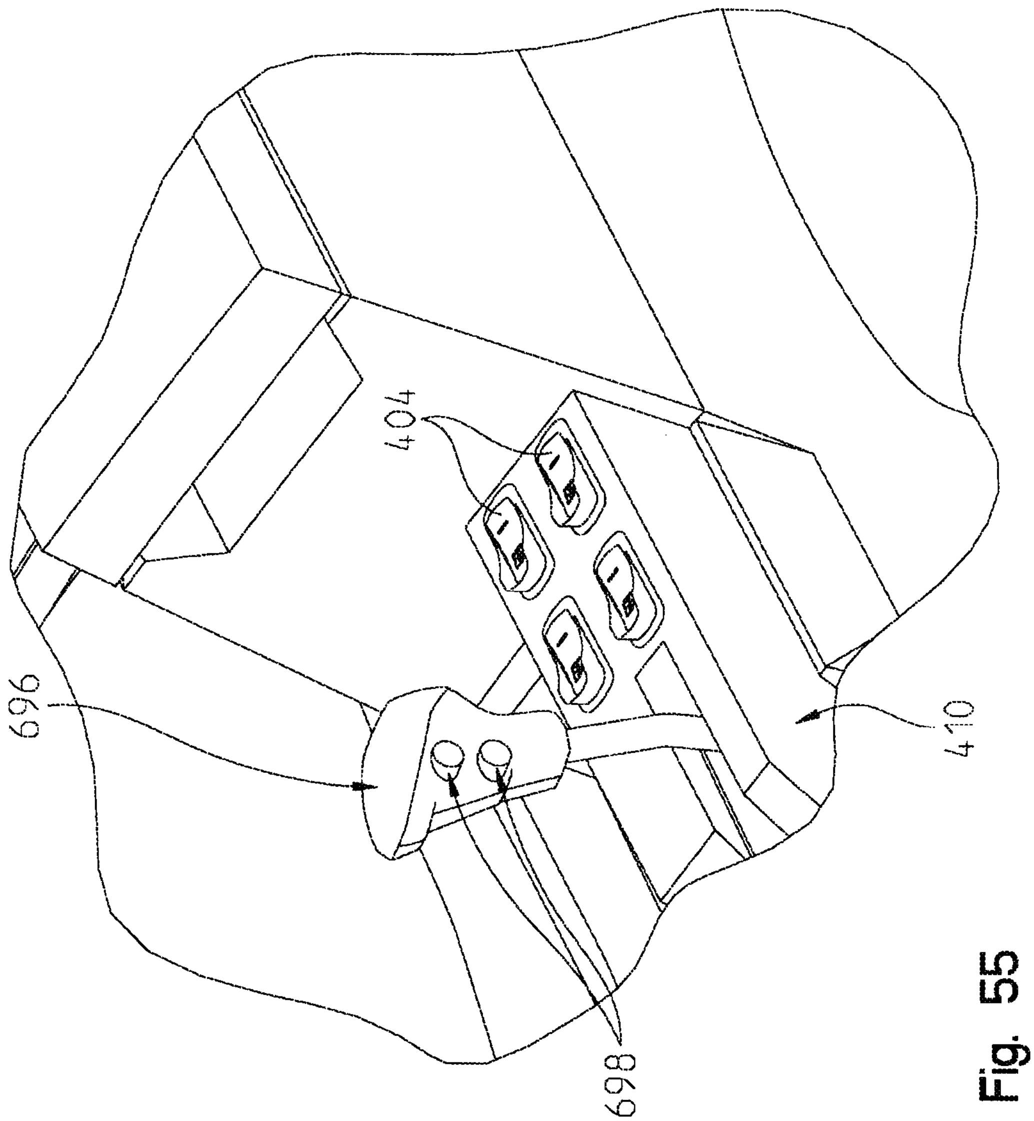
FIG. 55 shows an enlarged rear right perspective view of a center console with window controls and a gear shifter with winch controls of the present disclosure.
Figure 56:
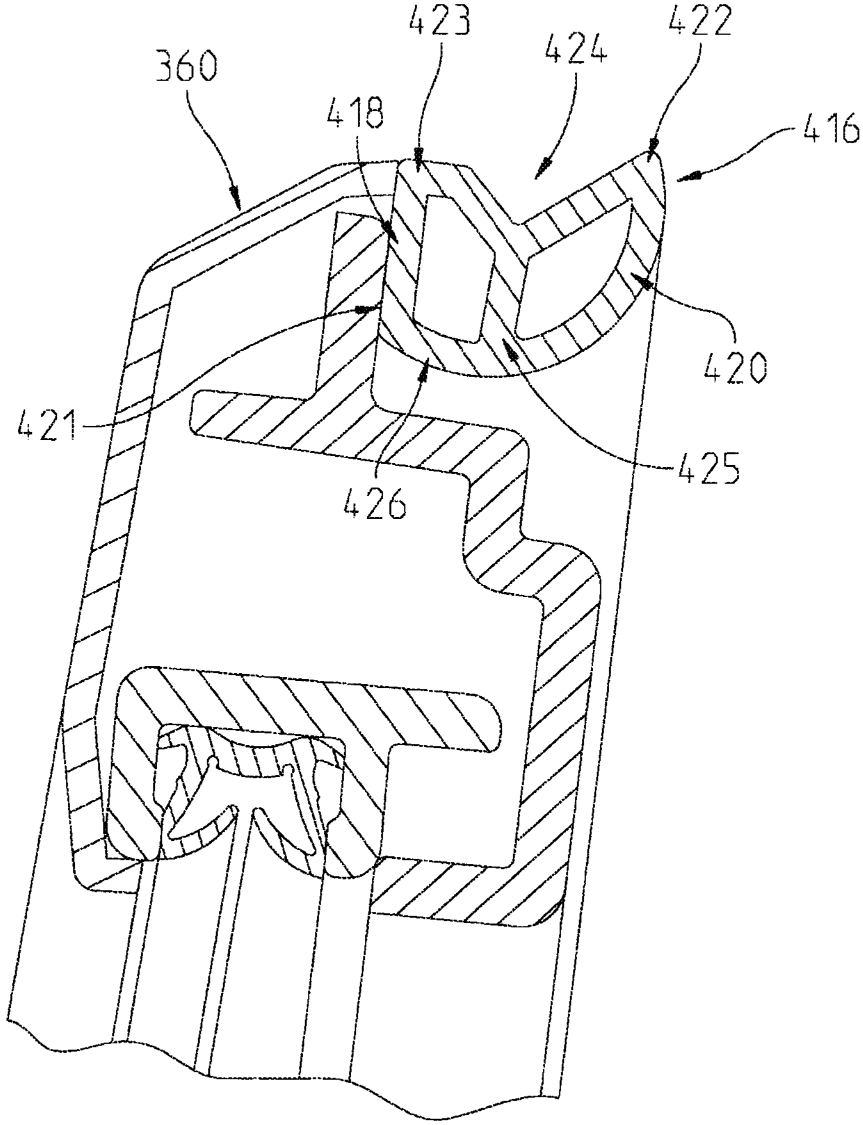
FIG. 56 shows a cross sectional view of a seal of the door of FIG. 54 taken along line 56-56 of FIG. 54.
Figure 57:
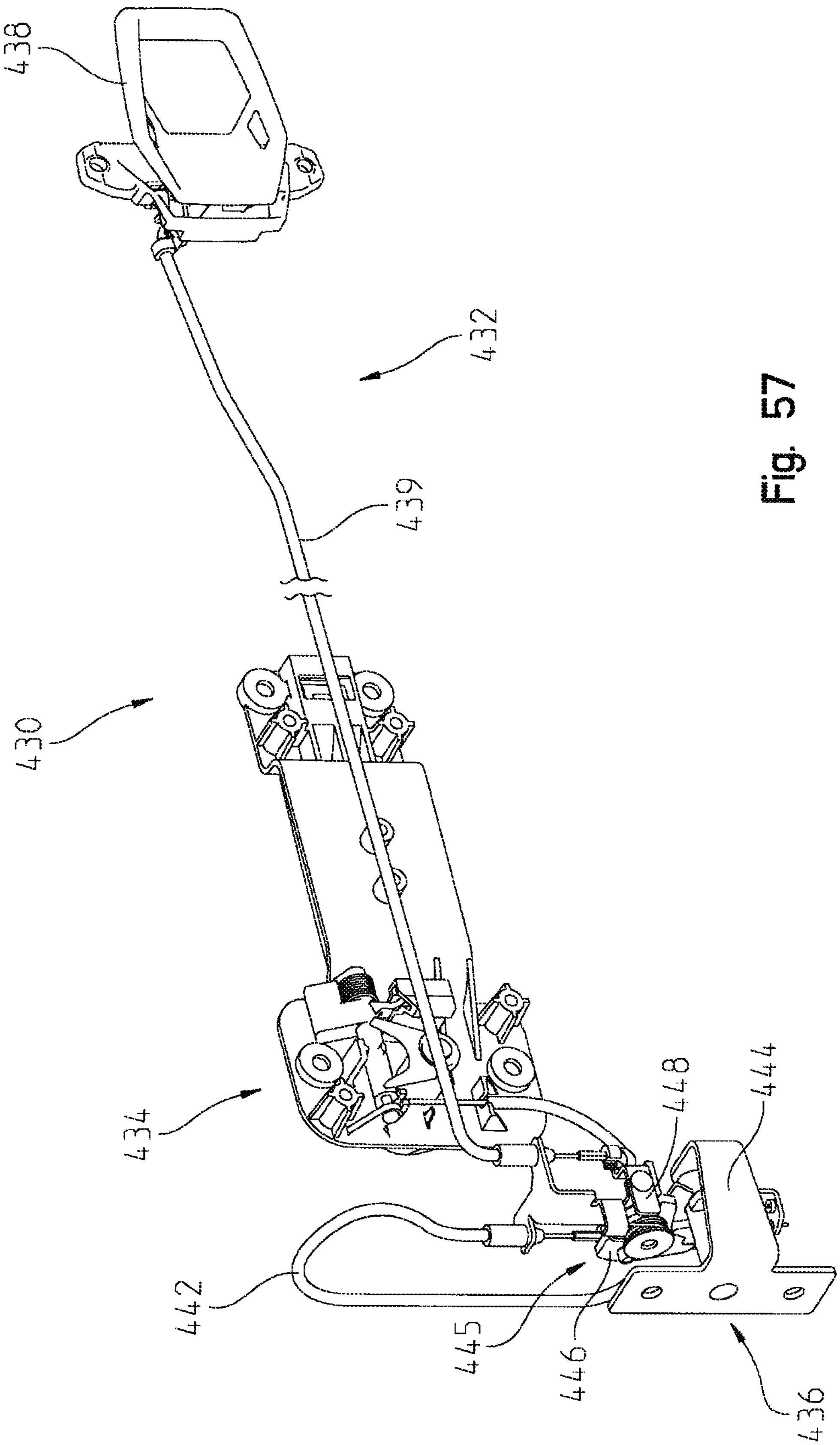
FIG. 57 shows an interior perspective view of an actuating mechanism of the door of FIG. 54.
Figure 58:
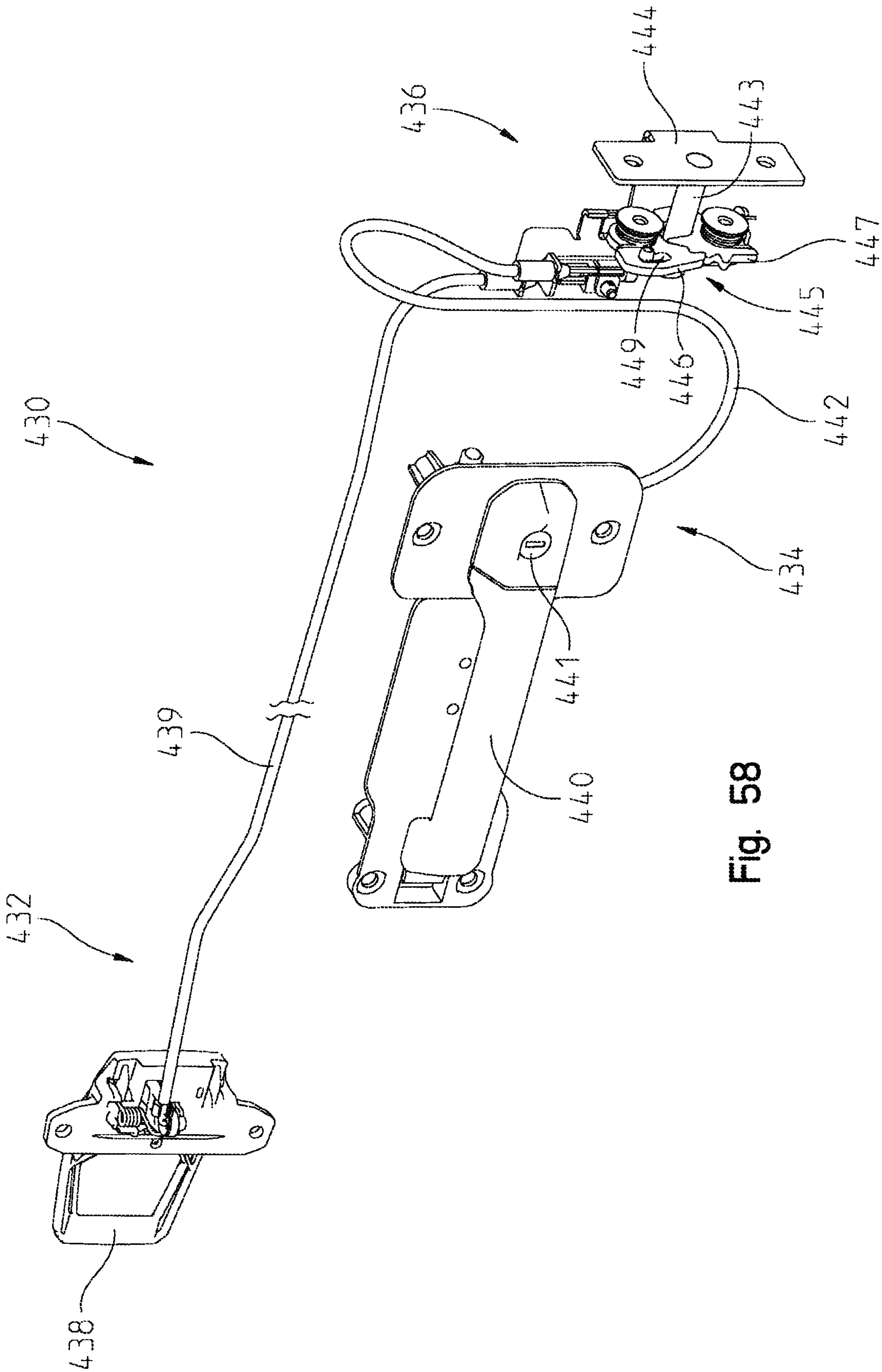
FIG. 58 shows an exterior perspective view of the actuating mechanism of FIG. 57.
Figure 59:
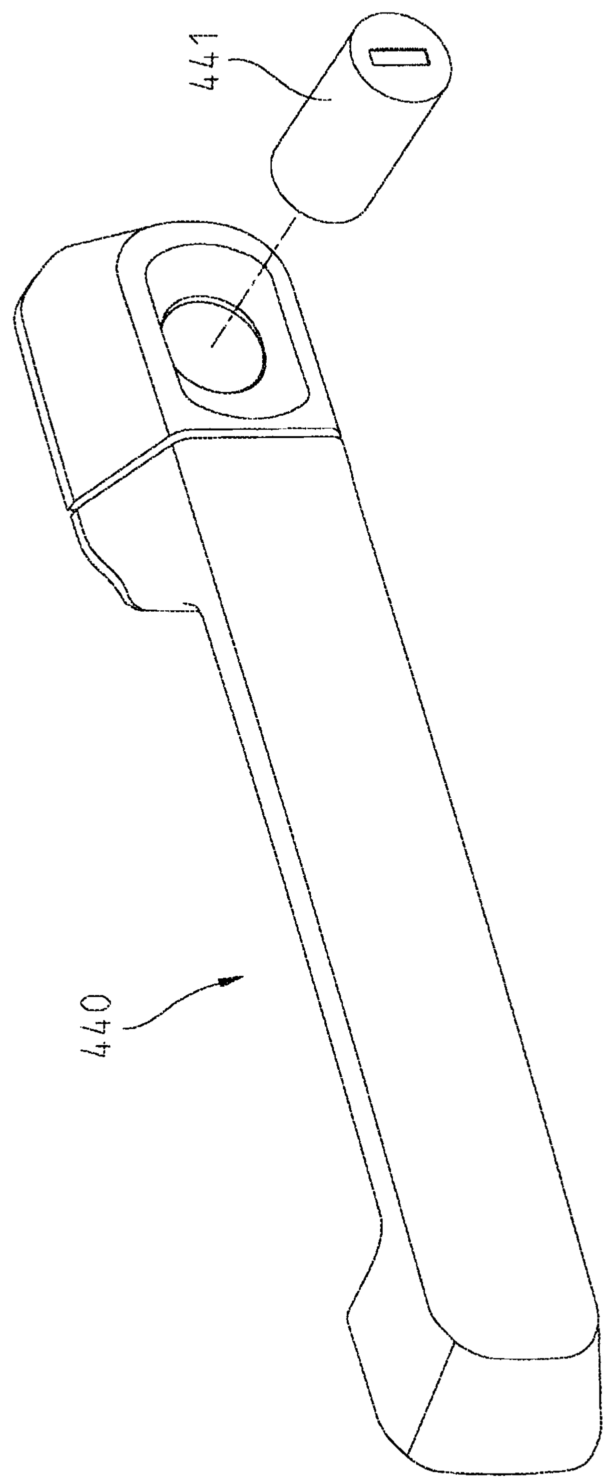
FIG. 59 shows an exploded perspective view of an exterior handle of the door of FIG. 54.
Figure 60:
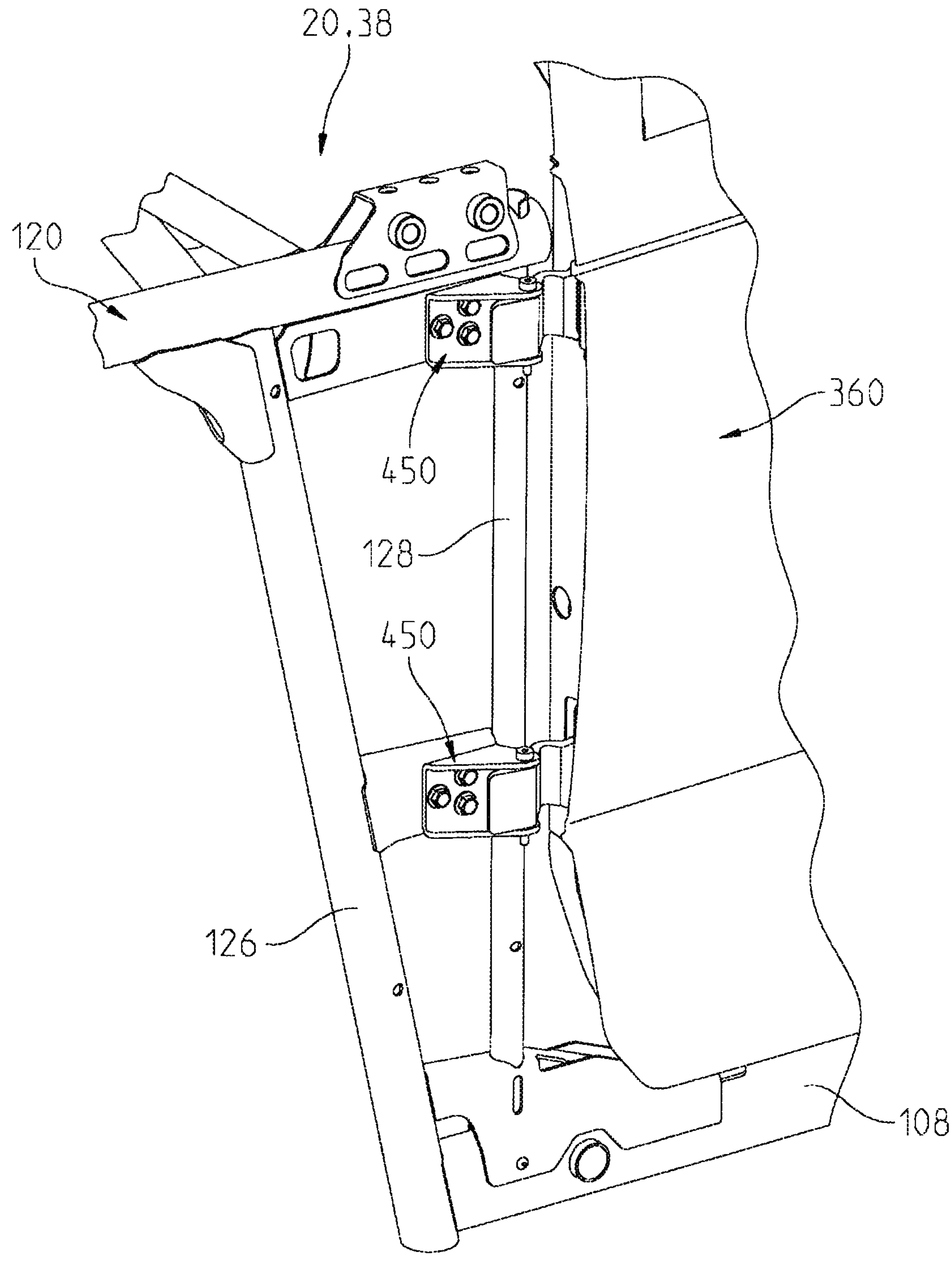
FIG. 60 shows a right front exterior perspective view of a hinge assembly for coupling the door of FIG. 54 to the lower frame portion of FIG. 15.
Figure 61:
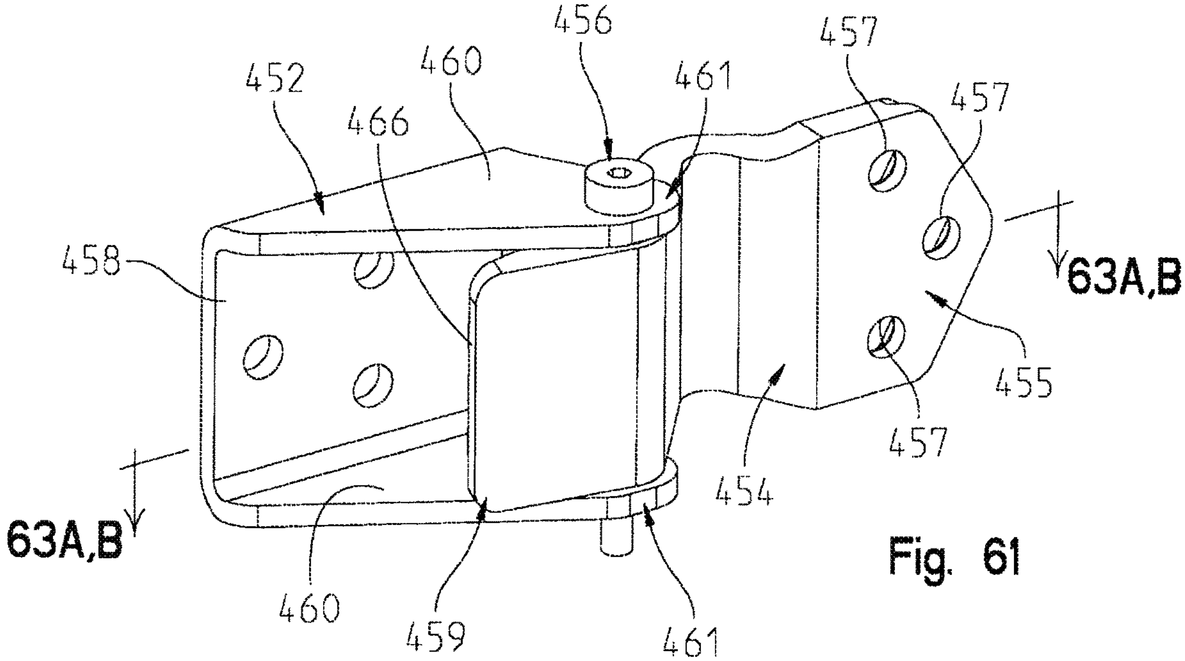
FIG. 61 shows an enlarged perspective view of the hinge assembly of FIG. 60.
Figure 62:
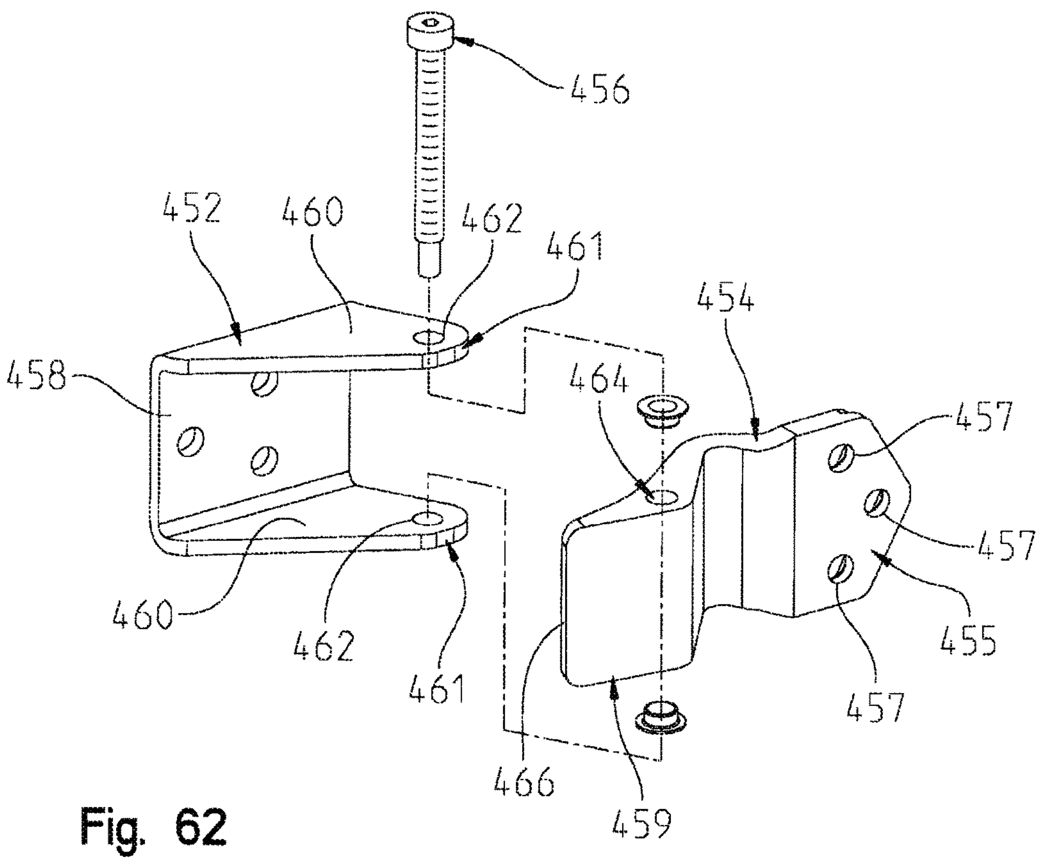
FIG. 62 shows an exploded view of the hinge assembly of FIG. 61.
Figure 63A:
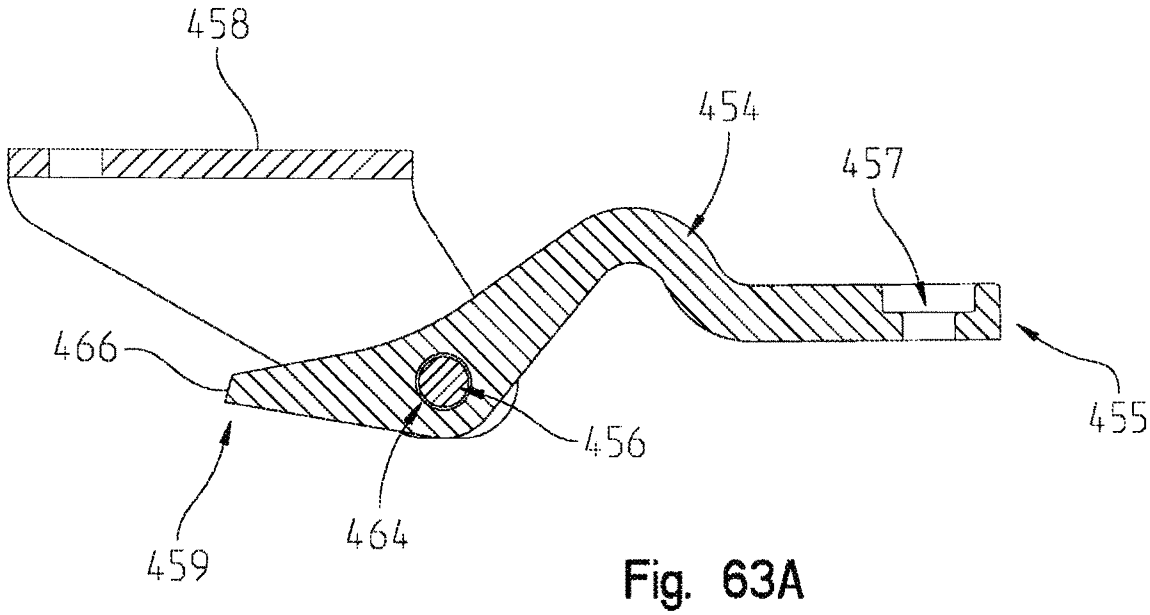
FIG. 63A shows a cross sectional view of the hinge assembly of FIG. 61 taken along line 63A, B of FIG. 61 in a fully open position.
Figure 63B:
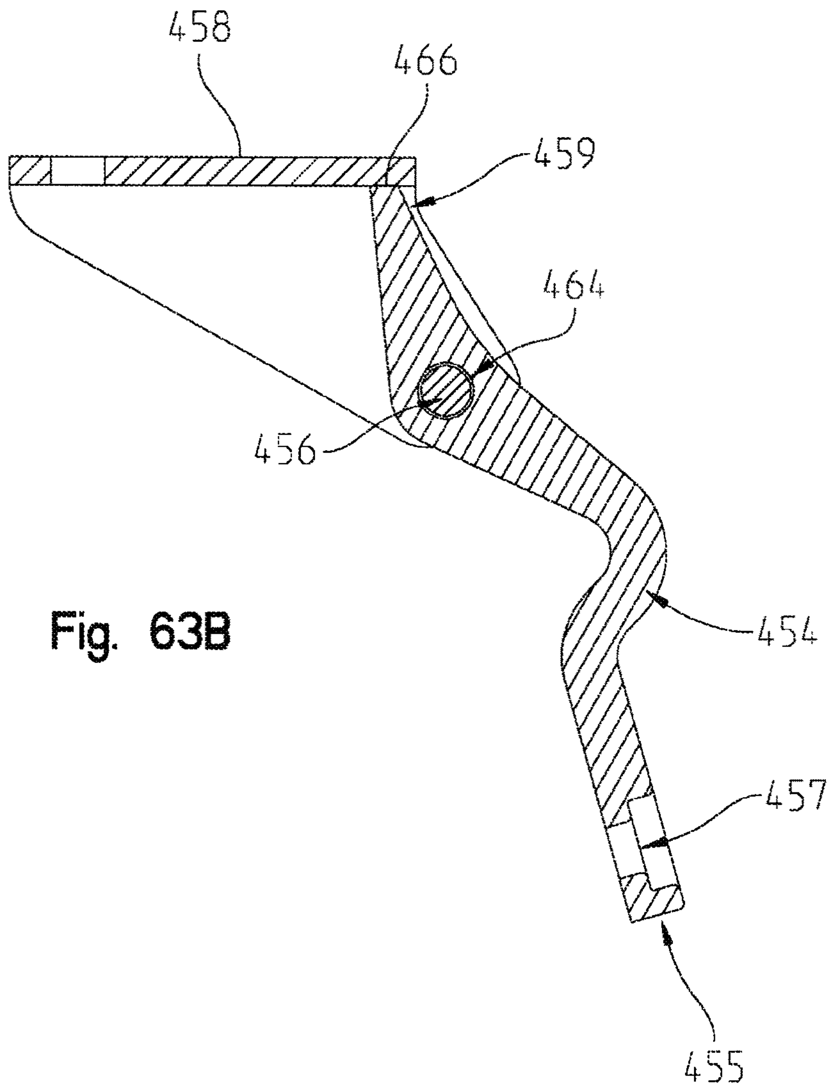
FIG. 63B shows a cross sectional view of the hinge assembly of FIG. 61 taken along line 63A, B of FIG. 61 in a closed position.

Referring to FIGS. 54 and 56, doors 360 generally further include a seal 416 along a perimeter of interior 414 of door 360 to allow door 360 to seal against body assembly 40 and/or frame 20 when in a closed position. In various embodiments, seal 416 is a continuous seal around the entire perimeter of interior 414 of door 360. Seal 416 generally includes a flat surface 418 coupled to door 360 with a rounded surface 420 extending from a lower portion 421 of flat surface 418 upward. A top end 422 of rounded surface 420 is coupled to a top end 423 of flat surface 418 by a connection (illustratively, Y-shaped) portion 424 positioned between flat portion 421 and rounded surface 420. A bottom end 425 of connection portion 424 is coupled adjacent a bottom end 426 of rounded surface 420. The shape of seal 416 allows body assembly 40 and/or frame 20 to contact seal 416 at an angle, such as 45 degrees, rather than head on when closing door 360, allowing seal 416 to conform between door 360 and body assembly 40 and/or frame 20 such that door 360 is properly sealed against body assembly 40 and/or frame 20 to substantially prevent air, water, and/or debris from entering and/or leaving an interior of vehicle 2. In various embodiments, seal 416 is coupled to door 360 via an adhesive or other non-invasive coupling mechanism.

With reference now to FIGS. 54 and 57-59, door 360 further includes an actuating mechanism 430 for opening door 360 and/or latching door 360 closed. Actuating mechanism 430 generally includes an interior mechanism 432, an exterior mechanism 434, and a latching mechanism 436. Interior mechanism 432 generally includes an actuating handle 438, and a mechanical or hydraulic line 439 coupling actuating handle 438 to latching mechanism 436. Exterior mechanism 434 generally includes an actuating handle 440, a mechanical or hydraulic line 442 coupling actuating handle 440 to latching mechanism 436, and a locking cylinder 441 (FIG. 59) configured to disengage line 442 from latching mechanism 436. In various embodiments, locking cylinder 441 may be a removable cylinder such that locking cylinders 441 on all doors 360 may be exchanged to be the same whereby one key, which may be the same key used to start vehicle 2, would work for all locking cylinders 441.

Latching mechanism 436 generally includes a latch 444 coupled to frame 20 of vehicle 2, a latch catching mechanism 445 having a first latch catching plate 446 and a second latch catching plate 447 coupled to door 360 and configured to engage one another to latch onto or catch around a post 443 of latch 444, and a lever 448 (FIG. 57) configured to engage rotation of first latch plate 446 and/or second latch plate 447. First latch catching plate 446 includes an opening 449 configured to be operably coupled to line 442 of exterior mechanism 434 such that actuation of actuating handle 440 results in rotation of first latch catching plate 446 and/or second latch catching plate 447 to release latch catching mechanism 445 from around post 443 of latch 444 whereby door 360 may be opened. Lever 448 is operably engaged with first latch catching plate 446 such that actuation of actuating handle 438 of interior mechanism 432 results in rotation of lever 448 causing rotation of first latch catching plate 446 and/or second latch catching plate 447 to release latch catching mechanism 445 from around post 443 of latch 444 whereby door 360 may be opened. As such, interior mechanism 432 and exterior mechanism 434 are independent of one another meaning interior mechanism 432 may actuate latching mechanism 436 when exterior mechanism 434 is locked or disabled.

Referring now to FIGS. 60-63B, any and/or all doors 360 may be coupled to frame 20 via at least one hinge assembly 450, illustratively two hinge assemblies 450. Hinge assembly 450 generally includes a bracket 452 (illustratively, U-shaped) configured to be coupled to frame 20, a coupling plate 454 configured to be coupled to door 360, and a coupler 456 coupling plate 454 to bracket 452. Bracket 452 generally includes a base 458 and two side plate 460 extending from base 458, where base 458 is configured to be coupled to frame 20 and ends 461 of side plates 460 including openings 462 configured to receive coupler 456. Coupling plate 454 generally includes a first end 455 having openings 457 configured to receive couplers (not shown) for coupling plate 454 to door 360, an opening 464 extending down through plate 454 and configured to receive coupler 456, and a second end 459 having an angled surface 466 configured to abut base 458 of bracket 452 to stop door 360 from over-extending when opening. In various embodiments, angled surface 466 is angled such that door 360 may be limited to a specific degree of opening such as between 75-95 degrees. However, it should be noted that the specific degree of opening may be larger if an exterior surface of vehicle 2 is further from the hinge assembly 450. Furthermore, in various embodiments, hinge assembly 450 may include an isolator (not shown) to dampen the stop of door 360 when opened. In various embodiments, door 360 may further include a removable exterior body panel (not shown) coupled to lower body portion 400 configured to conceal hinge assembly 450 and latching mechanism 436 provided in an interior of door 360. Actuating handle 440 of exterior mechanism 434 of latching mechanism 436 is configured to be removable such that when actuating handle 440 is removed, removable exterior body panel may also be removed from door 360.

Figure 64:
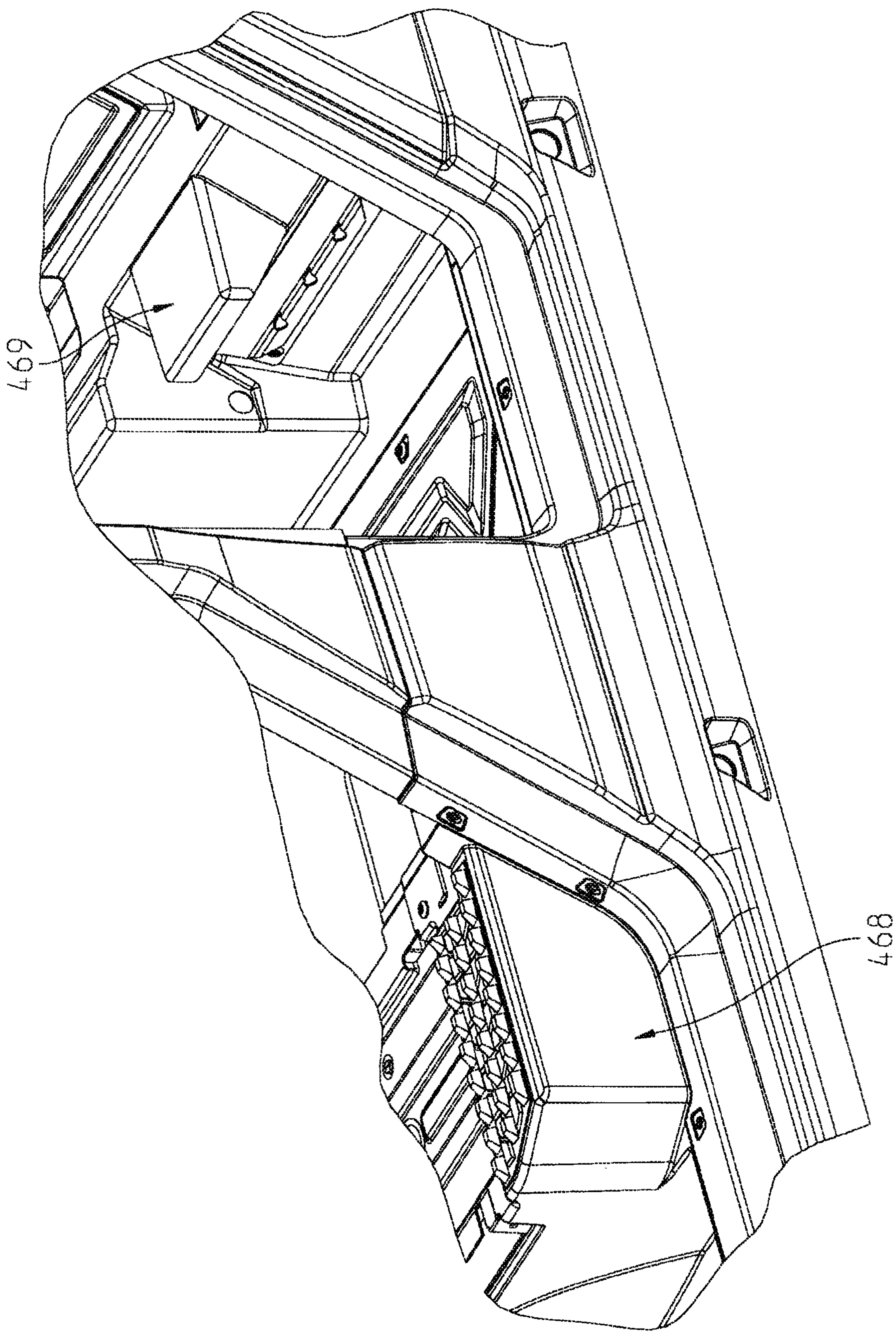
FIG. 64 shows an enlarged front left perspective view of an interior of the vehicle of FIG. 1 with the door removed, where the interior includes a first step adjacent a driver or passenger seat of the vehicle of FIG. 1 and a second step adjacent a rear passenger seat of the vehicle of FIG. 1.
Figure 65:
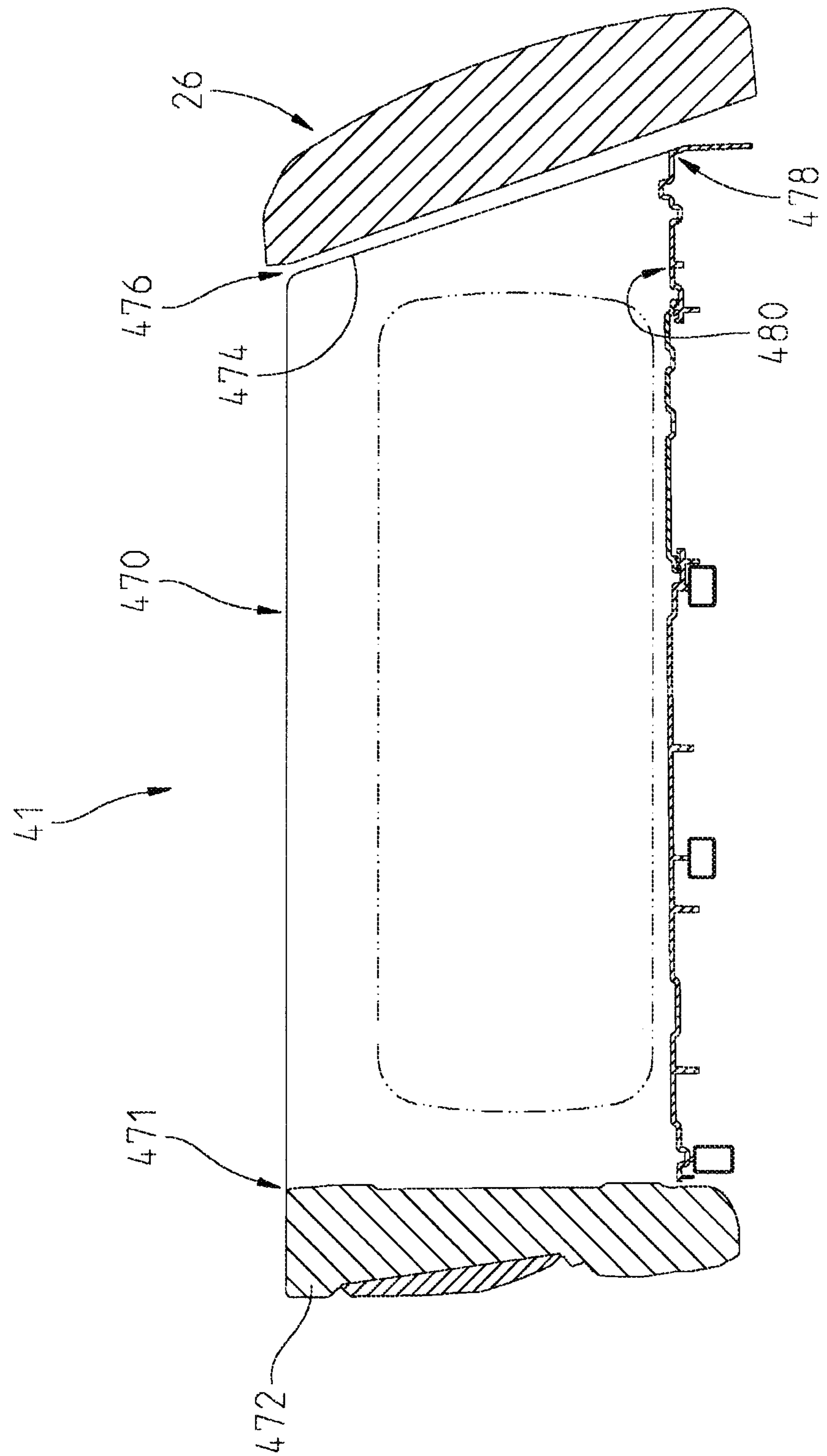
FIG. 65 shows a cross sectional view of a cargo area of the vehicle of FIG. 1 taken along line 65-65 of FIG. 3, where the cargo area includes a bed and a tailgate.
Figure 66:
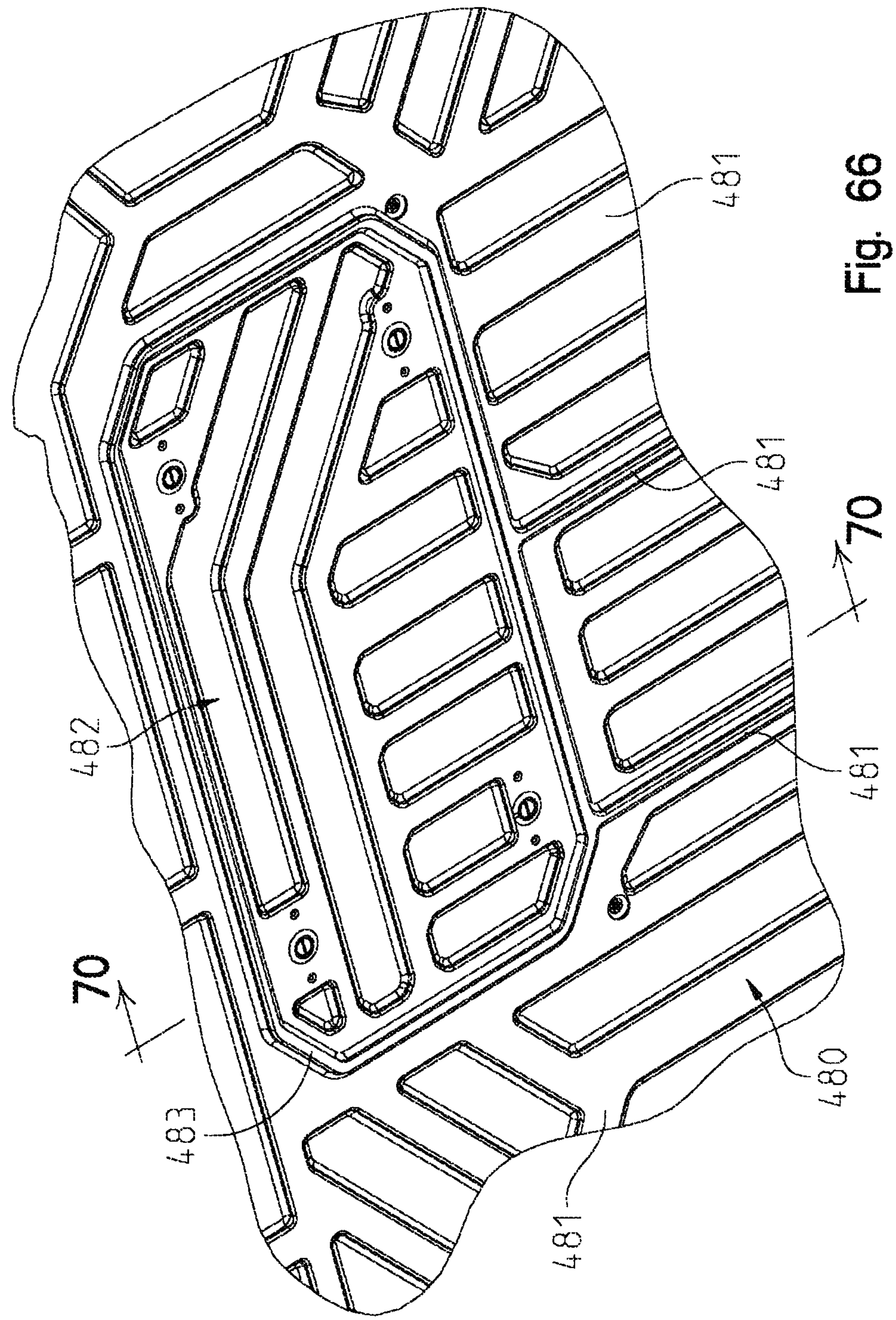
FIG. 66 shows an enlarged top perspective view of a floor of a bed of the cargo area of FIG. 65, where the floor includes an access panel.
Figure 67:
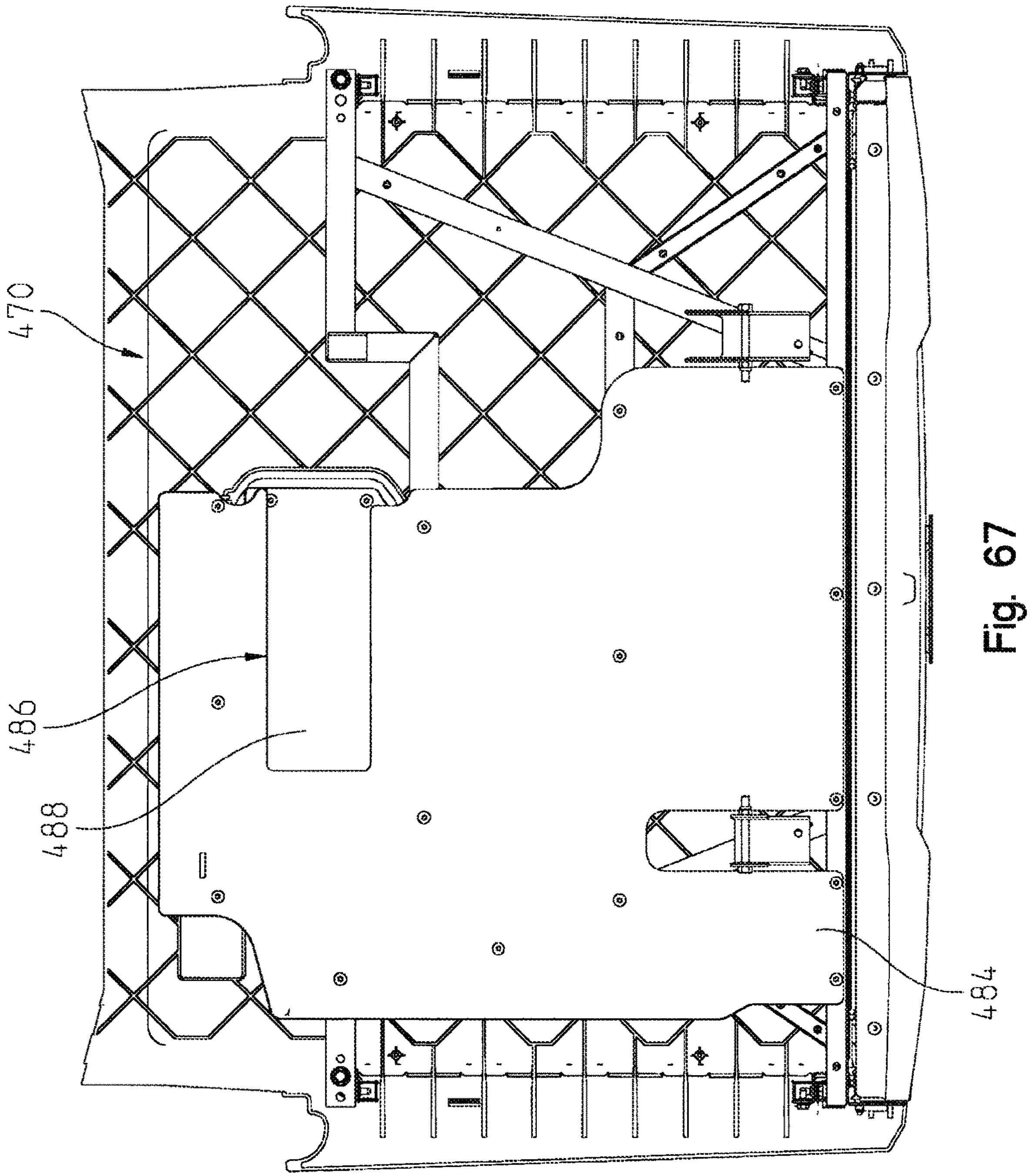
FIG. 67 shows a bottom plan view of the bed of the cargo area of FIG. 65, where the bed includes a shield positioned below the floor of the bed.
Figure 68:
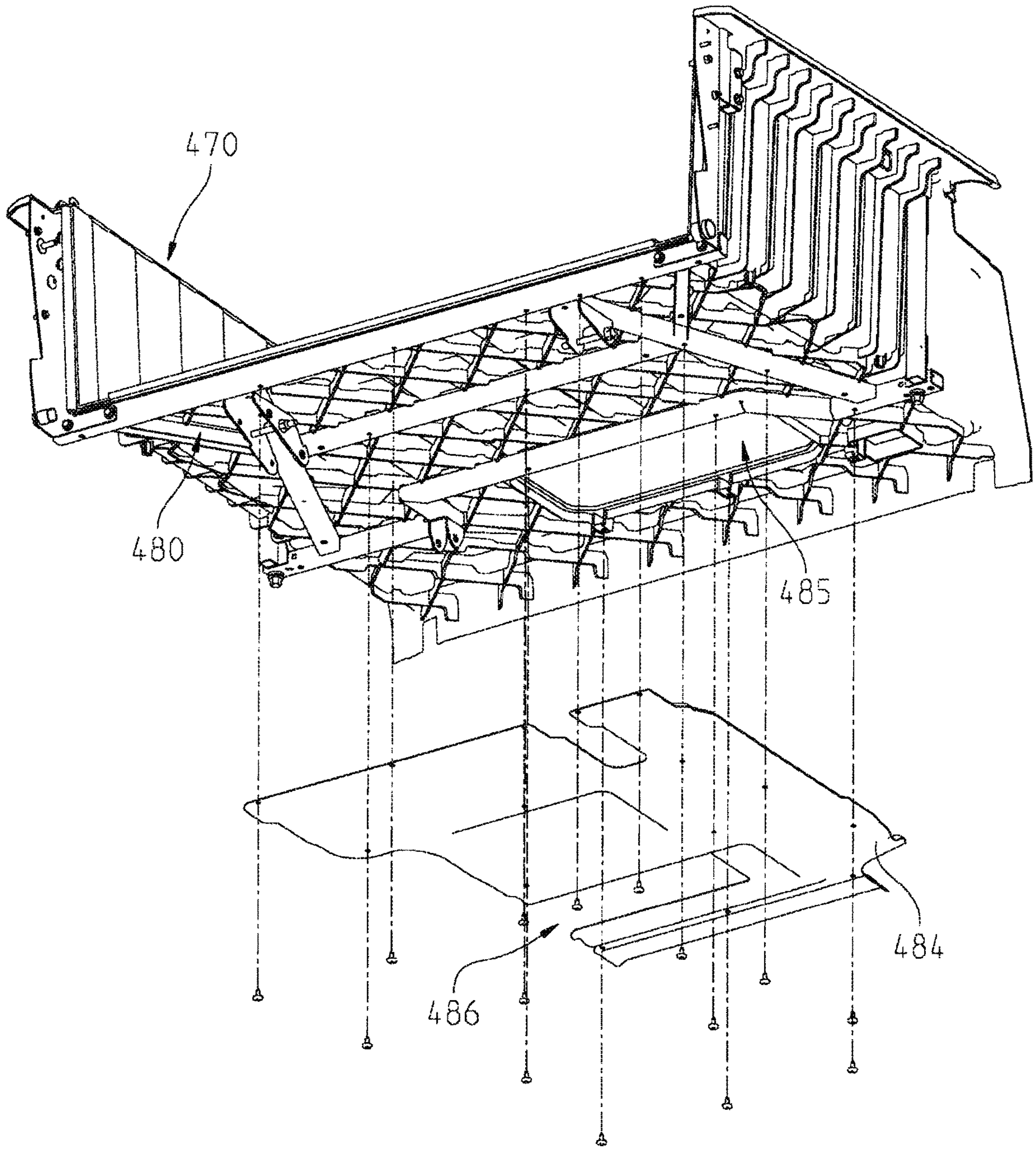
FIG. 68 shows an exploded perspective view of the bed and the shield of FIG. 67.
Figure 69:
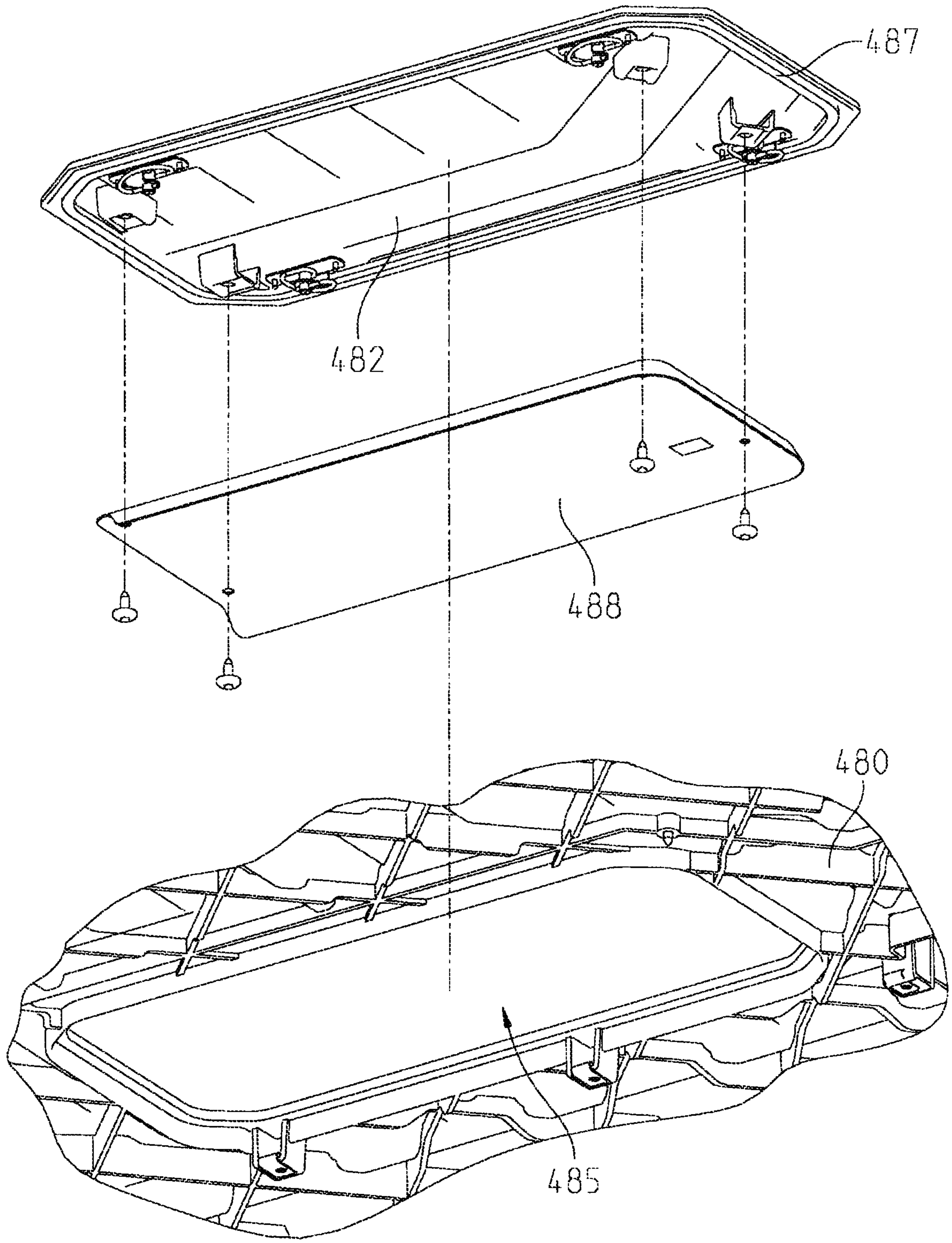
FIG. 69 shows an enlarged exploded view of the access panel and the floor of the bed of FIG. 66 and a portion of the shield of FIG. 67.
Figure 70:
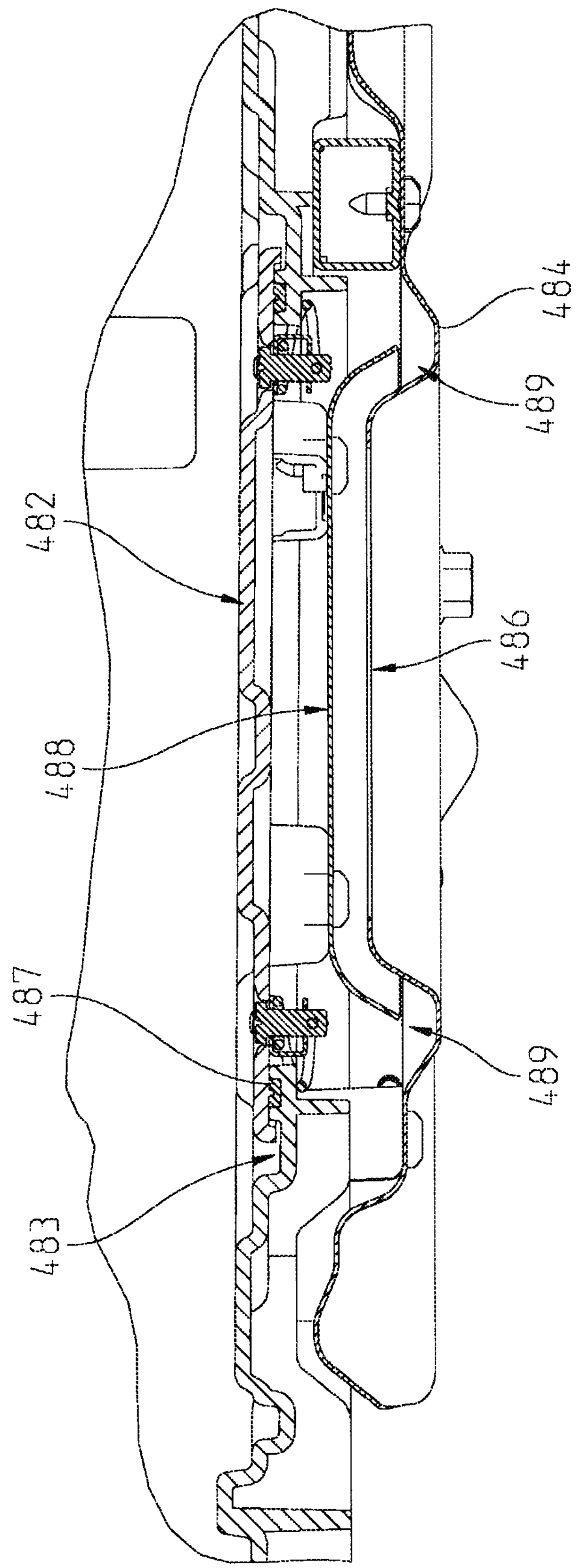
FIG. 70 shows a cross sectional view of the bed and the shield of FIG. 66 taken along line 70-70 of FIG. 66.

With reference now to FIG. 64, in various embodiments, vehicle 2 may include at least one step 468, 469 inside door 360 and adjacent seating area 26. Steps 468, 469 allow for a driver and/or a passenger of vehicle 2 to access an upper portion of vehicle 2 and/or allow easier ingress and egress for a driver and/or a passenger of vehicle 2. In various embodiments, vehicle 2 includes a first step 468 positioned between one of doors 360 and driver's seat 28 or passenger seat 30 and a second step 469 position beside or below rear passenger seat 32. First step 468 and/or second step 469 may include a tread to provide additional support and/or traction to the driver and/or passenger during use. Steps or tread panels also may be provided external to door 360 to facilitate egress and ingress. Further, in some embodiments, first step 468 or second step 469 are integrated into body assembly 40, driver's seat 28 or passenger seat 30. In various embodiments, second step 469 may act as a support structure for rear seat 32 and be positioned so that the upper surface of second step 469 contacts a lower portion of rear seat 32 when rear seat 32 is in a lowered position.

Referring now to FIGS. 65-75, cargo area 41 will be described in further detail. Cargo area 41 generally includes a bed 470 positioned rearward of seating area 26 and a tailgate 472 movably coupled relative to a rear end 471 of bed 470. In various embodiments, bed 470 may include an angled front wall 474 (FIG. 65) adjacent seating area 26, where an upper end 476 of angled front wall 474 is rearward of a lower end 478 of angled front wall 474. Angled front wall 474 is configured to allow a full-size tire for vehicle 2 to be placed within bed 470. In other various embodiments, bed 470 may be separated from seating area 26 via seat back 334 only, as discussed above, and seat back 334 may be angled similar to front wall 474 such that a full-size tire may be placed within bed 470.

With reference to FIGS. 66-70, a floor 480 of bed 470 generally includes various drainage channels 481 configured to route any fluid and/or debris within bed 470 towards corners of tailgate 472 such that the fluid and/or debris is routed away from any heat source(s) of vehicle 2. More particularly, at least a portion of powertrain assembly 509, including an engine, may be positioned below a portion of floor 480 and, because the engine is a significant heat source of vehicle 2, channels 481 route fluid away from at least the engine. In various embodiments, floor 480 of bed 470 may further include an access panel 482 positioned within an opening 485 in floor 480 and configured to allow access to components of vehicle 2 below bed 470. Access panel 482 is generally coupled with floor 480 of bed 470 over opening 485 in a sealed manner via seal 487 (FIG. 70), and floor 480 generally includes a U-shaped channel 483 surrounding panel 482 for routing any fluid and/or debris away from panel 482 towards tail gate 472. In various embodiments, vehicle 2 further includes a shield 484 positioned below floor 480 of bed 470 to provide heat protection to bed 470. When access panel 482 is provided, shield 484 includes an indentation or opening 486 covered by a separate access shield 488 positioned directly below access panel 482 such that components below bed 470 and shield 484 may still be accessed through bed 470 and shield 484 when access panel 484 and access shield 488 are removed. Shield 484 includes routings 489 which are configured to route debris and/or fluids away from components of vehicle 2 below bed 470.

Figure 71:
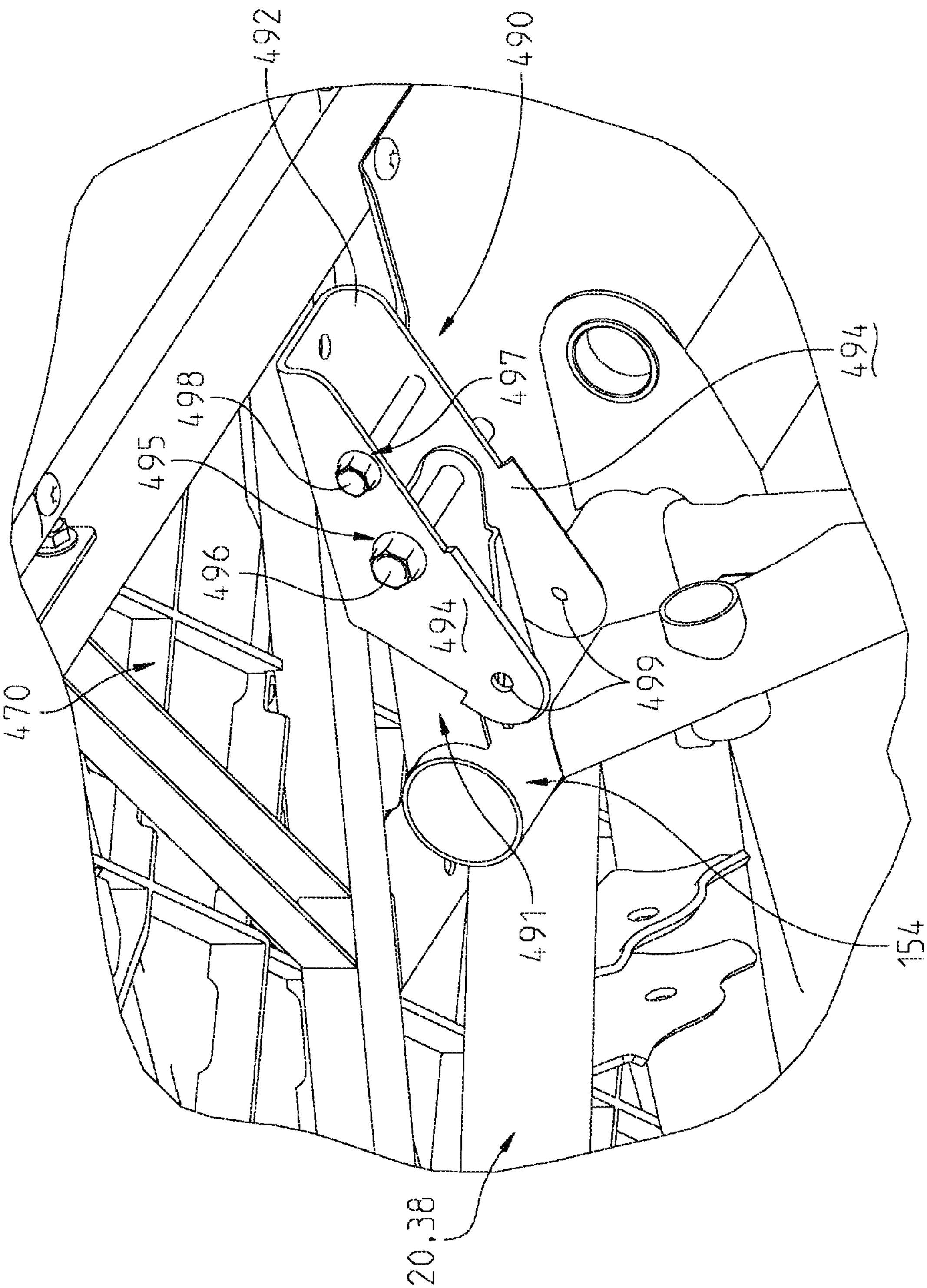
FIG. 71 shows an enlarged left rear perspective view of a limit bracket of the bed of the cargo area of FIG. 66.
Figure 72:
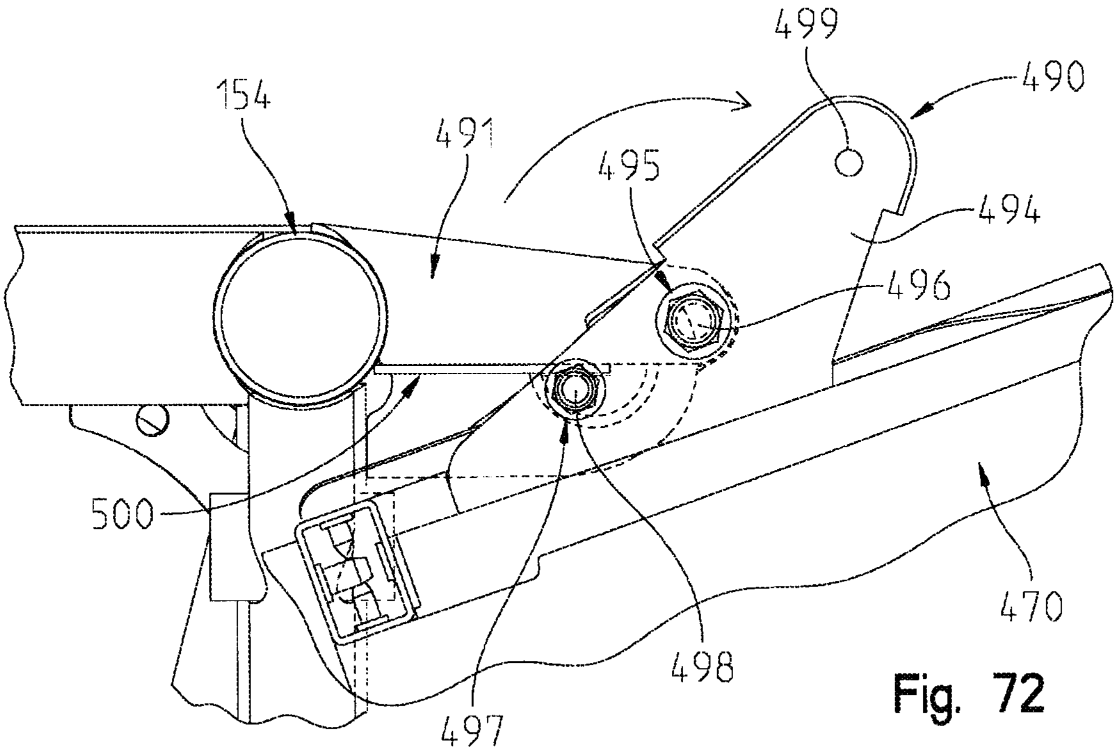
FIG. 72 shows a side elevational view of the limit bracket of FIG. 71 in an overextension limit configuration.
Figure 73:
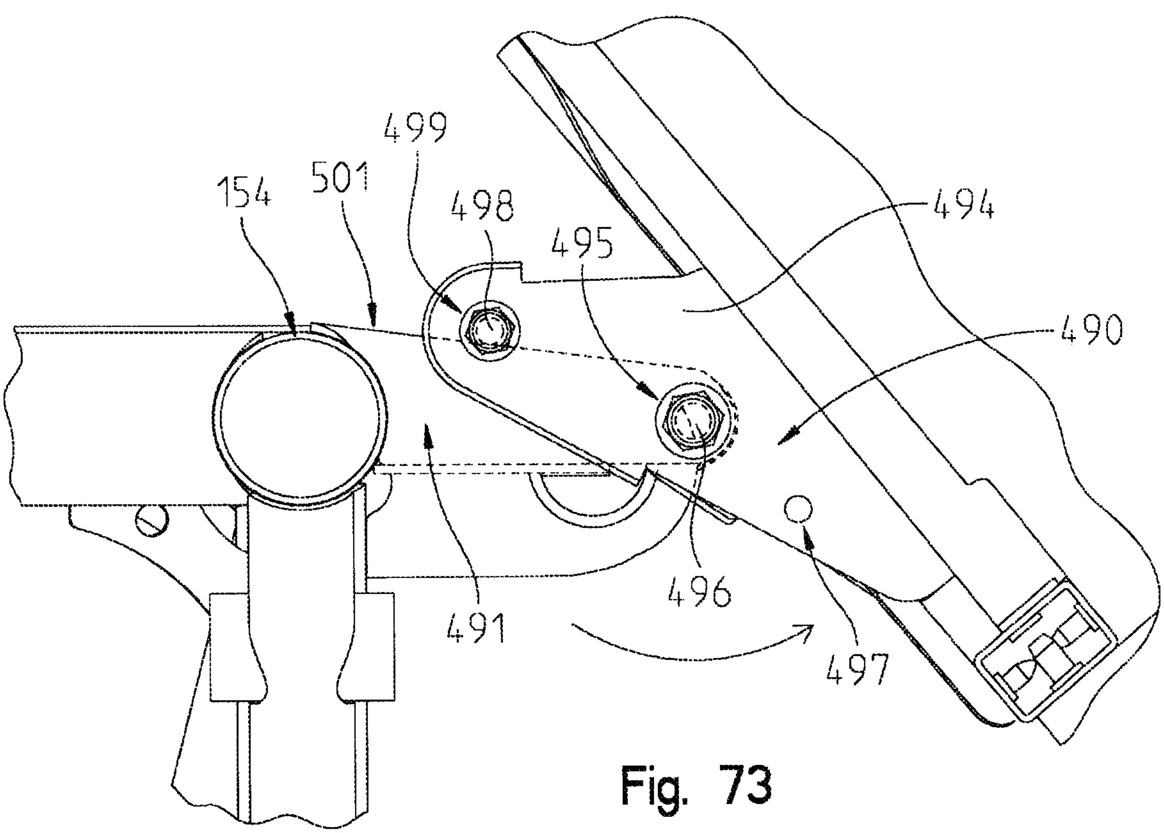
FIG. 73 shows a side elevational view of the limit bracket of FIG. 71 in a hold open configuration.

Referring now to FIGS. 71-73, in various embodiments, bed 470 may be fixedly coupled to frame 20, while in other various embodiments, bed 470 may be tiltable relative to frame 20. When bed 470 is tiltable relative to frame 20, a limit bracket 490 is provided and configured to limit rearward motion of bed 470 (FIG. 72) to an overextension position and hold bed 470 in an open position for servicing components below bed 470 (FIG. 73). Limit bracket 490 is generally coupled to lower frame portion 38, illustratively a bracket 491 coupled to horizontally-extending frame member 154, and generally includes a base 492 with two triangular-shaped arms 494 extending down from base 492, where base 492 and arms 494 are formed as an single, integral component. Each triangular-shaped arm 494 includes a first opening 495 configured to receive a coupler 496 for coupling limit bracket 490 to lower frame portion 38, a second opening 497 configured to receive a coupler 498 for limiting rearward motion and a third opening 499 configured to receive coupler 498 for holding bed 470 in the open configuration for servicing components below bed 470. When coupler 498 is received within second openings 497, bed 470 is limited from further rearward rotation when coupler 497 engages a lower surface 500 of bracket 491 (see FIG. 72). When coupler 498 is received within third openings 499 once third openings 499 have been rotated above bracket 491, bed 470 is held in the open configuration when coupler 498 engages an upper surface 501 of bracket 491 (see FIG. 73).

Figures 74, 75:
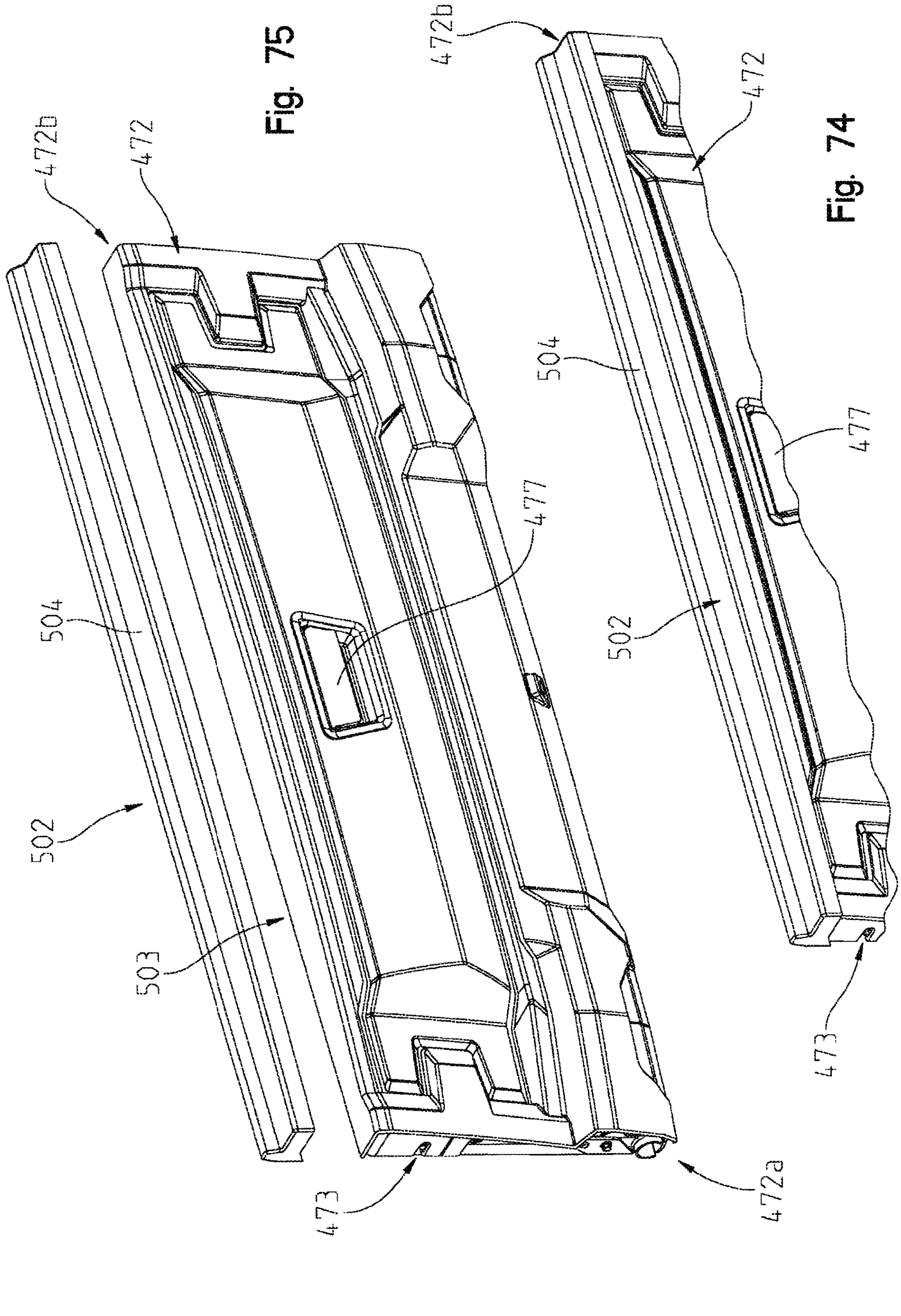
FIG. 74 shows an enlarged left rear perspective view of a top the tailgate of the cargo area of FIG. 65, where the tailgate includes a removable cap.
FIG. 75 shows an enlarged exploded rear perspective view of the top of the tailgate of FIG. 74.

With reference now to FIGS. 74 and 75, tailgate 472 is generally coupled to bed 470 at a lower end **472*a* of tailgate 472 and at an upper end 472*b* when tailgate 472 is closed via rotary latches 473, which are actuatable via handle 477 to open tailgate 472. In various embodiments, tailgate 472 may include a removable cap 502 along an upper surface 503 of tailgate 472. Removable cap 502 provides a sealing surface 504 configured to allow sealing engagement between tailgate 472 and rear window 364 of cargo area body assembly 359**, when provided.

Referring now to FIGS. 76-92, vehicle 2 further includes a powertrain 509 having an engine 510, a transmission 512 (FIG. 92), illustratively a continuously variable transmission ("CVT"), operably coupled to engine 510, and a drive train (not shown) operably coupled to engine 510 and/or transmission 512.

Figure 85:
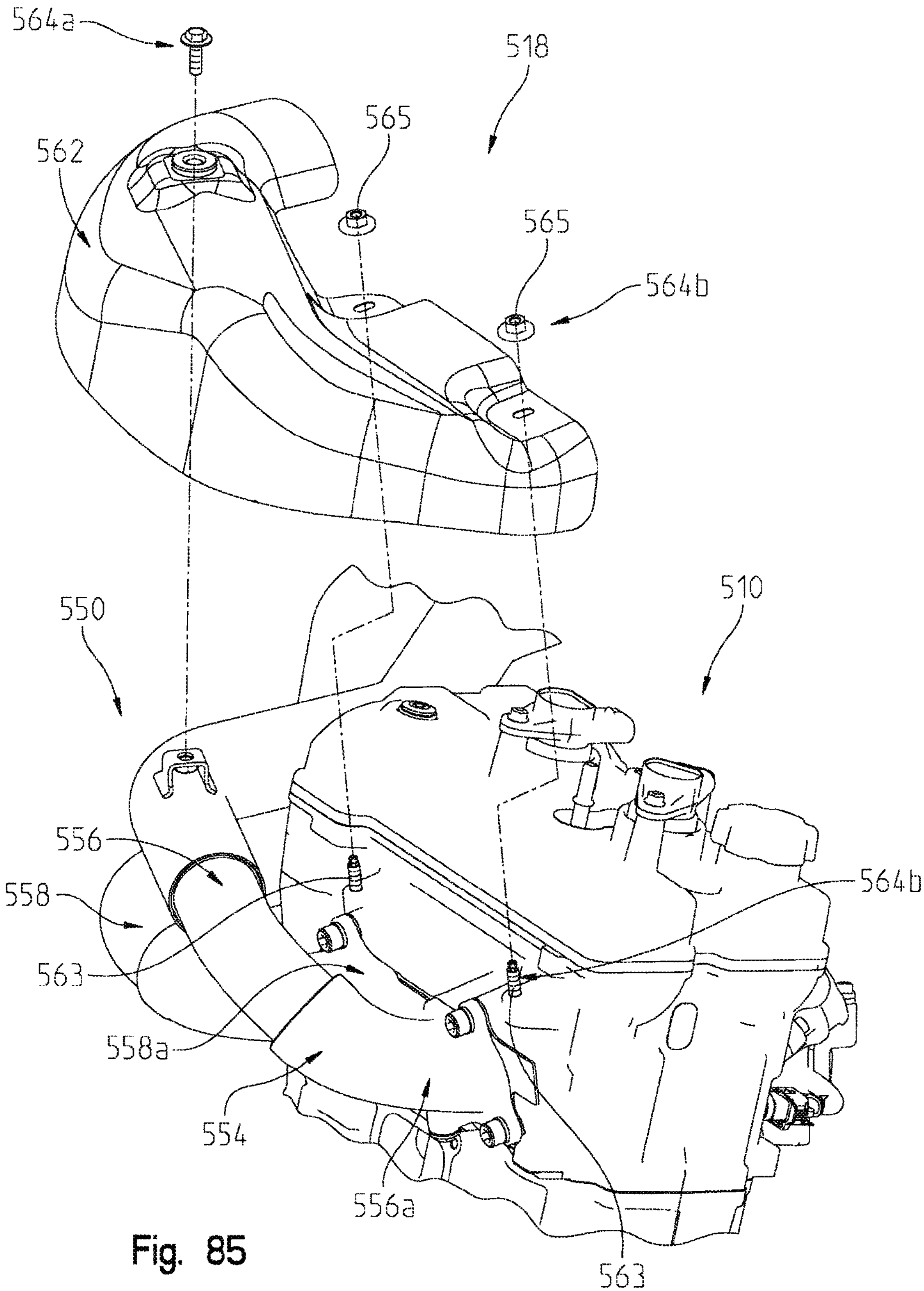
FIG. 85 shows an exploded front left perspective view of the engine and the portion of the exhaust assembly of FIG. 84.
Figure 86:
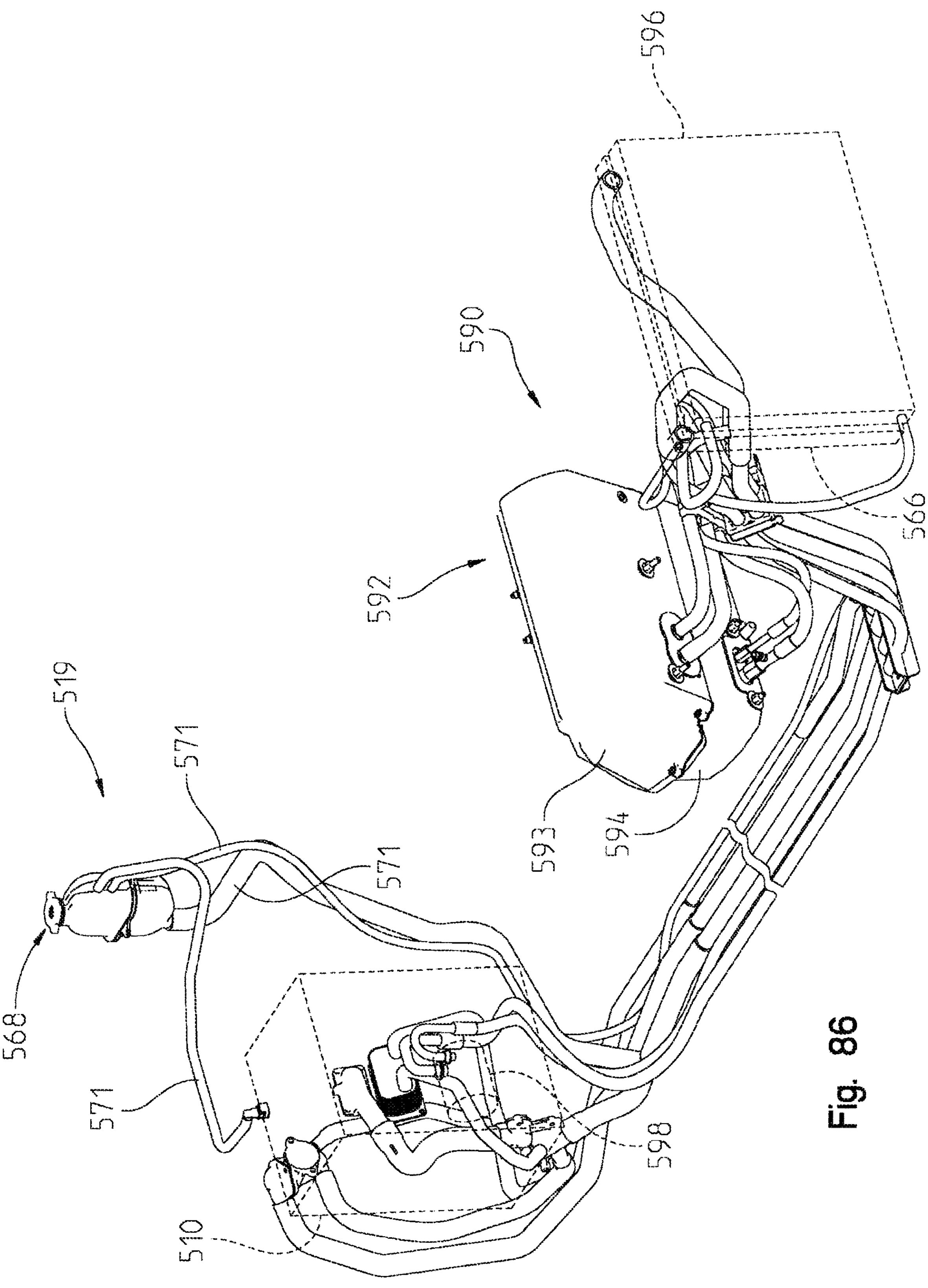
FIG. 86 shows a front right perspective view of a cooling assembly and a portion of a heating, ventilation, and air conditioning ("HVAC") system of the present disclosure.
Figure 87:
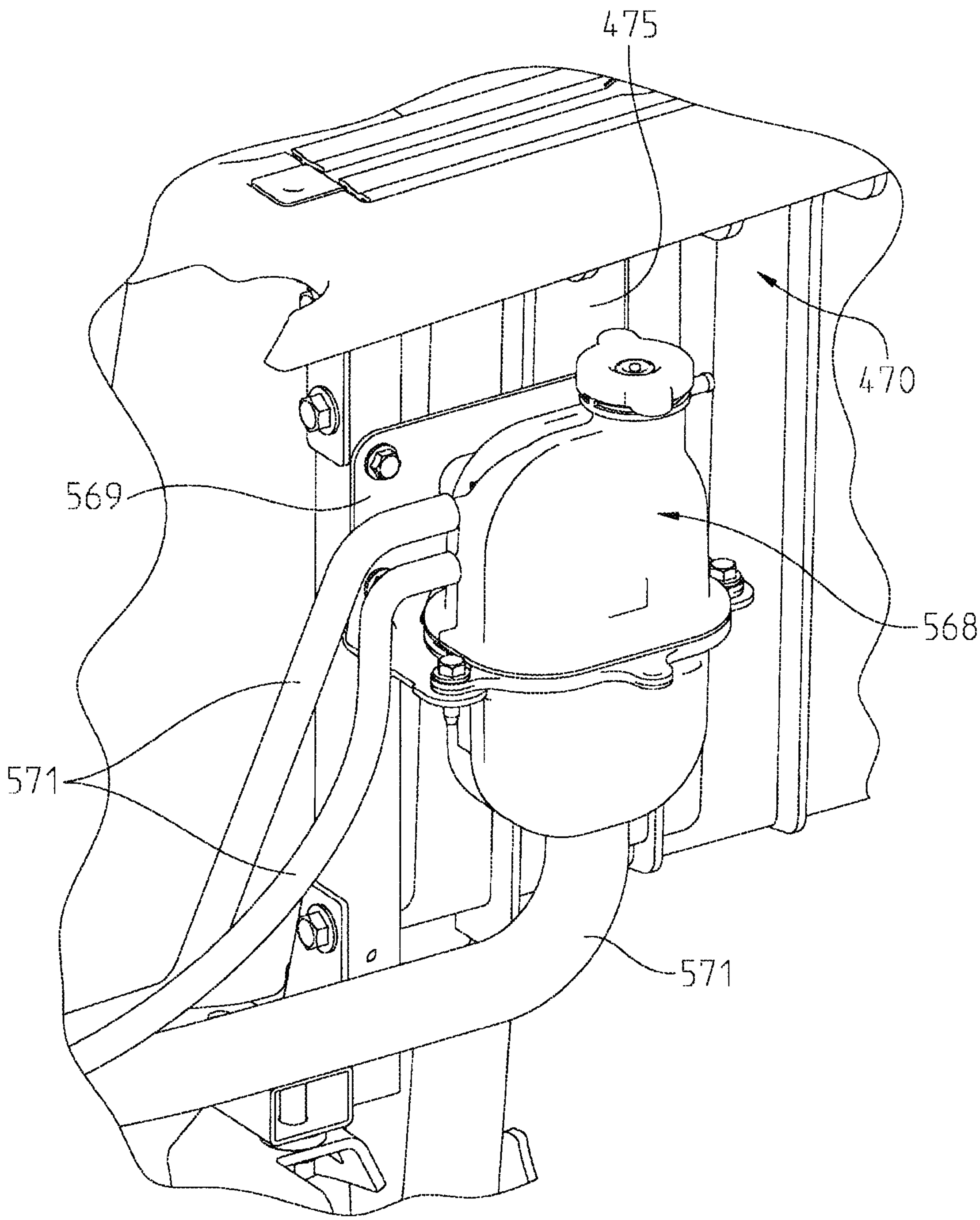
FIG. 87 shows a perspective view of a first embodiment of a coolant bottle of the cooling assembly of FIG. 86 coupled to a bed of a cargo area of the vehicle of FIG. 1 when the bed is fixed relative to a frame of the vehicle of FIG. 1.
Figure 88:
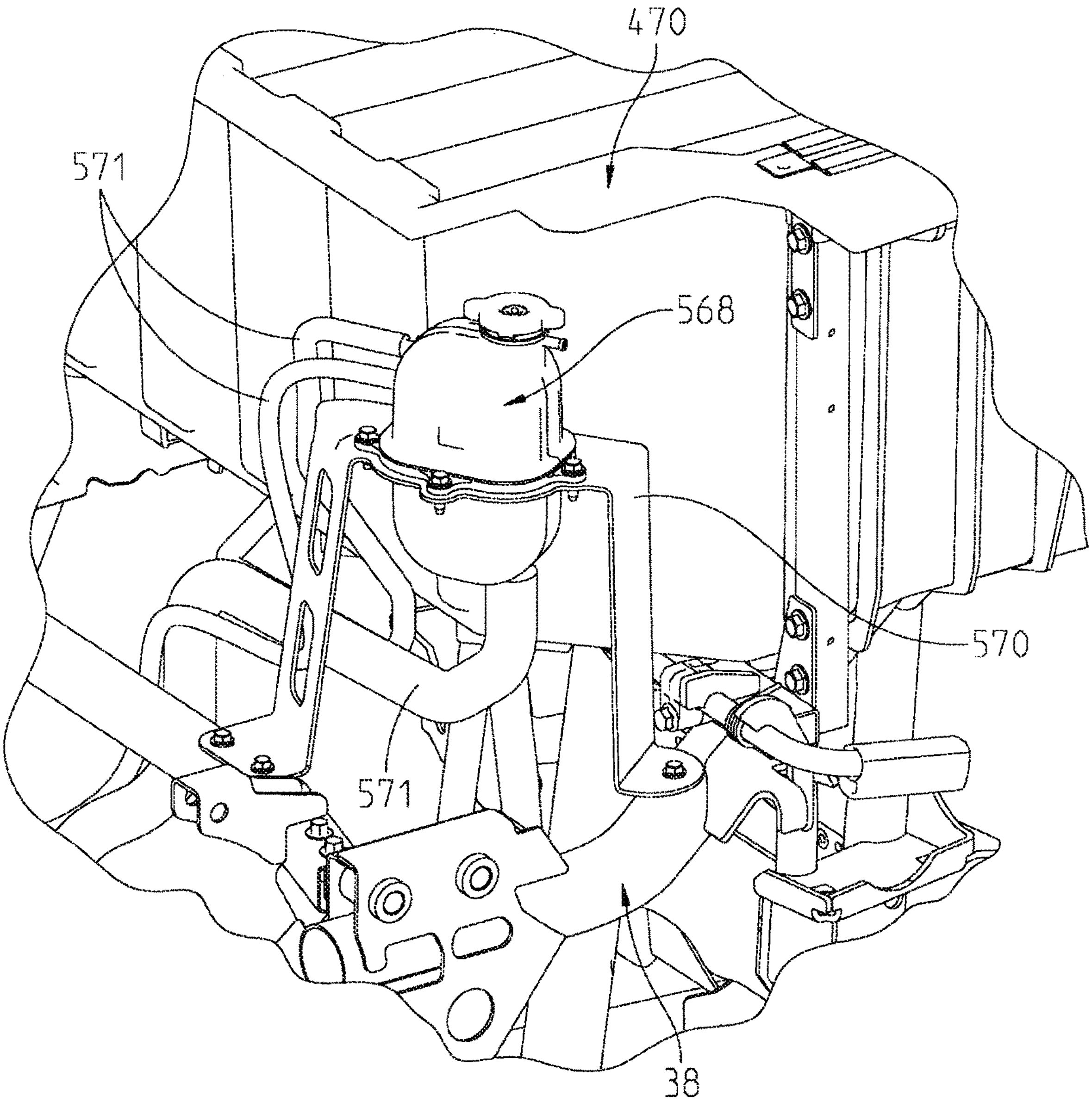
FIG. 88 shows a perspective view of a second embodiment of a coolant bottle of the cooling assembly of FIG. 86 coupled to a frame of the vehicle of FIG. 1 between a seating area and a bed of the vehicle of FIG. 1 when the bed is tiltable relative to a frame of the vehicle of FIG. 1.

Referring to FIGS. 76-88, engine 510 generally includes an intake assembly 516 for providing cool air to engine 510 (FIGS. 76-83), an exhaust assembly 518 for routing exhaust from engine 510 out of and away from vehicle 2 (FIGS. 84 and 85), and a cooling assembly 519 for providing coolant to engine 510 to transfer heat and prevent engine damage (FIG. 86-88). Intake assembly 516 generally includes an intake port 520, an acoustical attenuation device 522, a first intake duct 524 extending between intake port 520 and acoustical attenuation device 522, an air filter 526, a second intake duct 528 extending between acoustical attenuation device 522 and air filter assembly 526, and a third intake duct 530 extending between air filter assembly 526 and an air box 531 and/or engine 510. In various embodiments, intake assembly 516 extends across vehicle 2 from one side to the other. Acoustical attenuation device 522 is generally configured to reduce overall noise caused by intake assembly 516, and is generally positioned forward of engine 510 and rearward of seating area 26. In various embodiments, acoustical attenuation device 522 may be a blow-molded component, such a baffle box or a passive duct acoustical attenuation device, such as a quarter wave duct tube, explained in further detail below.

Figure 79:
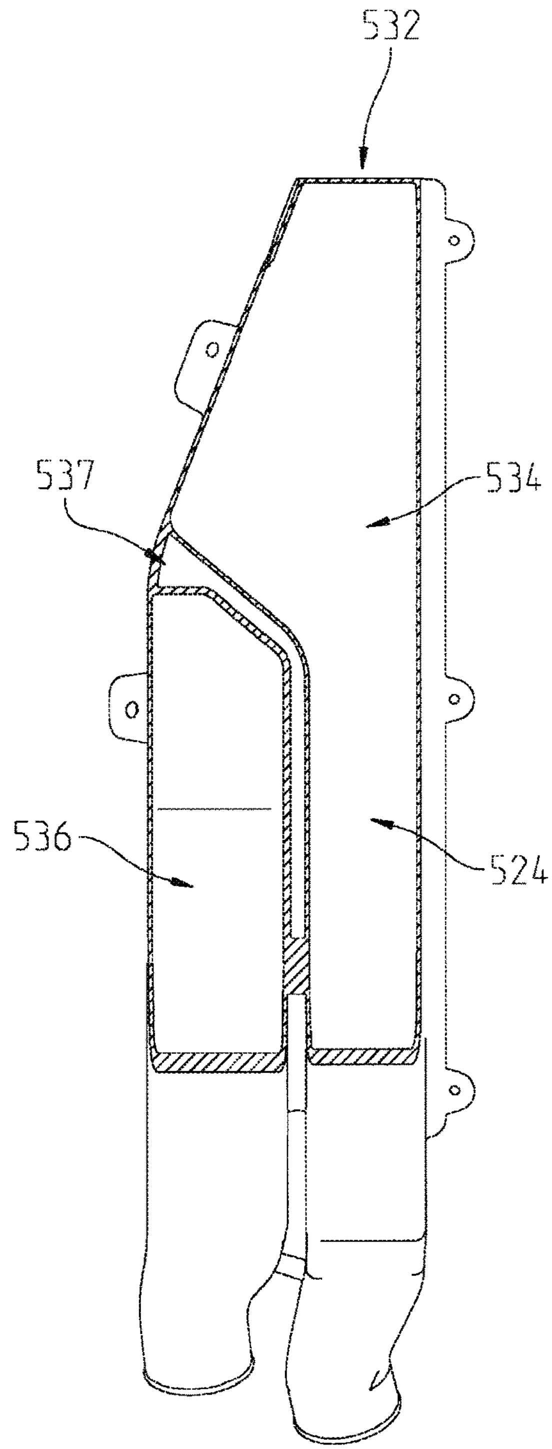
FIG. 79 shows a cross sectional view of the ducting component of FIG. 78.

In various embodiments, powertrain 509 further includes a ducting component 532 coupled to frame 20. Ducting component 532 generally includes a first portion 534 housing intake port 520 and at least a portion of first intake duct 524 of intake assembly 516, and a second portion 536 housing a portion of exhaust assembly 581 (FIG. 76) of transmission 512 or a portion of intake assembly 603 of HVAC system 590 (FIG. 80), described in further detail below, where first portion 534 is spaced apart from second portion 536 by a gap 537 (FIG. 79). In various embodiments, ducting component 532 is a blow molded component.

Intake port 520 of ducting component 532 is generally positioned vertically higher than exhaust port 591 of transmission 512 or intake port 607 of intake assembly 603, and includes a cover 533 spaced apart from an edge 535 of intake port 520 to provide an intake channel 539 between cover 533 and edge 535. In various embodiments, intake port 520 includes a screen (not shown) across intake channel 539. Cover 533 and the screen positioned across intake channel 539 prevent debris from entering intake assembly 516 and engine 510. In various embodiments, first portion 534 is positioned forward of second portion 536. With first portion 534 positioned forward of second portion 536 and intake port 520 positioned vertically higher than exhaust port 591 of transmission 512 when exhaust from transmission 512 is routed out via ducting component 532, engine 510 is able to draw fresh cool air in while exhaust air from transmission 512 may be blown out from exhaust port 591, thus preventing exhaust air from transmission 512 from mixing with fresh air provided to engine intake assembly 516. Ducting component 532 is generally coupled to cab frame 36 such that intake port 520 is positioned vertically higher than an uppermost portion of seats 28, 30, and 32. In various embodiments, ducting component 532 is coupled to downwardly-extending portions 48 or 50 of cab frame 36 at a height vertically higher than an uppermost extent of seats 28, 30 and/or 32.

Figure 82:
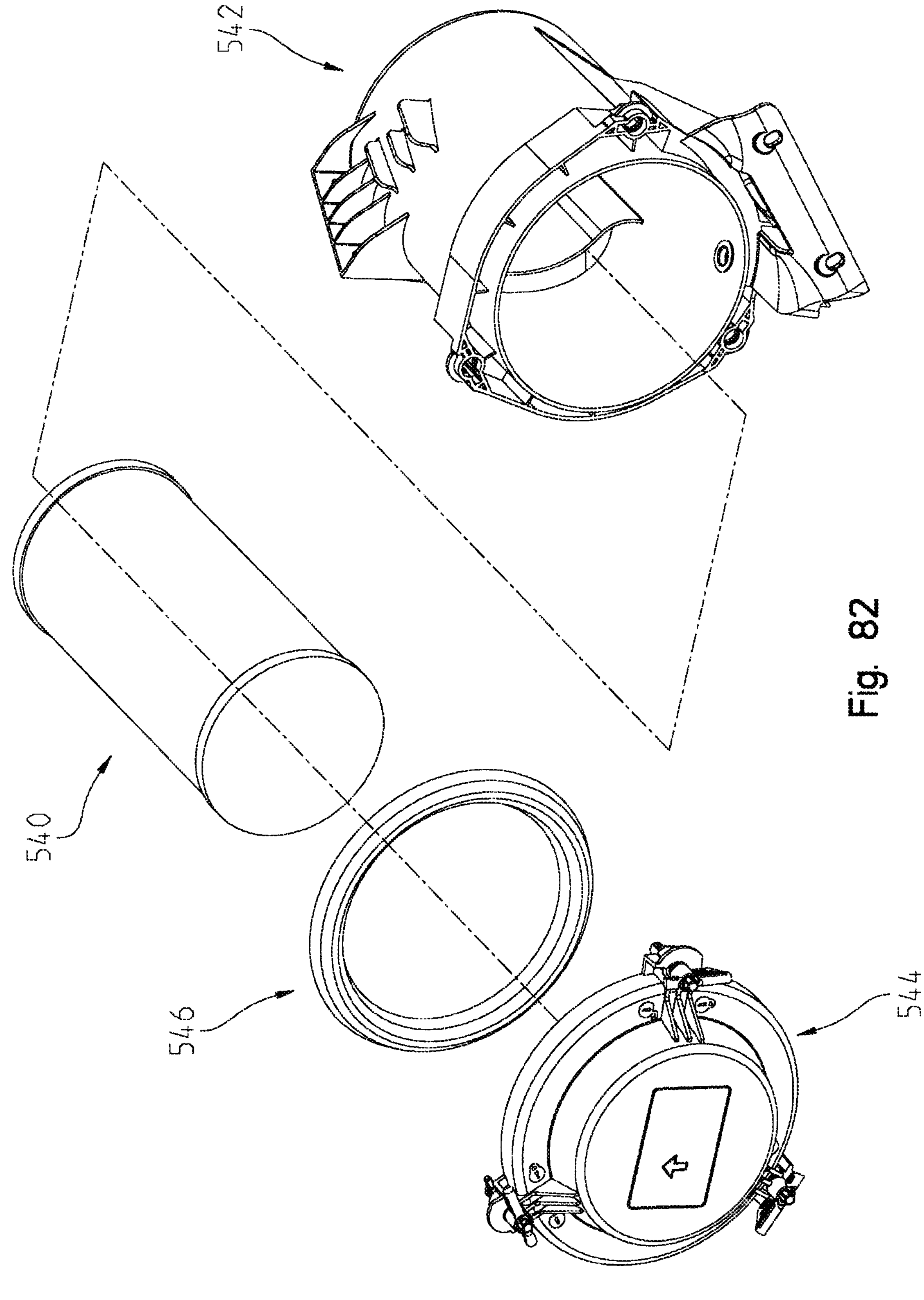
FIG. 82 shows an exploded view of the air filter assembly of FIG. 81.
Figure 83:
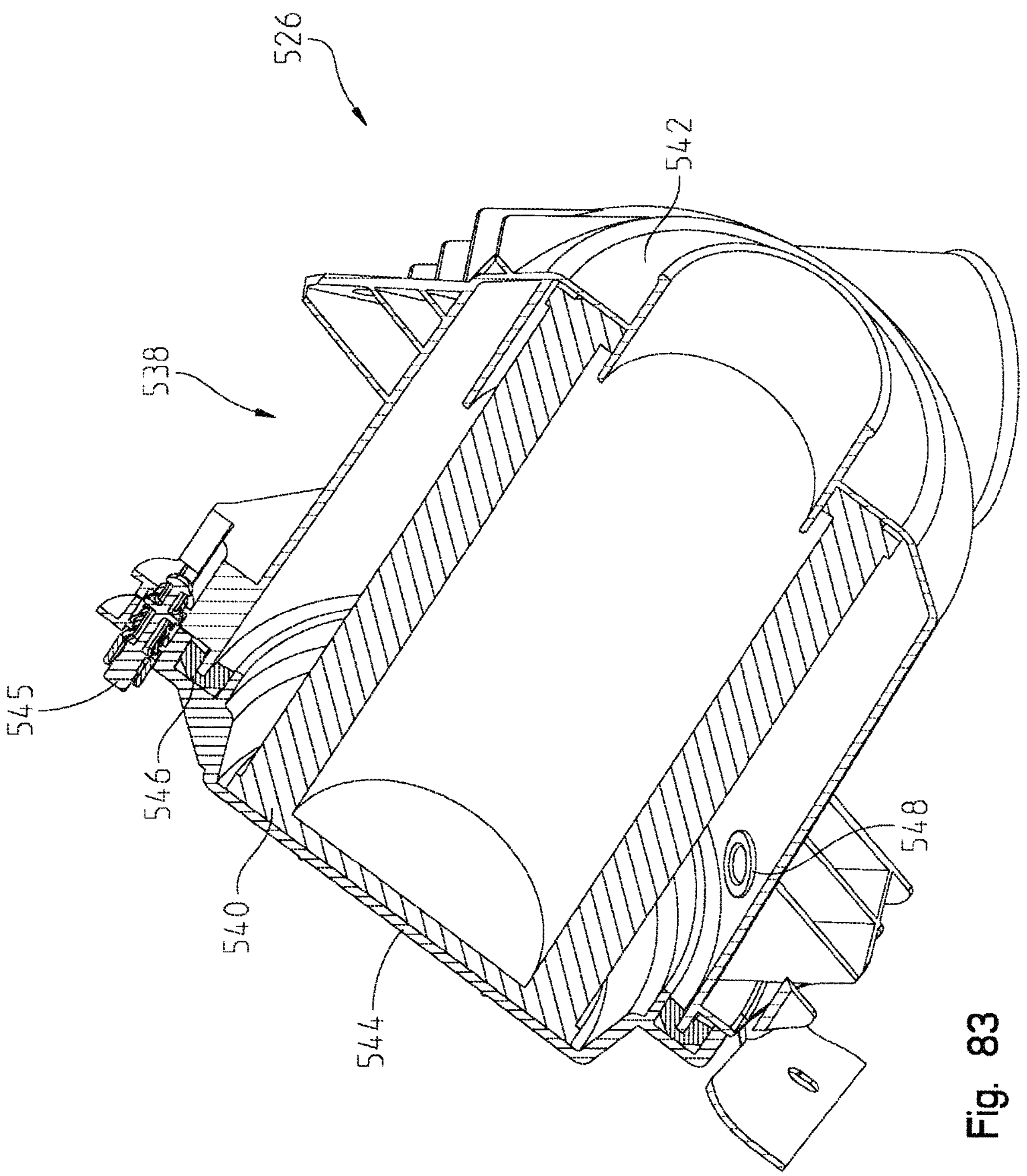
FIG. 83 shows a cross sectional view of the air filter assembly of FIG. 81 taken along line 83-83 of FIG. 81.

With reference to FIGS. 81-83, air filter assembly 526 of intake assembly 516 generally includes an air filter housing 538 and an air filter 540. Air filter housing 538 generally includes a main body 542, a lid 544 coupled to main body 542, and a seal 546 coupled to lid 544 and positioned between lid 544 and main body 542 for sealing the coupling between lid 544 and main body 542. In various embodiments, lid 544 may be coupled to main body 542 via cam-over couplers 545. Main body 542 may include a duck bill valve 548 (FIG. 83) configured to allow any debris and/or fluid to be removed from an interior of air filter housing 538.

Figure 84:
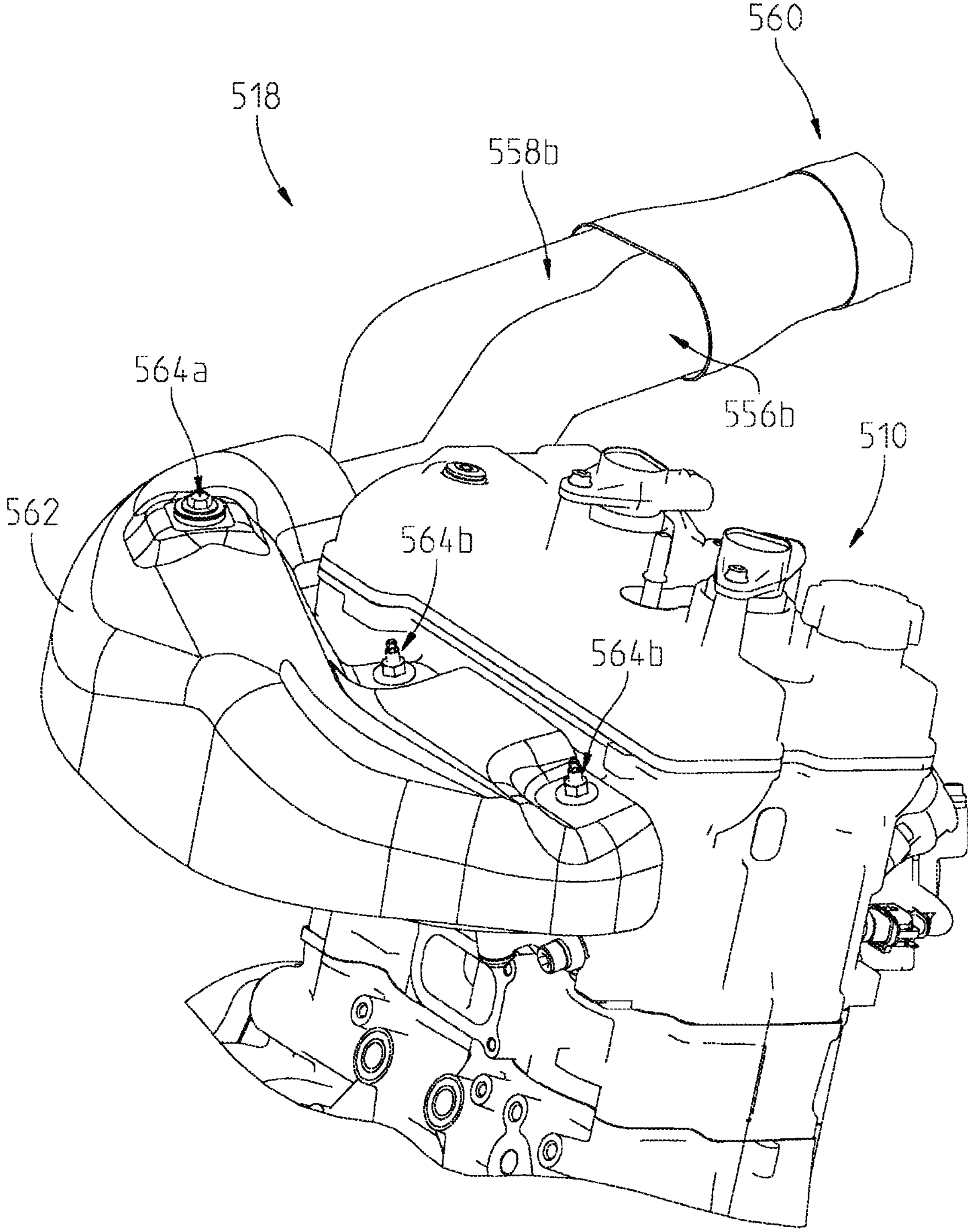
FIG. 84 shows a front left perspective view of the engine and a portion of the exhaust assembly of FIG. 76.

Referring now to FIGS. 84 and 85, exhaust assembly 518 of engine 510 generally includes an exhaust conduit assembly 550 extending from engine 510. Exhaust conduit assembly 550 generally includes at least one exhaust conduit 554 extending from engine 510. In various embodiments, and as shown in FIGS. 84 and 85, exhaust conduit 554 may include a first conduit 556 extending from engine 510 at a first end 556*a* and a second conduit 558 extending from engine 510 at a first end 558*a*, where first and second conduits 556 and 558 couple together at second ends 556*b* and 558*b* to form a single integrated conduit 560 leading exhaust from engine 510 out of vehicle 2. Exhaust conduit 554 may be stepped such that overall performance and/or power of vehicle 2 is increased. In various embodiments, exhaust conduit 554 may be stepped from a diameter of approximately 1.75 inches to a diameter of approximately 2 inches. This step in diameter of exhaust conduit 554 allows the exhaust flow to separate from the walls more when there are tight bends in conduit 554, and when a pressure wave hits in the area of expansion, there is a reflected rarefraction or relief wave in the opposite direction causing a small reduction in the exhaust pressure at the port shortly after the original pressure wave hits the stepped portion. In total, this requires less work from the piston during the exhaust stroke, which leaves more for the crankshaft output.

Exhaust assembly 518 may further include a heat shield 562 coupled to engine 510 and exhaust conduit assembly 550, illustratively first conduit 556 of exhaust conduit assembly 550, to provide heat protection to other various components of vehicle 2 adjacent exhaust assembly 518. In various embodiments, heat shield 562 is bolted to engine 510 and exhaust conduit assembly 550 via couplers 564*a* and 564*b*, where studs 563 of couplers 564*b* are formed in engine 510 and nuts 565 are configured to couple shield 562 to studs 563 of engine 510.

With reference to FIGS. 86-91, cooling assembly 519 generally includes a radiator 566 positioned at a front of vehicle 2, a fan 567 (FIG. 22) positioned rearward of radiator 566, and a coolant bottle 568 coupled to radiator 566 and engine 510 via various fluid lines 571. In various embodiments (i.e., when bed 470 is fixed), coolant bottle 568 may be coupled to a side surface 475 of bed 470 via a bracket 569 (FIG. 87), while in other various embodiments (i.e., when bed 470 is tiltable), coolant bottle 568 may be coupled to lower frame portion 38 via a bracket 570 behind seating area 26 and forward of bed 470 (FIG. 88). Coolant bottle 568 is generally positioned vertically higher than a top of radiator 566 (FIG. 86). In various embodiments, coolant bottle 568 may be positioned approximately 75 millimeters above the top of radiator 566.

Figure 89:
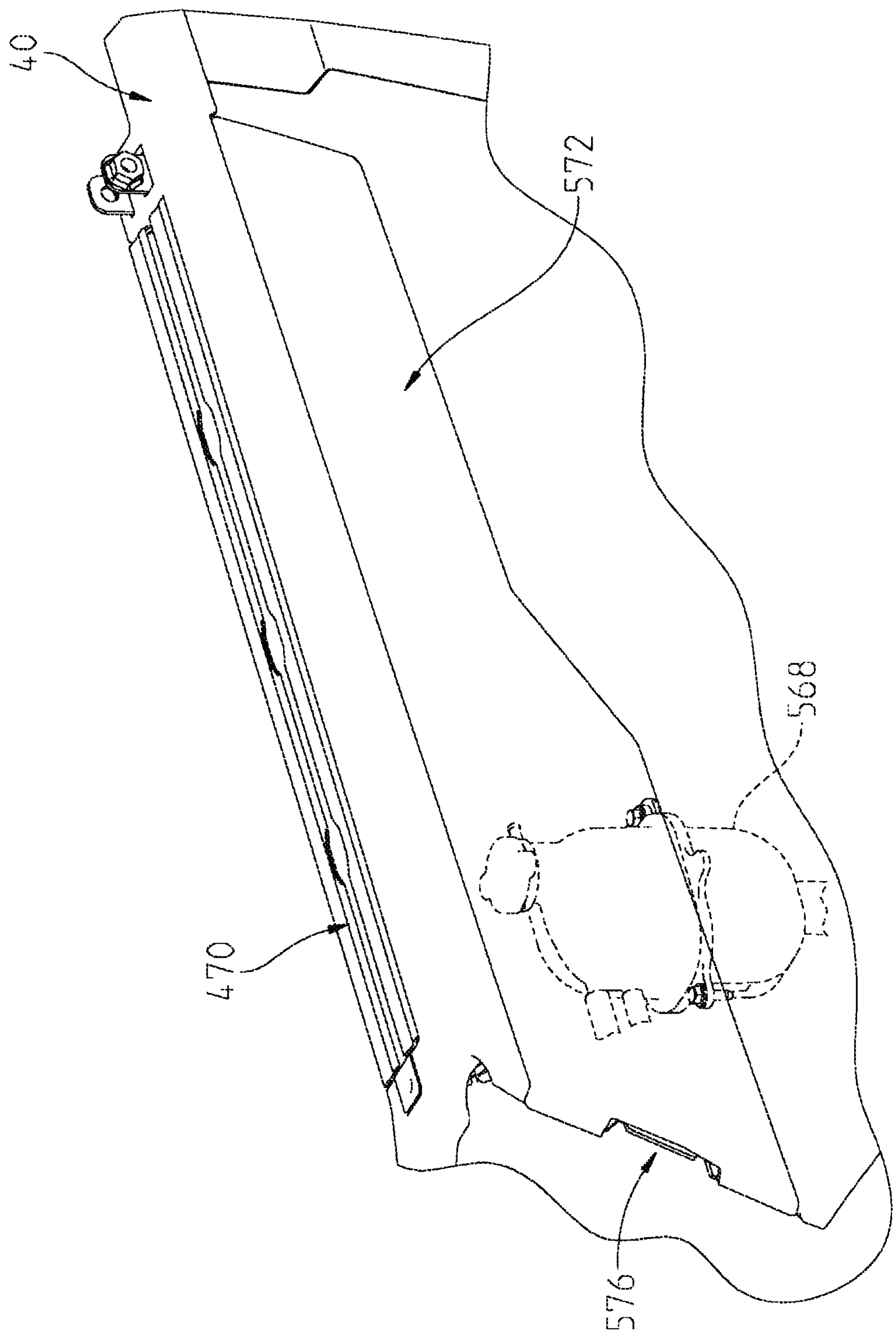
FIG. 89 shows a perspective view of a removable side panel of the vehicle of FIG. 1 for coolant bottle access.
Figure 90:
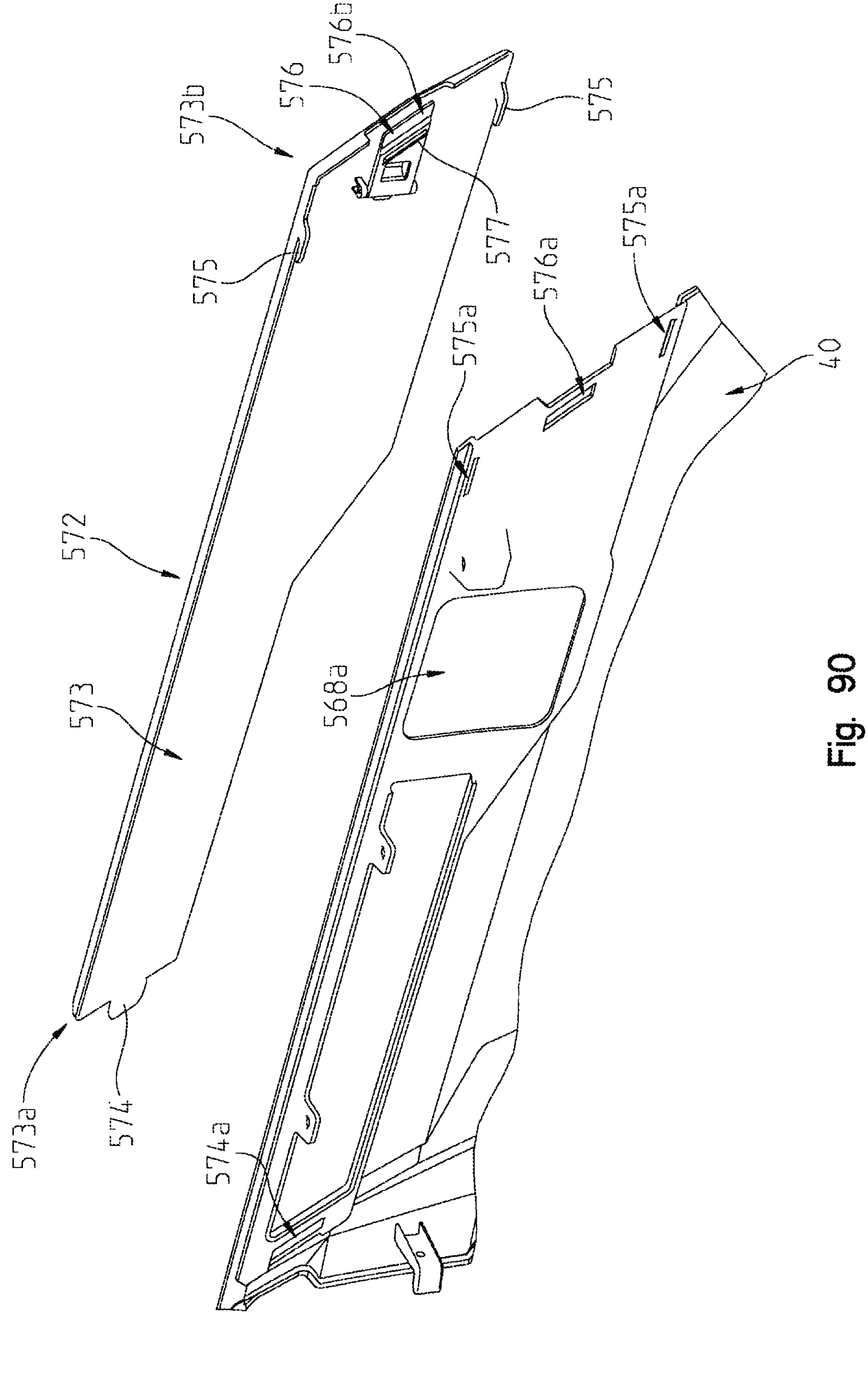
FIG. 90 shows an exploded view of the removable side panel and a main body panel of the vehicle of FIG. 1.
Figure 91:
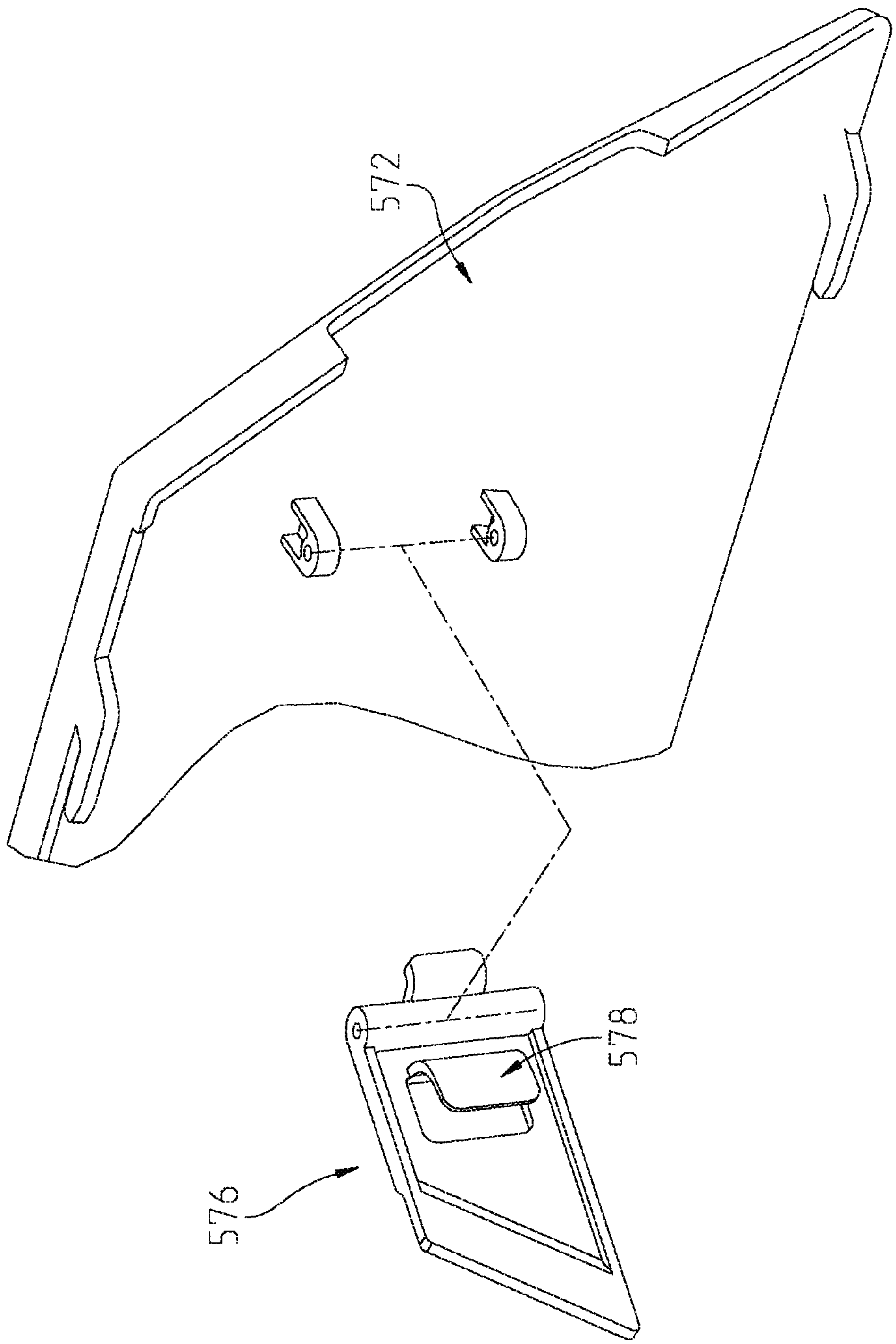
FIG. 91 shows an exploded view of a latch and a body of the removable side panel of FIG. 90.

When coolant bottle 568 is coupled to side surface 475 of bed 470, or in other instances when access to the area adjacent bed 470 may be desired, cargo area 41 of body assembly 40 may include a removable side panel 572 to allow access to coolant bottle 568 or other components through opening 568*a* in body assembly 40, as shown in FIGS. 89-91. Removable side panel 572 includes a body 573 having a tab 574 on a first end 573*a* configured to be received within an opening 574*a* in body assembly 40, at least one hook 575 on a second end 573*b* configured to be received within a separate opening 575*a* in body assembly 40, and a latch mechanism 576 configured to be received within yet another opening 576*a* in body assembly 40. Latch 576 includes an extension 577 (FIG. 90) configured to be received within opening 576*a* on a first side of latch 576 and a biasing member 578 (FIG. 91) extending from a second side of latch 576. Biasing member 578 is configured to abut body 573 of removable side panel 572 and bias latch 576 inward towards bed 470 such that extension 577 is received within opening 576*a*. To release removable side panel 572 from body assembly 40, latch 576 is actuated by pulling end 576*b* of latch 576 outward away from bed 470 such that extension 577 is removed from opening 576*a*.

Referring now to FIG. 140, in various embodiments, an opening 1568*b* may be located longitudinally rearward of an opening 1568*a* in body assembly 1040. Openings 1568*a* and 1568*b* can be accessed by removing a removable access panel 1572, which operates in substantially the same manner as removable side panel 572 (FIGS. 89-91). In various embodiments, opening 1568*b* allows access to an outlet panel 1569. In various embodiments, a plurality of outlet panels 1569 are within opening 1568*b*. Outlet panel 1569 may comprise a plurality of individual outlets 1569*a* configured to distribute power to one or more accessory(ies). Outlet panel 1569 is coupled to electrical system and battery (not shown) of vehicle 1002. In various embodiments, the plurality of individual outlets 1569*a* are present within opening 1568*a*. In various embodiments, individual outlets 1569*a* may provide different power levels in order to accommodate different types of accessories. An exemplary outlet panel 1569 is the PULSE BAR® from POLARIS INDUSTRIES, located at 2100 HWY 55, MEDINA, Minn. 55340. Additional disclosure around control of accessories can be found in U.S. Patent Application No. 62/878,927 filed Jul. 26, 2019, the complete disclosure of which is incorporated herein.

Figure 80:
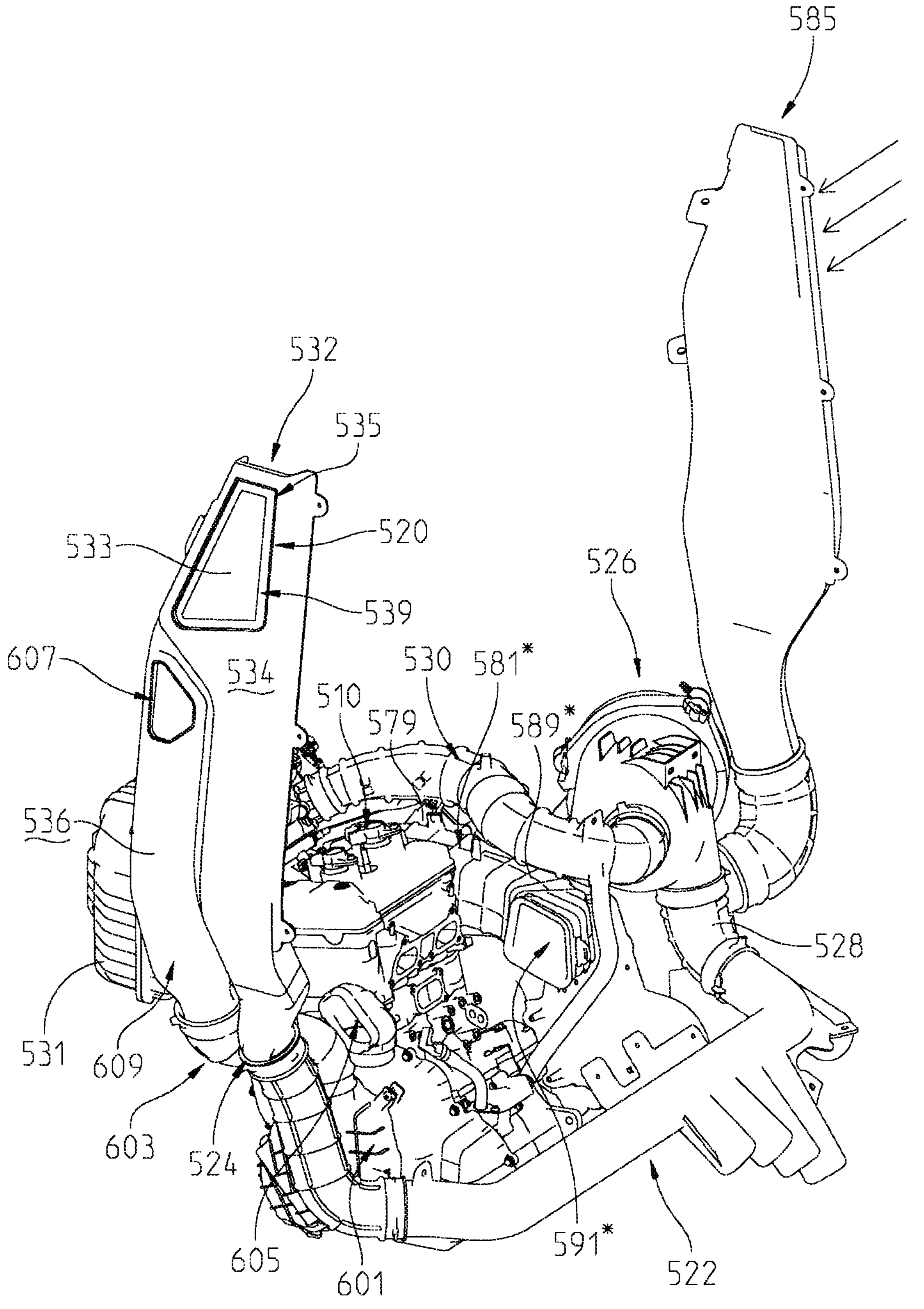
FIG. 80 shows a front right perspective view of a second embodiment of a powertrain of the vehicle of FIG. 1.
Figure 92:
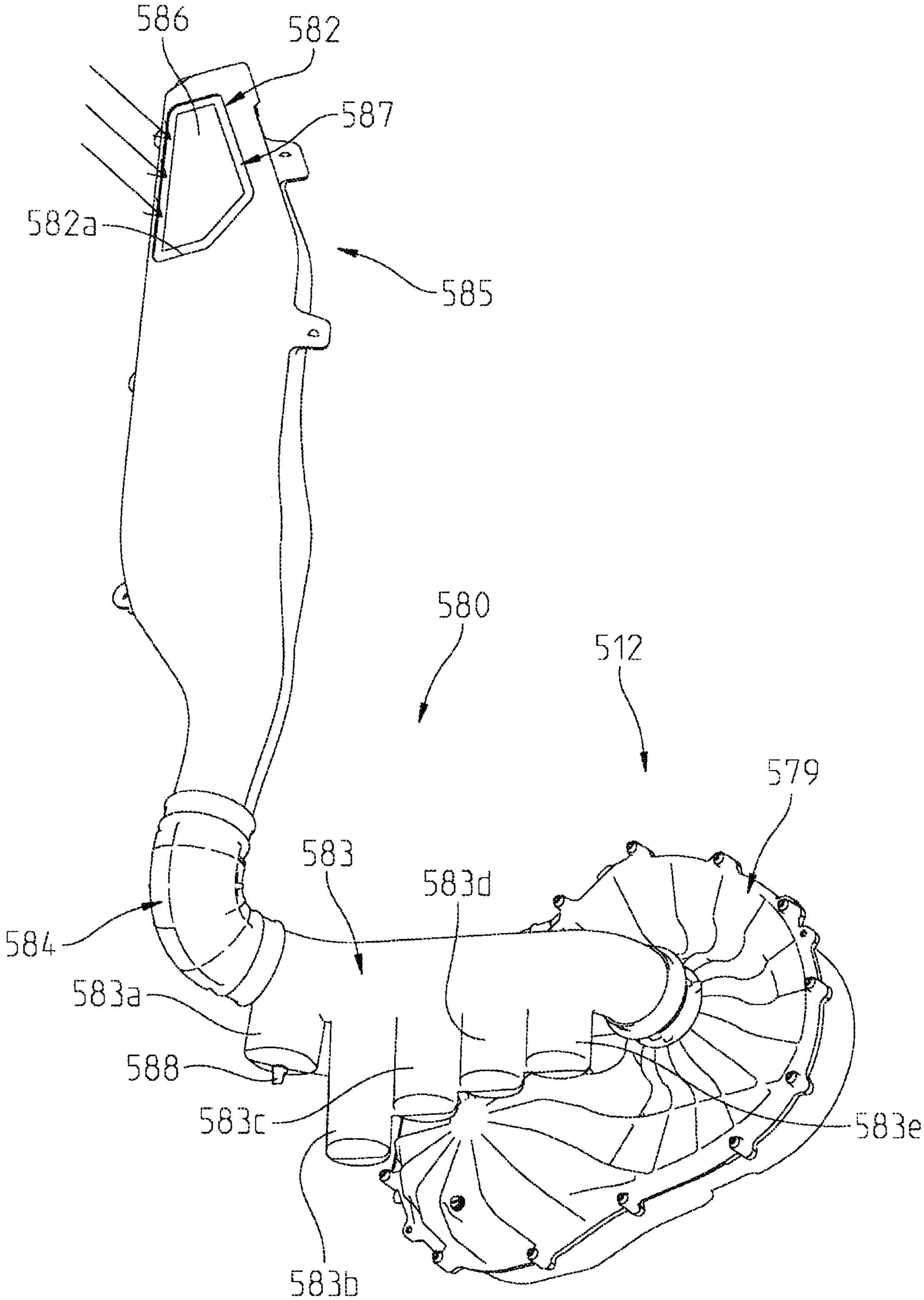
FIG. 92 shows a left rear perspective view of the transmission of FIG. 76.
Figure 93:
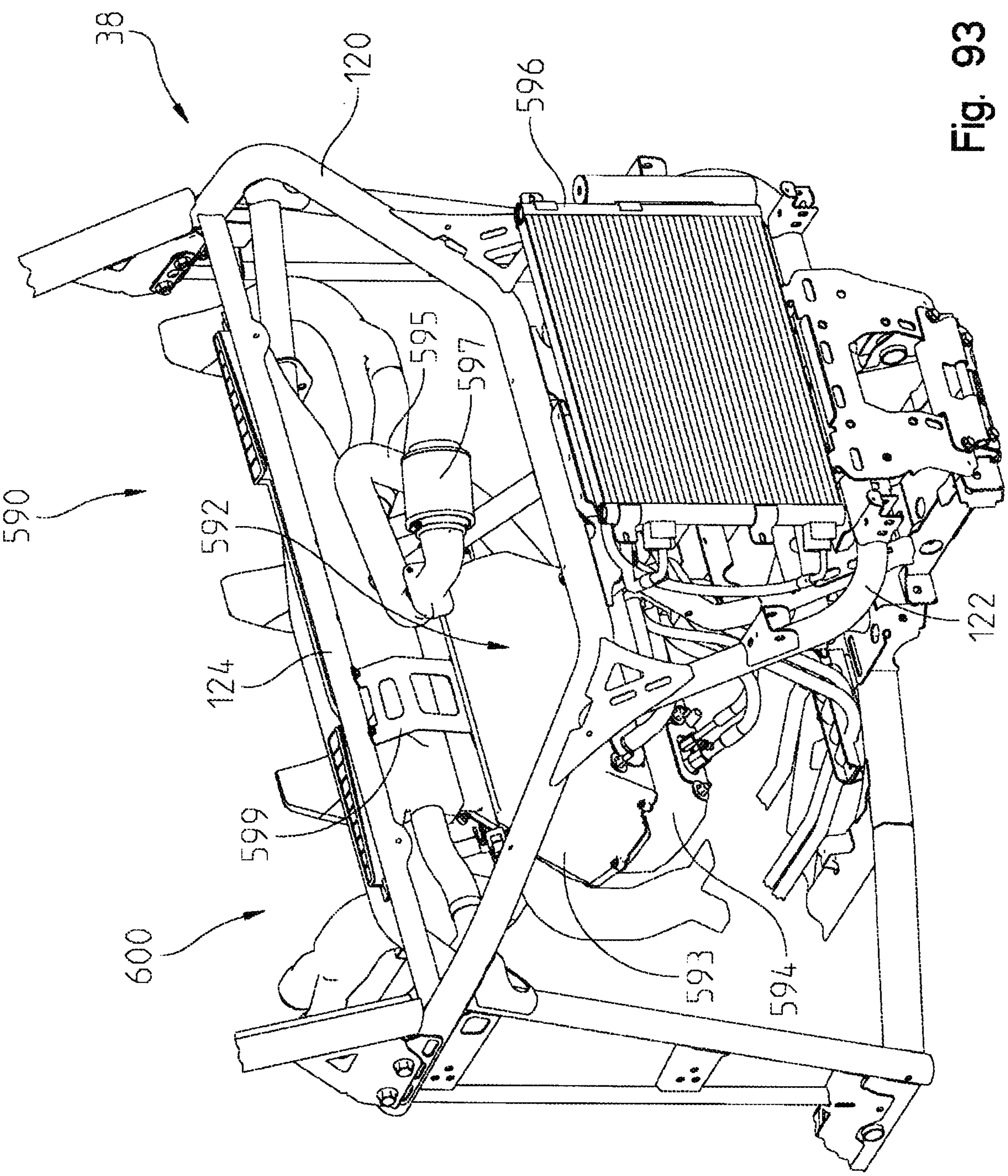
FIG. 93 shows a front right perspective view of an HVAC system of the present disclosure coupled to a front portion of the lower frame portion of FIG. 15.
Figure 94:
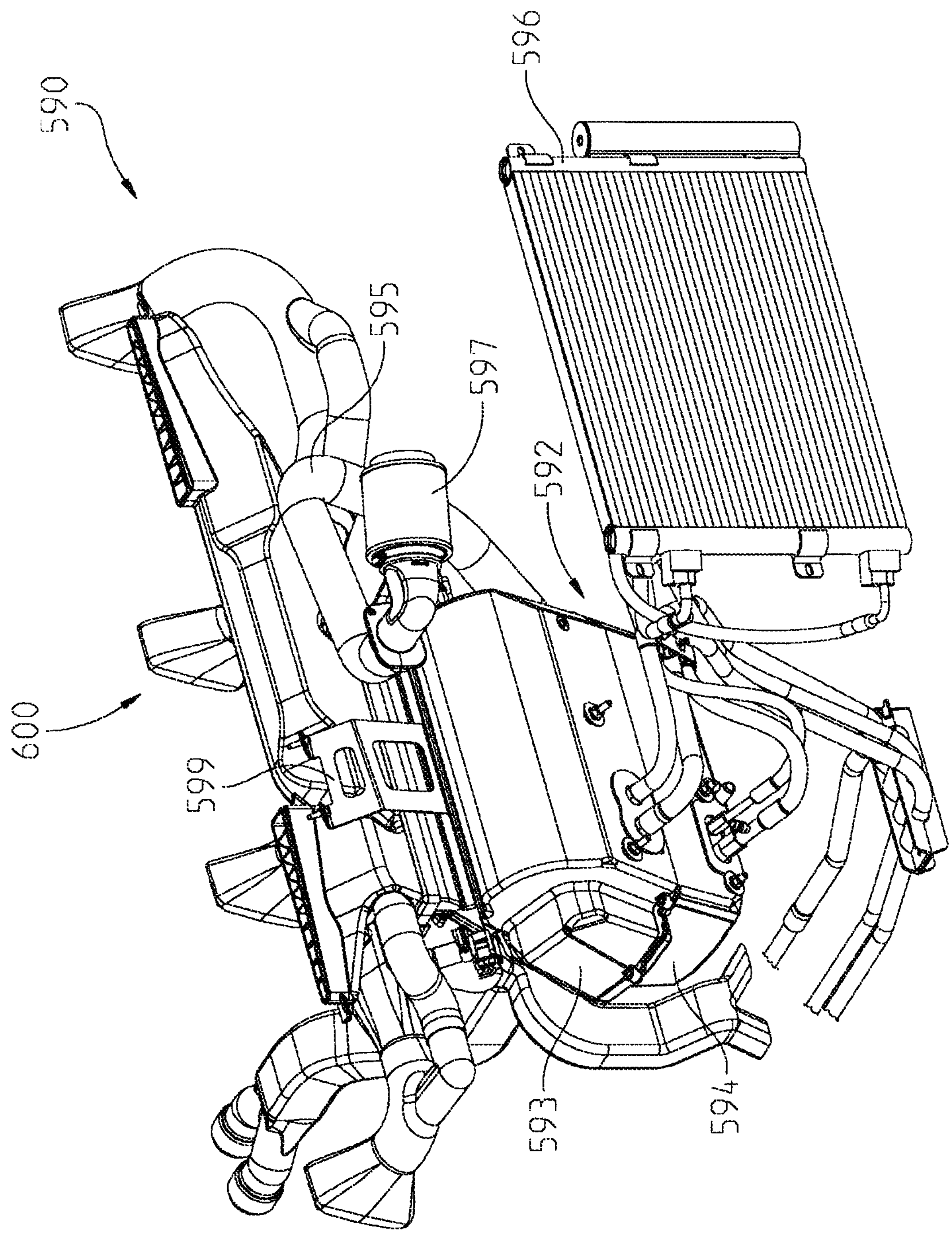
FIG. 94 shows a front right perspective view of the HVAC system of FIG. 93.
Figure 95:
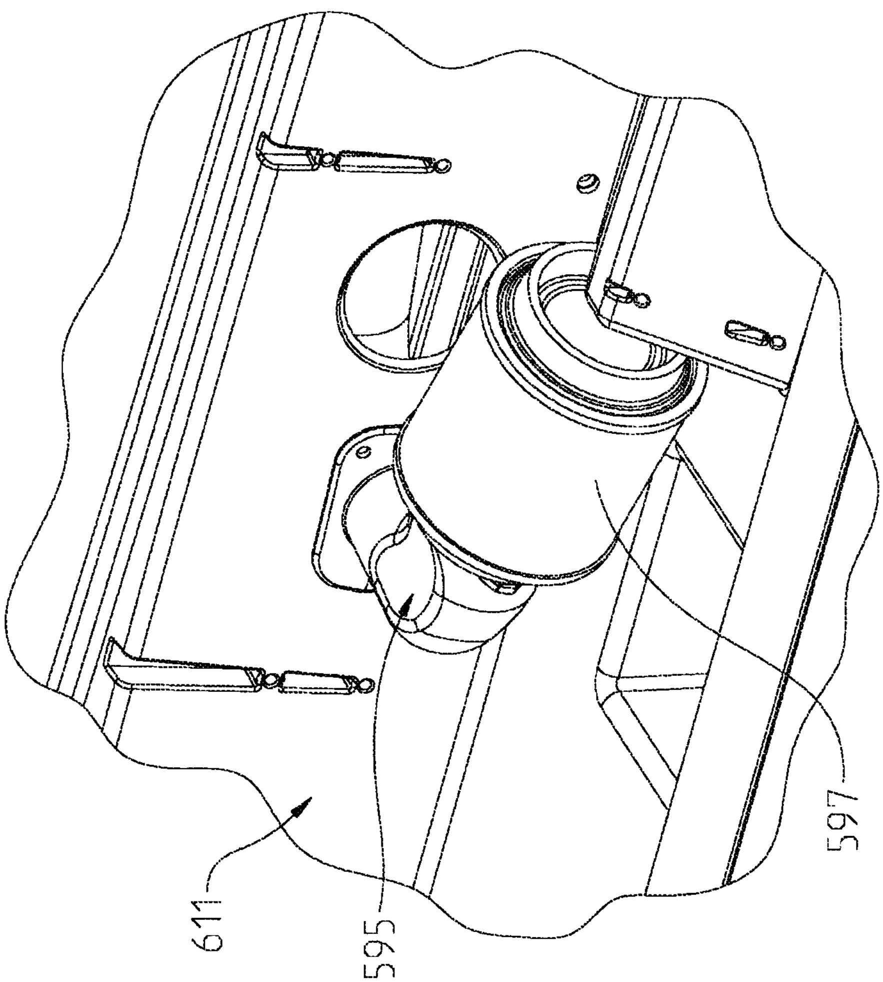
FIG. 95 shows a front left perspective view of an intake conduit of the HVAC system of FIG. 93, where the intake conduit includes an air filter.
Figure 96:
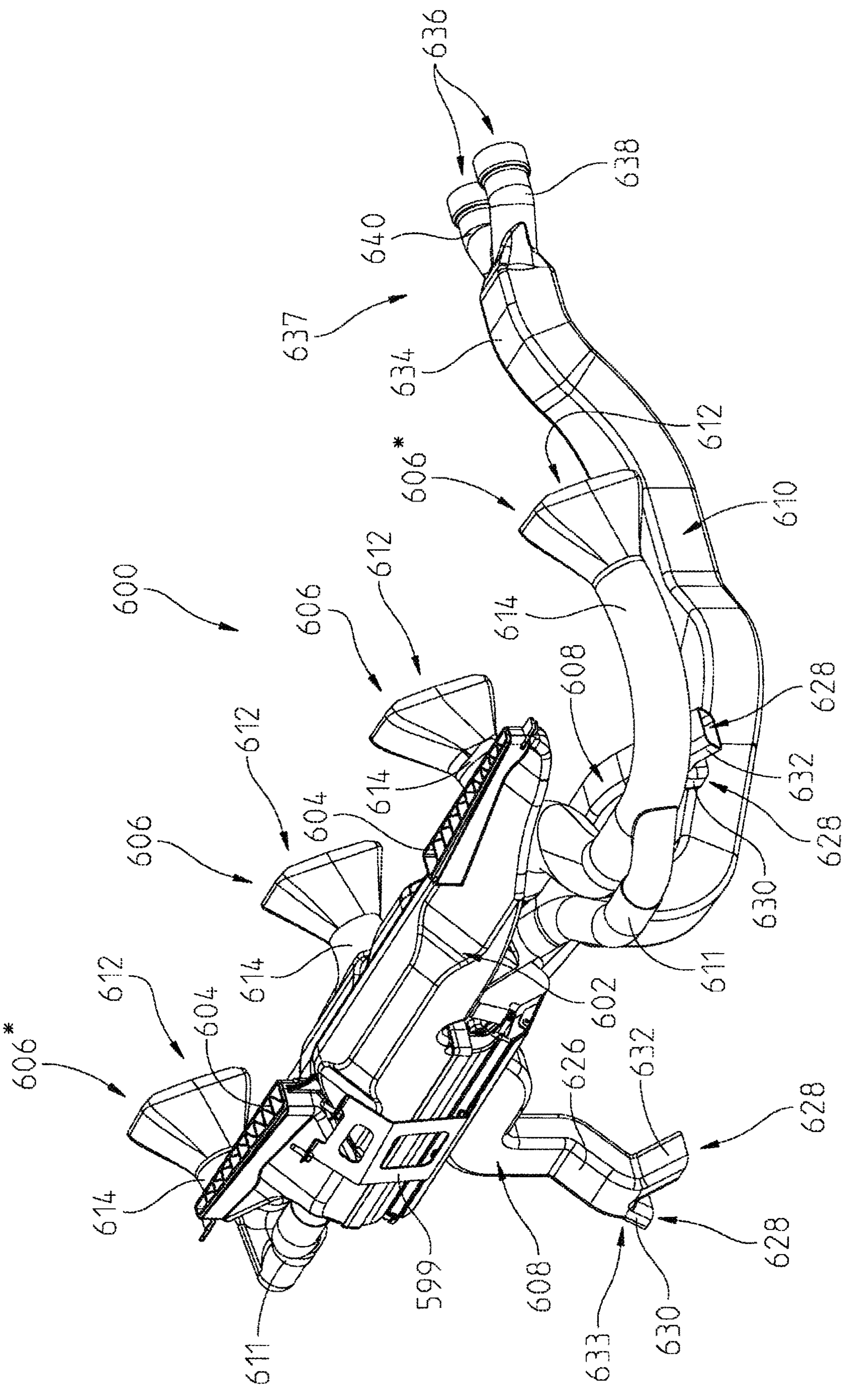
FIG. 96 shows a front left perspective view of air routing ducts of the HVAC system of FIG. 93.
Figure 97:
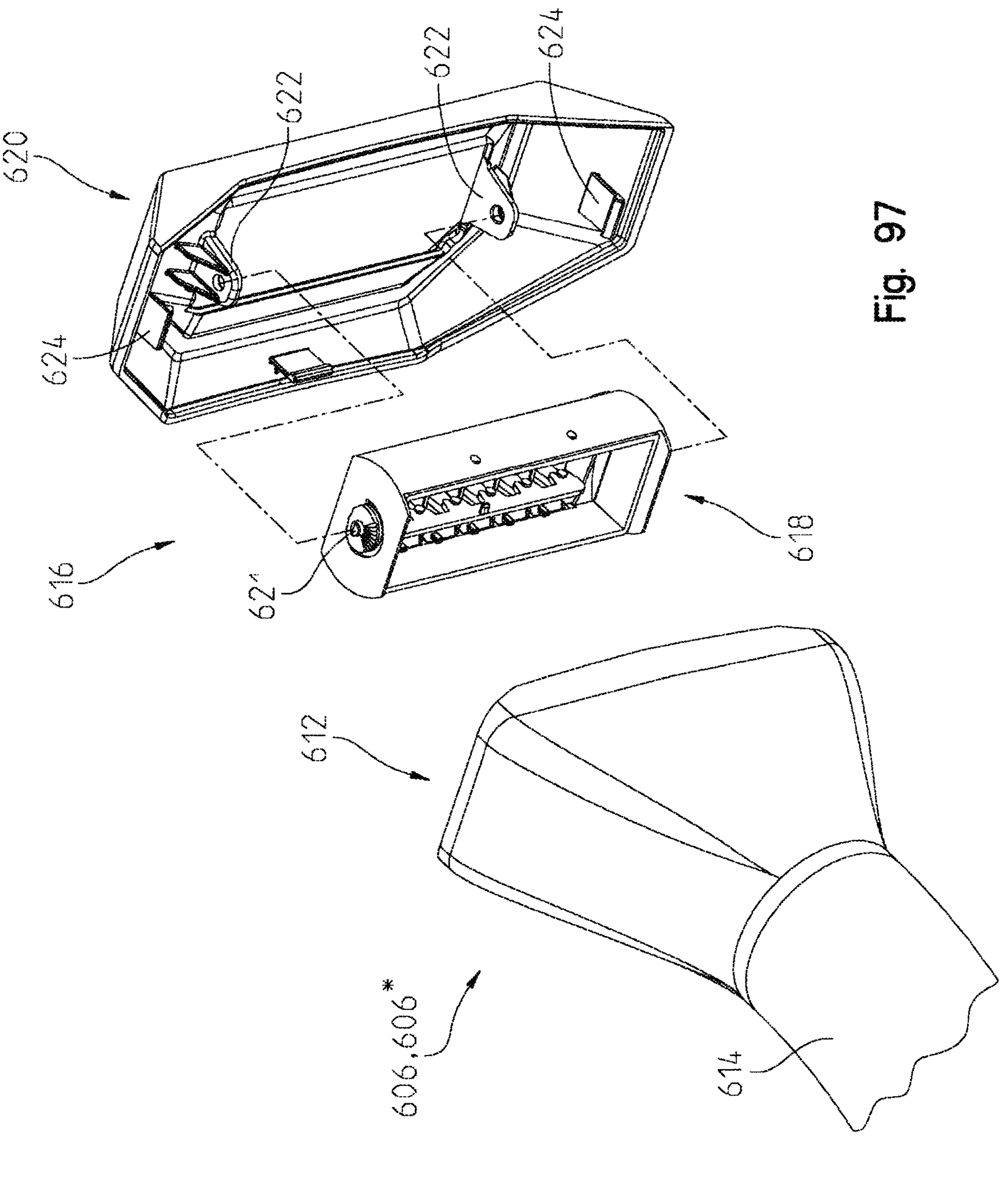
FIG. 97 shows an exploded view of an air vent assembly and a front cabin exhauster of the air routing ducts of FIG. 96.

Referring now to FIGS. 76, 80, and 92, transmission 512 of powertrain 509 may be a shiftable transmission or a continuously variable transmission ("CVT"), which may be an electronically controlled CVT ("eCVT"), a steel belt CVT and/or a rubber belt CVT. Further details relating to steel belt CVTs may be found in U.S. Patent Application Ser. No. 62/961,442, filed Jan. 15, 2020, the subject matter of which is incorporated herein by reference. Transmission 512, illustratively a CVT transmission, generally includes a transmission housing or body 579 housing drive and driven clutches (not shown), a cooling intake assembly 580 providing cool air to transmission body 579, a cooling exhaust assembly 581 routing used and/or heated air away from transmission body 579, and a passive duct acoustical attenuation device 583 positioned upstream or downstream of transmission body 579. In various embodiments, transmission 512 includes a vent line 513 (FIG. 32) coupled to rear frame portion 104, illustratively frame member 154, and which is configured to relieve pressure within transmission 512 when the temperature therein is altered. In various embodiments, vent line 513 may be coupled to rear frame portion 104 via a clip 511 received within an opening within rear frame portion 104. Vent line 513 generally includes an oliphobic and/or hydrophobic cover 515 configured to prevent debris and/or fluids from entering vent line 513 and/or transmission 512.

Intake assembly 580 of transmission 512 generally includes an intake port 582 and an intake duct 584 fluidly coupling intake port 582 to transmission body 579. When acoustical attenuation device 583 is provided upstream of transmission body 579, as shown in FIG. 92, intake duct 584 couples intake port 582 to acoustical attenuation device 583 and acoustical attenuation device 583 is coupled directly to transmission body 579. When acoustical attenuation device 583 is provided downstream of transmission body 579, intake duct 584 couples intake port 582 directly to transmission body 579.

In various embodiments, intake port 582 and at least a portion of intake duct 584 may be defined within a ducting component 585. In various embodiments, ducting component 585 is a blow-molded plastic component. Ducting component 585 is generally coupled to downwardly-extending portions 48 or 50 of cab frame 36 opposite ducting component 532, and intake port 582 is generally positioned at a height vertically higher than an uppermost extent of seats 28, 30 and/or 32. Intake port 582 generally includes a cover 586 creating a channel 587 between cover 586 and an edge 582*a* of intake port 582. In this way, cover 586 and/or the placement of intake port 582 substantially reduces the amount of debris (i.e., water, dirt, foliage, etc.) that can enter intake assembly 580. Furthermore, the added length and volume of intake port 582 reduces overall noise.

Acoustical attenuation device 583 of transmission 512 generally includes a plurality of quarter tubes 583*a-e* each configured to have a specific frequency between approximately 400 dB and 800 dB based on their various lengths. The specific frequency/length of each tube 583*a-e* is specifically picked based on the pressure level associated with each frequency such that the varying frequencies create alternating standing pressure waves between tubes 583*a-e* that cancel one another out to reduce the overall noise of transmission 512. In various embodiments, one of tubes 583*a-e* includes a duck bill valve 588 configured to act as a one-way valve which opens when sufficient fluid is present above valve 588 to cause valve 588 to open and drain fluid therein. Duck bill valve 588 is generally positioned at a bottom end of first quarter wave tube 583*a*. In various embodiments, acoustical attenuation device 583 is a blow-molded plastic component, such a quarter wave duct tube.

With reference to FIGS. 76 and 80, exhaust assembly 581, 581* of transmission 512 generally includes an exhaust conduit 589, 589* and an exhaust port 591, 591*. In various embodiments, and as shown in FIG. 76, exhaust conduit 589 may extend across vehicle 2 from transmission housing 579 to and within ducting component 532 such that exhaust port 591 is formed by ducting component 532. A first portion 591*a* of exhaust conduit 589 is formed by ducting component 532 and a second portion 591*b* of exhaust conduit 589 is formed of a metallic duct extending between transmission housing 579 and ducting component 532. When exhaust port 591 is formed within ducting component 532, exhaust port 591 may or may not include a cover (not shown) similar to intake port 582. When exhaust assembly 581 extends across vehicle 2 in this way, seats 28, 30 and/or 32 of vehicle 2 may be positioned further back in vehicle 2 such that seating area 26 may be increased. In other various embodiments, and as shown in FIG. 80, exhaust conduit 589* of exhaust assembly 581* may extend out of transmission housing 579 and forward within vehicle 2 such that exhaust port 591* blows exhaust air from transmission housing 579 out across exhaust assembly 518 of engine 510. In this way, temperatures under bed 570 are relatively cooler than when the transmission exhaust air is not passed over exhaust assembly 518. More particularly, while the temperature of exhaust gases within exhaust port 591, 591* are elevated compared to the temperature of the air being received within transmission 512, the temperatures of the exhaust gas may still be lower than a temperature of engine 510 or other heat sources adjacent engine 510 such that there is a cooling effect to engine 510 and/or adjacent components by passing exhaust gas from transmission 512 across engine 510 or other components.

Referring now to FIGS. 86 and 93-97, vehicle 2 may further include a heating, ventilation, and air conditioning (HVAC) system 590 coupled to lower frame portion 38, illustratively front portion 100 of lower frame portion 38. HVAC system 590 generally includes an HVAC housing or box 592 supporting a heater core (not shown) in a top portion 593 thereof and an air conditioning unit (i.e., an evaporator) (not shown) in a bottom portion 594 thereof, an intake conduit 595, a condenser 596, a compressor 598 and/or alternator (not shown), and air routing ducts 600. Intake conduit 595 includes an air filter 597 and is configured to provide ambient air to HVAC box 592. In various embodiments, intake conduit 595 passes through a close out panel 611 (FIG. 95) such that heat picked up via intake conduit 595 from adjacent heat-producing components may be reduced. Specifically, the portion of intake conduit 595 which extends into the cab beyond or rearward of close out panel 611 will be exposed to cooler air than the portion of intake conduit 595 extending before or forward of close out panel 611 due to the heat-producing components adjacent intake conduit 595 forward of close out panel 611. For additional information and details regarding the close out panel, U.S. patent application Ser. No. 15/631,874, now U.S. Pat. No. 10,479,422 is expressly incorporated by reference herein. Condenser 596 is positioned forward of radiator 566 and is coupled to HVAC box 592 and engine 510. Compressor 598 and/or alternator (not shown) is positioned adjacent engine 510 and coupled to condenser 596 and the air conditioning system in HVAC box 592. Air routing ducts

600 are coupled to HVAC box 592 for providing conditioned air into seating area 26. Furthermore, in various embodiments, HVAC box 592 and/or routing ducts 600 may be coupled to lower frame portion 38, illustratively below frame member 124, via a bracket 599. Bracket 599 may be made of various materials, including sheet metal.

With reference to FIG. 80, in various embodiments, compressor 598 and/or the alternator (not shown) may be coupled to engine 510 and may be concealed within a housing 601. To keep compressor 598 (FIG. 86) and/or the alternator properly cooled, housing 601 may include an intake assembly 603 providing cool air to housing 601 and compressor 598 and/or the alternator housed therein and an exhaust assembly 605 routing used and/or heated air out of housing 601. Intake assembly 603 generally includes an intake port 607 and an intake conduit 609 coupling intake port 607 to housing 601. In various embodiments, intake port 607 and a portion of intake conduit 609 are formed within ducting component 532 similarly to intake port 520 and intake conduit 524 of engine intake assembly 516. When vehicle 2 includes HVAC system 590 and thus intake assembly 603 for housing 601, exhaust conduit 589* of transmission 512 must be used such that ducting component 532 houses intake port 607 of intake assembly 603 and intake port 520 for powertrain 509 rather than exhaust port 591 of cooling exhaust assembly 581 of transmission 512. Exhaust port 591 of cooling exhaust assembly 581 and intake port 607 of intake assembly 603 cannot both be provided simultaneously.

Referring to FIGS. 93-97, air routing ducts 600 of HVAC system 590 generally include a main body 602 coupled to HVAC box 592, defrost exhausters 604 extending upward from main body 602, front cabin exhausters 606, 606* extending rearward from main body 602, and floor exhausters 608 extending downward from main body 602. When vehicle 2 further includes rear passenger seat 32, air routing ducts 600 may further include rear cabin exhauster(s) 610 extending downward from main body 602 and rearward below front cabin exhausters 606, 606* to direct air within the rear passenger seating area. In various embodiments, main body 602, defrost exhausters 604, front cabin exhausters 606, 606*, floor exhausters 608, and/or rear cabin exhausters 610 may be blow molded such that some or all of components 602, 604, 606, 606*, 608 and/or 610 are a single, integral component.

Front cabin exhausters 606, 606* generally each include an outlet 612 and a conduit 614 extending between main body 602 and outlet 612. In various embodiments, air routing ducts 600 may further include additional conduits 611 extending from main body 602 to outer front cabin exhausters 606* to provide additional airflow thereto. Furthermore, in various embodiments, outlet 612 of front cabin exhausters 606 may include an air vent assembly 616 (FIG. 97) configured to direct air provided through front cabin exhausters 606, 606* to seating area 26. Air vent assembly 616 generally includes a louver assembly 618 configured to rotate and direct air and a cover 620 configured to couple with extensions 621 of louver assembly 618 via tabs 622 and couple to outlet 612 via clips 624.

Floor exhausters 608 each generally include a conduit 626 and at least one outlet 628. In the illustrative embodiment shown in FIG. 96, conduit 626 splits into two separate conduits 630 and 632 at a lower end 633 of conduit 626 such that floor exhausters 608 each include two outlets 628.

Rear cabin exhauster 610 generally includes a conduit 634 that extends rearward between driver's seat 28 and passenger seat 30 and at least one outlet 636 configured to provide heated or cooled air to rear passenger seat 32. In the illustrative embodiment shown in FIG. 96, conduit 634 splits into two separate conduits 638 and 640 at a rear end 637 of conduit 634 such that rear cabin exhauster 610 includes two outlets 636. In various embodiments, defrost exhausters 604 and/or rear cabin exhauster 610 may include an air vent (not shown) configured to either block air from leaving exhausters 604 and/or 610 or direct air from exhausters 604 and/or 610 in at least one direction. In some embodiments, when the air vent is open, air may be directed in one direction via one or more flat flaps, while in other embodiments, the air vent may include a flat flap and at least one additional flap having a V-shaped indention in the middle of the at least one additional flap such that air may be directed in three different directions resulting in an overall wider airflow. The wider airflow allows for fewer exhausters 604 and/or 610 to be provided resulting in fewer components, weight reduction of vehicle 2, and lower costs associated with vehicle 2.

Figure 98:
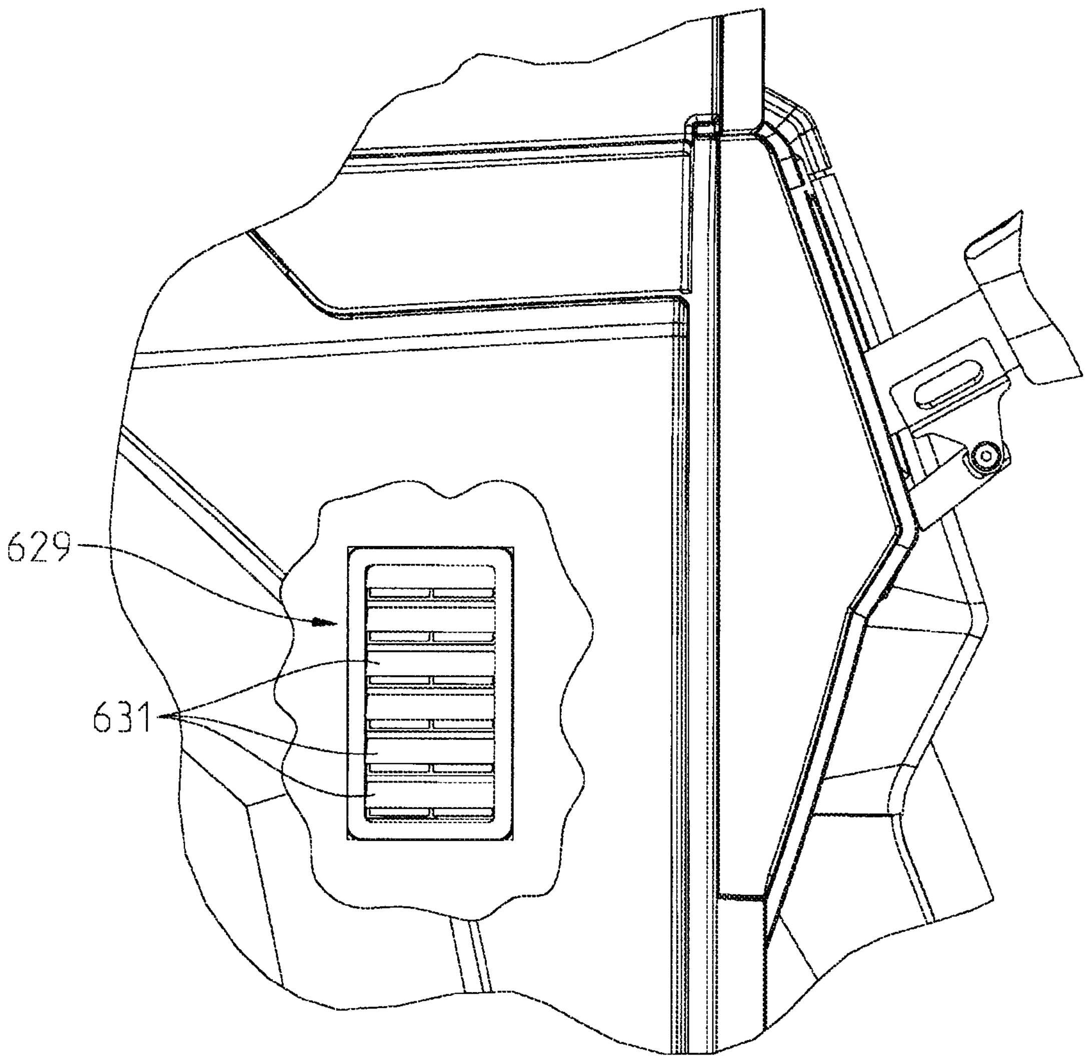
FIG. 98 shows an enlarged and cutaway view of a left side of the vehicle of FIG. 1 showing an HVAC exhauster of the present disclosure.
Figure 99:
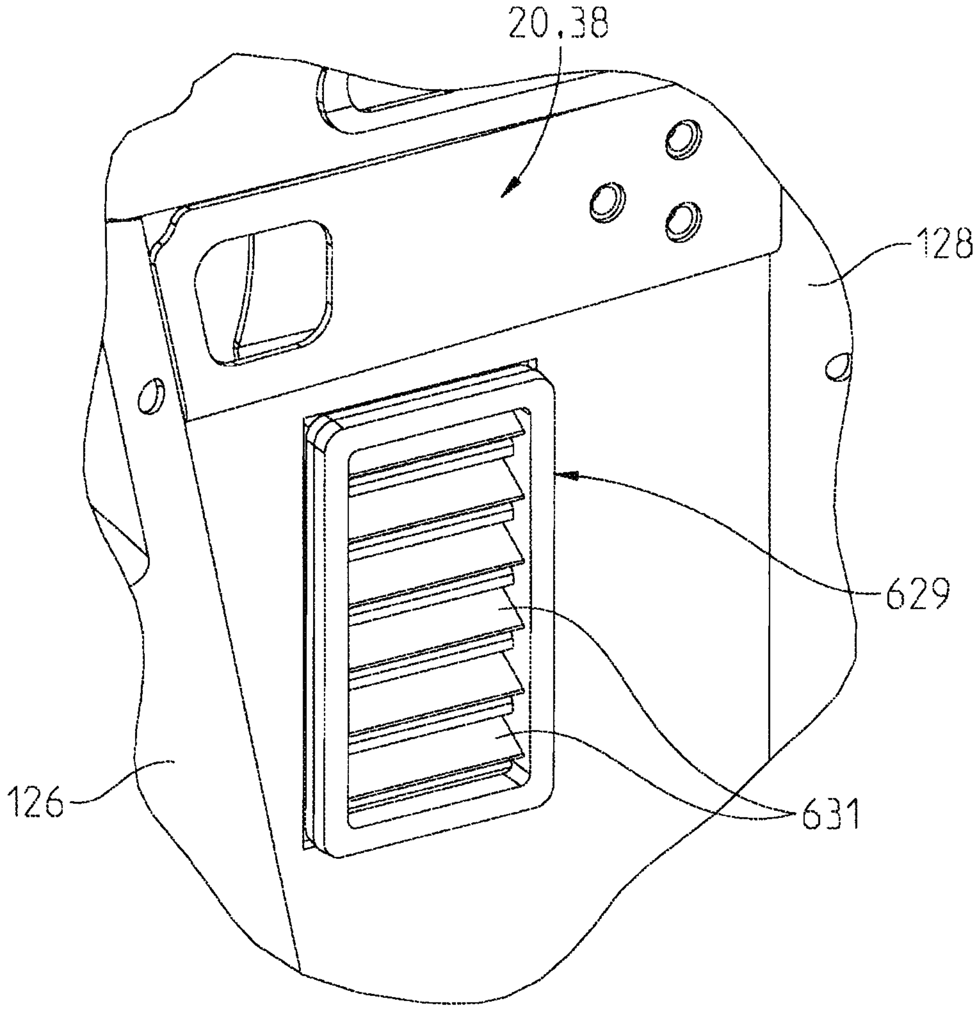
FIG. 99 shows an enlarged perspective view of the HVAC exhauster of FIG. 98 coupled to a frame of the vehicle of FIG. 1.

With reference to FIGS. 98 and 99, HVAC system 590 generally further includes HVAC exhausts comprised of vent panels 629 having a plurality of flaps 631 for directing air out of HVAC system 590 and/or seating area 26. Vent panels 629 are generally coupled to frame 20, specifically front portion 100 of lower frame portion 38, and/or body assembly 40, such that air may be passed from within vehicle 2 to outside of vehicle 2. In various embodiments, vent panels 629 may be positioned between frame members 126 and 128 of front portion 100 of lower frame portion 38.

Figure 100:
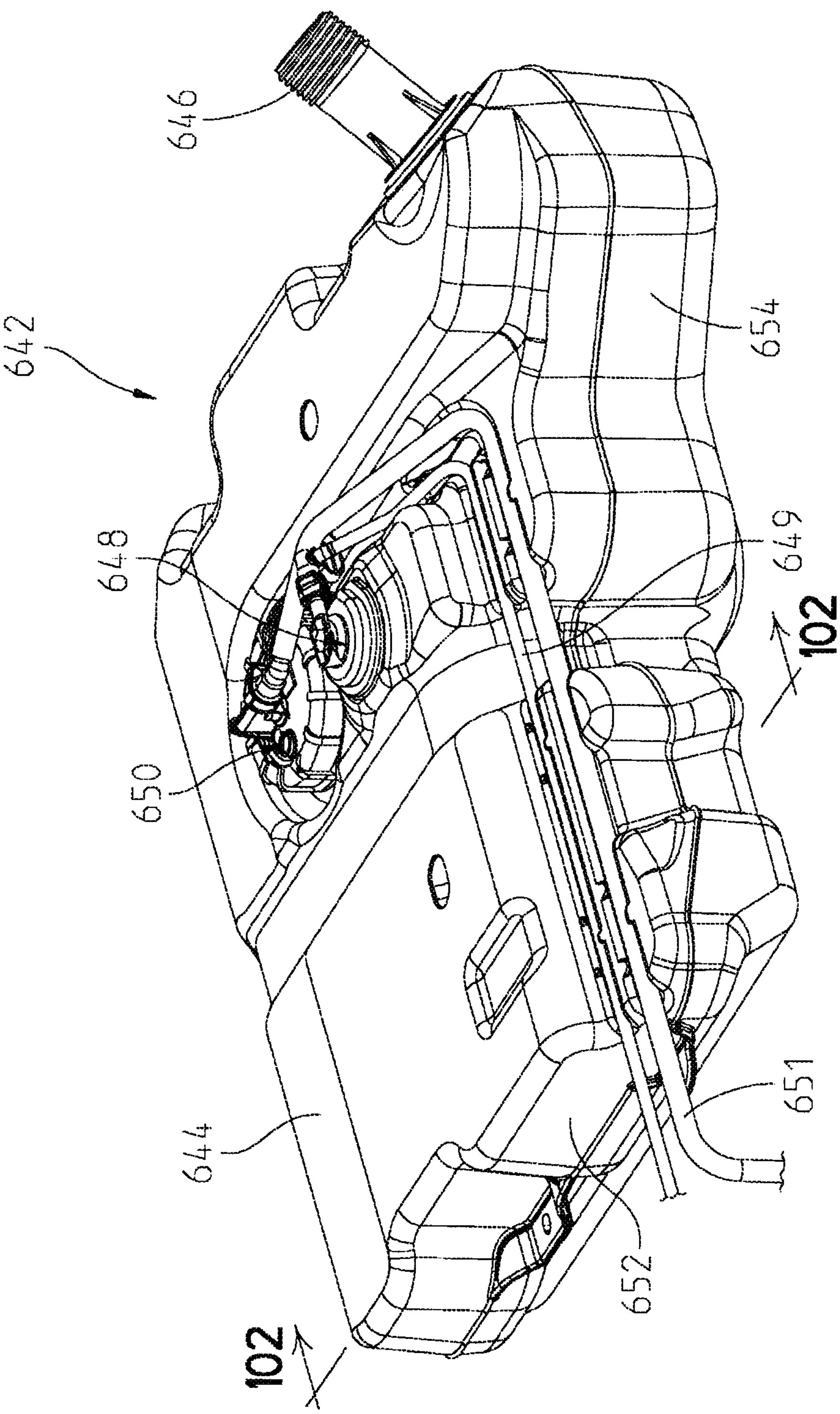
FIG. 100 shows a perspective view of a fuel tank of the present disclosure.
Figure 101:
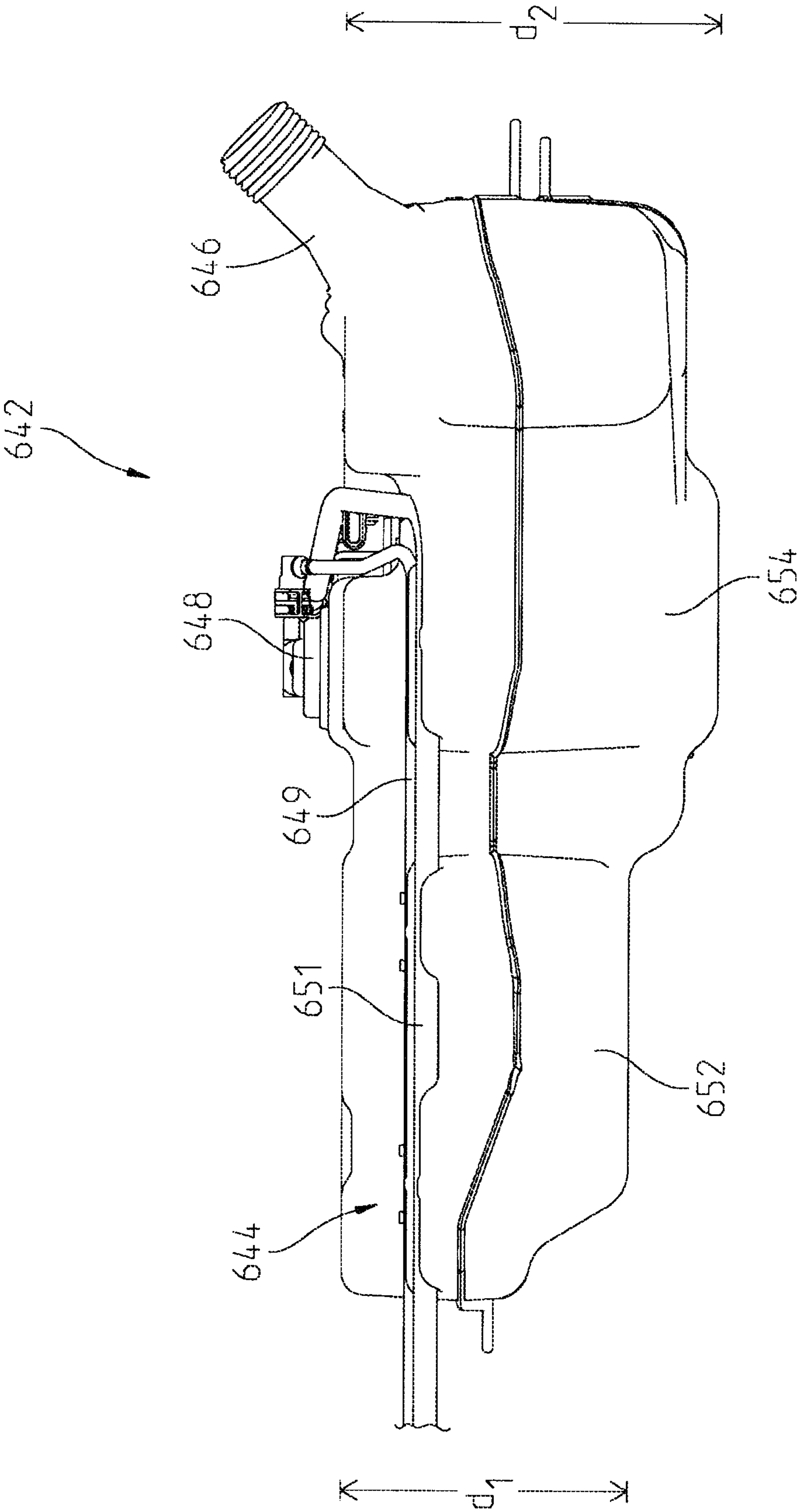
FIG. 101 shows a side elevational view of the fuel tank of FIG. 100.
Figure 102:
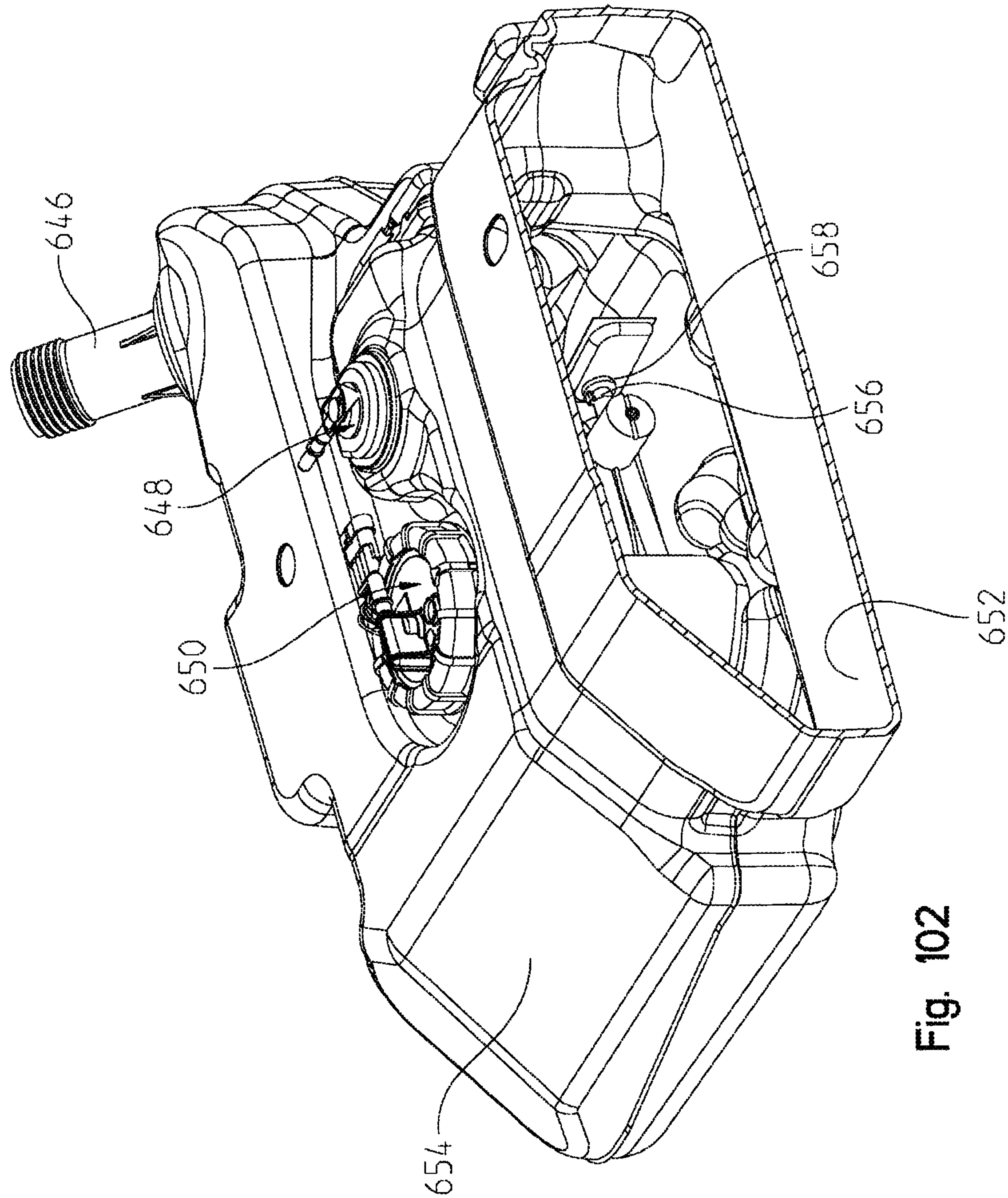
FIG. 102 shows a cross sectional view of the fuel tank of FIG. 100 taken along line 102-102 of FIG. 100.

Referring now to FIGS. 100-102, vehicle 2 further includes a fuel system including a fuel tank 642 for providing fuel to engine 510. Fuel tank 642 generally includes a body 644 having a fill tube 646, a valve 648, and a fuel pump 650. Fill tube 646 is configured to receive liquid fuel from a fuel delivery apparatus, and generally includes a cap (not shown) for containing both liquid fuel and fuel vapor within fuel tank 642. Furthermore, fill tube 646 is generally accessible from a side of vehicle 2. Valve 648 of fuel tank 642 is configured to allow venting of fuel vapors collecting within fuel tank 642 and prevent liquid fuel from escaping fuel tank 642, specifically in the case of vehicle 2 experience a tilt beyond a predetermined angle. Accordingly, valve 648 prevents liquid fuel from entering a fuel vapor line 649 configured to receive fuel vapor from fuel tank 642.

Fuel pump 650 of fuel tank 642 is configured to deliver liquid fuel from fuel tank 642 to engine 510 through fuel delivery line 651 based on the operating conditions of vehicle 2, for example based on information received from the throttle controls. In various embodiments, one of routing trays 200, 200* may be provided adjacent fuel tank 642 for retaining and routing lines 649 and 651, where routing tray 200, 200* (not shown in FIGS. 100-102) may be mounted or coupled to body 644 or simply resting on body 644.

Body 644 of fuel tank 642 generally includes a first portion 652 having a first depth $d_1$ and a second portion 654 having a second depth $d_2$, where second depth $d_2$ is deeper than first depth $d_1$. In various embodiments, body 544 is a blow-molded plastic component. Fuel pump 650 may include a remote pick up 656 (FIG. 102) configured to pick up fuel within second portion 654 of body 644 of fuel tank 62 to ensure fuel remaining in body 644 is provided to fuel pump 650. In various embodiments, remote pick up 656 may include a cap or filter 658 to prevent debris from entering remote pick up 656.

Figure 103:
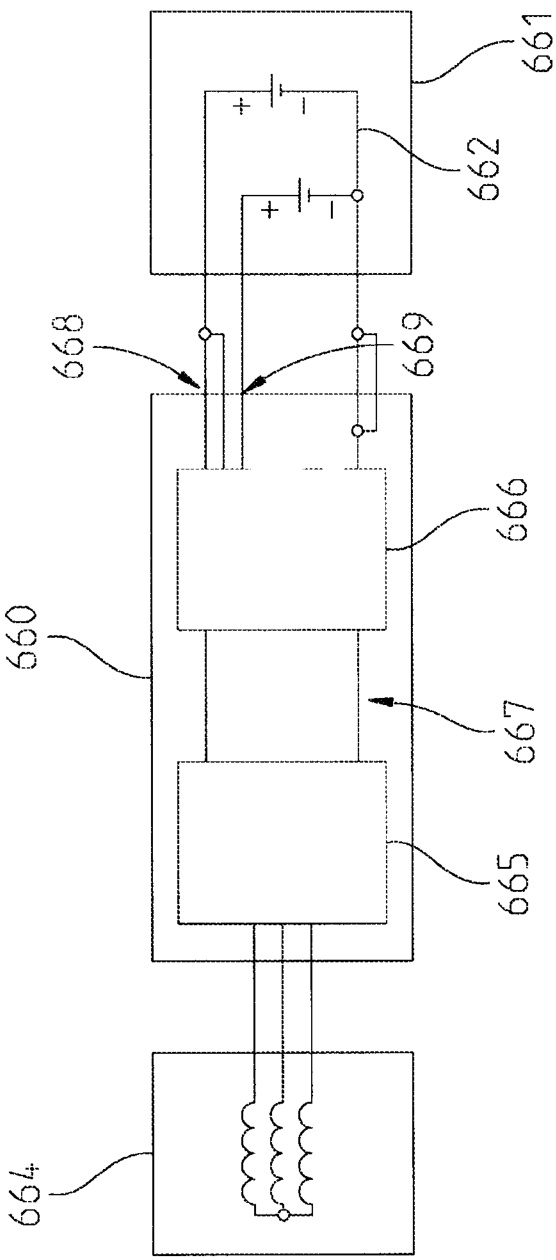
FIG. 103 shows a schematic view of a voltage regulator/rectifier of the present disclosure.

With reference to FIG. 103, in various embodiments, vehicle 2 may include a multiple output voltage regulator/rectifier 660 configured to increase available electrical power by providing output power to independently charge a starting battery 661 and/or auxiliary batteries 662. Voltage regulator/rectifier 660 is generally coupled between a stator 664 of vehicle 2 and starting battery 661 and/or auxiliary batteries 662, and generally includes a first section 665 configured to convert AC voltage from stator 664 to a DC voltage that is substantially greater than a voltage of batteries 661 and/or 662 and a second section 666 configured to step down the DC voltage to the voltage of batteries 661 and/or 662. First section 665 is generally coupled to second section 666 via a DC link 667 (i.e. two wires). First section 665 operates as a series-type regulator, whereby a current of stator 664 periodically drops to zero when there is excess power available from stator 664, and rectifies into a higher voltage resulting in lower stator currents and lower stator temperatures, particularly when engine 510 is operating at cruising speeds. In various embodiments, first section 665 is a conventional silicon controlled rectifier-based ("SCR-based") series voltage regulator. Second section 666 generally comprises multiple buck-type DC-DC converter circuits, whereby each DC-DC converter circuit can feed its own regulator output, or multiple circuits can be wired in parallel for increased power. In various embodiments, a first output 668 is provided for charging starting battery 661 and a second output 669 is provided for charging auxiliary batteries 662. When there is insufficient power available to keep both of first and second outputs 668, 669 at their desired voltages, first output 668 is given priority and second output 669 is allowed to decrease. In various embodiments, first and second outputs 668, 669 may have different desired voltages and/or maximum output currents. Voltage regulator/rectifier 660 allows for reduced temperatures of stator 664, increased output power for stator 664, independent charging of stating battery 661 and auxiliary batteries 662, and no need for a battery isolation contactor.

Figure 104A:
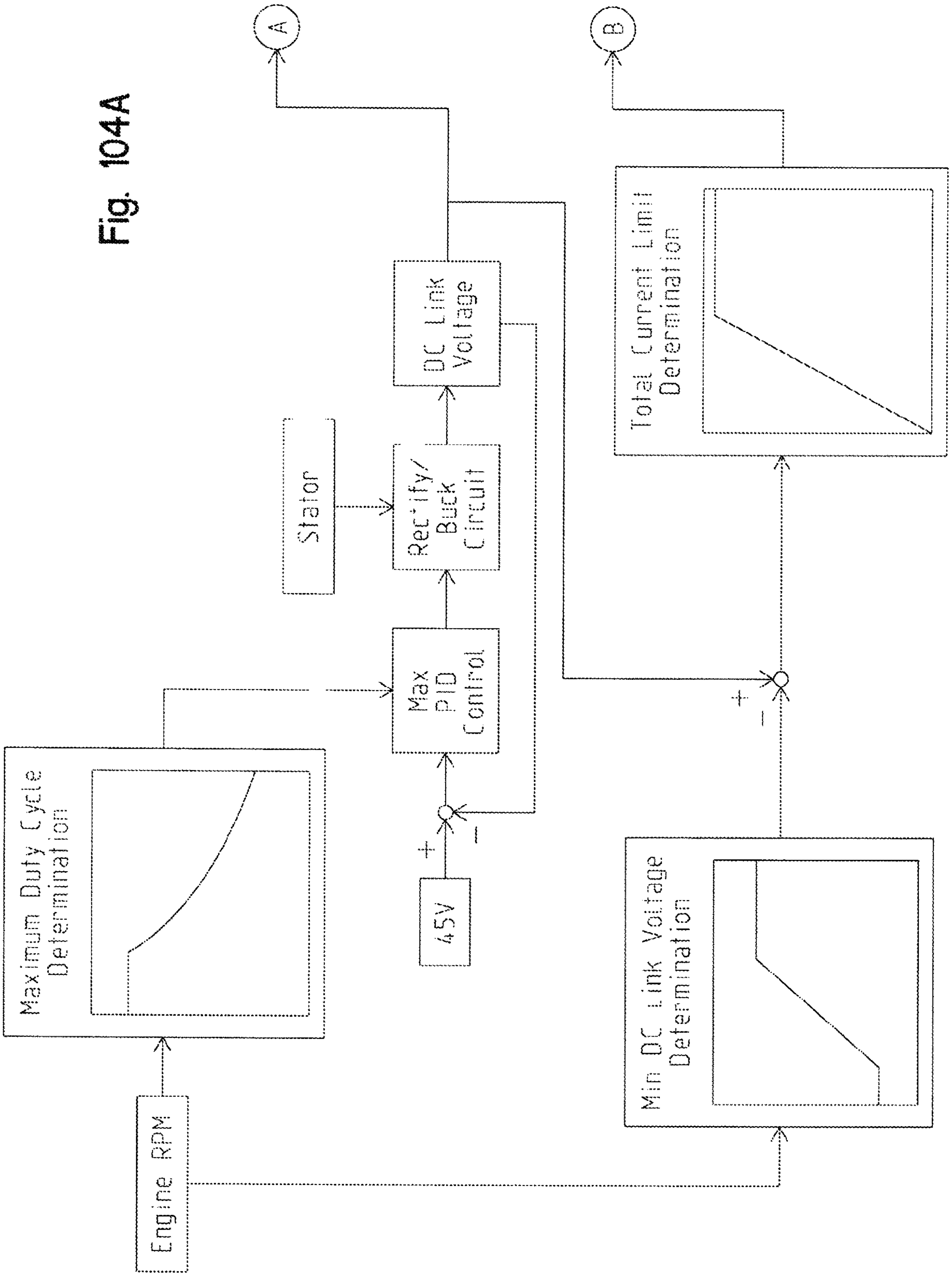
FIG. 104A-B show a control circuitry/logic for the voltage regulator/rectifier of FIG. 103, a stator of the present disclosure, and/or batteries of the present disclosure.
Figure 104B:
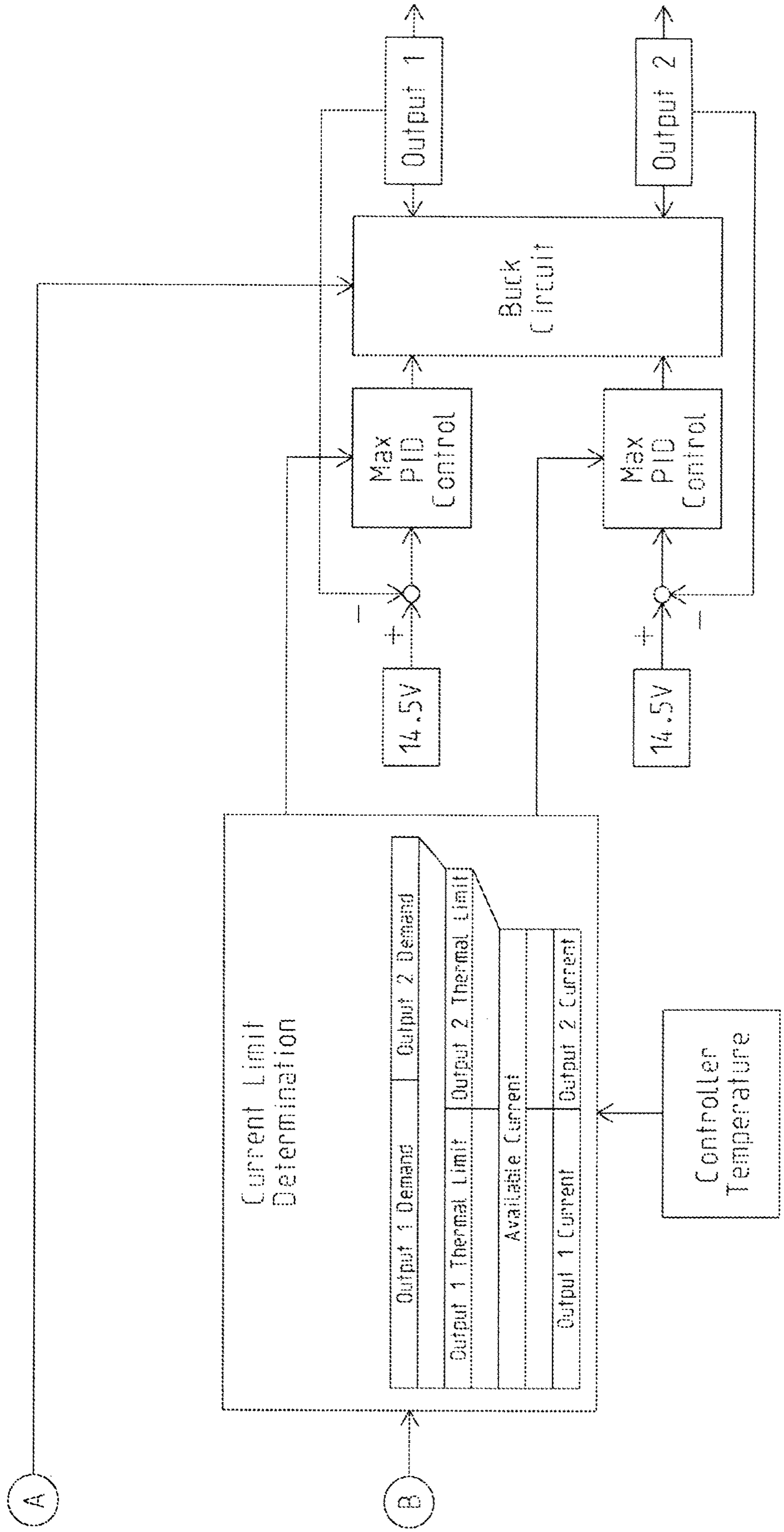

Referring to FIGS. 104A-B, a control circuitry/logic is shown for stator 664, voltage regulator/rectifier 660, and/or batteries 661 and 662 that is configured to monitor the AC voltage of stator 664 to determine a magneto flywheel speed, which is typically equal to an RPM of engine 510, and determine a target DC link voltage based on the determined magneto flywheel speed and an output current of regulator/rectifier 660 in order to limit heat generation of stator 664. The target DC link voltage is generally at its maximum, but it can be lowered at low RPM and high output current in order to increase the available power. In various embodiments, the flywheel speed is also used to determine a minimum DC link voltage, which is typically approximately 10 V at idle and increasing to 40 V at high RPM. The control circuitry/logic may include a proportional-integral-derivative ("PID") controller (not shown) to control the DC link voltage at 45V, and each DC-DC converter circuit in second section 666 may include an associated PID controller (not shown) to provide constant output voltage subject to a current limit. The current limit is adjusted based on the DC link voltage, the operating temperature, and the priority of outputs 668 and 669. The current is never more than the rating of the DC-DC converter circuit. The total current limit is generally calculating as:

$$I_T=\min(I_R(V_{link}-V_{min})*K)$$

where IR is the rated current, $V_{link}$ is the measured DC link voltage, $V_{min}$ is the minimum DC link voltage as a function of the flywheel speed, and K is a control constant, in A/V. Furthermore, the following pseudo code determines the output current for each output:

```
For x = 1..N {
  Io = max(0, PID(Vout[x]−Vtarget[x], Iout[x]))
  Io = min(Io, IT, Temp_limit(Tdevice, Imax[x]))
  Iout[x]= Io and IT = IT − Io
  }
```

where $V_{out}[x]$ is the measured output voltage of output X, $V_{target}[x]$ if the target output voltage of output X, Iout[x] is the commanded output current of output x, function PID (error, current output) calculated the target output current, $T_{device}$ is the measured device temperature, and Function Temp_limit (temp, $I_{max}$) calculates the maximum current at the given temperature. In this way, each output is protected from overheating and the lower-numbered outputs receive priority when total available power is limited.

Figure 105:
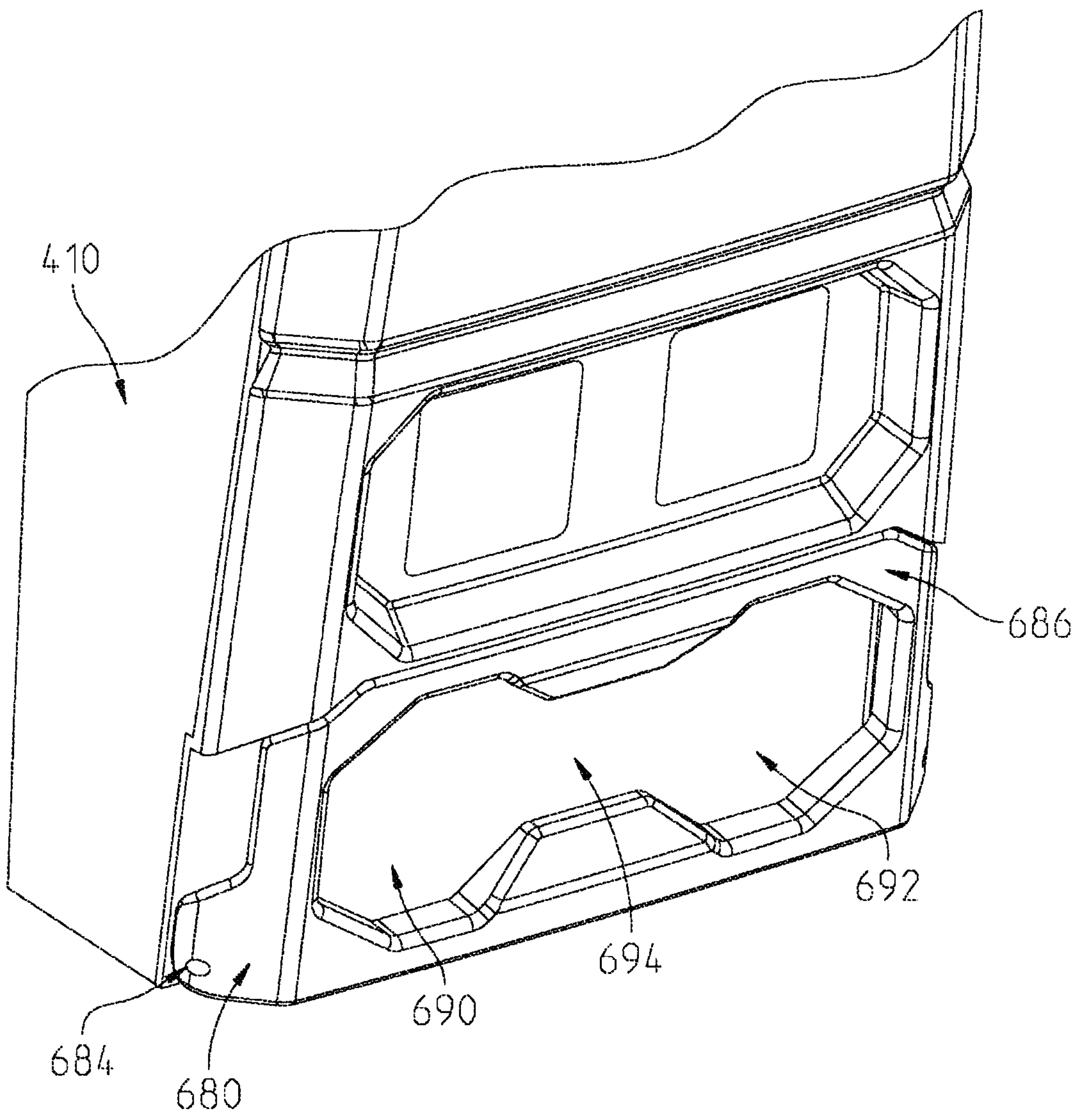
FIG. 105 shows a perspective view of a cupholder of the present disclosure in a stored or closed configuration.
Figure 106:
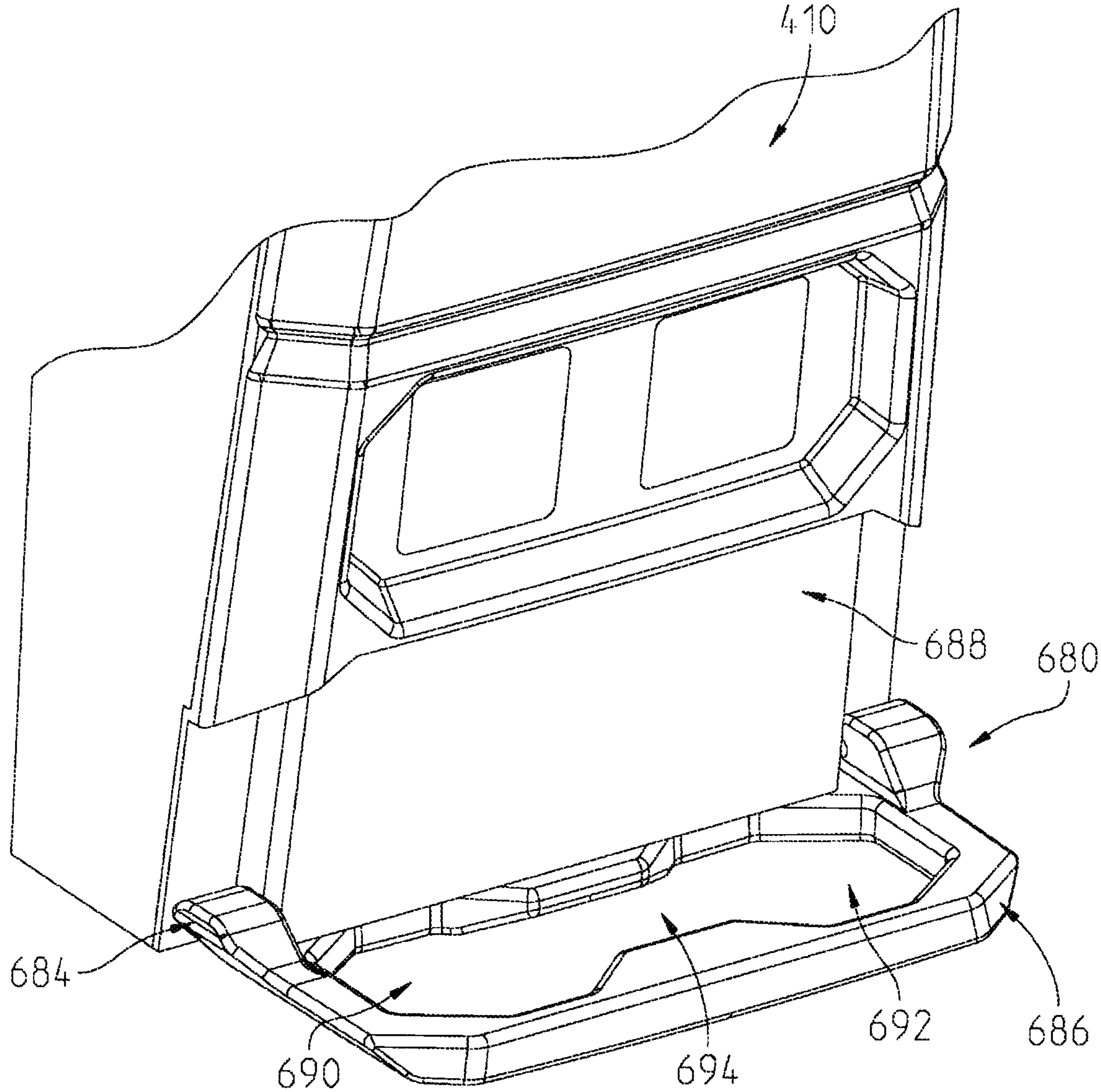
FIG. 106 shows a perspective view of the cupholder of FIG. 105 in an open or use configuration.
Figure 107:
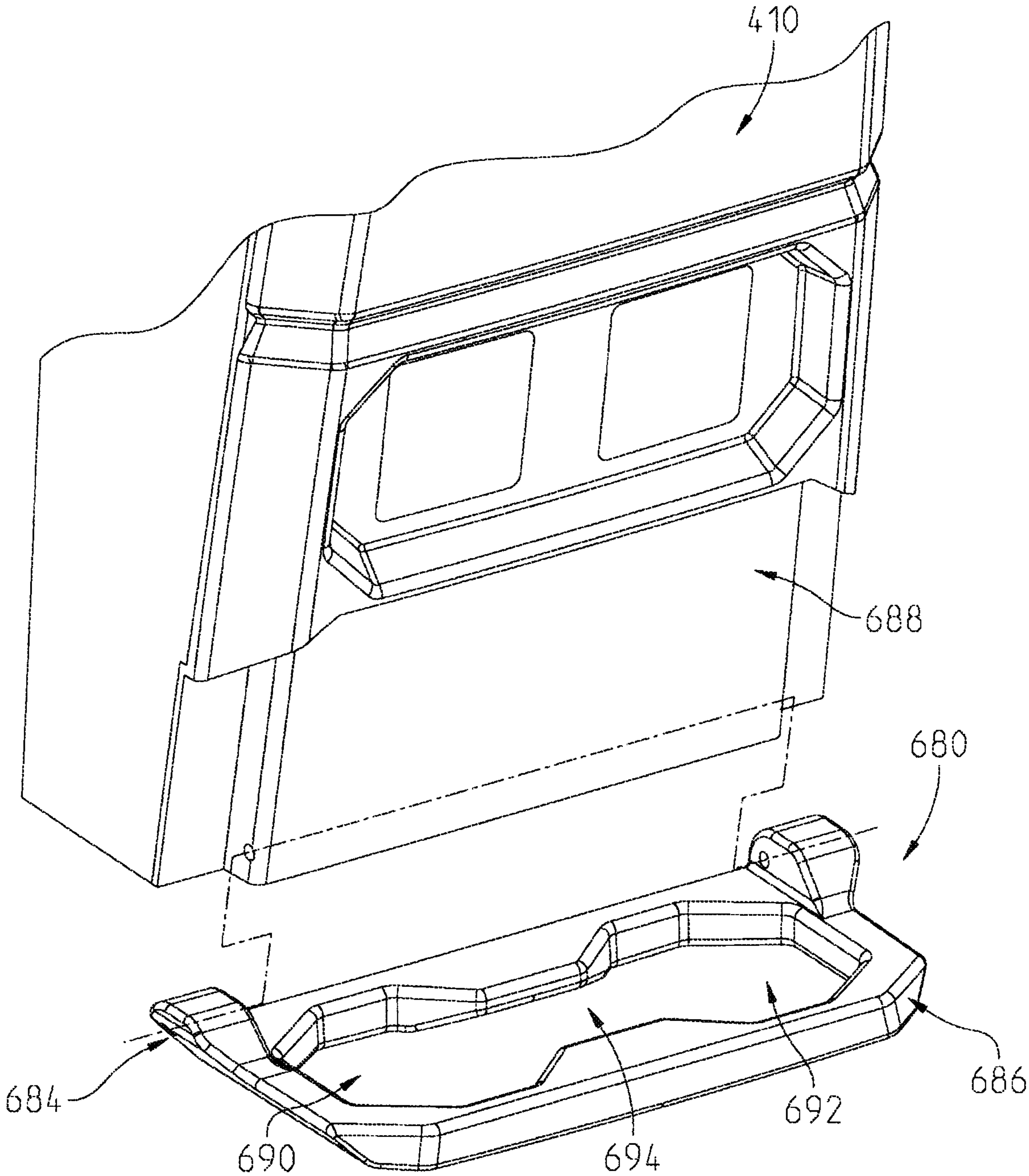
FIG. 107 shows an exploded view of the cupholder of FIG. 105.
Figure 108:
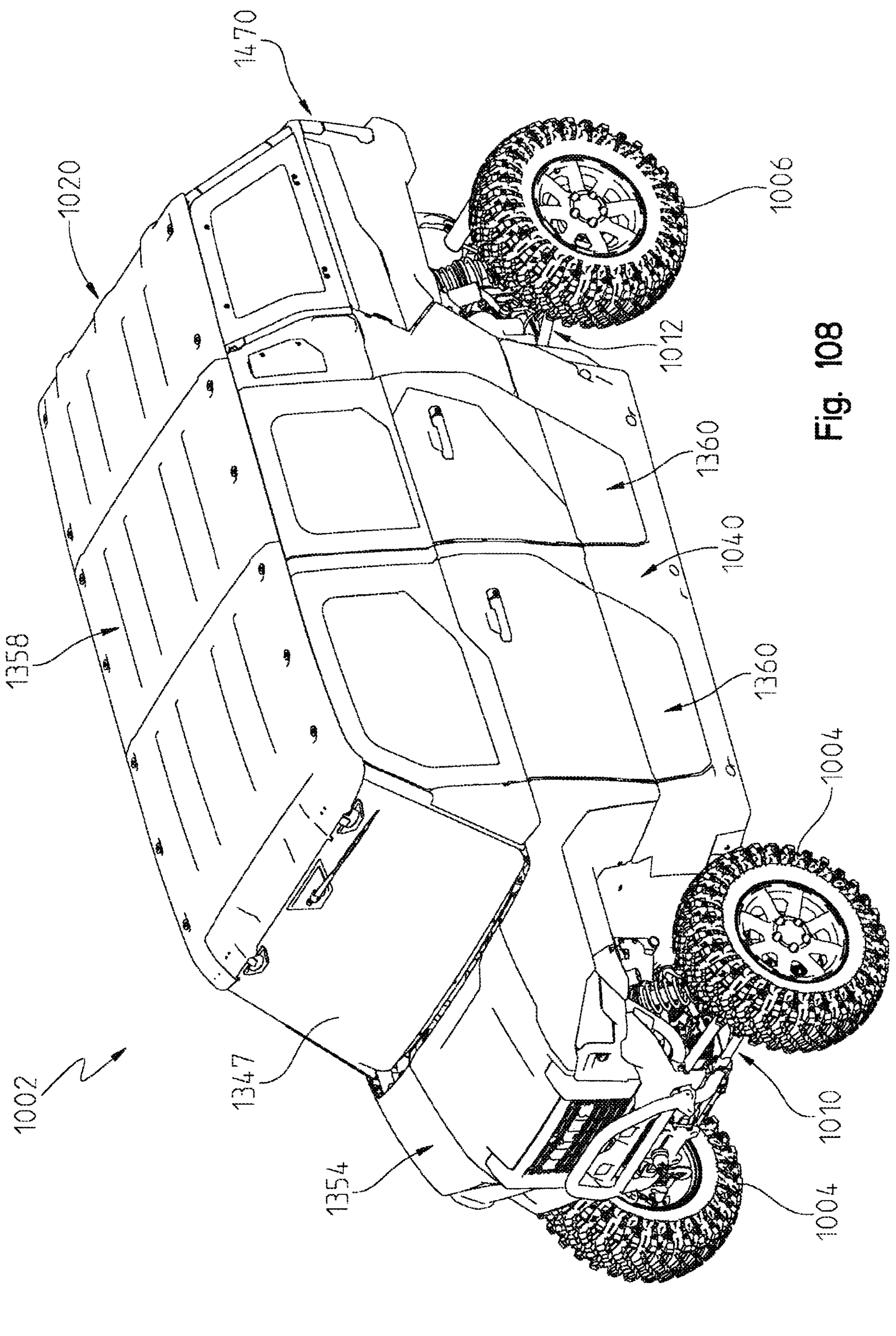
FIG. 108 shows a front left perspective view of a vehicle of the present disclosure with another embodiment of a body assembly.
Figure 109:
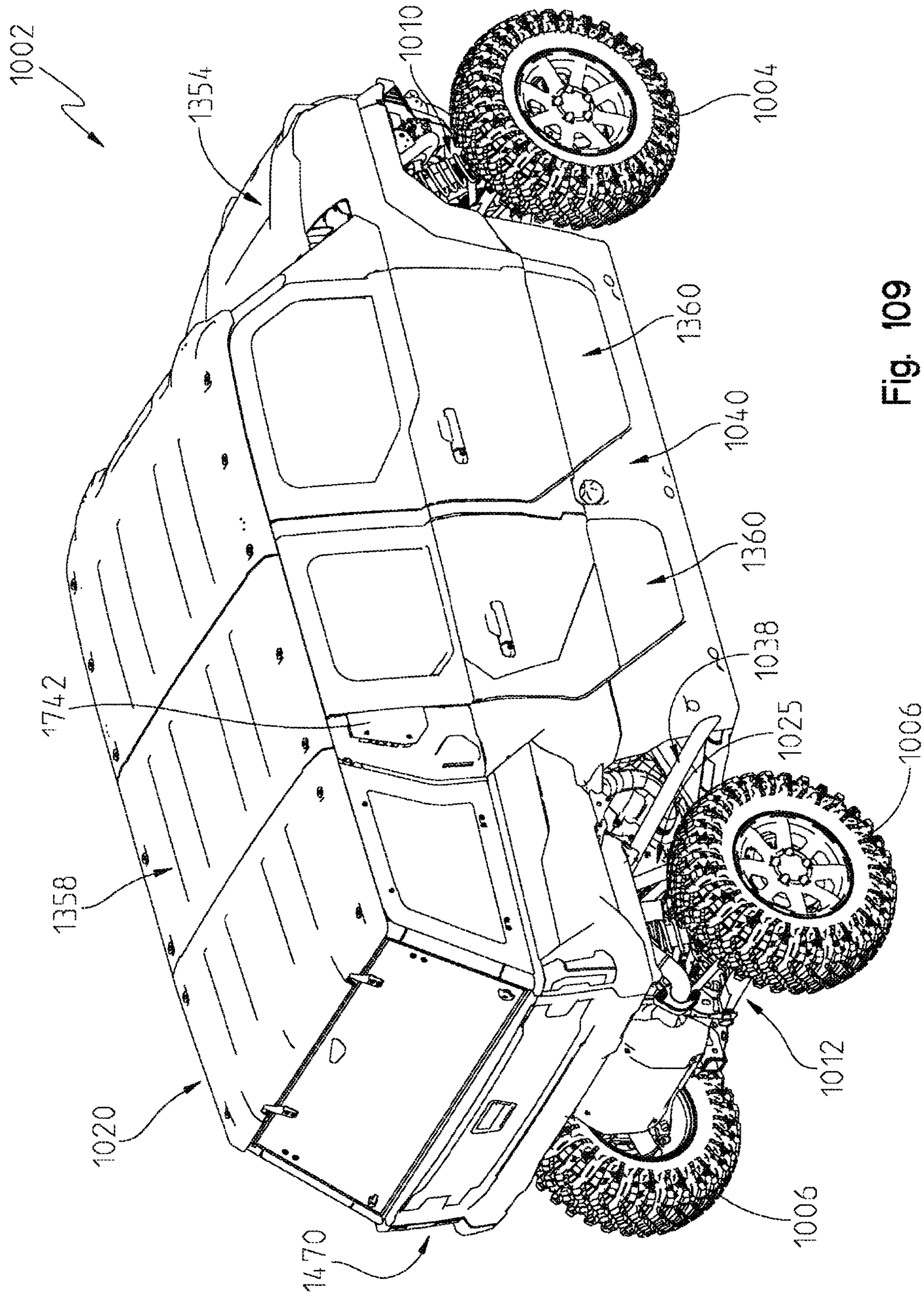
FIG. 109 shows a rear right perspective view of the vehicle of FIG. 108.
Figure 110:
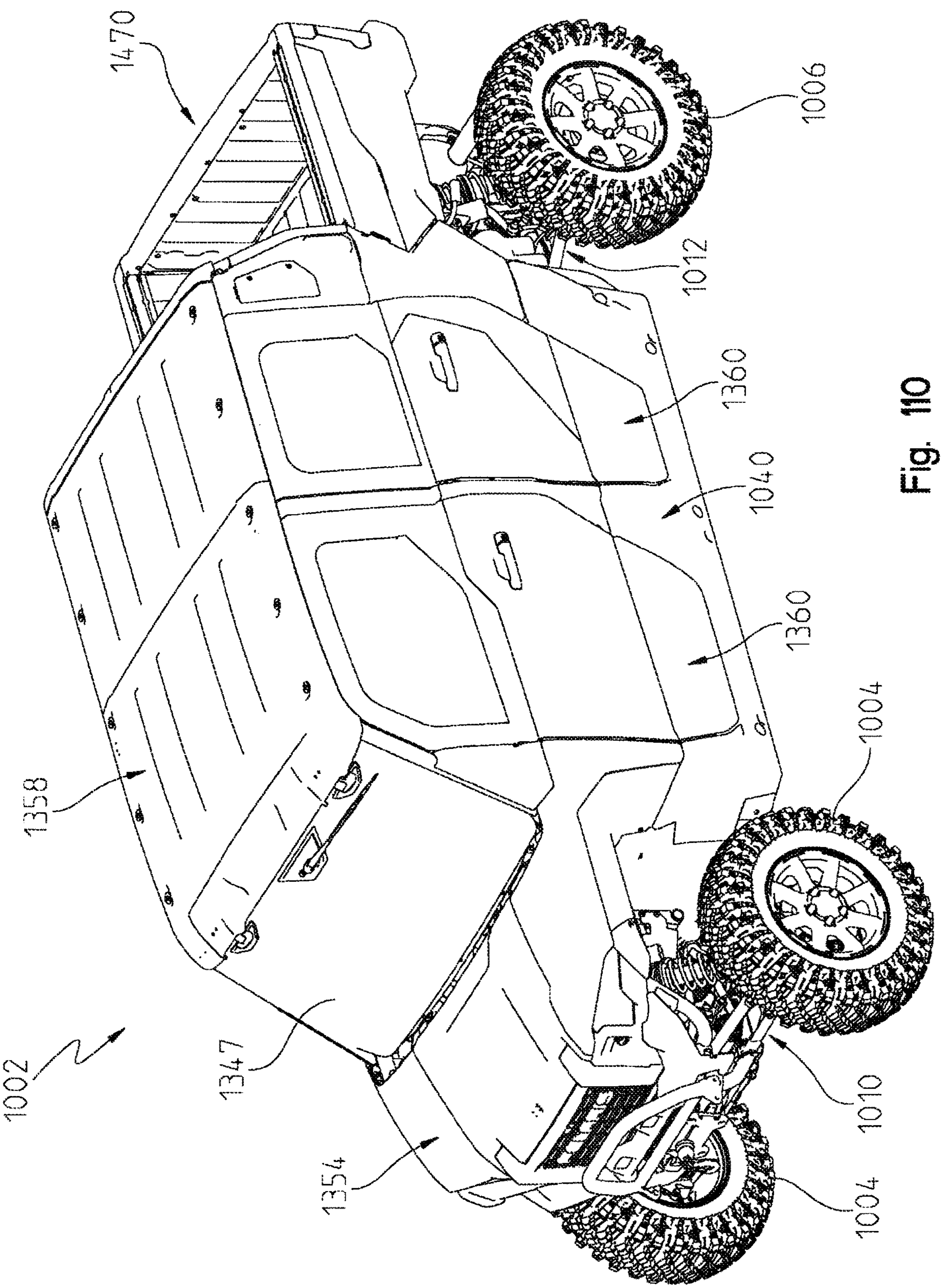
FIG. 110 shows a front left perspective view of a vehicle of the present disclosure with another embodiment of a body assembly.
Figure 111:
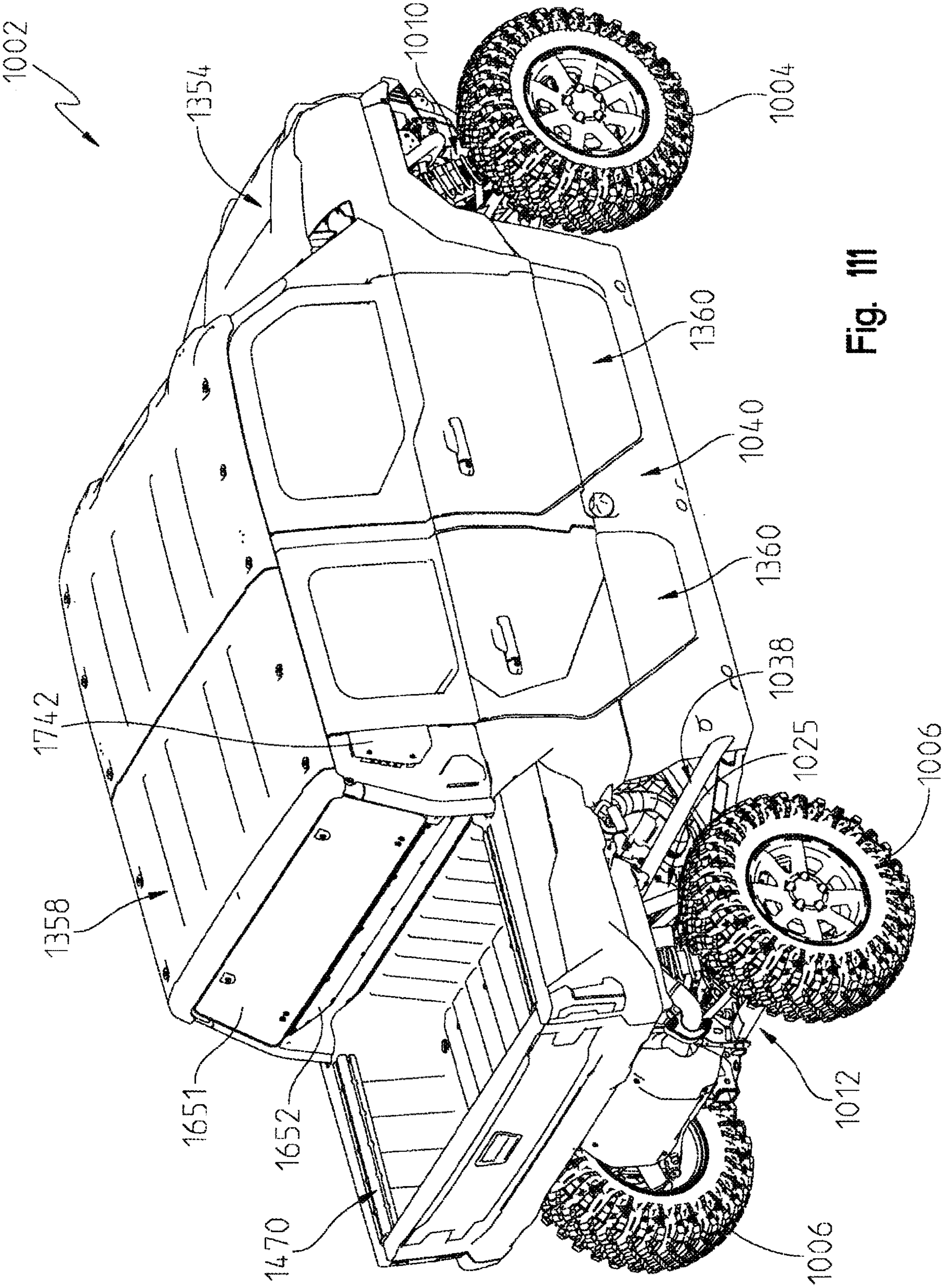
FIG. 111 shows a rear right perspective view of the vehicle of FIG. 110.

Referring now to FIGS. 105-107, in various embodiments, vehicle 2 may include a fold-up cup holder 680 coupled to a rear end of center console 410 positioned between driver's seat 28 and front passenger seat 30. Fold-up cup holder 680 is generally coupled to center console 410 at a lower end 684 such that an upper end 686 of fold-up cup holder 680 is configured to pivot out and down away from center console 410 into an open or use configuration (FIG. 106). Center console 410 generally includes an indentation 688 configured to receive fold-up cup holder 680 when in a closed or stored configuration (FIG. 105). Fold-up cup holder 680 generally includes a first opening 690 and a second opening 692, where first opening 690 and second opening 692 may be coupled via a channel opening 694 in various embodiments.

With reference again to FIG. 55, in various embodiments, a gear shifter handle 696 of vehicle 2 may include an actuating mechanism 698 configured to control a winch (not shown) of vehicle 2. Actuating mechanism 698 may be a plurality of individual buttons positioned above/below one another or forward/rearward of one another, a toggle button, and/or other various actuating mechanisms.

FIG. 108-111 illustrates an alternative embodiment of vehicle 2 which is shown as vehicle 1002, and vehicle 1002 will now be described in greater detail. Vehicle 1002 generally includes a pair of front ground engaging members 1004 and a pair of rear ground engaging members 1006. Vehicle 1002 includes a lower frame portion 1038 supported by the ground engaging members 1004, 1006. A front suspension 1010 is operably coupled to lower frame portion 1038 and front ground engaging members 1004. Front suspension 1010 may be a dual alignment or control-arm suspension or may further be a strut-style suspension. In various embodiments, front suspension 1010 may be any other type of front suspension. A rear suspension 1012 is operably coupled to lower frame portion 1038 and rear ground engaging members 1006. Rear suspension 1012 may be a dual alignment or control-arm suspension or may further be a strut-style suspension. In various embodiments, rear suspension 1012 may be any other type of rear suspension.

A cab frame 1036 (FIG. 115) is supported by lower frame portion 1038. Cab frame 1036 is positioned above and coupled to lower frame portion 1038. A body assembly 1040 is supported by lower frame portion 1038 and cab frame 1036. A plurality of doors 1360 may be coupled to lower frame portion 1038 to fully enclose an operator area (not shown) of vehicle 1002. Body assembly 1040 includes a hood 1354 positioned at a forward portion of vehicle 1002. A windshield 1347 is positioned rearward of hood 1354 and further encloses the operator area of vehicle 1002. A roof 1358 is positioned on top of cab frame 1036 and is configured to further enclose the operator area of vehicle 1002. Roof 1358 may include a plurality of roof panels or may further include a single roof panel.

Vehicle 1002 includes a cargo box 1470 positioned at a rear of vehicle 1002. Illustratively cargo box 1470 may tilt or rotate to help empty the contents of cargo box 1470. Additionally, cargo box 1470 may support a box cover 1020 configured to enclose the cargo box 1470. Box cover 1020 may sealingly couple to either or both of cargo box 1470 and frame assembly 1036, 1038 to provide an increased enclosed area. In the present embodiment, vehicle 1002 includes a powertrain assembly 1025 including an air intake assembly (FIG. 154) coupled to an engine (not shown) of the powertrain assembly 1025. Air intake assembly includes an air intake aperture 1742 positioned on a side of vehicle 1002.

As described herein, various systems will be described in relation to the additional embodiment described in FIG. 108-111. In embodiments, each system described herein can be used with any embodiment of vehicle 2 or vehicle 1002.

Figure 112:
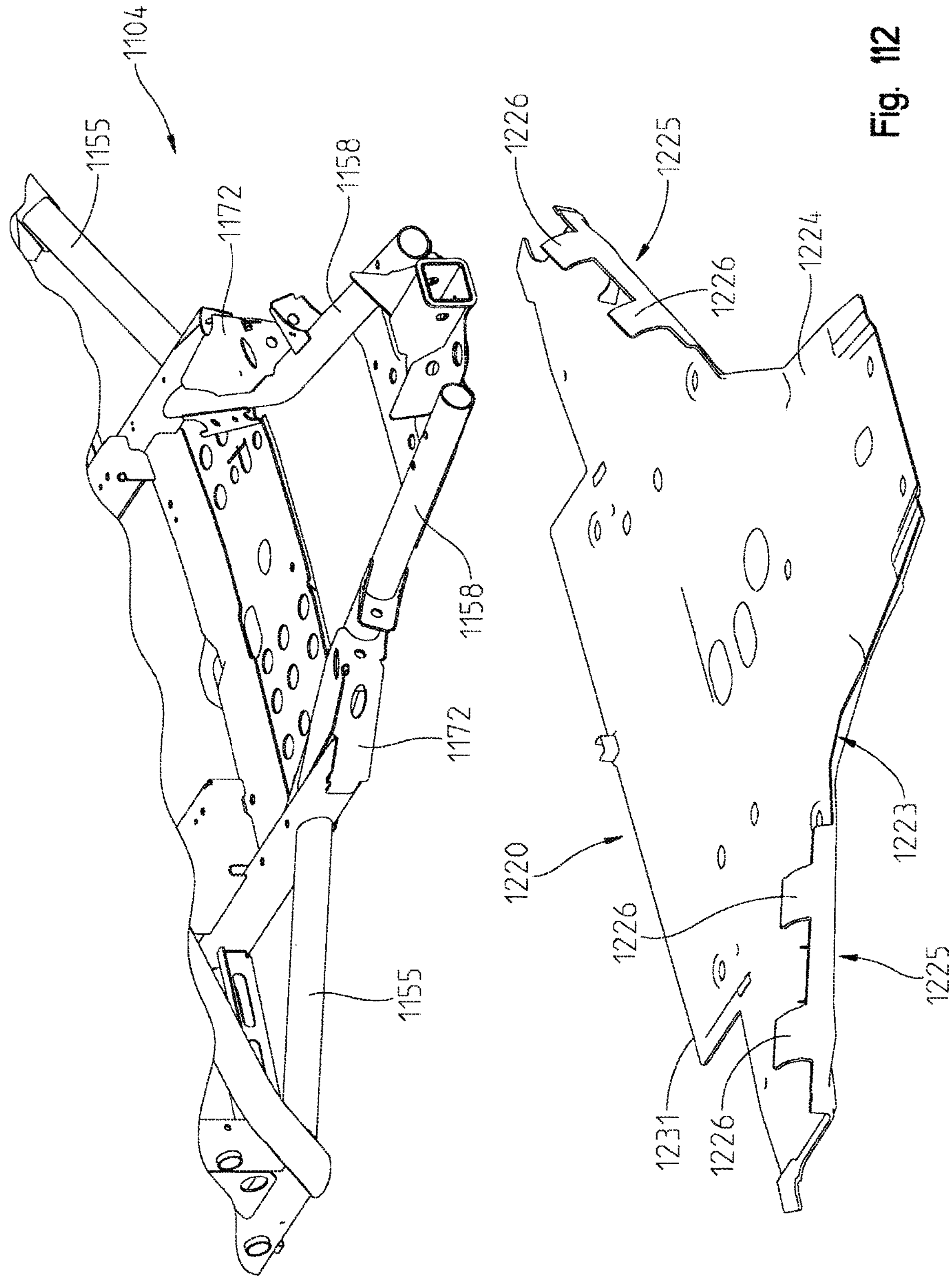
FIG. 112 shows an exploded view of a portion of a skid plate of the present disclosure.
Figure 113:
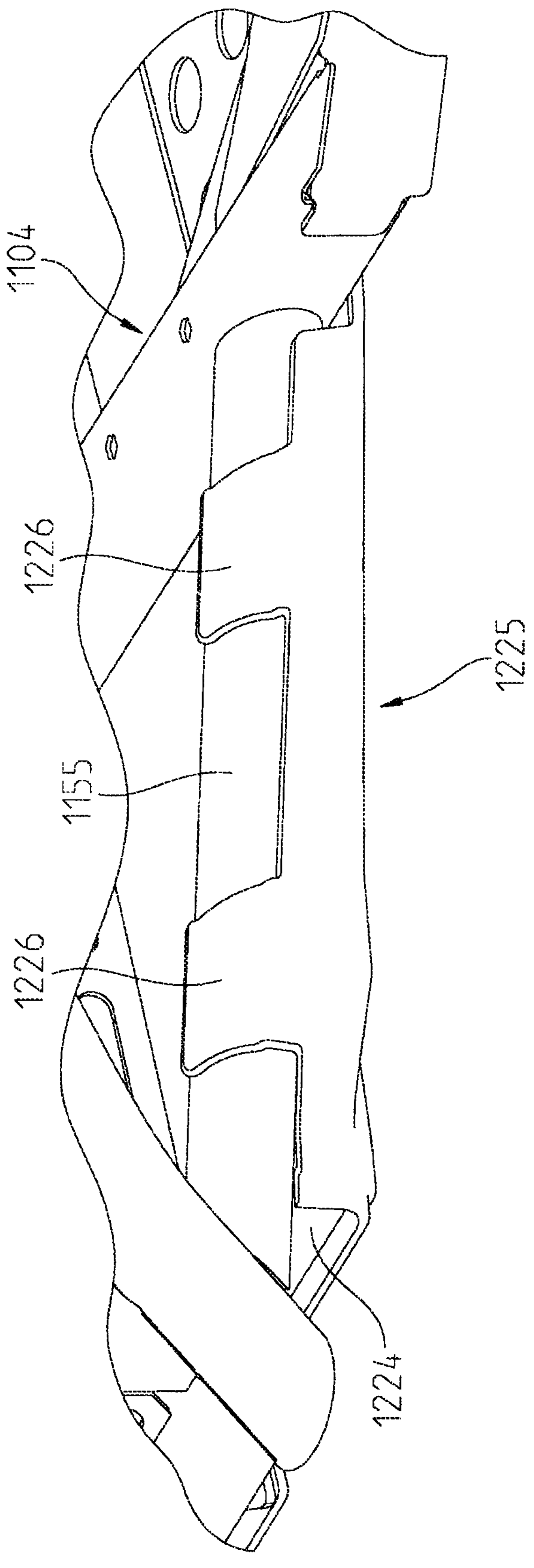
FIG. 113 shows a retention clip of the skid plate of FIG. 112.
Figure 114:
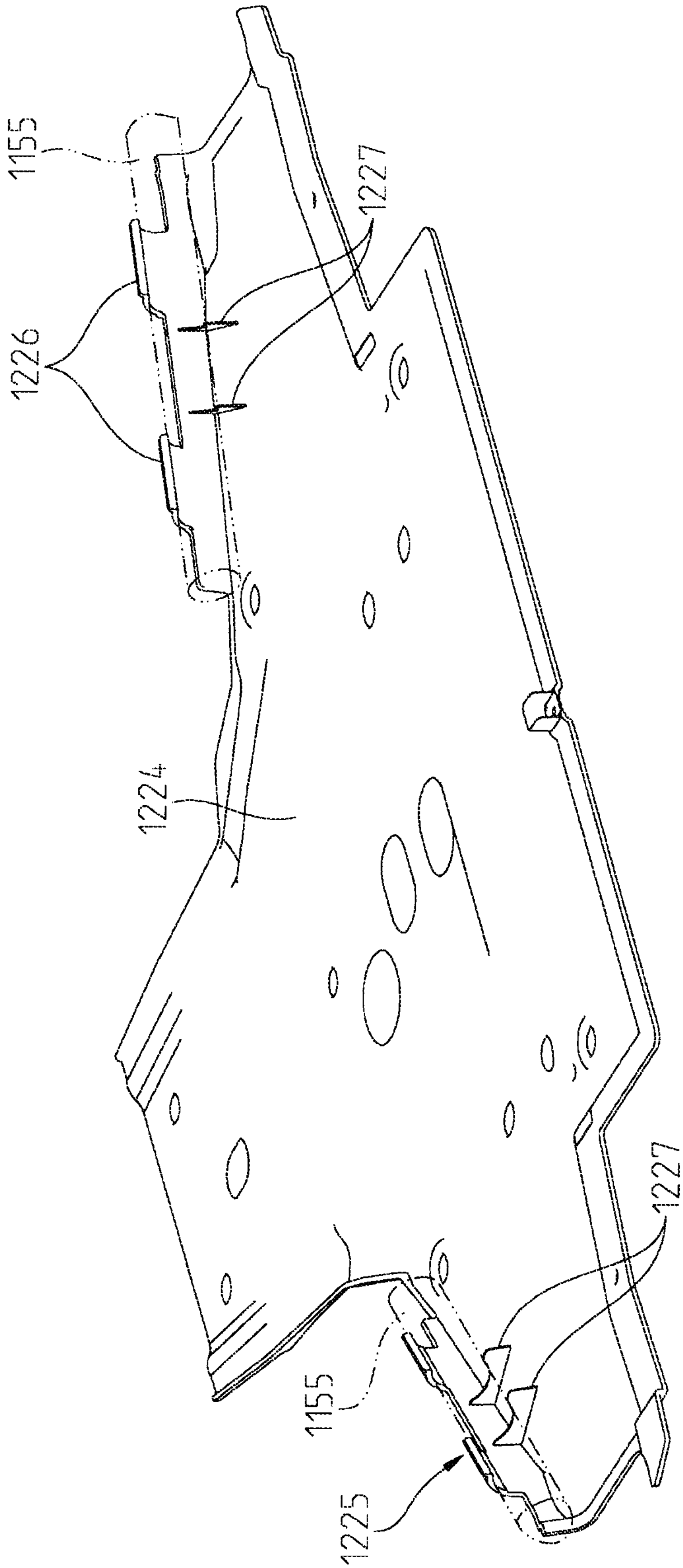
FIG. 114 shows a portion of the skid plate of FIG. 112.

With reference now to FIG. 112-114, skid plate 1220 includes a second portion 1224 which comprises a forward surface 1231 configured to interface with additional portions of skid plate 1220. Second portion 1224 is generally positioned vertically below and coupled to rear frame portion 1104 at a pair of rear frame members 1155. Second portion 1224 is coupled to rear frame members 1155 by clips 1225 positioned at a rearward surface 1223 of second portion 1224. In an exemplary embodiment, second portion 1224 comprises a pair of clips 1225, each configured with a pair of extensions 1226. In the present embodiment, extensions 1226 are generally arcuate shaped and when second portion 1224 is installed on rear frame portion 1104, extensions 1226 extend around a portion of rear frame members 1155. Illustratively, second portion 1224 is coupled to rear frame portion 1104 at the rearward surface 1223 without the use of fasteners. However, in various embodiments, the use of fasteners is contemplated and may be used to further couple or fasten second portion 1224 of skid plate 1220 to rear frame portion 1104.

As best seen in FIG. 114, second portion 1224 comprises a plurality of support brackets 1227 configured to support rear frame members 1155 (FIG. 113). In the present embodiment, each clip 1225 includes a pair of support brackets 1227 positioned vertically lower than extensions 1226. Further, support brackets 1227 are coupled between the second portion 1224 and clip 1225, which provides additional rigidity to clip 1225 while also providing support to rear frame member 1155. In the present embodiment, support brackets 1227 comprise an arcuate surface configured to interface with a lower side of rear frame members 1155 and extensions 1226 extend over the top of rear frame members 1155.

In the present embodiment, second portion 1224 protects at least a portion of rear frame portion 1104. Further, second portion 1224 protects the pair of rear frame members 1155, a pair of lower longitudinally extending frame members 1158, and a pair of transition brackets 1172. In various embodiments, second portion 1224 may be contoured to interface with the rear frame members 1155, the lower longitudinally extending frame members 1158, and transition brackets 1172.

Figure 115:
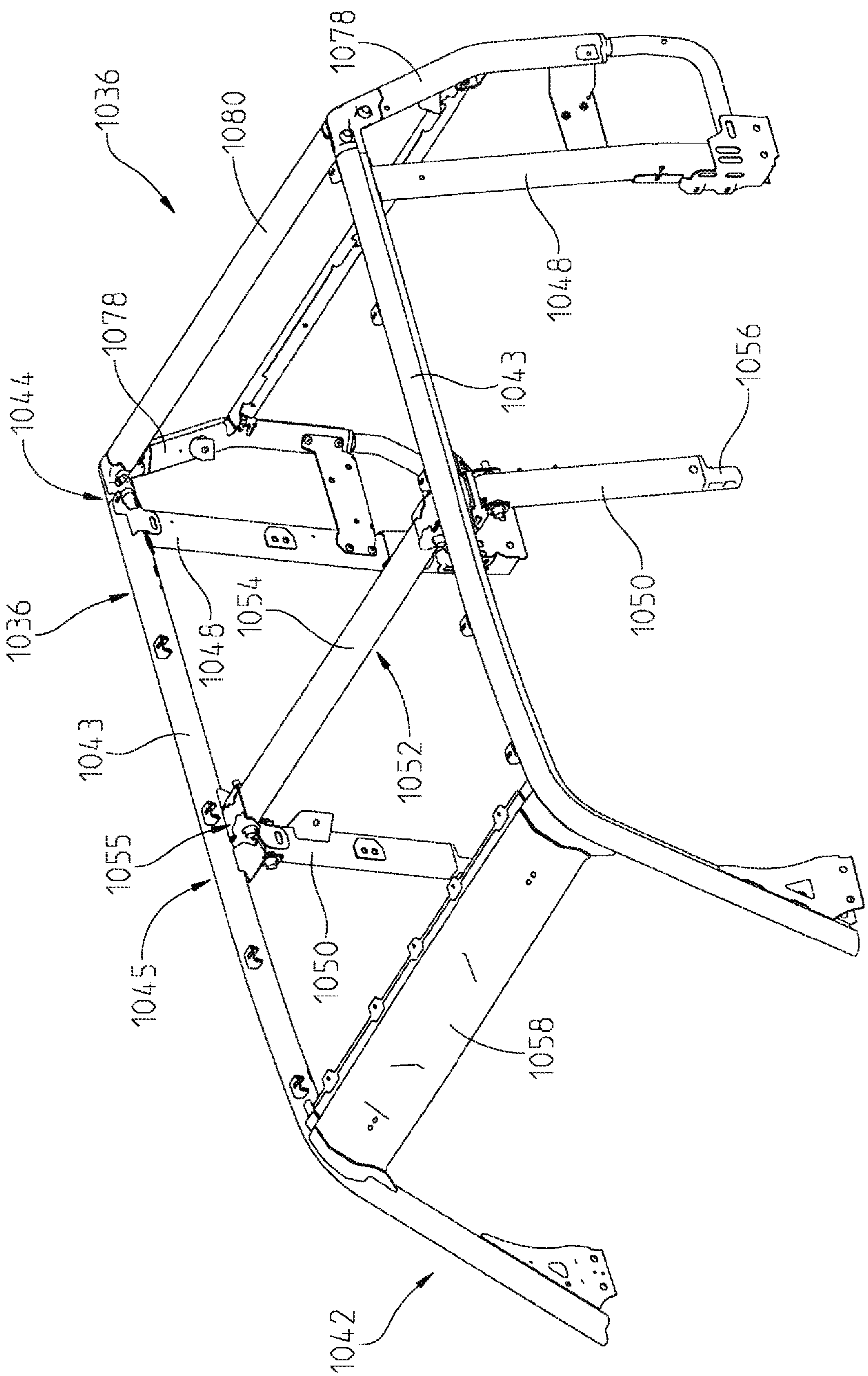
FIG. 115 shows a cab frame of the present disclosure.
Figure 116:
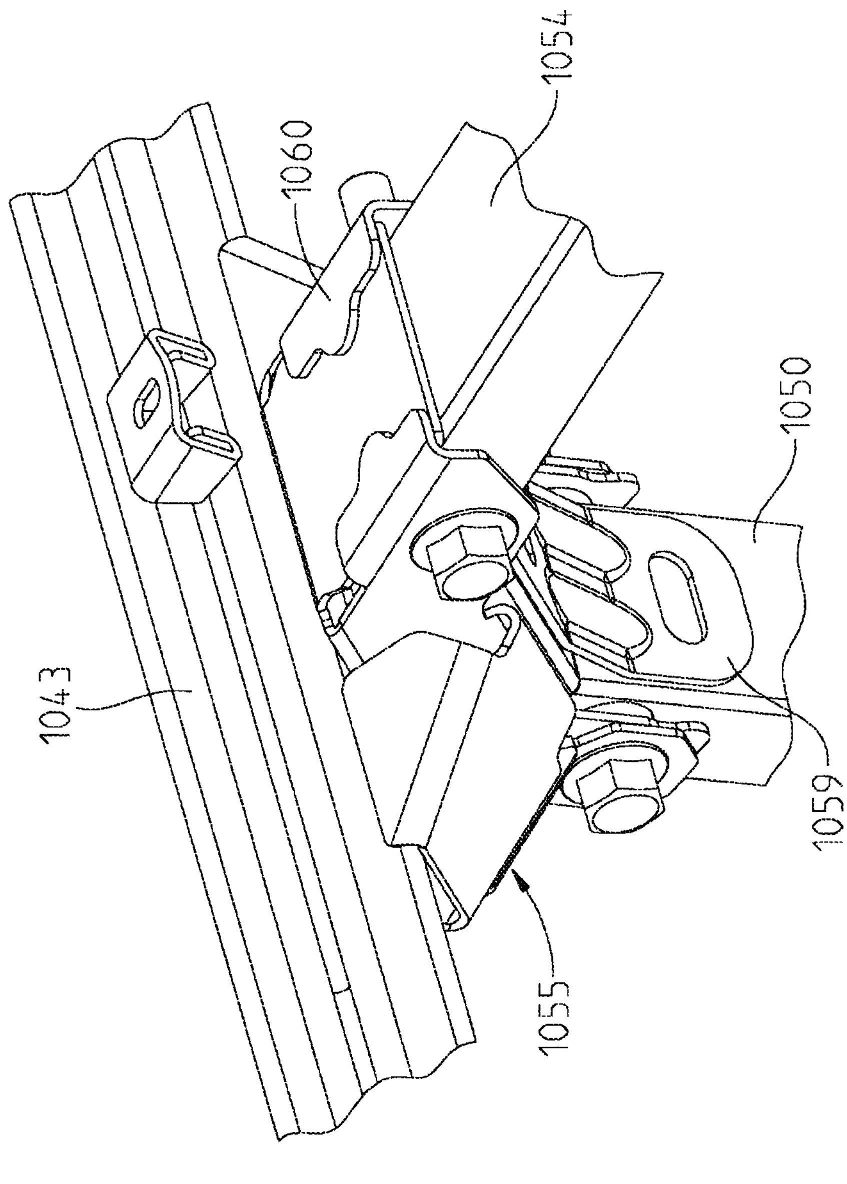
FIG. 116 shows a support bracket of the cab frame of FIG. 115.

Now turning to FIGS. 115-119, a bracket 1055 of the cab frame 1036 will be explained in greater detail. As best seen in FIG. 115, cab frame 1036 comprises a front frame portion 1042 and a rear frame portion 1044 which are coupled via a pair of longitudinally extending frame members 1043. In various embodiments, cab frame 1036 further comprises a middle frame portion 1045. Cab frame 1036 further comprises a horizontally extending frame member 1058 positioned towards the front portion of cab frame 1036 and coupled between the pair of longitudinally extending frame members 1043 adjacent front frame portion 1042. Further, cab frame 1036 may comprise a horizontal frame member 1080 positioned towards the rear portion of cab frame 1036 and coupled between the pair of longitudinally extending frame members 1043 adjacent rear frame portion 1044. In various embodiments, cab frame 1036 further comprises frame assembly 1052 extending between longitudinally extending frame members 1043. Frame assembly 1052 comprises horizontally extending frame member 1054 and a pair of downwardly extending vertical members 1050. Downwardly extending vertical members 1050 comprise castings 1056 positioned at their lower extent to couple to lower frame portion 1038. As best seen in FIG. 116, frame assembly 1052 is operably coupled to longitudinally extending frame members 1043 through brackets 1055. Bracket 1055 provides a method of coupling frame assembly 1052 and longitudinally extending frame members 1043 without having to interrupt the cross-section of frame assembly 1052 or longitudinally extending frame members 1043.

Figure 117:
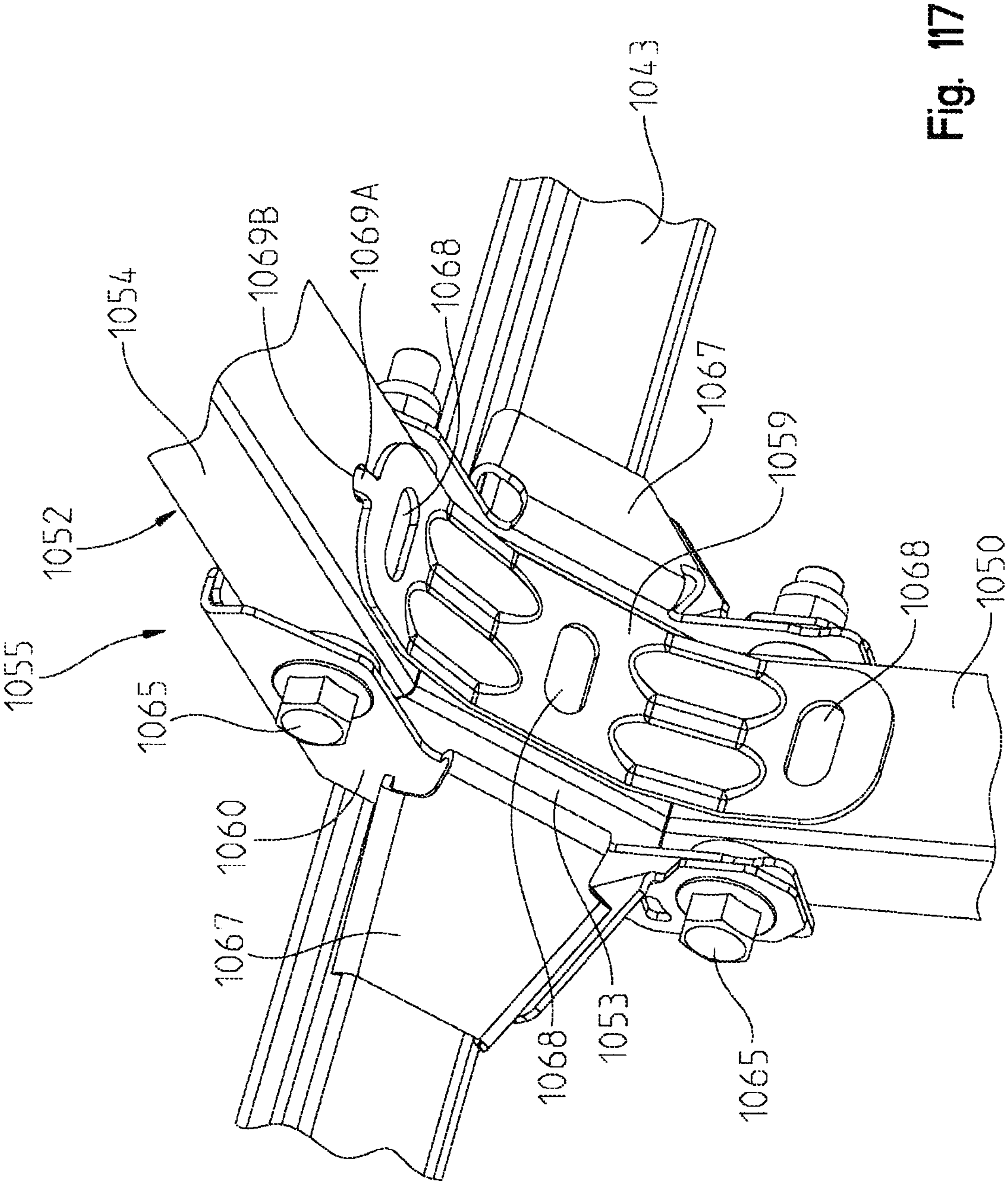
FIG. 117 shows a bottom perspective view of the support bracket of FIG. 116.

Referring to FIGS. 116-119, bracket 1055 comprises a bracket body 1060 coupled to horizontally extending frame member 1054, longitudinally extending frame member 1043, and downwardly extending vertical member 1050. Illustratively, bracket body 1060 is positioned to couple with the outer sides of horizontally extending frame member 1054, is operably coupled to downwardly extending vertical member 1050, and is further coupled to a lower side of longitudinally extending frame member 1043. As best seen in FIG. 117, a bracket 1059 is coupled on the inner sides of horizontally extending frame member 1054 and downwardly extending vertical member 1050. Bracket 1059 comprises a locating feature 1069A configured to extend within an opening 1069B within the lower side of horizontally extending frame member 1054. Further, bracket 1059 comprises a plurality of openings 1068 that allow bracket 1059 to be welded to horizontally extending frame member 1054, downwardly extending vertical member 1050, and an intermediate member 1053. During the assembly process, bracket 1059 is appropriately positioned using locating feature 1069A and then welded onto horizontally extending frame member 1054, downwardly extending vertical member 1050, and intermediate member 1053. When bracket 1059 is installed, bracket 1059 provides support to the joint around bracket 1055.

Bracket 1055 further comprises a pair of bushings 1057 which are welded within horizontally extending frame member 1054 and downwardly extending vertical member 1050. Bracket body 1060 comprises a first extension 1061 and a pair of second extensions 1063. In the present embodiment, bracket body 1060 comprises a pair of second extensions 1063 extending in substantially the same direction, generally opposite the first extension 1061. Further, first extension 1061 comprises a pair of openings 1062 and second extensions 1063 each comprises an opening 1064. Openings 1062 and 1064 each receives a fastener 1065. Further, bushings 1067 are configured to receive fasteners 1065, which couples bracket body 1060 to frame assembly 1052. In the present embodiment, fasteners 1065 are bolts and are received by a nut 1066. Illustratively, first extension 1061 is coupled to horizontally extending frame member 1054 and second extensions 1063 are coupled to downwardly extending vertical member 1050.

Figure 118:
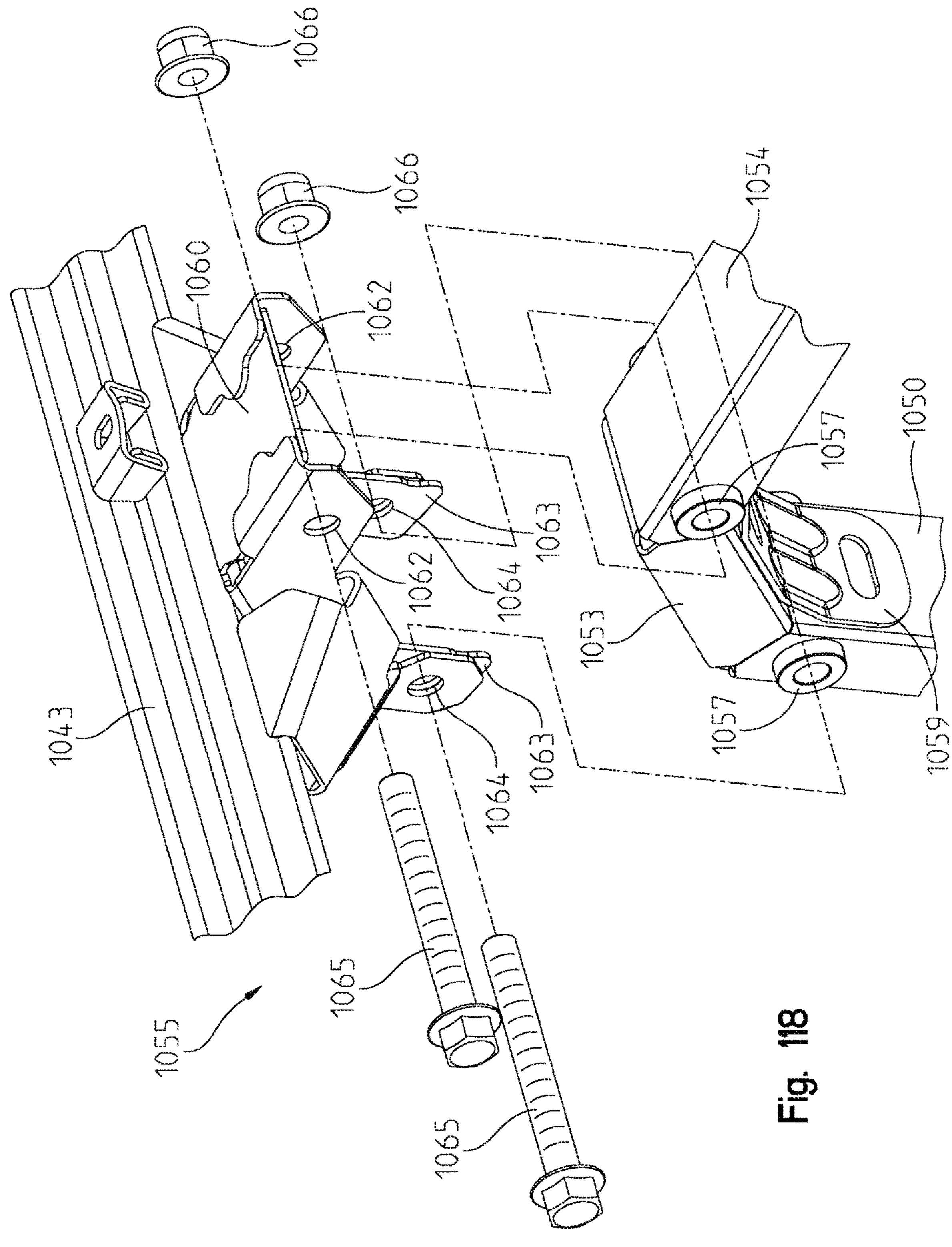
Figure 119:
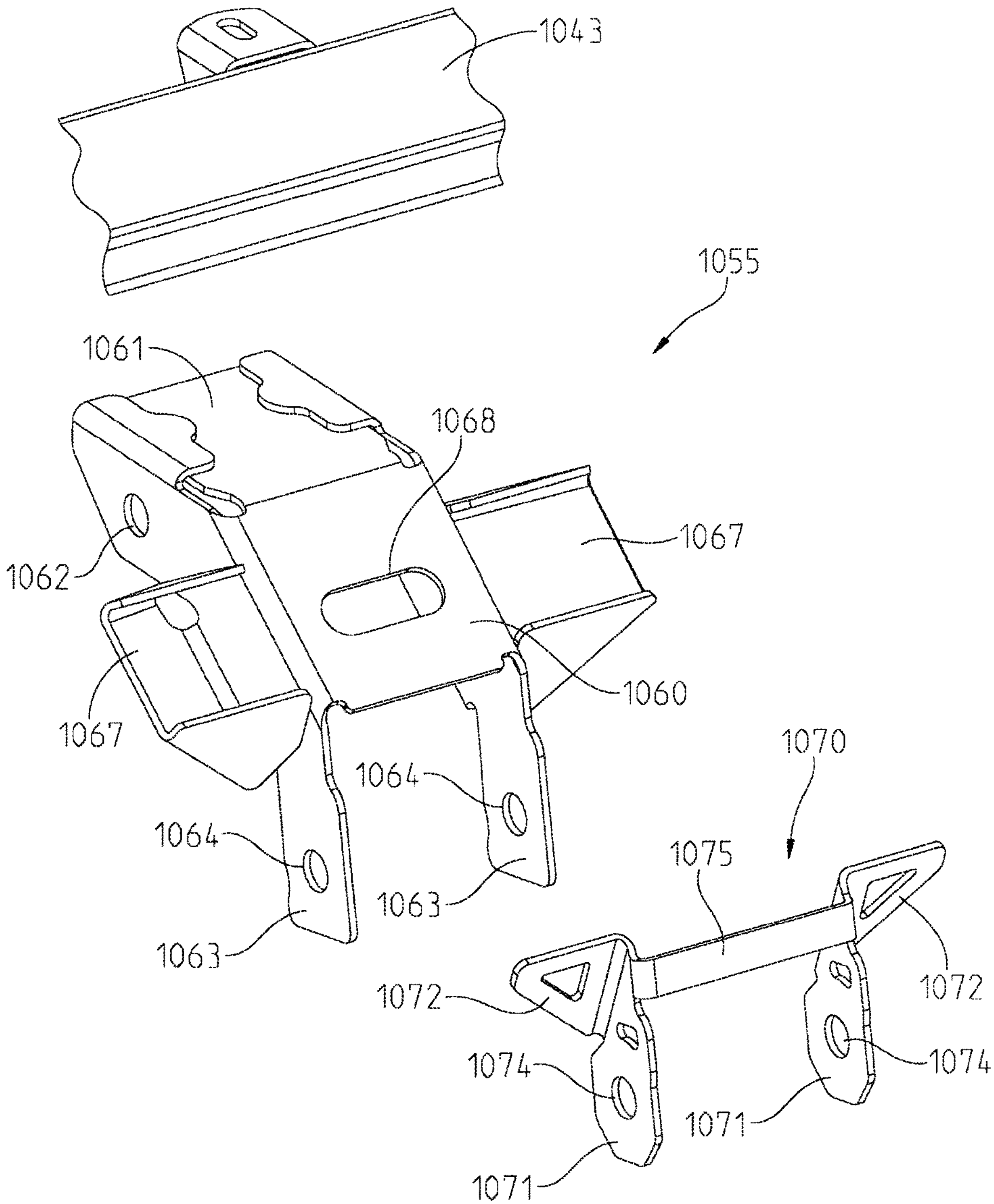

Still referring to FIGS. 117-119, bracket body 1060 further comprises a pair of gussets 1067 extending generally laterally from bracket body 1060 and coupled to longitudinally extending frame member 1043. In the present embodiment, gussets 1067 are welded to longitudinally extending frame member 1043 provide additional support to bracket 1055, and specifically, enhance the rigidity of the joint. Further, bracket body 1060 comprises opening 1068 which provides an additional location for bracket body 1060 to be welded to longitudinally extending frame member 1043.

Referring to FIG. 119, bracket 155 further comprises a doubler bracket 1070 which is welded to bracket body 160. In the present embodiment, doubler bracket 1070 comprises a pair of extensions 1071 each comprising an opening 1074. Extensions 1071 align with second extensions 1063 and openings 1074 align with openings 1064 allowing fastener 1065 to pass through both openings 1064 and 1074. Further, doubler bracket comprises a bridge 1075 coupled between the extensions 1071 and a pair of supports 1072 extending outward. Supports 1072 couple to gussets 1067 through a weld. Doubler bracket 1070 provides additional support to bracket 1055 and second extensions 1063.

In the present embodiment, bracket body 1060 is constructed from a single piece of metal. In various embodiments, bracket body 1060 may be constructed from a plurality of pieces and may be constructed of any rigid material. During manufacturing, doubler bracket 1070 is welded onto bracket body 1060 to increase the structural integrity of bracket body 1060, and bracket body 1060 is welded to longitudinally extending frame member 1043. Further, bushings 1067 are welded within frame assembly 1052 and more specifically within horizontally extending frame member 1054 and downwardly extending vertical member 1050. Bracket 1059 is positioned on the lower side of frame assembly 1052 and welded into place to provide additional support to frame assembly 1052 between horizontally extending frame member 1054 and downwardly extending vertical member 1050. Bracket body 1060 and longitudinally extending frame member 1043 are positioned atop frame assembly 1052 so that openings 1062 and 1064 align with bushings 1067. Finally, fasteners are inserted through openings 1062 and 1064, respectively, and through bushings 1067.

Figure 120:
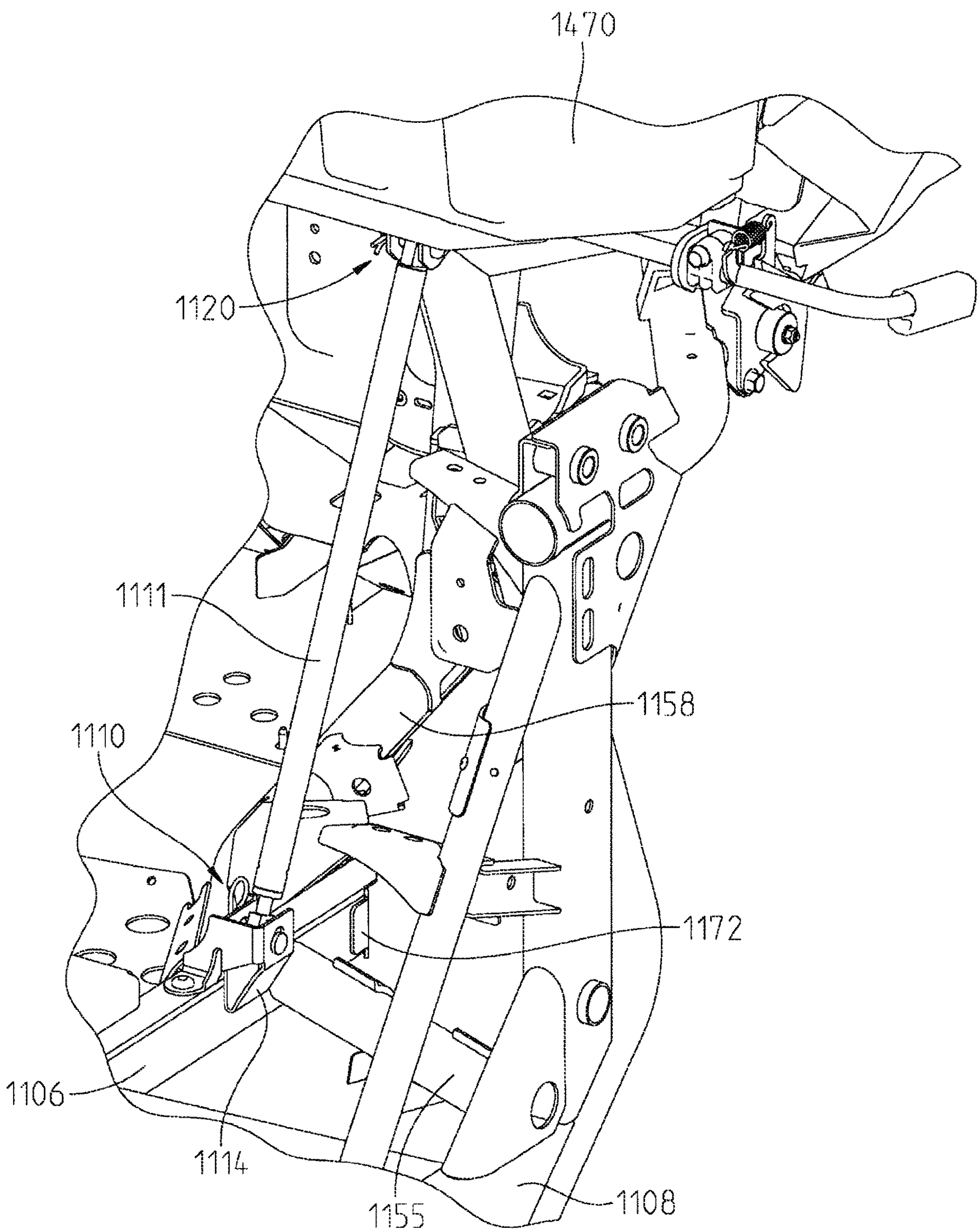
Figure 121:
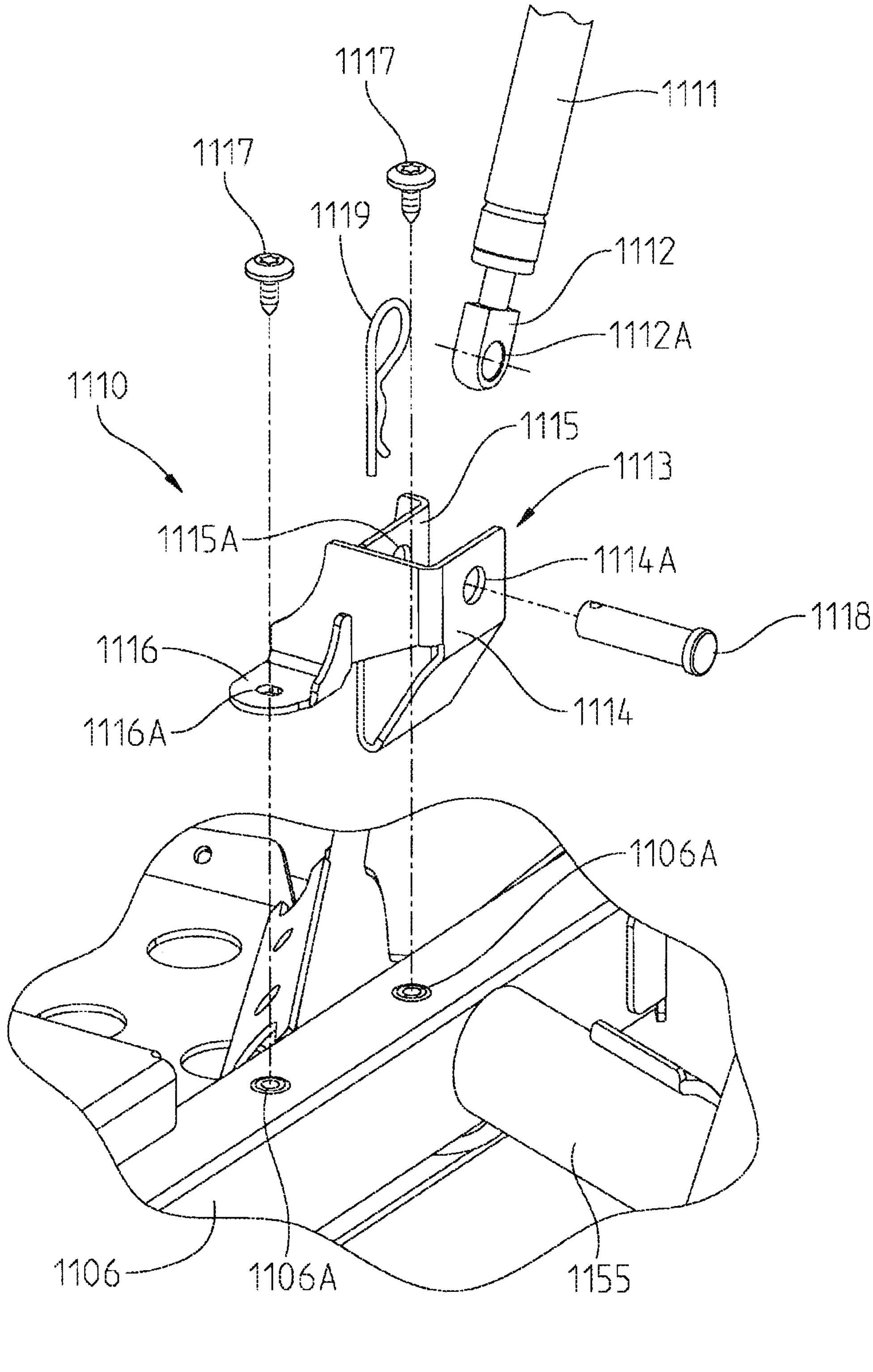

Turning now to FIGS. 120-121, a shock mount 1110 for a rear shock absorber 1111 will be explained. Shock mount 1110 is positioned along a longitudinally extending frame member 1106 in a position below cargo box 1470. Illustratively, shock mount 1110 is located adjacent rear frame member 1155 and longitudinally forward of lower longitudinally-extending frame members 1158 and transition bracket 1172. In the present embodiment, shock mount 1110 receives a lower end of shock absorber 1111, and upper end of shock absorber 1111 is coupled to a portion or frame for cargo box 1470 at an upper mounting location 1120.

Shock mount 1110 comprises a shock mount body 1113 which comprises a first portion 1114 and a second portion 1115. Illustratively, first portion 1114 comprises an opening 1114A and second portion 1115 comprises an opening 1115A. First portion 1114 and second portion 1115 are spaced apart, and at least an upper portion of each of first portion 1114 and second portion 1115 are generally parallel and spaced from each other. A lower shock absorber portion 1112 may be received within the space between first portion 1114 and second portion 1115. Further, a pin 1118 extends between opening 1114A and opening 1115A and extends through opening 1112A in lower shock absorber portion 1112. A cotter pin 1119 is selectively removable from pin 1118 which allows pin 1118 to be removed from shock mount 1110, thereby allowing shock absorber 1111 to be removable from shock mount 1110.

First portion 1114 and second portion 1115 extend downwardly, and second portion 1115 extends downwardly along the side of longitudinally extending frame member 1106, and first portion 1114 extends downwardly at an angle to meet second portion 1115. Shock mount body 1113 is coupled to longitudinally extending frame member 116, first portion 1114 and second portion 1115 which provides additional support to shock mount 1110. Further, shock mount body 1113 comprises an extension 1116 with aperture 1116A. In the present embodiment, shock mount body 1113 comprises at least two apertures 1116A which receive fasteners 1117. Illustratively, apertures 1116A are laterally spaced from first portion 1114 and second portion 1115. Further, fasteners 1117 extend through apertures 1116A and a pair of apertures 1106A in the top face of longitudinally extending frame member 1106. In various embodiments, fasteners 1117 may extend through shock mount body 1113 at a different location and couple with a side or bottom of longitudinally extending frame member 1106.

In the present embodiment, shock mount 1110 is positioned laterally offset from a centerline of vehicle 1002. Therefore, shock mount 1110 is closer to a side of vehicle 1002 and is therefore more accessible to an operator of vehicle 1002. Additionally, by allowing an operator to easily remove shock absorber 1111 from shock mount 1110, cargo box 1470 may be more easily tipped upwardly as previously discussed, allowing easier access to components below cargo box 1470.

Figure 122:
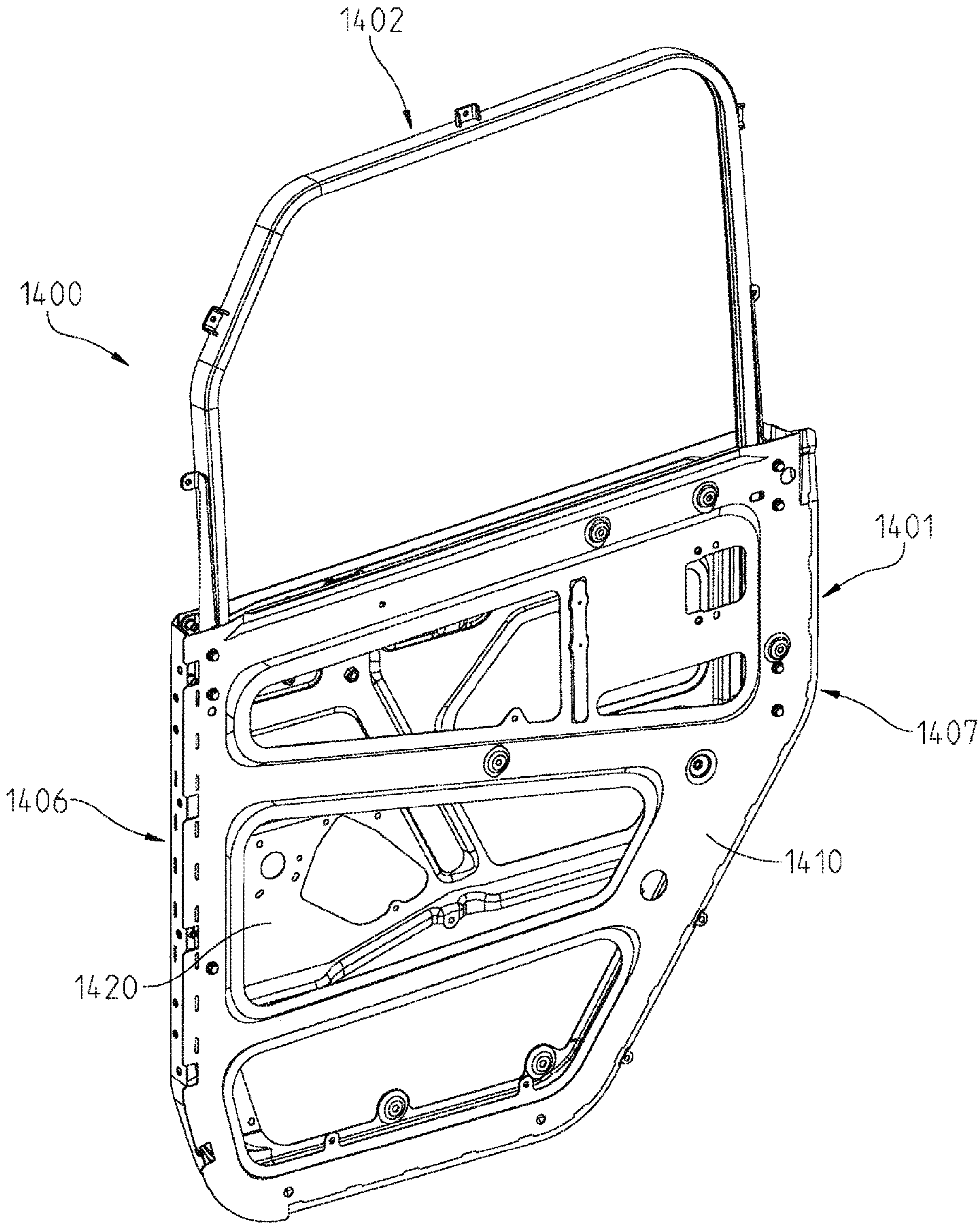
Figure 123:
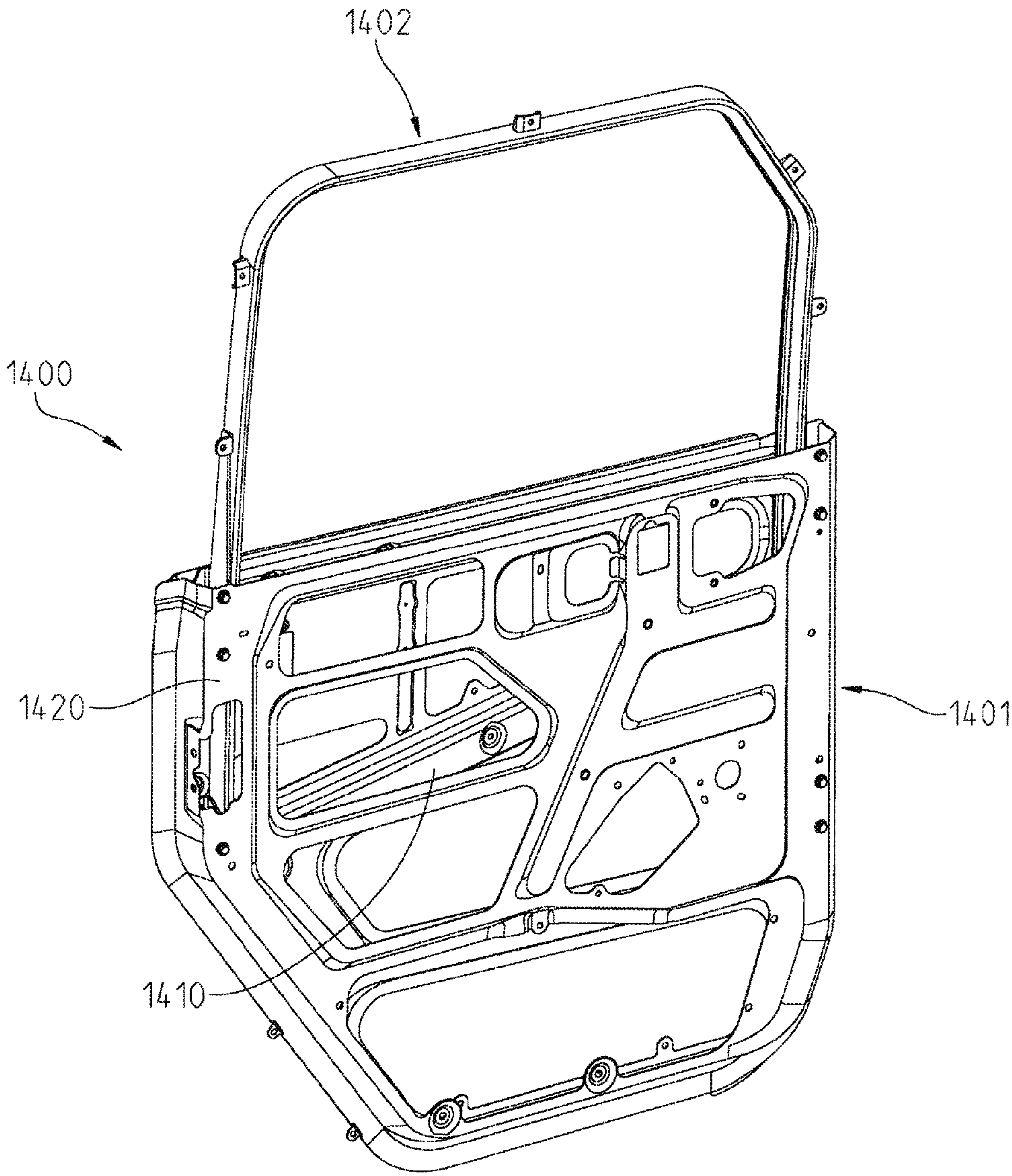

Now referring to FIG. 122-124, a frame 1400 of door 1360 (FIG. 108) will be explained in greater detail. In the present embodiment, door frame 1400 comprises a lower frame 1401 and an upper frame 1402. Lower frame 1401 further comprises an outer panel 1410 and an inner panel 1420. Illustratively, inner panel 1410 and outer panel 1420 are created through a stamping method and subsequently welded together. Frame 1400 further comprises a forward side or hinge side 1406 and a back side or latch side 1407. Further, an intermediate bracket 1415 is positioned between outer panel 1410 and inner panel 1420 adjacent the hinge side 1406. Intermediate bracket 1415 provides additional rigidity for the hinge side 1406 of lower frame 1401.

Figure 124:
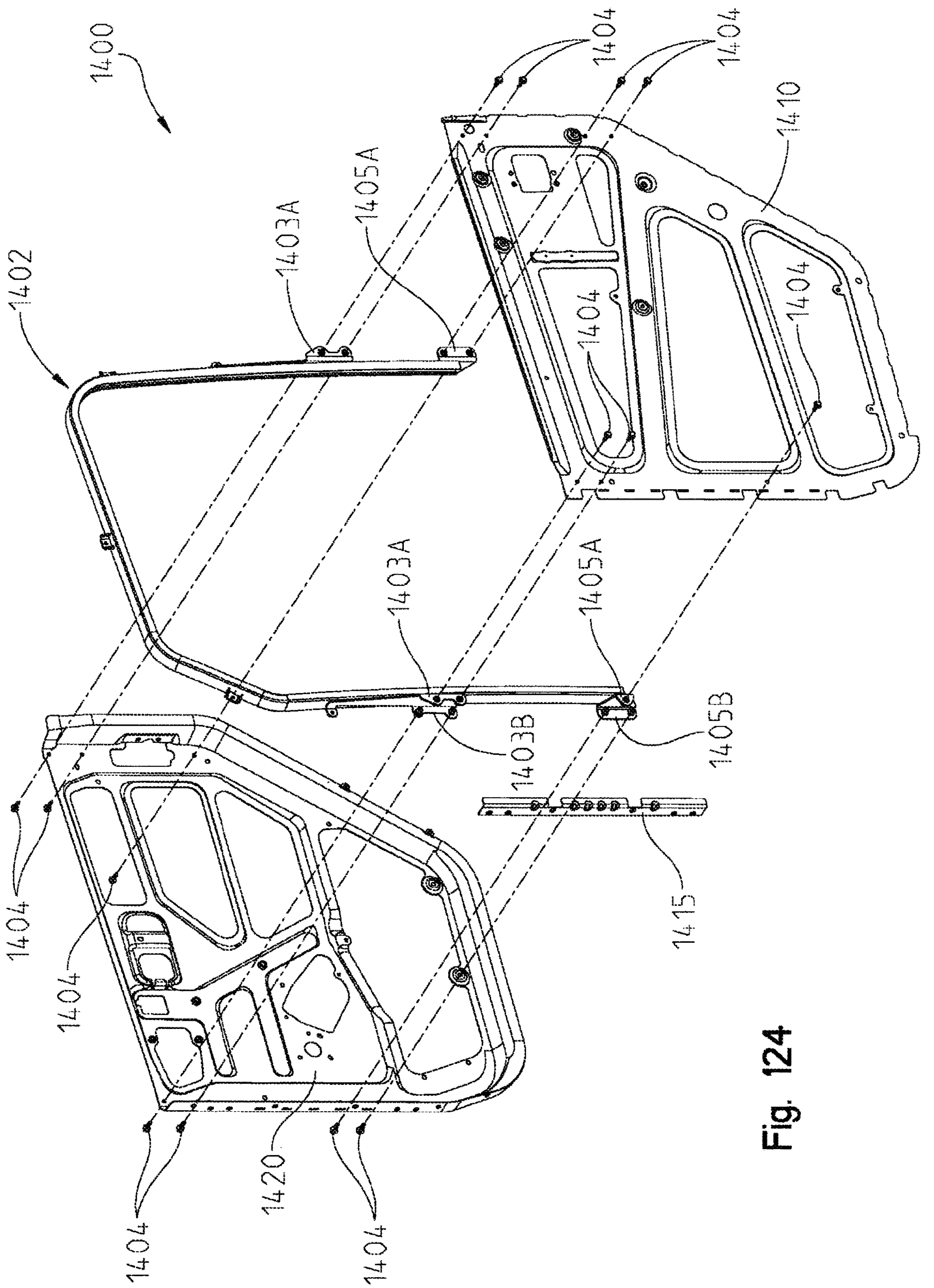

As seen in FIG. 124, upper frame 1402 is positioned between outer panel 1410 and inner panel 1420. Illustratively, upper frame 1402 comprises a pair of upper brackets 1403 including an outer upper bracket 1403A and an inner upper bracket 1403B. Further, a pair of lower brackets 1405 comprise an outer lower bracket 1405A and an inner lower bracket 1405B. Each of outer upper bracket 1403A, inner upper bracket, outer lower bracket 1405A, and inner lower bracket 1405B comprises at least one aperture configured to receive fastener 1404. Therefore, upper frame 1402 may be inserted between outer panel 1410 and inner panel 1420. Further, a space is created for a window (not shown) to be inserted and controlled between a raised position and a lowered position. Still referring to FIG. 122-124, outer panel 1410 may comprise an aesthetic panel (not shown) coupled to face the outside of vehicle 1002. Outer panel 1410 may comprise various fasteners and/or coupling portions to receive the aesthetic panel.

Referring now to FIGS. 125-130, door 1360 will be explained in greater detail. In the present embodiment, door 1360 is coupled to a lower frame portion 1038 of frame sections 102 and/or 104 (FIG. 15) through at least one hinge mechanism 1450. In the present embodiment, door 1360 is coupled to lower frame portion 1038 through a pair of hinge mechanisms 1450, and in various embodiments, more hinge mechanisms may be used. In the present embodiment, hinge mechanisms 1450 are coupled to a frame member 1128 and positioned vertically below a rear end 1125 of a U-shaped frame tube 1120.

Hinge mechanism 1450 comprises a bracket 1452 and a coupling plate 1454. Bracket 1452 is coupled to lower frame portion 1038 and coupling plate 1454 is coupled to door 1360. Illustratively, bracket 1452 comprises a pair of horizontal channels 1457 and frame member 1128 comprises a pair of apertures 1455. A pair of fasteners 1458 extend through horizontal channels 1457 and are received within apertures 1455, thereby coupling bracket 1457 to frame member 1128. In the present embodiment, channels 1457 have a greater horizontal length than vertical height. Illustratively, coupling plate 1454 comprises a pair of vertical channels 1459 and door 1360 comprises a pair of apertures 1453. A pair of fasteners 1458 extend through channels 1459 and are received within apertures 1453 to couple plate 1457 to door 1360. In the present embodiment, vertical channels 145 may have a vertical height greater than their horizontal length.

Figure 125:
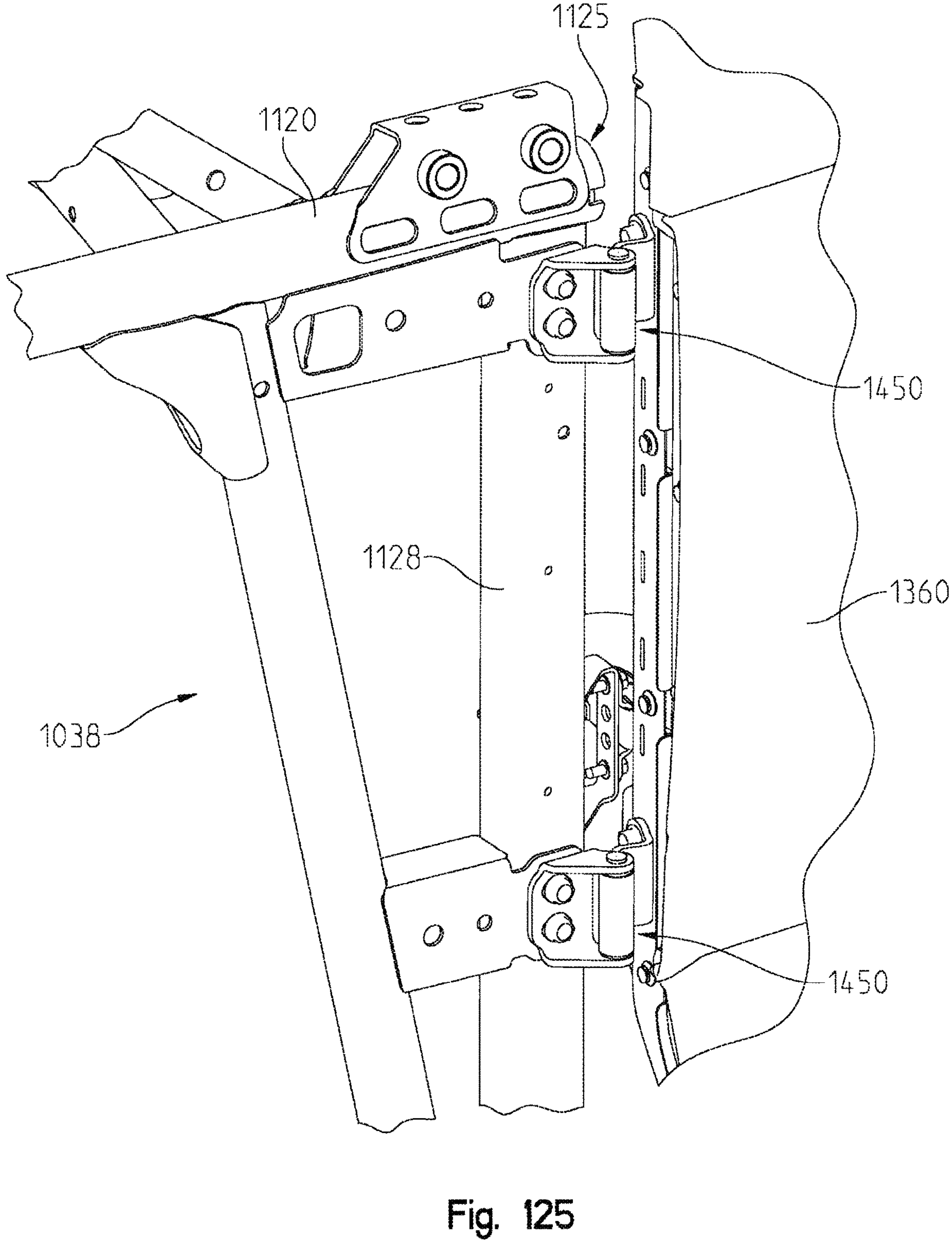
Figure 126:
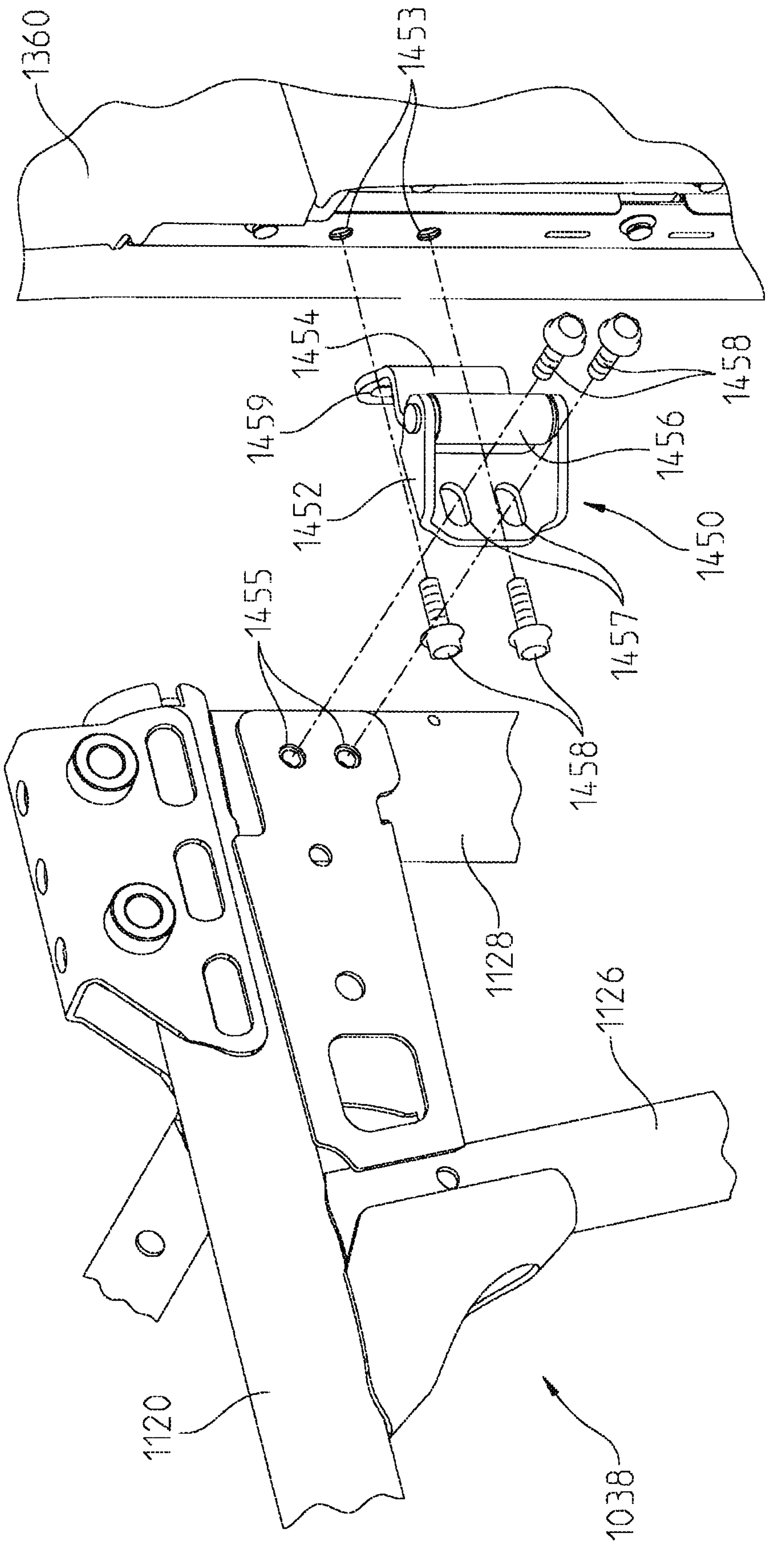
Figure 127:
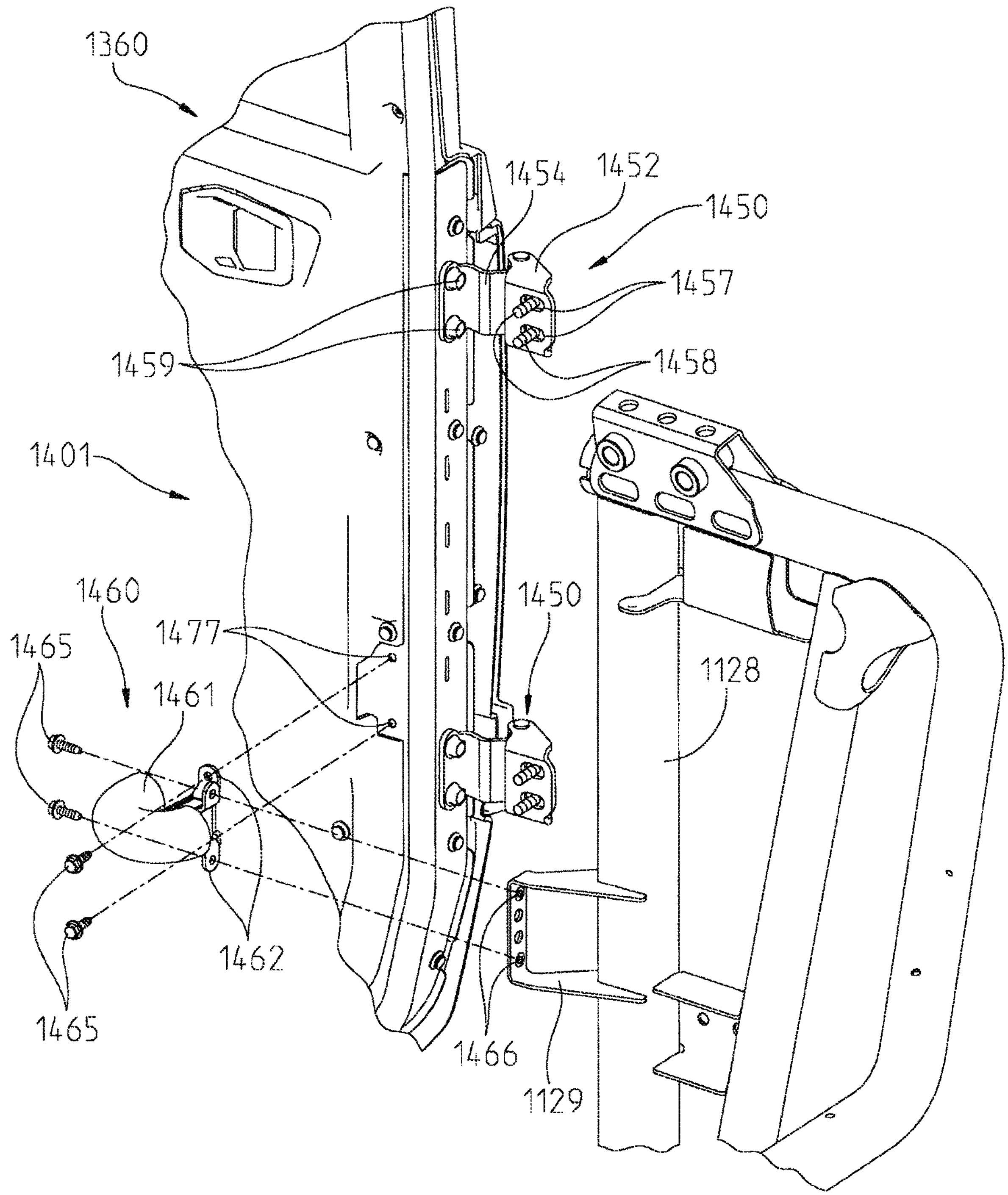
Figure 128:
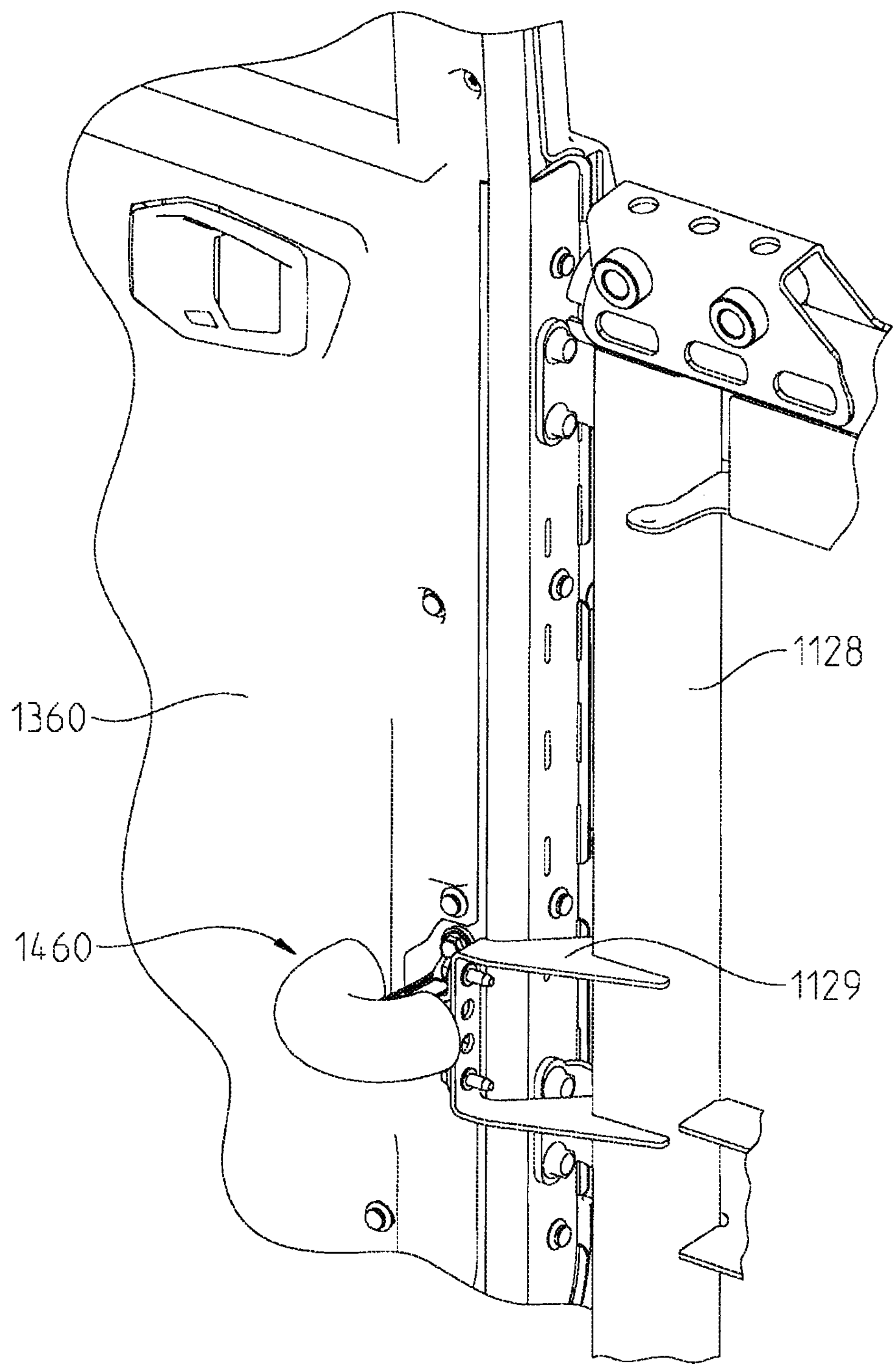

Further referring to FIGS. 125-127, fasteners 1458 may be movable within horizontal channels 1457 and vertical channels 1459. Door 1360 is movable relative to lower frame portion 1038 by moving door 1360 and fasteners 1458 within horizontal channels 1457 and vertical channels 1459. Each of the plurality of hinge mechanisms 1450 may comprise horizontal channels 1457 and vertical channels 1459 to move cooperatively with each other.

Now referring to FIGS. 127-130, a door limiting assembly 1460 will be further explained. Illustratively, door limiting assembly 1460 is positioned on lower portion 1401 of door 1360. Further, door limiting assembly 1460 is positioned on the inside of door assembly 1360 and is coupled to inner panel 1420. Door limiting assembly 1460 comprises a pair of mounting brackets 1462 and a conduit 1461 connected therebetween. Frame member 1128 further comprises a bracket 1129 with a plurality of apertures 1466. Bracket 1129 extends longitudinally rearwardly from frame member 1128. In the present embodiment, mounting bracket 1462 comprises a pair of apertures 1464 (FIG. 129) positioned to align with the apertures 1466. A pair of fasteners 1465 extend through aperture 1464 to be received within aperture 1466. Further, another mounting bracket 1462 comprises apertures 1464 positioned to align with a pair of apertures 1477 on door 1360. A pair of fasteners 1465 extend through apertures 1464 to be received within apertures 1477 to couple door limiting assembly 1460 to door assembly 1360.

Conduit 1461 provides a passageway for cables (not shown) which extend between lower frame portion 1038 and door 1360. Cables may be any type of cable, including but not limited to cables to power a powered window, data cables, or other types of electrical cables, or pulley type cables.

As best seen in FIGS. 129-130, door limiting assembly 1460 further comprises a conduit strap 1463 and a limit strap 1465. In the present embodiment, conduit strap 1463 is integral to conduit 1461. Conduit strap 1463 wraps around a first mounting bracket 1462 at a first end 1463A of conduit strap 1463 and wraps around the second mounting bracket 1462 at a second end 1463B of conduit strap 1463. Conduit 1461 is positioned along conduit strap 1463 between mounting brackets 1462. Further, limit strap 1465 is coupled between mounting brackets 1465. In the present embodiment, a first end 1465A of limit strap 1465 is coupled to the first end 1463A of conduit strap 1463 and a second end 1465B of limit strap 1465 is coupled to the second end 1463B of conduit strap 1463. In various embodiments, conduit strap 1463 and limit strap 1465 are coupled using an adhesive, plastic welding, fastener(s).

Conduit strap 1463 and limit strap 1465 are made of a flexible material which may stretch and bend to move with door 1360 as it moves between an open and closed position. In the present embodiment, limit strap 1465 and conduit strap 1463 are made of the same material. In various embodiments, limit strap 1465 is constructed of a more rigid material than conduit strap 1463. Additionally, limit strap 1465 is a shorter length than conduit strap 1463 so that when door rotates to an open position, more force is imparted within limit strap 1465 than within conduit strap 1463. Limit strap 1465 is appropriately sized so door 1360 is restricted from rotating fully through hinge assembly 1450 and contacting other portions (e.g., aesthetic body panels) of vehicle 1002. In the present embodiment, limit strap 1465 prevents door 1360 from rotating more than 70 degrees. In various embodiments, limit strap 1465 prevents door 1360 from rotating more than 150 degrees. In various embodiments, limit strap 1465 prevents door 1360 from rotating more than 115 degrees. Door limiting assembly 1460 may be positioned on any of doors 1360. In various embodiments, various doors may be limited at various angles. In one embodiment, a front door 1360 may be limited to rotating 75 degrees and a rear door 1360 may be limited to rotating 70 degrees.

Now referring to FIGS. 131-132, a power port 1390 is integrated into a recess 1382 in a body assembly 1040 of vehicle 1002. Illustratively, recess 1382 is positioned laterally adjacent a grille 1380. In the present embodiment, vehicle 1002 comprises a pair of recesses 1382 on either side of grille 1380, and power port 1390 is located in recess 1382 and to the right of grille 1380 when viewed from the front of vehicle 1002. In various embodiments, either recess 1382 may contain power port 1390. In various embodiments, both recesses 1382 may contain a power port 1390. Further, power port 1390 is electrically coupled to an electrical system (not shown) and a battery (not shown) of vehicle 1002. In the present embodiment, power port 1390 is bi-directional and is a battery tender for providing power to the electrical system of vehicle 1002 from an external power source (e.g., 120V from a home). Further, power port 1390 is able to provide power to external accessories from the electrical system of vehicle 1002. In various embodiments, power port 1390 may be unidirectional and provide power to vehicle 1002 or provide power from vehicle 1002.

Power port 1390 further comprises a cover 1391 configured to cover an electrical pin 1392. In the present embodiment, recess 1382 comprises a front surface 1393 that is angled relative to the grille 1380. Cover 1391 is positioned completely within recess 1382 and behind front surface 1393 and is protected at least in part from debris and other elements.

Now referring to FIGS. 131 and 133-134, a hood retention system will be explained in greater detail. Grille 1380 comprises a pair of retention screws 1387 positioned in the upper left and upper right corner of grille 1380. In the present embodiment, retention screws 1387 are constructed to be operated with quarter turn fasteners to allow for easy and rapid removal or adjustment of grille 1380 from vehicle 1002. Grille 1380 may tip outwardly and forwardly away from vehicle 1002 when retention screws 1380 are unfastened. Further, hood 1354 comprises an indent 1357 adjacent a front edge 1355 of hood 1354 that receives grille extension 1381. In the present embodiment, grille 1380 further comprises a plurality of tabs 1370 adjacent a lower edge of grille 1380, and a front body assembly 1350 comprises a plurality of complementary apertures 1371 to receive tabs 1370.

Grille 1380 covers at least a portion of a front body panel 1383. Front body panel 1383 comprises a hook 1385 and a notch 1386. Illustratively, hook 1385 extends generally downwardly and notch 1386 is positioned vertically above hook 1385. Front body panel 1383 further comprises an extension 1388 extending generally laterally inward towards a middle of vehicle 1002 and behind grille 1380. Extension 1388 comprises an aperture 1389 which receives retention screw 1387. Hood 1354 further comprises a strap 1384 adjacent front edge 1355 of hood 1354, and strap 1384 is configured to extend downwardly adjacent front body panel 1383. Illustratively, strap 1384 is configured to extend over hook 1385 and couple to front body panel 1383. In the present embodiment, strap 1384 is an elastic member and may stretch over hook 1385 to be coupled in place. Hood 1354 is retained and substantially restricted from moving upward when strap 1384 is coupled to front body panel 1383 by hook 1385. Strap 1384 extends downwardly along and within notch 1386 which prevents strap 1384 from bending at a large angle and instead allows strap 1384 to be substantially straighter without having to extend front edge 1355 of hood 1354 further forward. This prevents strap 1384 from being unnecessarily fatigued and will prolong the usable life of strap 1384. In various embodiments, front body panel 1383 does not have a notch 1386. While FIG. 133 only shows one side of front body panel 1383, and only one retention system, the present embodiment comprises a retention system, including strap 1384, hook 1385, notch 1386, tab 1370, and aperture 1371 on both sides of grille 1380.

Hood 1354 further comprises a pair of tabs 1356 located adjacent a rear edge 1357 of hood 1354. Body assembly 1040 further comprises a pair of slots 1041 located adjacent a lower edge of windshield 1347. Tabs 1356 extend generally downwardly and rearwardly to extend within slots 1041. Hood 1354 can be installed onto vehicle 1002 by placing tabs 1356 within slots 1041, lowering hood 1354 onto body assembly 1040, and extending straps 1384 to engage hooks 1385.

Grille 1380 may be installed on vehicle 1002 after hood 1354 is installed by placing tabs 1370 within apertures 1371 and rotating grille 1380 upwardly to contact front body panel 1383. Retention screws 1387 are then rotated to engage aperture 1389 and retain grille 1380 in a fixed position adjacent front body panel 1383. Grille 1380, when installed, covers hook 1385, strap 1384, notch 1386, extension 1388, and aperture 1389, and provides an aesthetic appeal to the front of vehicle 1002. Additionally, removal of grille 1380 and hood 1354 provides access to various engine components, suspension components, steering components, cooling components, electrical components, telecommunication components, or other components.

Turning now to FIGS. 135-137, a center console 1500 of vehicle 1002 will be described. Illustratively, in FIG. 135, center console 1500 comprises a pair of rear floor lights 1502. In the present embodiment, rear floor lights 1502 are positioned on a lower portion of center console 1500 and angled downwardly and outwardly towards the feet of passengers (not shown). Rear floor lights 1502 provide a light source for passengers. Further, as shown in FIGS. 136-137, center console 1500 comprises a forward light 1504. Forward light 1504 provides a light source on to the center controls area (e.g., FIG. 55) for an operator or passenger (not shown). In the present embodiment, lights 1502 and 1504 are Light Emitting Diodes (LEDs). In various embodiments, lights 1502 and 1504 are always powered. In various embodiments, lights 1502 and 1504 are controlled using a button, knob, slider. In various embodiments, lights 1502 and 1504 are configured to turn on when a door 1360 is opened and turn off when door 1360 is closed. In various embodiments, lights 1502 and 1504 are controlled by a timer. In various embodiments, rear floor lights 1502 comprise more than a pair of lights. In various embodiments, a single rear floor light 1502 is used. In various embodiments, more than a single forward light 1504 is used.

Now referring to FIGS. 136-137, a storage container 1512 is located within center console 1500 beneath a lid 1510. Illustratively, lid 1510 rotates upwardly and rearwardly to reveal the inner contents of console 1500. In the present embodiment, lid 1510 is able to be locked to center console 1500 using a lock 1516. In the present embodiment, storage container 1512 is removable (FIG. 137) and contoured to fit within the center console 1500. In various embodiments, lid 1510 comprises a seal 1513 which is shaped to fit with the upper edge of storage container 1512, making the contents within storage container 1512 less vulnerable to intrusions from water, other liquids, debris, and other foreign contents.

Center console 1500 further comprises a pair of fuse boxes 1514 therewithin. In the present embodiment, fuse boxes 1514 are positioned vertically underneath storage container 1512. Fuse boxes 1514 are accessible by removing storage container 1512 from within center console 1500. Fuse boxes 1514 are accessible by an operator or a passenger (not shown) of vehicle 1002. In various embodiments, fuse boxes 1514 are angled relative to horizontal. In various embodiments, a 12V charger and/or a USB plug-in is positioned within center console 1500 and is accessible through an opening (not shown) in the side of storage container 1512 when storage container 1512 is positioned inside center console 1500 and also when it is removed from center console 1500.

Now referring to FIGS. 138-139, a dash 1520 comprises a mounting system 1521. In the present embodiment, mounting system 1521 comprises a plurality of mounting bosses 1523 extending on the bottom of upper surface 1525 of dash 1520. Upper surface 1525 comprises covers 1522 that cover the upper extent of mounting bosses 1523. Covers 1522 are a thinly layered material, and may be punched through, allowing access to mounting bosses 1523. In the present embodiment, mounting bosses 1523 receive a threaded rod of an accessory mount (not shown), and provides locations for mounting phones, tablets, displays, radios, etc. Mounting system 1521 further comprises support braces 1524 extending between mounting bosses 1523 to provide additional rigidity to mounting system 1521 when accessories are installed and extending through mounting bosses 1523. In the present embodiment, dash 1520 further comprises an open storage bin 1526 located longitudinally forward of mounting system 1521 and may comprise a friction mat or other treated surface configured to substantially retain objects and prevent substantial movement.

Now referring to FIGS. 141-150, rear seating area 1334 will be explained in greater detail. Rear seating area 1334 comprises a seat back 1032, a seat bottom 1336, and a lumbar support 1339. In the present embodiment, rear seating area 1334 is configured to support three riders. Illustratively, rear seating area 1334 comprises a first seatbelt assembly 1340, a second seatbelt assembly 1341, and a third seatbelt assembly 1342. In the present embodiment, first seat belt assembly 1340 and third seatbelt assembly 1342 are each coupled to downwardly extending frame members 1078.

Now referring to FIGS. 142-143, seat back 1032 comprises an upper seat frame member 1348 and a frame extension 1343 extending upwardly therefrom. Frame extension 1343 comprises a rounded upper extent and extends upward at a position laterally adjacent a headrest frame 1351 of seat back 1032. Second seatbelt assembly 1341 comprises an anchored loop 1344 coupled to frame extension 1343 by a fastener 1345. Fastener 1345 extends through an aperture 1343*a* within frame extension 1343. In the present embodiment, frame extension 1343 is located at a position longitudinally rearward of a front surface of seatback 1032. Further, anchored loop 1344 receives belt 1349 which extends across the chest and lap of a middle passenger (not shown) in rear seating area 1334.

Seat back 1032 is able to rotate about a pivot axis 1033 (FIG. 141). In various embodiments, seat back 1032 may freely rotate about pivot axis 1033. In the present embodiment, seat back 1032 includes a latching assembly 1320 configured to be actuated by a strap 1323. Illustratively, strap 1323 is a looped strap and is positioned on a vertical frame member 1325 of seat back 1032. Vertical frame member 1325 includes an opening 1324 sized so that strap 1323 may extend through opening 1324. In various embodiments, strap 1323 includes a wire extending to either or both lateral extents of seat back 1032 and to latching assembly 1320. Strap 1323 is coupled to latching mechanism 1320 which is configured to couple seat back 1032 to either of lower frame portion 1038 or cab frame 1036. In the present embodiment, latching mechanism 1320 is a claw type latch that couples with a strike pin 1092 (FIG. 144). If seat back 1032 is in an upright position, when strap 1323 is actuated (e.g., pulled), latching mechanism 1320 is disengaged and allowed to move away from strike pin 1092 and seat back 1032 is able to rotate about pivot axis 1033. If seat back 1032 is in a lowered position, when seat back 1032 is rotated upwardly to engage strike pin 1092, seat back 1032 is latched in the upright position. Latching mechanism 1320 is coupled to an auxiliary frame member 1322. Auxiliary frame member 1322 is generally a u-shaped bracket configured to couple to a lateral extent of seat back 1032. In various embodiments, seat back 1032 includes a single latching mechanism 1320 positioned on one lateral extent of seat back 1032. In various embodiments, seat back 1032 includes a pair of latching mechanisms 1320 positioned on both lateral extents of seat back 1032. Seat back 1032 also includes a strap 1338 configured to couple between seat back 1032 and either of lower frame portion 1038 and cab frame 1036 (FIG. 144). In the present embodiment, strap 1338 is sized appropriately so that when seat back 1032 is rotated into a lowered position, a rear surface 1034 of seat back 1032 is generally horizontal and facing upwardly.

Now referring to FIG. 144-146, first seatbelt assembly 1340 is coupled to frame members 1078 using an anchored loop 1337. A belt 1346 extends downwardly from anchored loop 1337 and is configured to extend over the chest and lap of a passenger (not shown). A belt retention assembly 1090 is configured to retain belt 1346 at a position adjacent the side of vehicle 1002. A support plate 1088 extends between a vertical frame member 1048 and frame members 1078 which provides strengthening to cab frame 1036 (FIG. 115). Additionally, support plate 1088 provides a mounting location for belt retention assembly 1090, strike pin 1092, and strap 1338. Support plate 1088 includes a pair of first apertures 1088*a* and a second aperture 1088*b*. In the present embodiment, strap 1338 includes a mounting plate 1335 comprising an aperture 1335*a* positioned at one or both of its extents. Belt retention assembly 1090 includes a retention member 1100 configured with an aperture 1104. Illustratively, strap 1338 and retention member 1100 are coupled to support plate 1088 by a fastener 1095 extending through apertures 1104 and 1335*a* to couple to support plate 1088 at aperture 1088*b*. In various embodiment, aperture 1088*b* is threaded, or a receiving member may be positioned on or behind support plate 1088 to receive fastener 1095.

Strike pin 1092 is coupled to a support member 1091. Support member 1091 is generally V-shaped including a lower bend 1096 and a pair of arms 1097. Strike pin 1092 is configured to be received and coupled to support member 1091 at lower bend 1096. Support member 1091 includes a pair of apertures 1094 positioned in arms 1097. Apertures 1094 are generally oval-shaped, however, in various embodiments apertures 1094 may be shaped otherwise. Support member 1092 also includes a pair of extensions 1098 extending generally transverse the pair of arms 1097. Each extension 1098 includes an aperture 1098*a* and a pair of fasteners 1093 are configured to extend through apertures 1098*a* and couple to support plate 1088 at apertures 1088*a*, thereby coupling support member 1091 to support plate 1088.

Retention member 1100 includes a handle 1106 positioned at one of its distal ends. Additionally, retention member 1100 includes an extension 1102 with a general hook shape at the other of the distal ends. When retention member 1100 is coupled to support plate 1088 by fastener 1095, extension 1102 is positioned to engage support member 1091 at one of the apertures 1094. That is, extension 1102 is sized to fit within one of apertures 1094. Retention member 1100 also includes an inner surface 1101 configured to face support plate 1088 when retention member 1100 is coupled to support plate 1088. A spacer 1105 is positioned around aperture 1104 and configured to contact mounting plate 1335 when retention member 1100 and mounting plate 1335 are fastened to support plate 1088. Further, an extension 1103 extends outwardly and may be transverse to spacer 1105 and is configured to extend through aperture 1335*a*. Mounting plate 1335 may then rotate around extension 1103 and avoid contact with fastener 1095. Spacer 1105 and extension 1103 are configured to be integral with retention member 1100.

Retention member 1100 includes a first wall 1101*a* positioned adjacent the extension 1102. A second wall 1101*b* is positioned to surround at least a portion of spacer 1105 and extension 1103. Second wall 1101*b* is spaced from first wall 1101*a* to create a belt receiving area 1107. Belt receiving area 1107 is generally sized and shaped to be at least as wide as belt 1338. As shown in FIG. 144, belt 1338 is configured to extend downwardly and between retention member 1100 and support plate 1088. Further, first wall 1101*a* and second wall 1101*b* contain strap 1338 so that any contact with fasteners 1093 or fastener 1095 is limited or eliminated.

Now referring to FIGS. 147-149, rear seating area 1334 will be explained in greater detail. Illustratively, lumbar support 1339 is coupled to the rear seating area 1334. Illustratively, lumbar support 1339 is coupled to a rear wall 1430 of rear seating area 1334. Additionally, a pair of steps 1469 are integral to rear seating area 1334. Illustratively, seat bottom 1336 is configured to extend outwardly from rear wall 1430 and into rear seating area 1334. A lower side of seat bottom 1336 is configured to rest on an upper face of steps 1469. Further, seat back 1032 is rotatably coupled to rear seating area 1334 at a position vertically higher than lumbar support 1339. In the present embodiment, lumbar support 1339 is configured to support a lower back (i.e., lumbar) of a passenger. Further, as seen in FIG. 149, seat back 1032 is configured to rotate downwardly so that a back surface 1034 of seat back 1032 is generally level with a bottom surface 1610 of cargo box 1470. Illustratively, as previously described, strap 1338 is of the appropriate length to ensure back surface 1034 is generally level with bottom surface 1610.

Lumbar support 1339 is generally elongated in a lateral direction such that each passenger within rear seating area 1334 may utilize lumbar support 1339. Lumbar support 1334 has an irregularly shaped cross-section configured to be ergonomically comfortable for all passengers within rear seating area 1334. In various embodiments, lumbar support 1339 is generally sized to extend a width of rear seating area 1334. Lumbar support 1339 and seat back 1032 are sized and shaped so that when seat back 1032 is rotated downward, lumbar support 1339 is generally profiled to seat back 1032. That is, seat back 1032 is permitted to rotate downwardly into a flat position uninhibited by lumbar support 1339.

Lumbar support 1339 is positioned below seat back 1032 and does not need to be removed from the rear seating area 1334 when seat back 1032 is rotated downward. Rotating seat back 1032 forward allows the bottom surface 1610 to extend forwardly into the rear seating area 1334. At least a portion of seat bottom 1336 is positioned below lumbar support 1339 to maximize head room for passengers when seated on seat bottom 1336. Lumbar support 1339 provides additional back support to seated passengers when it is positioned in the gap created between the seat bottom 1336 and the seat back 1032.

Referring now to FIGS. 150-151, the position of seat back 1032 will be explained in greater detail. Illustratively, a rear window assembly 1650 includes a first rear window 1651 and a second rear window 1652. First rear window 1651 extends downwardly and rearwardly from a rear extent of roof assembly 1358. Further, second rear window 1652 extends downwardly and forwardly from a bottom extent of first rear window 1651. First rear window 1651 and second rear window 1652 extend laterally between frame members 1078. First rear window 1651 and second rear window 1652 are angled so that a headspace area 1655 is created behind the headrest of seat back 1032. Illustratively, a rearward extent of headspace area 1655 is positioned on a vertical plane 1660.

Cargo box 1470 has a front wall 1606 angled relative to a vertical plane. Illustratively, the front wall 1606 extends upwardly and rearwardly from a forward extent 1605 of the bottom of cargo box 1470. In the present embodiment, forward extent 1605 of cargo box 1470 is positioned forward of a rearward extent of a first rear window 1651, defined by a vertical plane 1660. Further, forward extent 1605 of bottom surface is positioned forward of a rearward extent of seat back 1032. In various embodiments, front wall 1606 is shaped so that cargo box 1470 may tilt and rotate upwardly and downwardly without contacting rear window assembly 1650 or seat back 1032.

In various embodiments, first rear window 1651 and second rear window 1652 are made of glass. In various embodiments, first rear window 1651 and second rear window 1652 are made of a poly-propylene, plastic, or other transparent material. In various embodiments, first rear window 1651 and second rear window 1652 may be made of a plastic, metal, or other non-transparent material. In various embodiments, first rear window 1651 and second rear window 1652 may be made of different materials.

Referring now to FIGS. 152-153, a seal 1720 of air filter assembly 1700 will be explained in greater detail. Illustratively, air filter assembly 1700 includes a main body 1710 and a lid 1730. In the present embodiment, main body 1710 and lid 1730 are generally circular. Main body has an extension 1711 extending around the perimeter of an upper extent of main body 1710. Lid 1730 includes a generally U-shaped channel 1731 around its perimeter configured to receive seal 1720. Channel 1731 includes an outer wall 1731*a*, an inner wall 1731*b*, and a bridge wall 1731*c*. Seal 1720 is generally circular shaped and has a cross section profile that is generally U-shaped. Seal 1720 includes a first arm 1720*a*, a second arm 1720*b*, and a bridge 1720*c* connected between first arm 1720*a* and second arm 1720*b*. A channel 1721 is created between first arm 1720*a*, second arm 1720*b*, and bridge 1720*c*. Illustratively, when seal 1720 is installed in u-shaped channel 1731, and lid 1730 is positioned on main body 1710, first arm 1720*a* is positioned between outer wall 1731*a* and extension 1711, second arm 1720*b* is positioned between inner wall 1731*b* and extension 1711, and bridge 1720*c* is positioned between bridge wall 1731*c* and extension 1711. Illustratively, first arm 1720*a*, second arm 1720*b*, and bridge 1720*c* extend only partially along the outer wall 1731*a*, inner wall 1731*b*, and bridge wall 1731*c* of channel 1731. That is, a pair of air pockets 1723 are created in the corners of channel 1731, and a plurality of individually sealed surfaces are created within u-shaped channel 1731.

In the present embodiment, lid 1730 is attached to main body 1710 by fasteners 1715. Further, an air filter 1702 is positioned within main body 1710. Air filter 1702 is generally cylindrical shaped, however, in various embodiments, air filter 1702 may be shaped in other configurations.

Now referring to FIG. 154, an air intake assembly 1740 of vehicle 1002 is shown. Air intake assembly 1740 is fluidly coupled between an air intake 1742 and an engine of the powertrain assembly 1025. Illustratively, a first conduit 1751 is coupled to between air intake 1742 and air filter assembly 1700. Further, a second conduit 1770 extends between air filter assembly 1700 and an intake of the engine. First conduit 1751 includes an attenuator assembly 1750 comprised of a plurality of attenuator tubes 1755. Further, a mounting tab 1756 is coupled to first conduit 1751 and configured to couple first conduit 1751 to lower frame portion 1038. Further, a drainage port 1752 is positioned along a bottom extent of first conduit 1751. Illustratively, first conduit 1751 has a lowermost extent along a horizontal plane 1760. Drainage port 1752 is positioned along horizontal plane 1760 and the majority of fluid that is present within first conduit 1751 will fall under gravity to drainage port 1752. Drainage port 1752 is a duck-bill type drainage port and therefore allows fluid to exit first conduit 1751 while minimizing or preventing air from entering first conduit 1751.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle, comprising:

a frame;

at least one front ground engaging member and at least one rear ground engaging member supporting the frame; and a powertrain drivingly coupled to at least one of the front and rear ground engaging members, the powertrain comprising an engine and a transmission, and the transmission includes a transmission air intake assembly and a transmission exhaust assembly, wherein at least one of the transmission air intake assembly or the transmission exhaust assembly includes a conduit defining an acoustical attenuation device including a plurality of quarter tubes extending outwardly from the conduit, the plurality of quarter tubes including a first quarter tube with a first length, a second quarter tube with a second length positioned adjacent the first quarter tube, and a third quarter tube with a third length positioned adjacent the second quarter tube, the first length being different from the second length.

2. The vehicle of claim 1, the powertrain further comprising an engine air intake assembly and an engine air exhaust assembly operably coupled to the engine, wherein at least one of the engine air intake assembly and engine air exhaust assembly includes a second acoustical attenuation device defining a plurality of quarter tubes.

3. The vehicle of claim 1, wherein at least one of the plurality of quarter tubes includes a duck bill drain.

4. The vehicle of claim 1, wherein the acoustical attenuation device is a passive duct acoustical attenuation device.

5. The vehicle of claim 2, wherein the transmission air intake assembly comprises a transmission intake port and the engine air intake assembly comprises an engine intake port, and the transmission intake port is coupled to the frame on a first side of a vehicle centerline and the engine air intake port is coupled to the frame on a second side of the vehicle centerline.

6. The vehicle of claim 2, wherein the engine air intake assembly comprises an engine air intake port and an airbox, and the second acoustical attenuation device is fluidly coupled between the engine air intake port and the airbox.

7. The vehicle of claim 1, wherein the transmission air intake assembly comprises an intake port and a duct fluidly coupled between the intake port and the transmission, and the acoustical attenuation device is fluidly coupled between the intake port and the transmission.

8. The vehicle of claim 7, wherein the plurality of quarter tubes are spaced along the duct.

9. The vehicle of claim 8, wherein the first quarter tube of the plurality of quarter tubes is positioned closer to the intake port than the remaining plurality of quarter tubes, and a duck bill drain is positioned in the first quarter tube.

10. The vehicle of claim 8, wherein the third quarter tube and the second quarter tube have different lengths.

11. The vehicle of claim 1, wherein the transmission intake assembly includes a transmission intake conduit and the transmission exhaust assembly includes a transmission exhaust conduit, and the acoustical attenuation device is positioned along the at least one of the transmission intake conduit and the transmission exhaust conduit.

12. The vehicle of claim 1, wherein the first quarter tube is dimensioned to resonate at a first frequency and the second quarter tube is dimensioned to resonate at a second frequency.

13. The vehicle of claim 1, wherein the plurality of quarter tubes are positioned along the conduit, the conduit being generally cylindrically shaped and extending generally along a first axis, the first quarter tube positioned at a first axial position on the conduit and extending radially outwardly from the conduit and the second quarter tube positioned at a second axial position on the conduit and extending radially outwardly from the conduit, the second quarter tube radially aligned with the first quarter tube.

14. The vehicle of claim 13, wherein the first quarter tube is generally cylindrically shaped, the first quarter tube including a first closed end and a second end fluidly coupled with the conduit, and the second quarter tube is generally cylindrically shaped, the second quarter tube including a first closed end and a second end fluidly coupled with the conduit.

15. A vehicle, comprising:

a frame;

front and rear ground engaging members supporting the frame;

a powertrain drivingly coupled to at least one of the front and rear ground engaging members, the powertrain comprising an engine and a transmission, the engine comprises an engine air intake assembly and an engine exhaust assembly, the transmission comprises a transmission intake assembly and a transmission exhaust assembly;

a first acoustical attenuation device defining a plurality of quarter wave tubes is positioned along a first assembly of the engine air intake assembly, the engine exhaust assembly, the transmission intake assembly, and the transmission exhaust assembly; and a second acoustical attenuation device defining a plurality of quarter wave tubes is positioned along a second assembly of the engine air intake assembly, the engine exhaust assembly, the transmission intake assembly, and the transmission exhaust assembly.

16. The vehicle of claim 15, wherein the first acoustical attenuation device comprises a plurality of quarter wave tubes, and a first quarter wave tube of the plurality of quarter wave tubes comprises a duck bill drain.

17. The vehicle of claim 15, wherein the first acoustical attenuation device comprises a plurality of quarter wave tubes, and a first quarter wave tube of the plurality of quarter wave tubes is a different length than a second quarter wave tube of the plurality of quarter wave tubes.

18. The vehicle of claim 15, wherein the first acoustical attenuation device is positioned along the transmission intake assembly.

19. The vehicle of claim 18, wherein the second acoustical attenuation device is positioned along the engine air intake assembly.

20. The vehicle of claim 15, wherein the engine intake assembly has an engine intake port coupled to the frame and the transmission intake assembly has a transmission exhaust port coupled to the frame, and the transmission exhaust port is positioned adjacent the engine intake port.

21. The vehicle of claim 15, further comprising a ducting component coupled to the frame, wherein the ducting component comprises a first portion and a second portion, and the first portion is configured to house at least a portion of one of the engine air intake assembly, the engine exhaust assembly, the transmission intake assembly, and the transmission exhaust assembly; and the second portion is configured to house at least a portion of a different one of the engine air intake assembly, the engine exhaust assembly, the transmission intake assembly, and the transmission exhaust assembly.

22. The vehicle of claim 15, wherein the engine intake assembly comprises an engine intake port and an airbox, and the first acoustical attenuation device is coupled fluidly between the engine intake port and the airbox.

23. The vehicle of claim 22, wherein the engine intake assembly comprises an air filter, and the air filter is coupled fluidly between the first acoustical attenuation device and the airbox.

24. The vehicle of claim 15, wherein the engine intake assembly includes an engine intake conduit, the engine exhaust assembly includes an engine exhaust conduit, the transmission intake assembly includes a transmission intake conduit, and the transmission exhaust assembly includes a transmission exhaust conduit, and the first acoustical attenuation device is positioned along a first conduit of the engine intake conduit, engine exhaust conduit, transmission intake conduit, and transmission exhaust conduit, and the second acoustical attenuation device is positioned along a second conduit of the engine intake conduit, engine exhaust conduit, transmission intake conduit, and transmission exhaust conduit.

25. The vehicle of claim 15, wherein the first acoustical attenuation device defines a first plurality of quarter wave tubes and the second acoustical attenuation device defines a second plurality of quarter wave tubes, wherein a first quarter wave tube of the first plurality of quarter wave tubes has a first length and a second quarter wave tube of the first plurality of quarter wave tubes has a second length, the second length being different than the first length.

26. The vehicle of claim 25, wherein the first acoustical attenuation device is coupled to the engine intake assembly, and the first quarter wave tube is positioned fluidly closer to an engine intake assembly inlet than the second quarter wave tube, and the second length is greater than the first length.

27. The vehicle of claim 26, wherein the second acoustical attenuation device is coupled to the transmission intake assembly, and wherein a first quarter wave tube of the second plurality of quarter wave tubes has a third length and a second quarter wave tube of the second plurality of quarter wave tubes has a fourth length, and the first quarter wave tube of the second plurality of quarter wave tubes is positioned fluidly closer to a transmission intake assembly inlet than the second quarter wave tube of the second plurality of quarter wave tubes, and the third length is greater than the fourth length.

28. A vehicle, comprising:

a frame;

a plurality of ground engaging members including at least one front ground engaging member and at least one rear ground engaging member supporting the frame;

an operator area supported by the frame;

a powertrain drivingly coupled to at least one of the plurality of ground engaging members, the powertrain comprising an engine including an engine intake and an engine exhaust, a transmission including a transmission intake and a transmission exhaust, and a plurality of conduits;

wherein a first conduit of the plurality of conduits defines a first plurality of quarter tubes and a second conduit of the plurality of conduits defines a second plurality of quarter tubes; and wherein each of the engine, transmission, the first plurality of quarter tubes, and the second plurality of quarter tubes are positioned rearwardly of the operator area.

29. The vehicle of claim 28, wherein the plurality of quarter tubes are positioned adjacent each other.

30. The vehicle of claim 1, wherein the plurality of quarter wave tubes are positioned adjacent each other.

* * * * *